(12) United States Patent
Miller et al.

(10) Patent No.: US 11,853,535 B2
(45) Date of Patent: Dec. 26, 2023

(54) SHARING AND USING PASSES OR ACCOUNTS

(71) Applicant: Apple Inc., Cupertino, CA (US)

(72) Inventors: Thomas John Miller, San Jose, CA (US); Russell Fenenga, Santa Clara, CA (US); Morgan Grainger, Nashville, TN (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/030,257

(22) Filed: Sep. 23, 2020

(65) Prior Publication Data

US 2021/0374750 A1    Dec. 2, 2021

Related U.S. Application Data

(60) Provisional application No. 63/041,996, filed on Jun. 21, 2020, provisional application No. 63/032,504, filed on May 29, 2020.

(51) Int. Cl.
| | |
|---|---|
| *G06F 3/04842* | (2022.01) |
| *H04L 67/306* | (2022.01) |
| *G06F 3/0485* | (2022.01) |
| *G06Q 20/32* | (2012.01) |
| *G06Q 20/22* | (2012.01) |
| *G06Q 20/40* | (2012.01) |

(52) U.S. Cl.
CPC ........ *G06F 3/04842* (2013.01); *G06F 3/0485* (2013.01); *G06Q 20/227* (2013.01); *G06Q 20/3267* (2020.05); *G06Q 20/3274* (2013.01); *G06Q 20/4014* (2013.01); *H04L 67/306* (2013.01)

(58) Field of Classification Search
CPC .......... G06Q 20/4014; G06Q 20/3274; G06Q 20/3267; G06Q 20/227; G06F 3/04842; G06F 3/0485; H04L 67/306
USPC ......................................................... 705/75
See application file for complete search history.

(56) References Cited

U.S. PATENT DOCUMENTS

| | | | |
|---|---|---|---|
| 2,013,027 A | 9/1935 | Branch | |
| 8,353,448 B1 * | 1/2013 | Miller | ............... G06Q 20/3276 235/379 |
| 8,381,969 B1 * | 2/2013 | Miller | ................. G06Q 20/382 235/375 |
| 8,466,875 B2 | 6/2013 | Nakada et al. | |

(Continued)

FOREIGN PATENT DOCUMENTS

| | | |
|---|---|---|
| CN | 101689188 A | 3/2010 |
| CN | 103635923 A | 3/2014 |

(Continued)

OTHER PUBLICATIONS

"Cease", Dictionary.com, Merriam-Webster. (Year: 2022).*

(Continued)

*Primary Examiner* — Hani M Kazimi
*Assistant Examiner* — Alison L. Lamb
(74) *Attorney, Agent, or Firm* — DLA Piper LLP (US)

(57) ABSTRACT

The present disclosure generally relates to a computer system displaying user interfaces for accessing passes and transfer accounts. In some examples, passes are added to the computer system. In some examples, passes are accessed. In some examples, transfers relating to the passes and transfer accounts are displayed, such as in search user interfaces.

30 Claims, 45 Drawing Sheets

(56) References Cited

U.S. PATENT DOCUMENTS

| | | |
|---|---|---|
| 8,496,563 B2 | 7/2013 | Komatsu et al. |
| 8,827,153 B1 | 9/2014 | Rhoades et al. |
| 9,348,492 B1 | 5/2016 | Penilla et al. |
| 9,485,251 B2 | 11/2016 | White et al. |
| 9,798,443 B1 | 10/2017 | Gray |
| 10,032,100 B2 | 7/2018 | Mullen et al. |
| 10,164,975 B1 | 12/2018 | Son et al. |
| 10,223,631 B2 | 3/2019 | Mullen et al. |
| 10,234,953 B1 | 3/2019 | Li et al. |
| 10,242,351 B1 | 3/2019 | Wilson et al. |
| 10,255,545 B2 | 4/2019 | Mullen et al. |
| 10,282,727 B2 | 5/2019 | Van Os et al. |
| 10,339,521 B1 | 7/2019 | Bodkin et al. |
| 10,503,912 B1 | 12/2019 | Kerr |
| 10,701,067 B1 | 6/2020 | Ziraknejad et al. |
| 10,776,779 B1 | 9/2020 | Ellis et al. |
| 10,853,791 B1 | 12/2020 | Ellis et al. |
| 11,127,013 B1 | 9/2021 | Boyd et al. |
| 11,157,918 B1 | 10/2021 | Ellison et al. |
| 11,182,774 B1 | 11/2021 | Boyd et al. |
| 11,216,119 B2 | 1/2022 | De Vries et al. |
| 11,312,207 B1 | 4/2022 | Sanders et al. |
| 2004/0128286 A1 | 7/2004 | Yasushi et al. |
| 2006/0048076 A1 | 3/2006 | Vronay et al. |
| 2006/0255906 A1 | 11/2006 | Ghabra et al. |
| 2007/0136093 A1 | 6/2007 | Rankin et al. |
| 2008/0041936 A1 | 2/2008 | Vawter |
| 2008/0048022 A1 | 2/2008 | Vawter |
| 2008/0214150 A1 | 9/2008 | Ramer et al. |
| 2009/0118100 A1 | 5/2009 | Oliver et al. |
| 2009/0164567 A1 | 6/2009 | Hara |
| 2009/0320125 A1 | 12/2009 | Pleasant et al. |
| 2010/0075656 A1 | 3/2010 | Howarter et al. |
| 2010/0331145 A1 | 12/2010 | Lakovic et al. |
| 2011/0032105 A1 | 2/2011 | Hoffman et al. |
| 2011/0077983 A1 | 3/2011 | Hua et al. |
| 2011/0131494 A1 | 6/2011 | Ono et al. |
| 2011/0165859 A1 | 7/2011 | Wengrovitz |
| 2011/0282785 A1 | 11/2011 | Chin |
| 2012/0105225 A1 | 5/2012 | Valtonen |
| 2012/0129493 A1 | 5/2012 | Vasudevan |
| 2012/0200390 A1 | 8/2012 | Saravanan |
| 2012/0323664 A1 | 12/2012 | Klems |
| 2013/0024371 A1 | 1/2013 | Hariramani et al. |
| 2013/0046600 A1 | 2/2013 | Coppinger |
| 2013/0073459 A1 | 3/2013 | Zacarias et al. |
| 2013/0233097 A1 | 9/2013 | Hayner et al. |
| 2013/0275008 A1 | 10/2013 | Breed |
| 2013/0304642 A1 | 11/2013 | Campos |
| 2014/0047331 A1 | 2/2014 | Feldman et al. |
| 2014/0129053 A1 | 5/2014 | Kleve et al. |
| 2014/0244494 A1 | 8/2014 | Davis et al. |
| 2014/0279519 A1 | 9/2014 | Mattes et al. |
| 2014/0304173 A1 | 10/2014 | Ernsdorff |
| 2014/0365466 A1 | 12/2014 | Chu et al. |
| 2015/0053757 A1 | 2/2015 | Williams et al. |
| 2015/0074774 A1* | 3/2015 | Nema .......... H04L 63/062 726/5 |
| 2015/0271175 A1 | 9/2015 | Je et al. |
| 2015/0278780 A1 | 10/2015 | Vaidyanathan et al. |
| 2015/0348001 A1 | 12/2015 | Van Os et al. |
| 2016/0018525 A1 | 1/2016 | Lanzagorta |
| 2016/0055511 A1 | 2/2016 | Chidella et al. |
| 2016/0057138 A1 | 2/2016 | Hoyos et al. |
| 2016/0070447 A1 | 3/2016 | Righter et al. |
| 2016/0072794 A1 | 3/2016 | Engert |
| 2016/0078143 A1* | 3/2016 | Huang .......... G06Q 50/01 235/375 |
| 2016/0078581 A1 | 3/2016 | Maher |
| 2016/0134599 A1 | 5/2016 | Ross et al. |
| 2016/0180332 A1 | 6/2016 | Wilczynski |
| 2016/0252978 A1 | 9/2016 | Yoo et al. |
| 2016/0259497 A1 | 9/2016 | Foss et al. |
| 2016/0294831 A1 | 10/2016 | Borunda et al. |
| 2016/0295005 A1 | 10/2016 | Schussmann et al. |
| 2016/0300054 A1 | 10/2016 | Turgeman et al. |
| 2016/0373458 A1 | 12/2016 | Moreton et al. |
| 2017/0032485 A1 | 2/2017 | Vemury |
| 2017/0053470 A1 | 2/2017 | Bergerhoff et al. |
| 2017/0091765 A1 | 3/2017 | Lloyd et al. |
| 2017/0109901 A1 | 4/2017 | Raj |
| 2017/0120864 A1 | 5/2017 | Fischer et al. |
| 2017/0124312 A1 | 5/2017 | Inoue |
| 2017/0140642 A1 | 5/2017 | Kim |
| 2017/0151928 A1 | 6/2017 | Kang et al. |
| 2017/0169528 A1 | 6/2017 | Kundu et al. |
| 2017/0213211 A1 | 7/2017 | Sibert et al. |
| 2017/0243200 A1 | 8/2017 | Vaidyanathan et al. |
| 2017/0248946 A1 | 8/2017 | Ogura et al. |
| 2017/0286656 A1 | 10/2017 | Kohli |
| 2017/0343200 A1 | 11/2017 | Lai et al. |
| 2017/0357520 A1* | 12/2017 | De Vries .......... G06F 3/0485 |
| 2018/0018595 A1 | 1/2018 | Scott et al. |
| 2018/0018664 A1 | 1/2018 | Purves et al. |
| 2018/0029560 A1 | 2/2018 | Mohaupt et al. |
| 2018/0033034 A1 | 2/2018 | Ye et al. |
| 2018/0041503 A1 | 2/2018 | Lindemann |
| 2018/0103414 A1 | 4/2018 | Golsch |
| 2018/0108031 A1 | 4/2018 | Jones et al. |
| 2018/0126248 A1 | 5/2018 | Dion et al. |
| 2018/0130044 A1 | 5/2018 | Gage et al. |
| 2018/0165655 A1 | 6/2018 | Marcelle et al. |
| 2018/0167387 A1 | 6/2018 | Bhatt et al. |
| 2018/0186333 A1 | 7/2018 | Santiano et al. |
| 2018/0191501 A1 | 7/2018 | Lindemann |
| 2018/0195874 A1 | 7/2018 | Andrew et al. |
| 2018/0260553 A1 | 9/2018 | Hoyos et al. |
| 2018/0265095 A1 | 9/2018 | Joe et al. |
| 2018/0276657 A1 | 9/2018 | Cho et al. |
| 2018/0322488 A1 | 11/2018 | Arana et al. |
| 2018/0335928 A1 | 11/2018 | Van Os et al. |
| 2018/0357846 A1 | 12/2018 | Chen |
| 2018/0367946 A1 | 12/2018 | Best |
| 2019/0043148 A1 | 2/2019 | Vemury |
| 2019/0057412 A1 | 2/2019 | Bhattacharjee et al. |
| 2019/0061687 A1 | 2/2019 | Khalil |
| 2019/0080070 A1 | 3/2019 | Van Os et al. |
| 2019/0080189 A1 | 3/2019 | Van Os et al. |
| 2019/0092279 A1 | 3/2019 | Jarvis et al. |
| 2019/0163876 A1 | 5/2019 | Remme et al. |
| 2019/0164165 A1 | 5/2019 | Ithabathula |
| 2019/0197527 A1 | 6/2019 | Agarwalla et al. |
| 2019/0220662 A1 | 7/2019 | Shenouda Dawoud |
| 2019/0263356 A1 | 8/2019 | Golsch et al. |
| 2019/0287111 A1 | 9/2019 | Cvetkovich et al. |
| 2019/0305949 A1 | 10/2019 | Hamel et al. |
| 2019/0327228 A1 | 10/2019 | Pantfoerder et al. |
| 2019/0370781 A1 | 12/2019 | Van Os et al. |
| 2020/0020196 A1 | 1/2020 | Petersen et al. |
| 2020/0065822 A1 | 2/2020 | Lin et al. |
| 2020/0211031 A1 | 7/2020 | Patil |
| 2020/0269811 A1 | 8/2020 | Kim et al. |
| 2020/0320653 A1 | 10/2020 | Hastings et al. |
| 2020/0349244 A1 | 11/2020 | Kim et al. |
| 2020/0391049 A1 | 12/2020 | Moffat et al. |
| 2021/0004792 A1 | 1/2021 | Kikinis et al. |
| 2021/0014678 A1 | 1/2021 | Seagraves et al. |
| 2021/0089635 A1 | 3/2021 | Weeresinghe |
| 2021/0127233 A1 | 4/2021 | Santavicca et al. |
| 2021/0229630 A1 | 7/2021 | Kramar et al. |
| 2021/0266500 A1 | 8/2021 | Taylor et al. |
| 2021/0287768 A1 | 9/2021 | Craig et al. |
| 2021/0319468 A1 | 10/2021 | Zhu et al. |
| 2021/0319862 A1 | 10/2021 | Boyd et al. |
| 2021/0321263 A1 | 10/2021 | Boyd et al. |
| 2021/0373745 A1 | 12/2021 | Chang |
| 2021/0374714 A1 | 12/2021 | Chang |
| 2021/0374750 A1 | 12/2021 | Miller et al. |
| 2021/0377742 A1 | 12/2021 | Boyd et al. |
| 2022/0121299 A1 | 4/2022 | De Vries et al. |
| 2022/0135001 A1 | 5/2022 | Alsina et al. |
| 2022/0277295 A1 | 9/2022 | Robinson-Morgan et al. |
| 2022/0332285 A1 | 10/2022 | Sanders et al. |
| 2022/0391481 A1 | 12/2022 | Villanueva Gaviola et al. |

(56) References Cited

U.S. PATENT DOCUMENTS

| | | | |
|---|---|---|---|
| 2022/0391482 | A1 | 12/2022 | Villanueva Gaviola et al. |
| 2023/0039942 | A1 | 2/2023 | Young et al. |
| 2023/0089689 | A1 | 3/2023 | Pons Bordes et al. |

FOREIGN PATENT DOCUMENTS

| | | | | |
|---|---|---|---|---|
| CN | 105190659 | A | 12/2015 | |
| CN | 105338066 | A | 2/2016 | |
| CN | 105787755 | A | 7/2016 | |
| CN | 109353309 | A | 2/2019 | |
| CN | 110135872 | A | 8/2019 | |
| EP | 2981115 | A2 | 2/2016 | |
| EP | 3460692 | A1 | 3/2019 | |
| EP | 3476670 | A1 | 5/2019 | |
| JP | 2013-37568 | A | 2/2013 | |
| JP | 2016-133969 | A | 7/2016 | |
| JP | 2018-136886 | A | 8/2018 | |
| JP | 2018-156283 | A | 10/2018 | |
| JP | 2019-46122 | A | 3/2019 | |
| JP | 2019-95880 | A | 6/2019 | |
| JP | 2019-191753 | A | 10/2019 | |
| JP | 2019-535931 | A | 12/2019 | |
| KR | 10-2013-0131956 | A | 12/2013 | |
| KR | 10-1509596 | B1 | 4/2015 | |
| KR | 10-2015-0066892 | A | 6/2015 | |
| KR | 10-1684188 | B1 | 12/2016 | |
| KR | 10-2020-0108515 | A | 9/2020 | |
| WO | 2008/157016 | A1 | 12/2008 | |
| WO | 2013/003210 | A3 | 2/2013 | |
| WO | 2014/146186 | A1 | 9/2014 | |
| WO | 2015/153154 | A1 | 10/2015 | |
| WO | 2016/128569 | A1 | 8/2016 | |
| WO | 2017/078635 | A1 | 5/2017 | |
| WO | WO-2017218490 | A1 * | 12/2017 | ........... G06Q 20/206 |
| WO | 2018/071674 | A1 | 4/2018 | |
| WO | 2018/074504 | A1 | 4/2018 | |
| WO | 2019/069129 | A1 | 4/2019 | |
| WO | 2019/191213 | A1 | 10/2019 | |
| WO | 2020/197694 | A1 | 10/2020 | |

OTHER PUBLICATIONS

M. Eminagaoglu, E. Cini, G. Sert and D. Zor, "A Two-Factor Authentication System with QR Codes for Web and Mobile Applications,"2014 Fifth International Conference on Emerging Security Technologies, 2014, pp. 105-112. (Year: 2014).*
International Search Report and Written Opinion received for PCT Patent Appiication No. PCT/US2021/015123, dated Aug. 9, 2021, 20 pages.
Applicant-Initiated Interview Summary received for U.S. Appl. No. 17/030,259, dated Nov. 19, 2021, 18 pages.
Certificate of Examination received for Australian Patent Application No. 2021100511, dated Nov. 5, 2021, 2 pages.
Office Action received for Australian Patent Application No. 2021100511, dated Sep. 2, 2021, 3 pages.
Intention to Grant received for Danish Patent Application No. PA202170032, dated Oct. 6, 2021, 2 pages.
International Search Report and Written Opinion received for PCT Patent Application No. PCT/US2021/033051, dated Oct. 29, 2021, 20 pages.
Meet Your Model 3, Available Online at: https://www.tesla.com/support/meet-your-tesla/model-3#keys, 2021, 3 pages.
Non-Final Office Action received for U.S. Appl. No. 17/030,260, dated Oct. 6, 2021, 43 pages.
Notice of Allowance received for U.S. Appl. No. 15/608,848, dated Oct. 29, 2021, 7 pages.
Sibila Alex, "Tesla App Full Walkthrough (Mar. 2020)", Available Online at: https://www.youtube.com/watch?v=RHMWPj_RXLU, Mar. 16, 2020, 3 pages.
Use your iPhone or Apple Watch as a car key, Available Online at: https://support.apple.com/en-us/HT211234, Mar. 16, 2021, 5 pages.
Volvo On Call app: Operating remote start of the car, Available Online at: https://www.volvocars.com/en-ca/support/topics/volvo-on-call/app/volvo-on-call-app-operating-remote-start-of-the-car-2, Nov. 5, 2020, 4 pages.
Office Action received for Danish Patent Application No. PA202170032, dated May 7, 2021, 7 pages.
Applicant-Initiated Interview Summary received for U.S. Appl. No. 15/608,848, dated May 12, 2020, 5 pages.
Applicant-Initiated Interview Summary received for U.S. Appl. No. 15/608,848, dated Nov. 1, 2019, 3 pages.
Final Office Action received for U.S. Appl. No. 15/608,848, dated Aug. 21, 2020, 15 pages.
Final Office Action received for U.S. Appl. No. 15/608,848, dated Jun. 26, 2019, 27 pages.
Non-Final Office Action received for U.S. Appl. No. 15/608,848, dated Feb. 6, 2020, 12 pages.
Non-Final Office Action received for U.S. Appl. No. 15/608,848, dated Nov. 2, 2018, 21 pages.
Gym Book—Strength Training Planner, Logger and Analyzer, GymBookApp, Available Online at: https://web.archive.org/web/20160401104508/https://gymbookapp.com/, Apr. 1, 2016, 10 pages.
Invitation to Pay Additional Fees received for PCT Patent Application No. PCT/US2021/033051, mailed on Aug. 26, 2021, 10 pages.
Non-Final Office Action received for U.S. Appl. No. 17/030,259, dated Aug. 19, 2021, 20 pages.
Notice of Allowance received for U.S. Appl. No. 15/608,848, dated Aug. 25, 2021, 9 pages.
Office Action received for Australian Patent Application No. 2021102823, dated Aug. 24, 2021, 8 pages.
Lurey C., "Keeper fortifies industry best security architecture with integrated two-factor codes", Online available at: https://www.keepersecurity.com/blog/2019/08/29/keeper-fortifies-industry-best-securityarchitecture-with-integrated-two-factor-codes/, Aug. 29, 2019, 8 pages.
Applicant Initiated Interview Summary received for U.S. Appl. No. 15/608,848, dated Oct. 26, 2020, 3 pages.
Invitation to Pay Additional Fees received for PCT Patent Application No. PCT/US2021/015123, dated Jun. 16, 2021, 12 pages.
Non-Final Office Action received for U.S. Appl. No. 15/608,848, dated Feb. 12, 2021, 14 pages.
Applicant Initiated Interview Summary received for U.S. Appl. No. 15/608,848, dated Apr. 13, 2021, 4 pages.
Office Action received for Australian Patent Application No. 2021100511, dated May 26, 2021, 5 pages.
Final Office Action received for U.S. Appl. No. 17/030,256, dated Mar. 14, 2022, 20 pages.
Final Office Action received for U.S. Appl. No. 17/030,260, dated Mar. 9, 2022, 42 pages.
Applicant-Initiated Interview Summary received for U.S. Appl. No. 17/030,260, dated May 5, 2022, 2 pages.
Corrected Notice of Allowance received for U.S. Appl. No. 17/484,306, dated Mar. 30, 2022, 4 pages.
International Search Report and Written Opinion received for PCT Patent Application No. PCT/US2021/057325, dated Jan. 5, 2022, 14 pages.
Notice of Allowance received for U.S. Appl. No. 17/484,306, dated Nov. 26, 2021, 9 pages.
Notice of Allowance received for U.S. Appl. No. 17/030,259, dated Dec. 14, 2021, 8 pages.
Juan, "Everything you can do with Wechat QR codes in 2019", Available online at: https://qpsoftware.net/blog/wechat-qr-code, Jul. 1, 2019, 13 pages.
Linelovers, "4 ways to add someone to your Line friends list", Available online at: http://line-lovers-world.com/2016/10/23/%E3%80%90line-app%E3%80%914-ways-to-add-someone-to-your-line-friends-list/, Oct. 23, 2016, 14 pages.
Mack, Brandon, "How Do Snapchat's Snapcodes Work?", Available online at: https://blackatlascreative.com/blog/how-do-snapchats-snapcodes-work/, Nov. 10, 2015, 10 pages.
Office Action received for Australian Patent Application No. 2021102823, dated Nov. 24, 2021, 7 pages.

(56) References Cited

OTHER PUBLICATIONS

Applicant-Initiated Interview Summary received for U.S. Appl. No. 17/030,256, dated Feb. 23, 2022, 2 pages.
Office Action received for Australian Patent Application No. 2021102823, dated Feb. 22, 2022, 5 pages.
Office Action received for Australian Patent Application No. 2021213717, dated Feb. 10, 2022, 4 pages.
Search Report and Opinion received for Danish Patent Application No. PA202170598, dated Feb. 15, 2022, 11 pages.
Decision to Grant received for Danish Patent Application No. PA202170032, dated Feb. 1, 2022, 2 pages.
Notice of Allowance received for U.S. Appl. No. 17/180,509, dated Apr. 28, 2021, 16 pages.
Notice of Allowance received for U.S. Appl. No. 17/180,509, dated Aug. 23, 2021, 14 pages.
Corrected Notice of Allowance received for U.S. Appl. No. 17/030,259, dated Apr. 4, 2022, 2 pages.
Applicant Initiated Interview Summary received for U.S. Appl. No. 17/030,260, dated Jan. 7, 2022, 2 pages.
Corrected Notice of Allowance received for U.S. Appl. No. 17/030,259, dated Jan. 5, 2022, 2 pages.
Non-Final Office Action received for U.S. Appl. No. 17/030,256, dated Jan. 18, 2022, 20 pages.
August, et al., "Mobile web searching", Bell Lab Technical Journal, vol. 6, No. 2, 2002, pp. 84-98.
Corrected Notice of Allowance received for U.S. Appl. No. 17/030,256, dated Nov. 9, 2022, 8 pages.
Dahan, et al., "Increasing TeraGrid User Productivity through Integration of Information and Interactive Services", IEEE, 2008, 11 pages.
Final Office Action received for U.S. Appl. No. 17/030,260, dated Nov. 4, 2022, 39 pages.
Notice of Allowance received for Korean Patent Application No. 10-2022-0003867, dated Oct. 21, 2022, 7 pages (2 pages of English Translation and 5 pages of Official Copy).
Office Action received for European Patent Application No. 21707473.1, dated Oct. 31, 2022, 7 pages.
Applicant-Initiated Interview Summary received for U.S. Appl. No. 17/030,260, dated Oct. 11, 2022, 2 pages.
Applicant-Initiated Interview Summary received for U.S. Appl. No. 17/077,820, dated Oct. 6, 2022, 2 pages.
International Search Report and Written Opinion received for PCT Patent Application No. PCT/US2022/025365, dated Sep. 27, 2022, 16 pages.
Non-Final Office Action received for U.S. Appl. No. 17/375,767, dated Sep. 29, 2022, 10 pages.
Applicant-Initiated Interview Summary received for U.S. Appl. No. 17/030,256, dated Jun. 17, 2022, 2 pages.
Office Action received for Australian Patent Application No. 2021213717, dated Jun. 17, 2022, 4 pages.
Applicant-Initiated Interview Summary received for U.S. Appl. No. 17/375,767, dated Oct. 27, 2022, 4 pages.
Non-Final Office Action received for U.S. Appl. No. 17/077,820, dated Aug. 31, 2022, 10 pages.
Office Action received for Danish Patent Application No. PA202170598, dated Sep. 7, 2022, 4 pages.
Non-Final Office Action received for U.S. Appl. No. 17/030,260, dated Jul. 8, 2022, 36 pages.
Notice of Allowance received for U.S. Appl. No. 17/030,256, dated Jul. 20, 2022, 9 pages.
Non-Final Office Action received for U.S. Appl. No. 17/222,568, dated Sep. 16, 2022, 32 pages.
Notice of Acceptance received for Australian Patent Application No. 2021213717, dated Sep. 21, 2022, 3 pages.
Office Action received for Australian Patent Application No. 2021203367, dated May 23, 2022, 5 pages.
Office Action received for Korean Patent Application No. 10-2022-0003867, dated May 17, 2022, 19 pages (9 pages of English Translation and 10 pages of Official Copy).
International Preliminary Report on Patentability received for PCT Patent Application No. PCT/US2021/015123, dated Aug. 11, 2022, 14 pages.
Invitation to Pay Additional Fees received for PCT Patent Application No. PCT/US2022/025365, dated Aug. 4, 2022, 9 pages.
International Preliminary Report on Patentability received for PCT Patent Application No. PCT/US2021/033051, dated Dec. 8, 2022.
2016-133969, JP, A, Cited by the Japanese Patent Office in an Office Action for related Patent Application No. 2022-520133 dated Oct. 17, 2022.
2019-191753, JP, A, Cited by the Japanese Patent Office in an Office Action for related Patent Application No. 2022-520133 dated Oct. 17, 2022.
2019- 535931, JP, A, Cited by the Japanese Patent Office in an Office Action for related Patent Application No. 2022-520133 dated Oct. 17, 2022.
Notice of Allowance received for Japanese Patent Application No. 2023-028792, dated Jun. 26, 2023, 4 pages (1 page of English Translation and 3 pages of Official Copy).
Office Action received for Japanese Patent Application No. 2022-573404, dated Jul. 3, 2023, 12 pages (6 pages of English Translation and 6 pages of Official Copy).
Office Action received for Japanese Patent Application No. 2022-520133, dated Oct. 17, 2022, 4 pages (2 pages of English Translation and 2 pages of Official Copy).
Advisory Action received for U.S. Appl. No. 17/030,260, dated Dec. 13, 2022, 4 pages.
Advisory Action received for U.S. Appl. No. 17/222,568, dated Apr. 20, 2023, 5 pages.
Advisory Action received for U.S. Appl. No. 17/375,767, dated Jun. 29, 2023, 2 pages.
Advisory Action received for U.S. Appl. No. 17/485,086, dated Sep. 9, 2022, 5 pages.
Applicant-Initiated Interview Summary received for U.S. Appl. No. 17/485,086, dated Apr. 26, 2022, 2 pages.
Applicant-Initiated Interview Summary received for U.S. Appl. No. 17/030,260, dated Nov. 29, 2022, 2 pages.
Applicant-Initiated Interview Summary received for U.S. Appl. No. 17/375,767, dated Apr. 13, 2023, 2 pages.
Applicant-Initiated Interview Summary received for U.S. Appl. No. 17/375,767, dated Feb. 2, 2023, 2 pages.
Applicant-Initiated Interview Summary received for U.S. Appl. No. 17/375,767, dated Jun. 26, 2023, 2 pages.
Applicant-Initiated Interview Summary received for U.S. Appl. No. 17/485,086, dated Dec. 23, 2022, 2 pages.
Corrected Notice of Allowance received for U.S. Appl. No. 17/077,820, dated Feb. 6, 2023, 2 pages.
Corrected Notice of Allowance received for U.S. Appl. No. 17/077,820, dated Jan. 19, 2023, 2 pages.
Corrected Notice of Allowance received for U.S. Appl. No. 17/077,820, dated Mar. 8, 2023, 2 pages.
Corrected Notice of Allowance received for U.S. Appl. No. 17/485,098, dated Oct. 13, 2022, 8 pages.
Extended European Search Report received for European Patent Application No. 23165330.4, dated Jun. 28, 2023, 10 pages.
Final Office Action received for U.S. Appl. No. 17/222,568, dated Feb. 8, 2023, 68 pages.
Final Office Action received for U.S. Appl. No. 17/375,767, dated Dec. 29, 2022, 13 pages.
Final Office Action received for U.S. Appl. No. 17/375,767, dated Jun. 1, 2023, 15 pages.
Final Office Action received for U.S. Appl. No. 17/485,086, dated May 4, 2022, 21 pages.
Intention to Grant received for Danish Patent Application No. PA202170598, dated Apr. 24, 2023, 2 pages.
Intention to Grant received for Danish Patent Application No. PA202170598, dated Jan. 16, 2023, 2 pages.
International Preliminary Report on Patentability received for PCT Patent Application No. PCT/US2021/057325, dated May 19, 2023, 8 pages.
International Search Report and Written Opinion received for PCT Patent Application No. PCT/US2022/030567, dated Dec. 9, 2022, 24 pages.

(56) References Cited

OTHER PUBLICATIONS

International Search Report and Written Opinion received for PCT Patent Application No. PCT/US2022/042978, dated Nov. 29, 2022, 15 pages.
Invitation to Pay Additional Fees and Partial International Search Report received for PCT Patent Application No. PCT/US2022/030567, dated Sep. 13, 2022, 13 pages.
Non-Final Office Action received for U.S. Appl. No. 17/222,568, dated May 25, 2023, 72 pages.
Non-Final Office Action received for U.S. Appl. No. 17/375,767, dated Feb. 16, 2023, 12 pages.
Non-Final Office Action received for U.S. Appl. No. 17/485,086, dated Jan. 24, 2022, 19 pages.
Non-Final Office Action Received for U.S. Appl. No. 17/485,086, dated Nov. 14, 2022, 22 pages.
Non-Final Office Action received for U.S. Appl. No. 17/566,521, dated May 15, 2023, 12 pages.
Notice of Acceptance received for Australian Patent Application No. 2022235545, dated Jun. 27, 2023, 3 pages.
Notice of Allowance received for Japanese Patent Application No. 2022-520133, dated Jan. 27, 2023, 4 pages (1 page of English Translation and 3 pages of Official Copy).
Notice of Allowance received for Korean Patent Application No. 10-2022-7045895, dated Apr. 19, 2023, 7 pages (2 pages of English Translation and 5 pages of Official Copy).
Notice of Allowance received for U.S. Appl. No. 17/030,260, dated Jun. 28, 2023, 11 pages.
Notice of Allowance received for U.S. Appl. No. 17/030,260, dated May 3, 2023, 14 pages.
Notice of Allowance received for U.S. Appl. No. 17/077,820, dated Jan. 6, 2023, 11 pages.
Notice of Allowance received for U.S. Appl. No. 17/398,723, dated Feb. 23, 2023, 17 pages.
Notice of Allowance received for U.S. Appl No. 17/398,723, dated Jun. 15, 2023, 15 pages.
Notice of Allowance received for U.S. Appl. No. 17/485,086, dated Jan. 30, 2023, 9 pages.
Notice of Allowance received for U.S. Appl. No. 17/485,098, dated Aug. 5, 2022, 12 pages.
Office Action received for Australian Patent Application No. 2022235545, dated May 11, 2023, 3 pages.
Office Action received for European Patent Application No. 21707473.1, dated May 4, 2023, 5 pages.
Office Action received for Korean Patent Application No. 10-2021-0151108, dated Jan. 13, 2023, 10 pages (5 pages of English Translation and 5 pages of Official Copy).
Search Report received for Danish Patent Application No. 202270438, dated Dec. 5, 2022, 9 pages.
Office Action received for Chinese Patent Application No. 202310033917.0, dated Jun. 28, 2023, 19 pages (10 pages of English Translation and 9 pages of Official Copy).

* cited by examiner

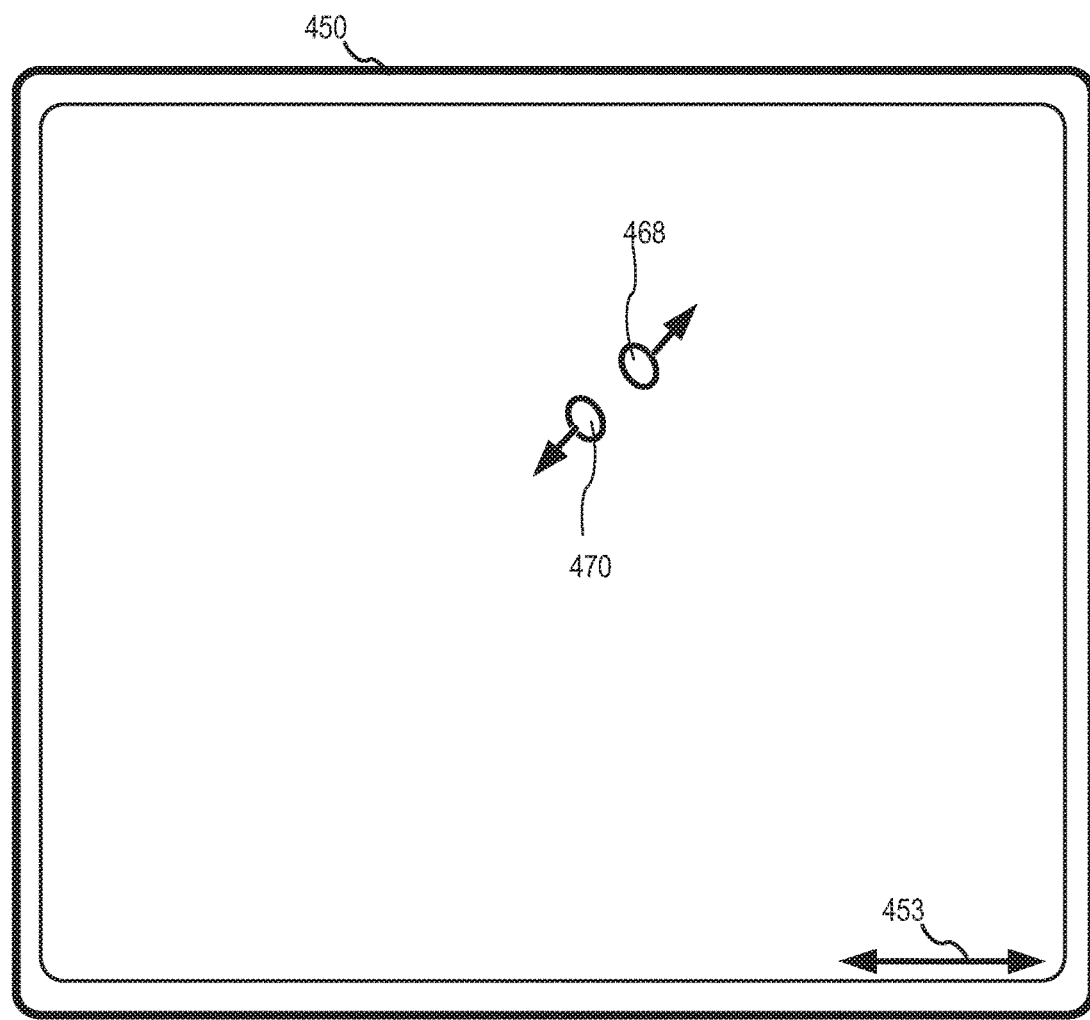
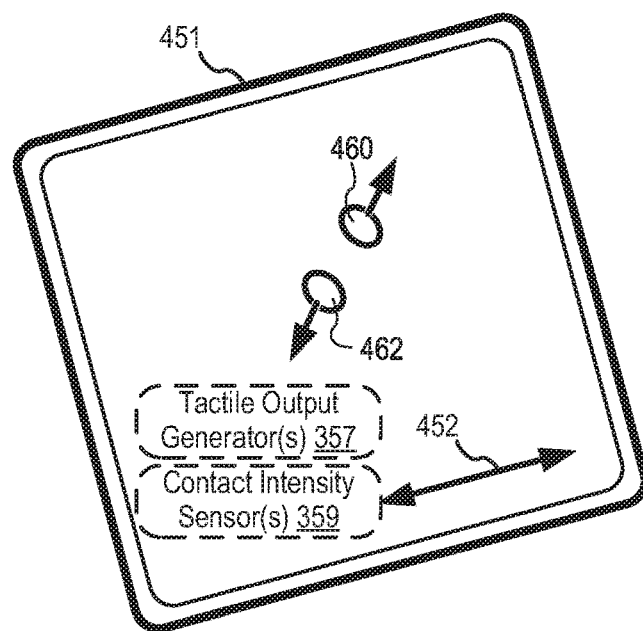
*FIG. 4B*

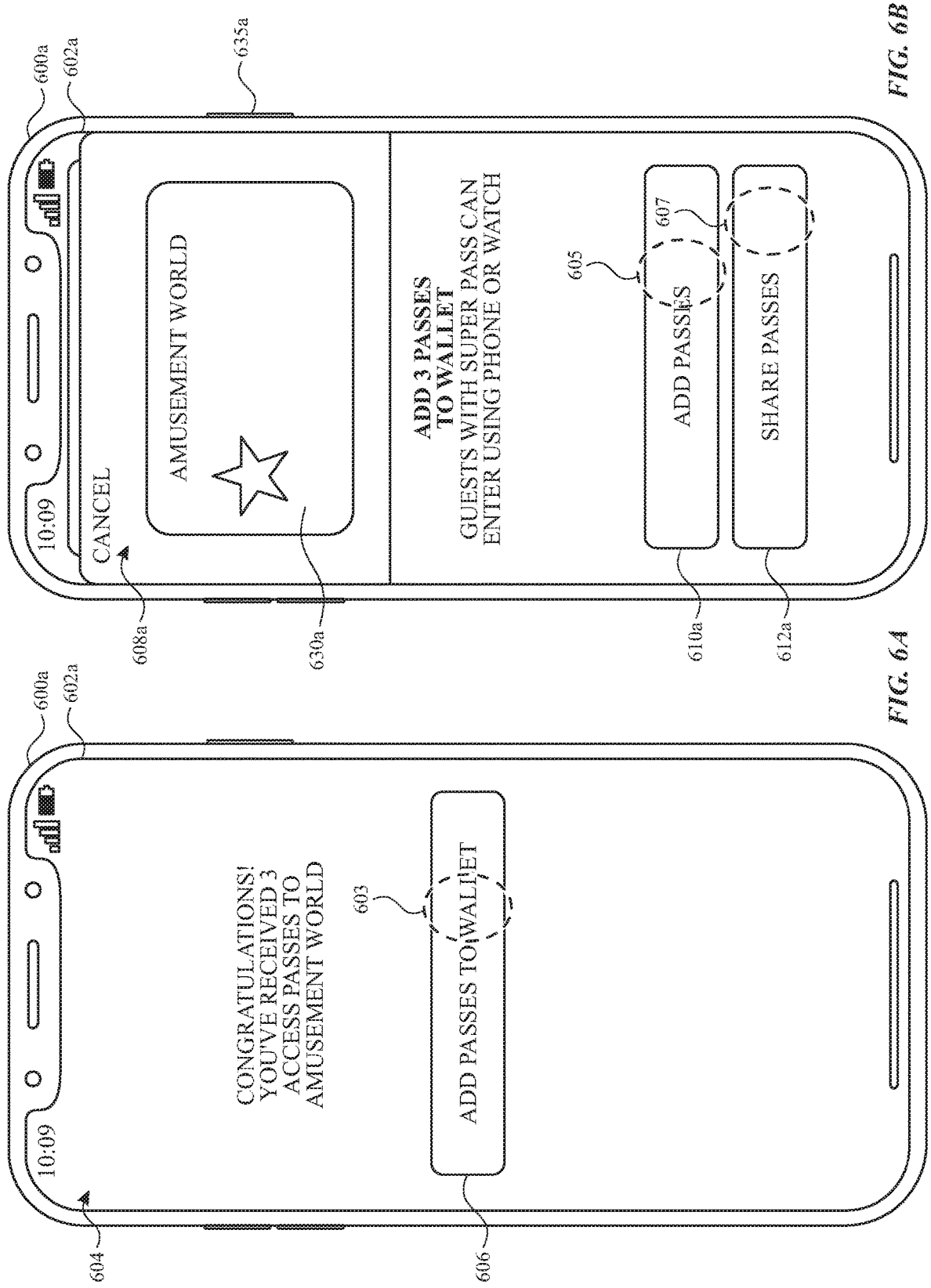

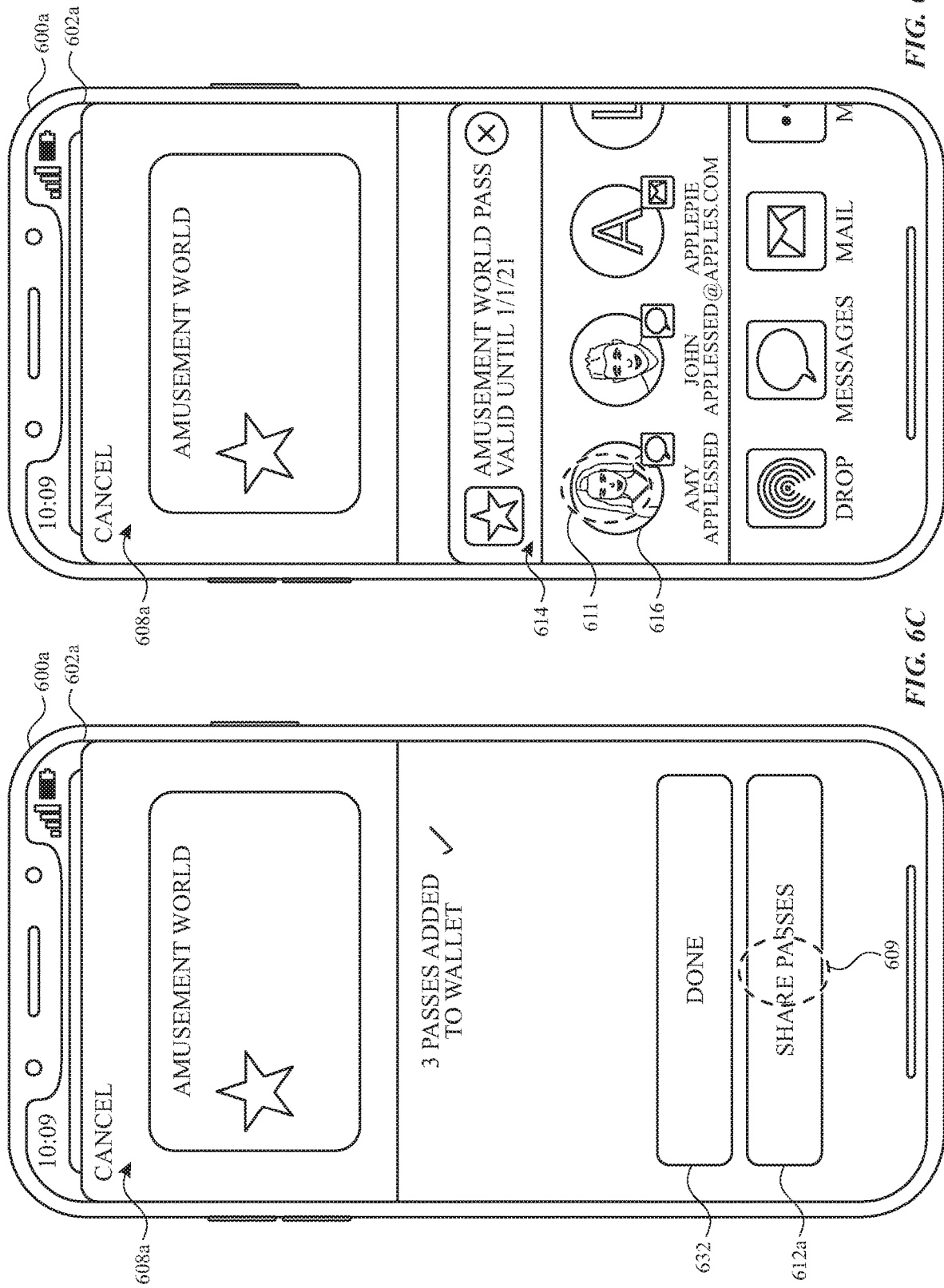

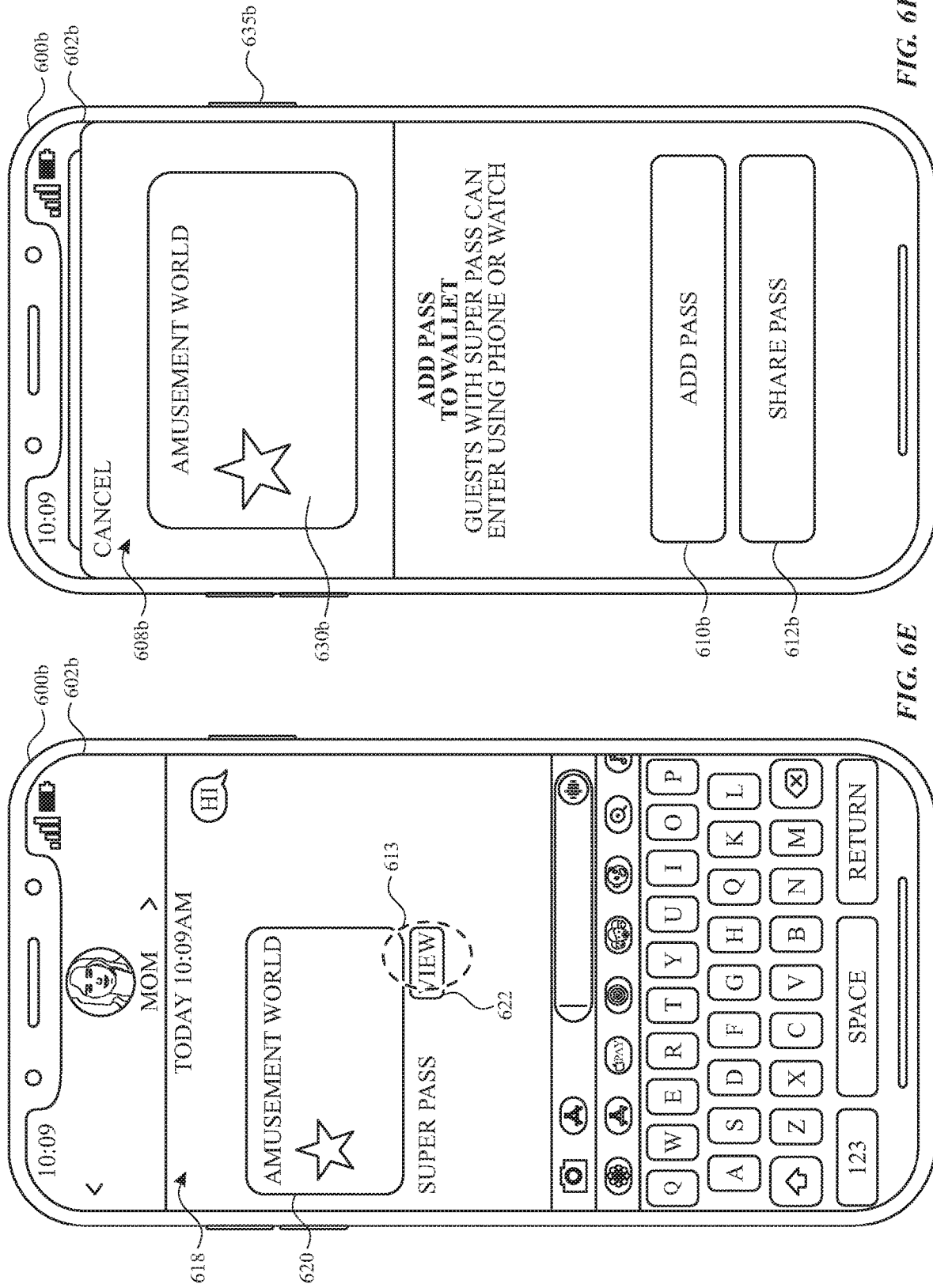

700↘

702
Display a first user interface that includes information about one or more passes associated with a service provider

704
While displaying the first user interface, receive a request to add one or more passes to an account associated with a first user identity, wherein the one or more passes provide access to a service provided by the service provider

706
Display a share affordance for providing at least one of the one or more passes to an account associated with a second user identity

708
Receive a user input corresponding to selection of the share affordance

710
In response to receiving the user input corresponding to selection of the share affordance, initiate a process for providing at least one of the one or more passes to the account associated with the second user identity

*FIG. 7*

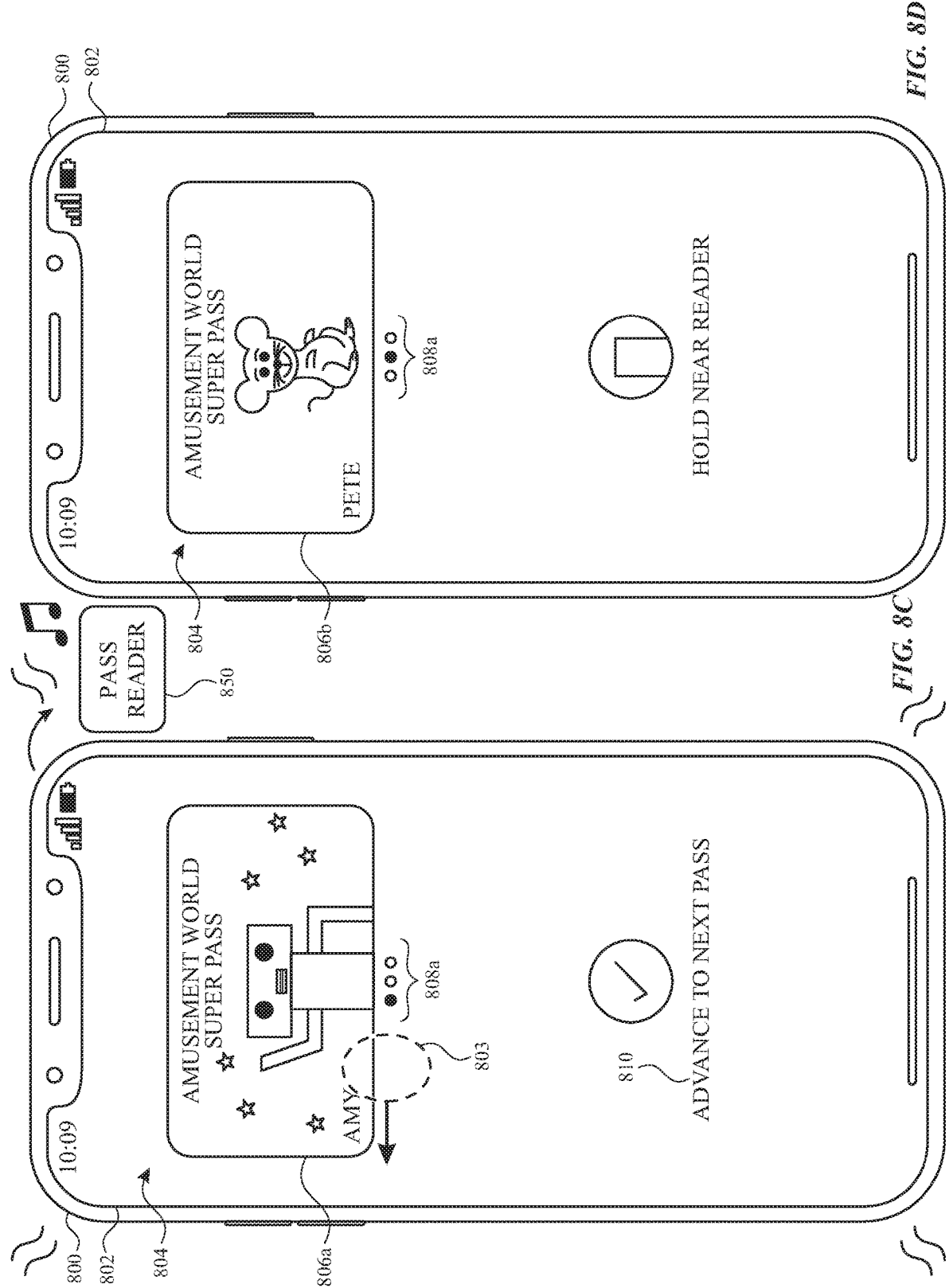

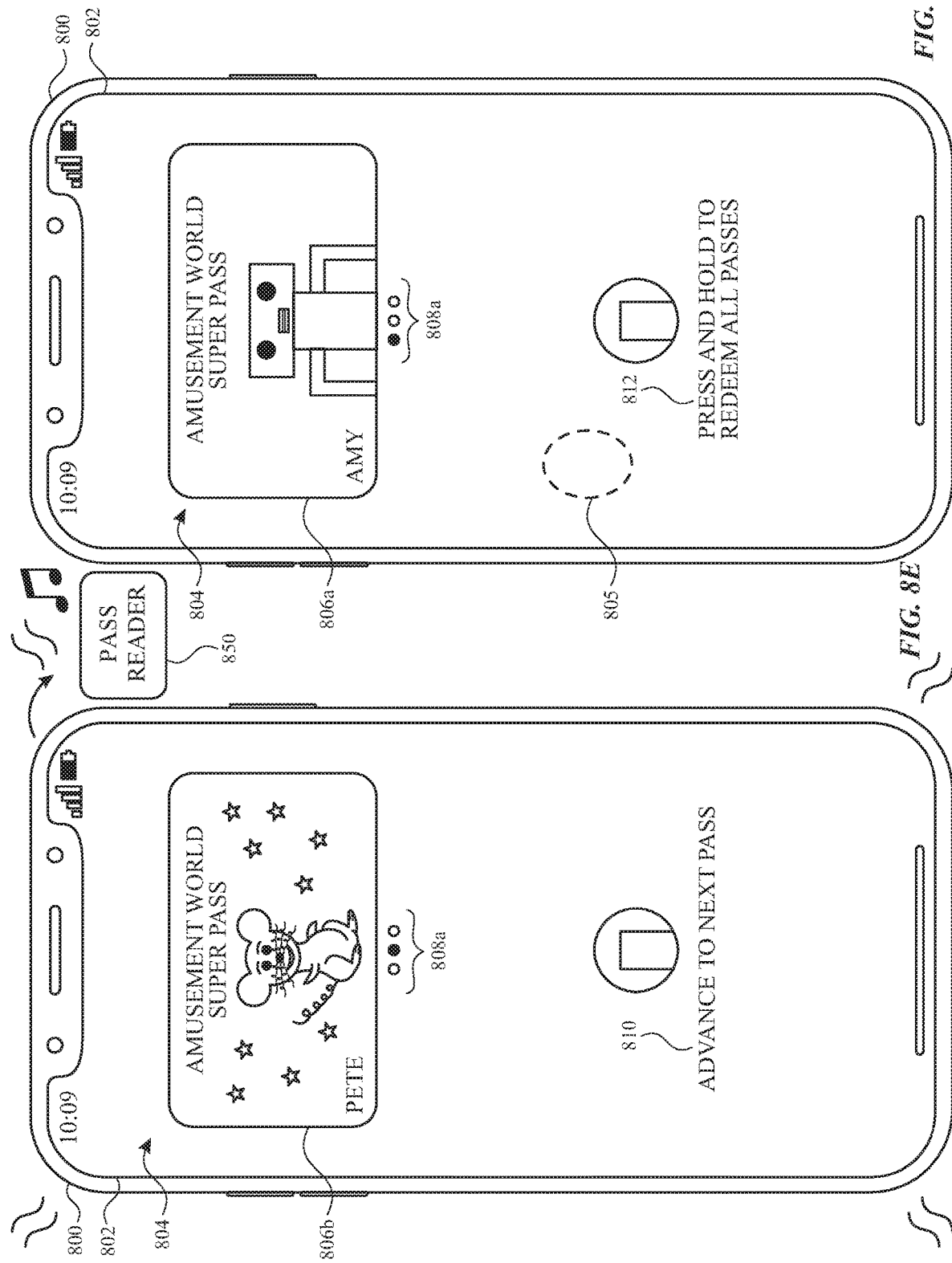

900

902
Detect that data corresponding to a first pass was provided by the computer system to a pass reader terminal that is separate from the computer system

904
Display an indication that data corresponding to the first pass was provided by the computer system to the pass reader terminal

906
In accordance with a determination that data corresponding to a second pass is available to be provided to the pass reader terminal by the computer system, provide a prompt to the user to provide authorization for data corresponding to the second pass to be provided to the pass reader terminal by the computer system

908
In accordance with a determination that data corresponding to a second pass is not available to be provided to the pass reader terminal by the computer system, forgo providing the prompt to the user to provide authorization for data corresponding to a second pass to be provided to the pass reader terminal by the computer system

*FIG. 9*

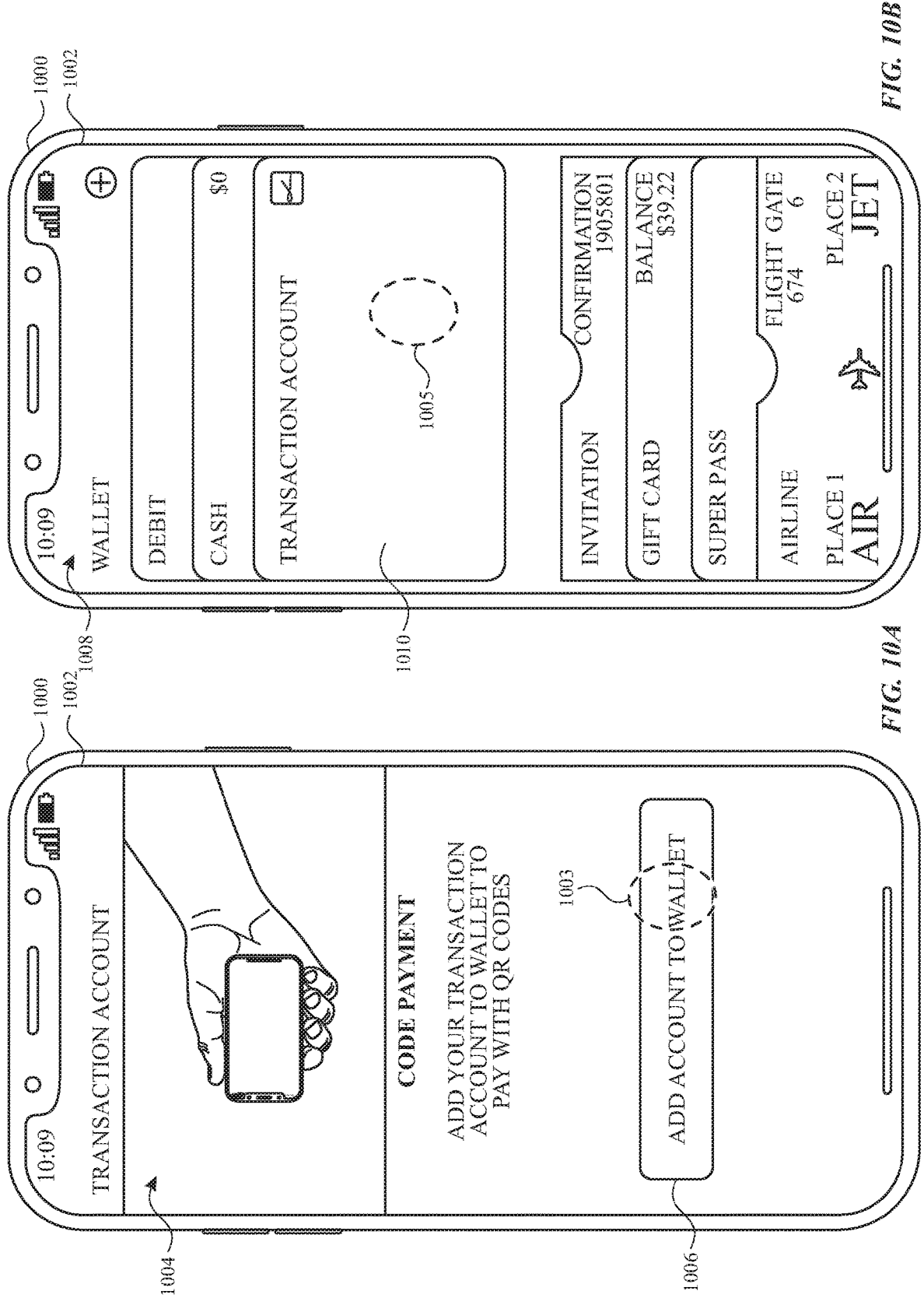

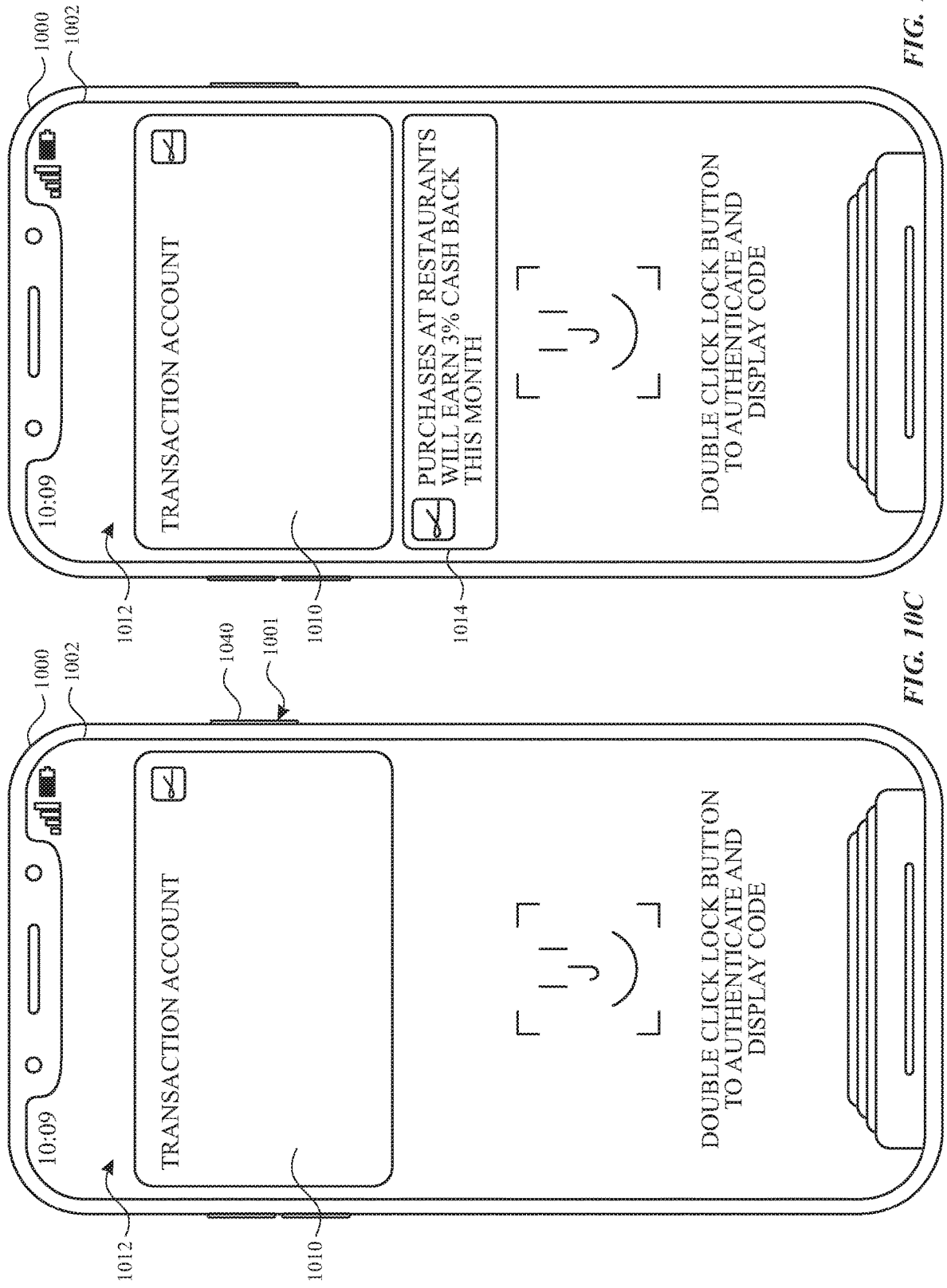

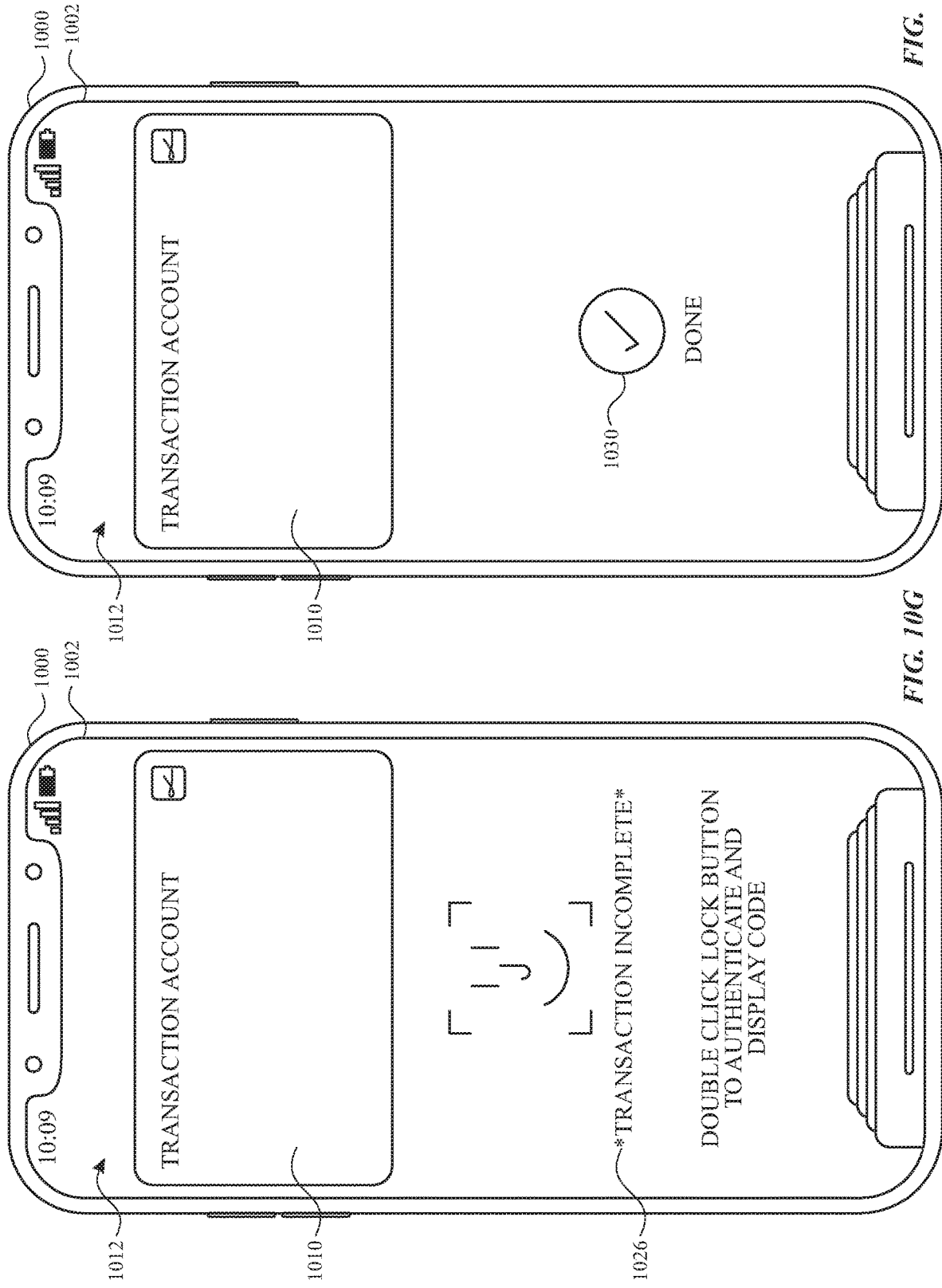

1100

1102
Display a first user interface including an indication of an account

1104
Receive authentication data

1106
In response to receiving the authentication data:

1108
In accordance with a determination that the authentication data satisfies authentication criteria associated with the account, display a first machine-readable code associated with the account 1110
In accordance with a determination that the authentication data does not satisfy the authentication criteria associated with the account, forgo display of the first machine-readable code associated with the account

*FIG. 11*

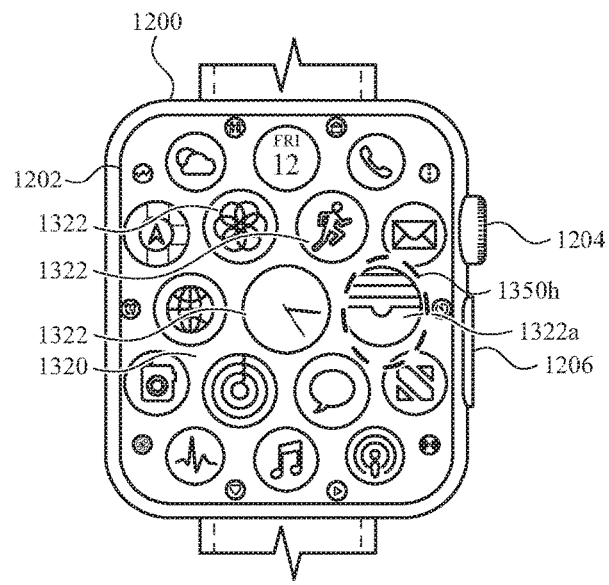 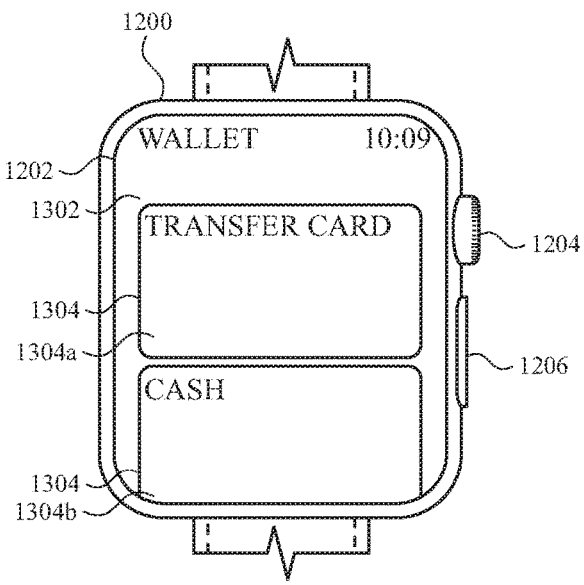
*FIG. 13I*  *FIG. 13J*
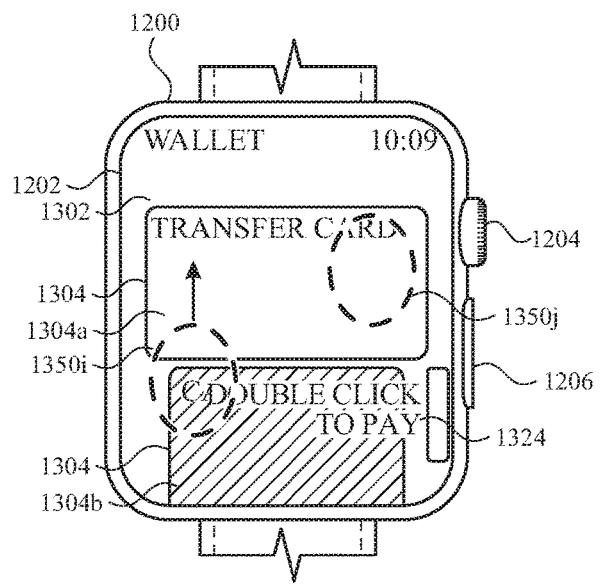 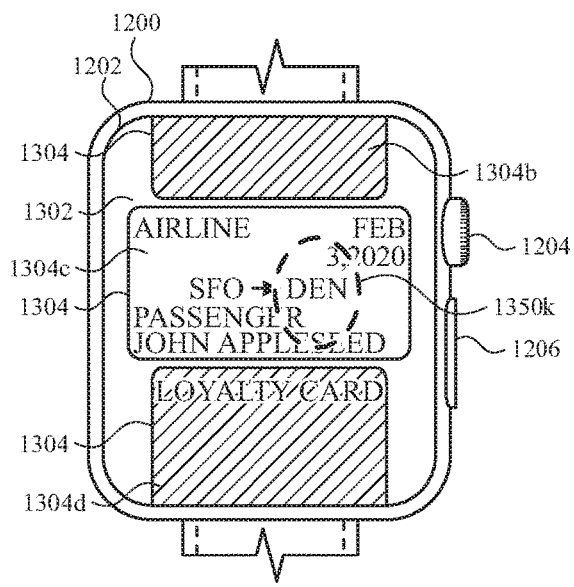
*FIG. 13K*  *FIG. 13L*

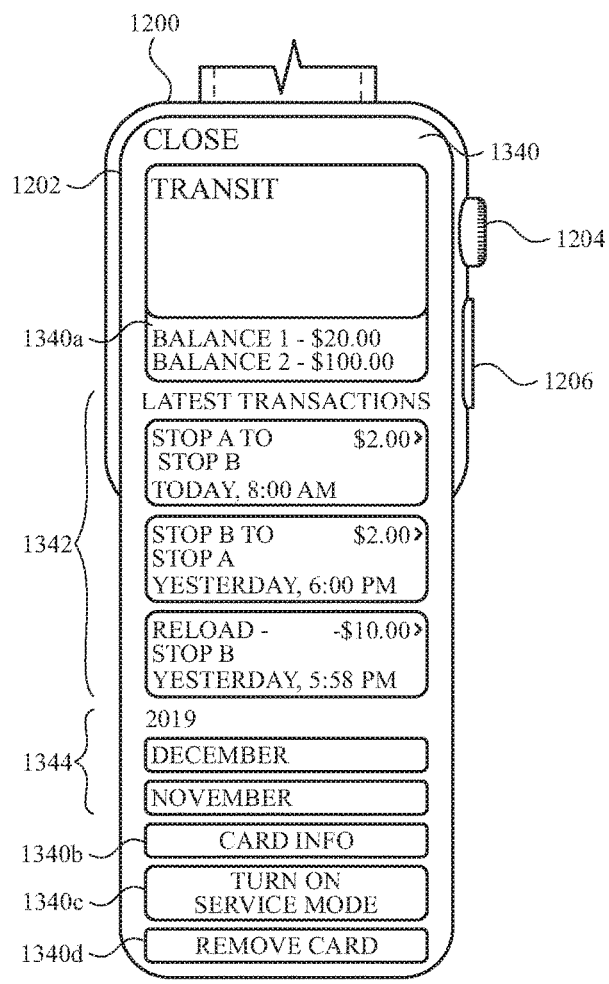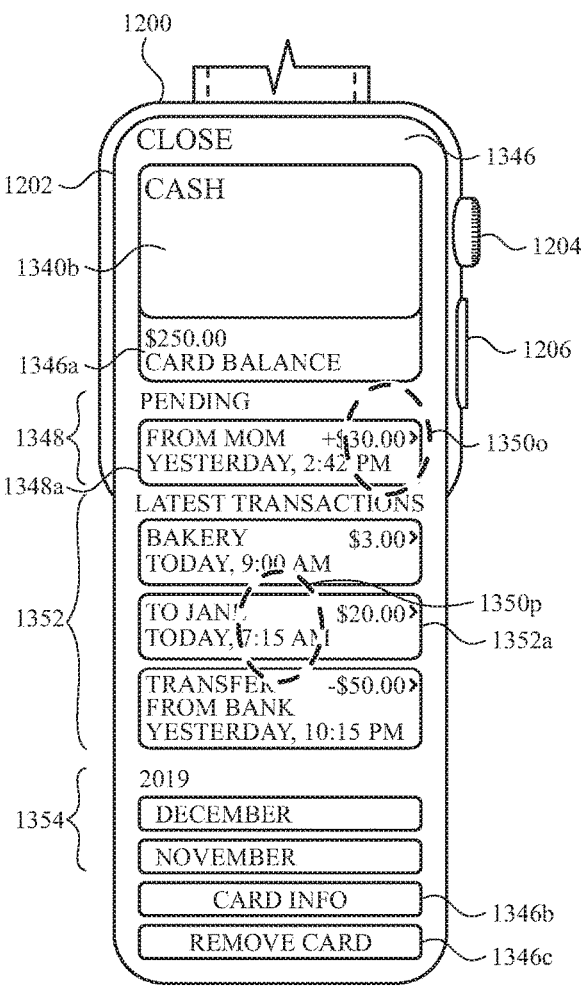
FIG. 13R
FIG. 13S

1400

1402
Display an account user interface that includes a plurality of visual representations of a plurality of different accounts.

1404
While displaying the account user interface, receive a scroll input corresponding to a request to scroll the account user interface.

1406
In response to receiving the scroll input, scroll the account user interface to cause a first visual representation of a first account and a second visual representation of a second account to scroll.

1408
Subsequent to receiving the scroll input and while displaying the account user interface:

1410
In accordance with a determination that the first visual representation of the first account satisfies a set of selection criteria, where the set of selection criteria includes a criterion that is met when the first visual representation of the first account is displayed in a selection region for at least a threshold amount of time, reduce a visual emphasis of the second visual representation of the second account relative to a visual emphasis of the first visual representation of the first account.

1412
In accordance with a determination that the second visual representation of the second account satisfies the set of selection criteria, reduce a visual emphasis of the first visual representation of the first account relative to a visual emphasis of the second visual representation of the second account.

*FIG. 14*

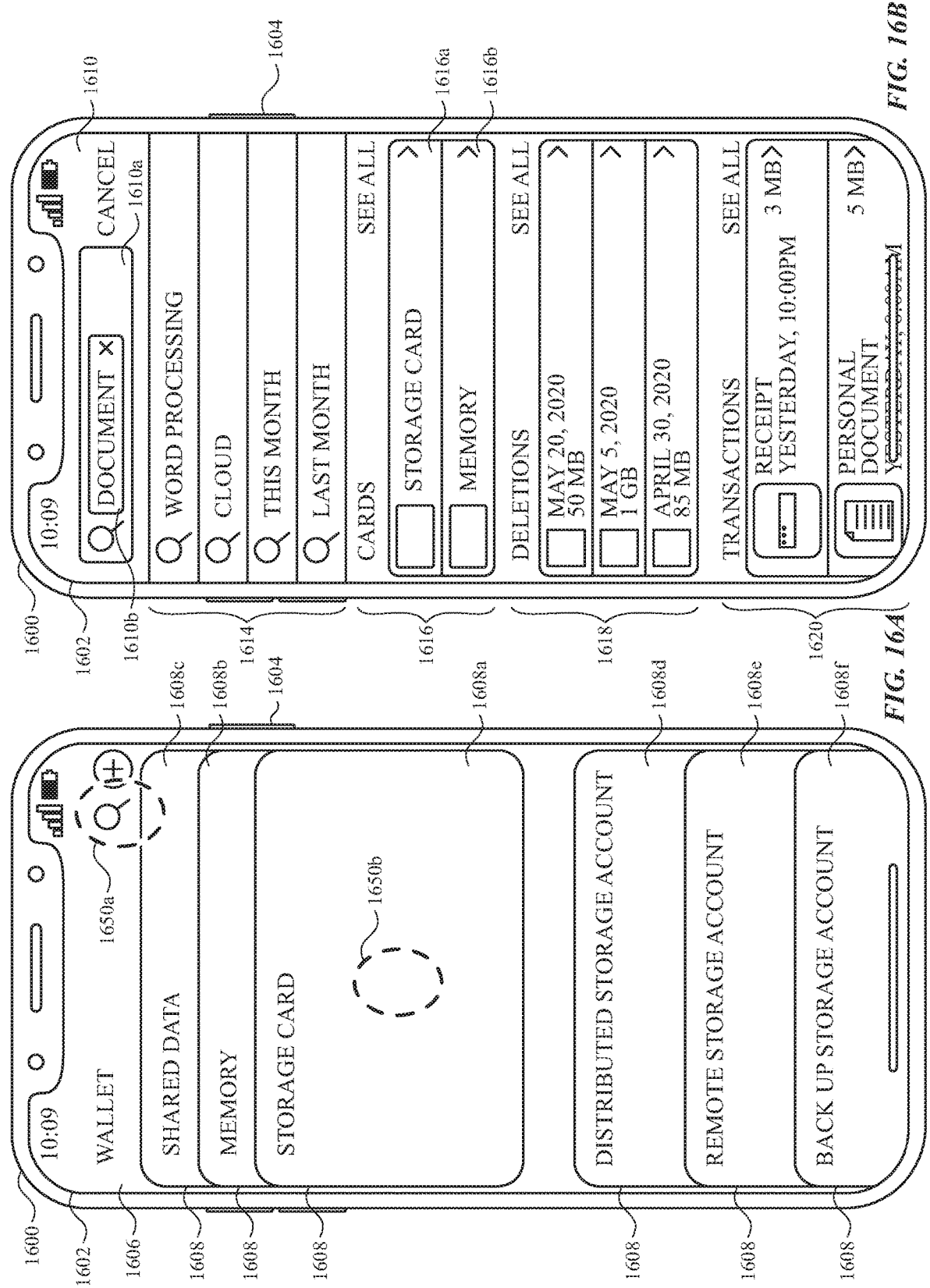

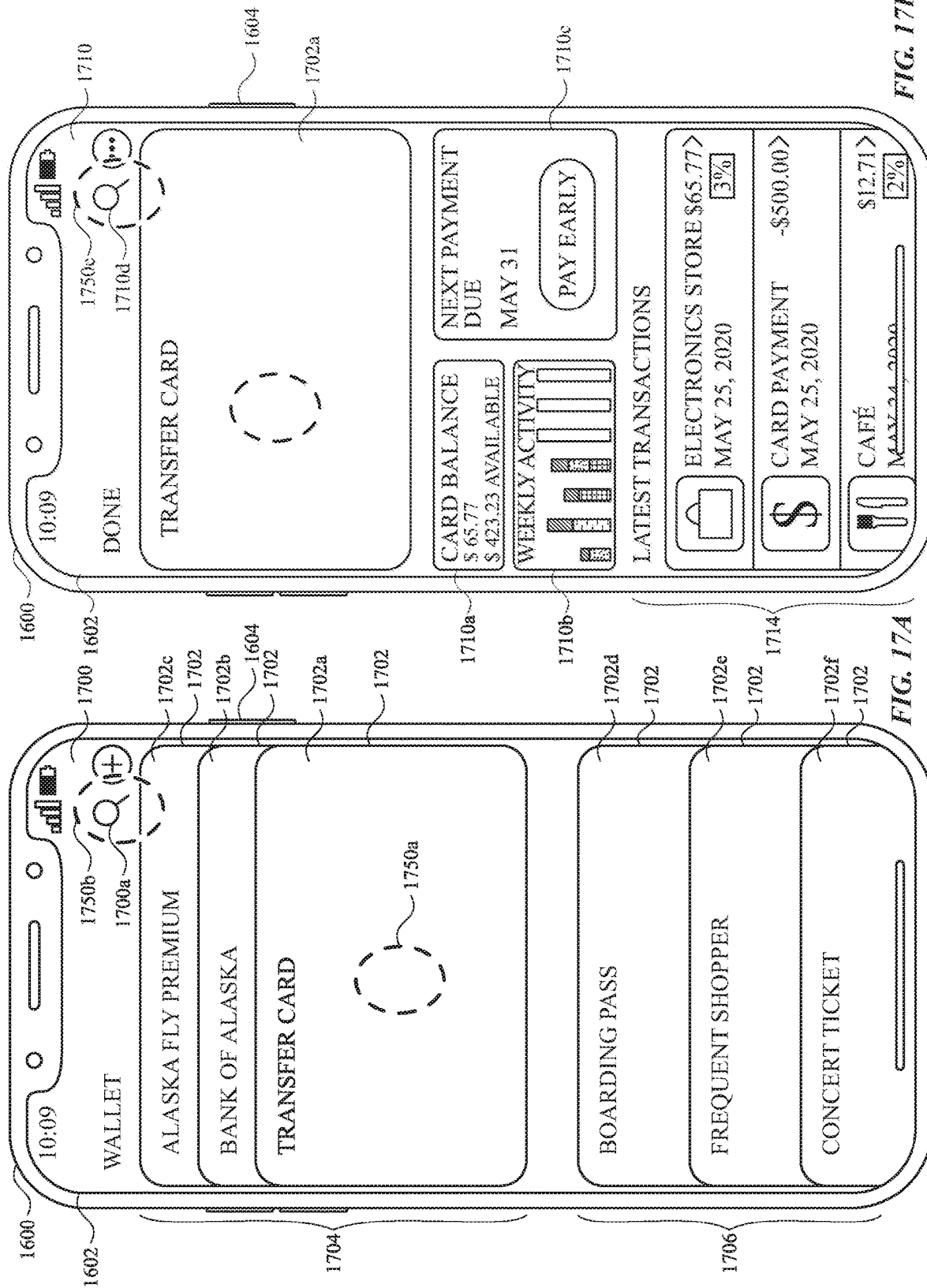

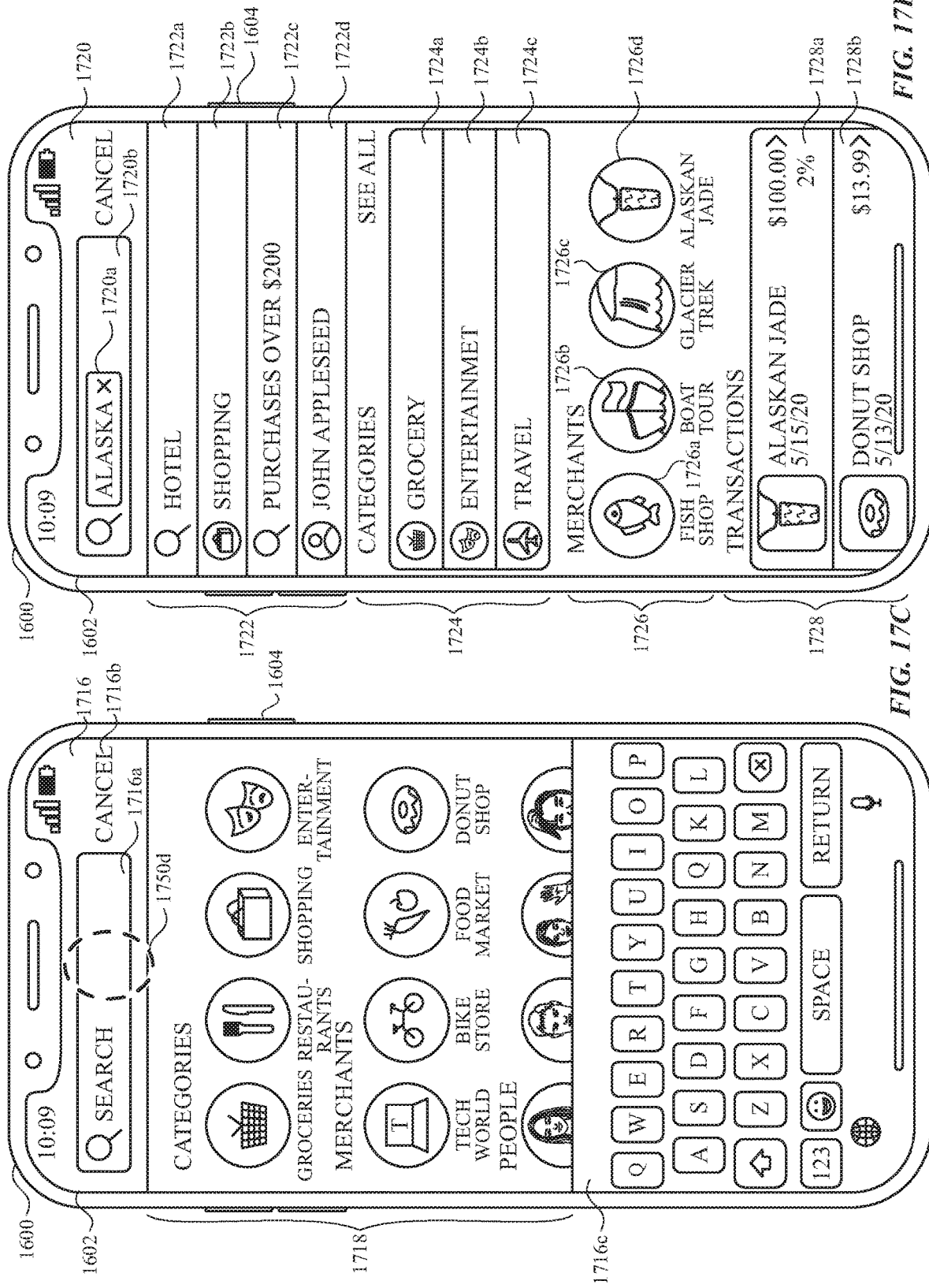

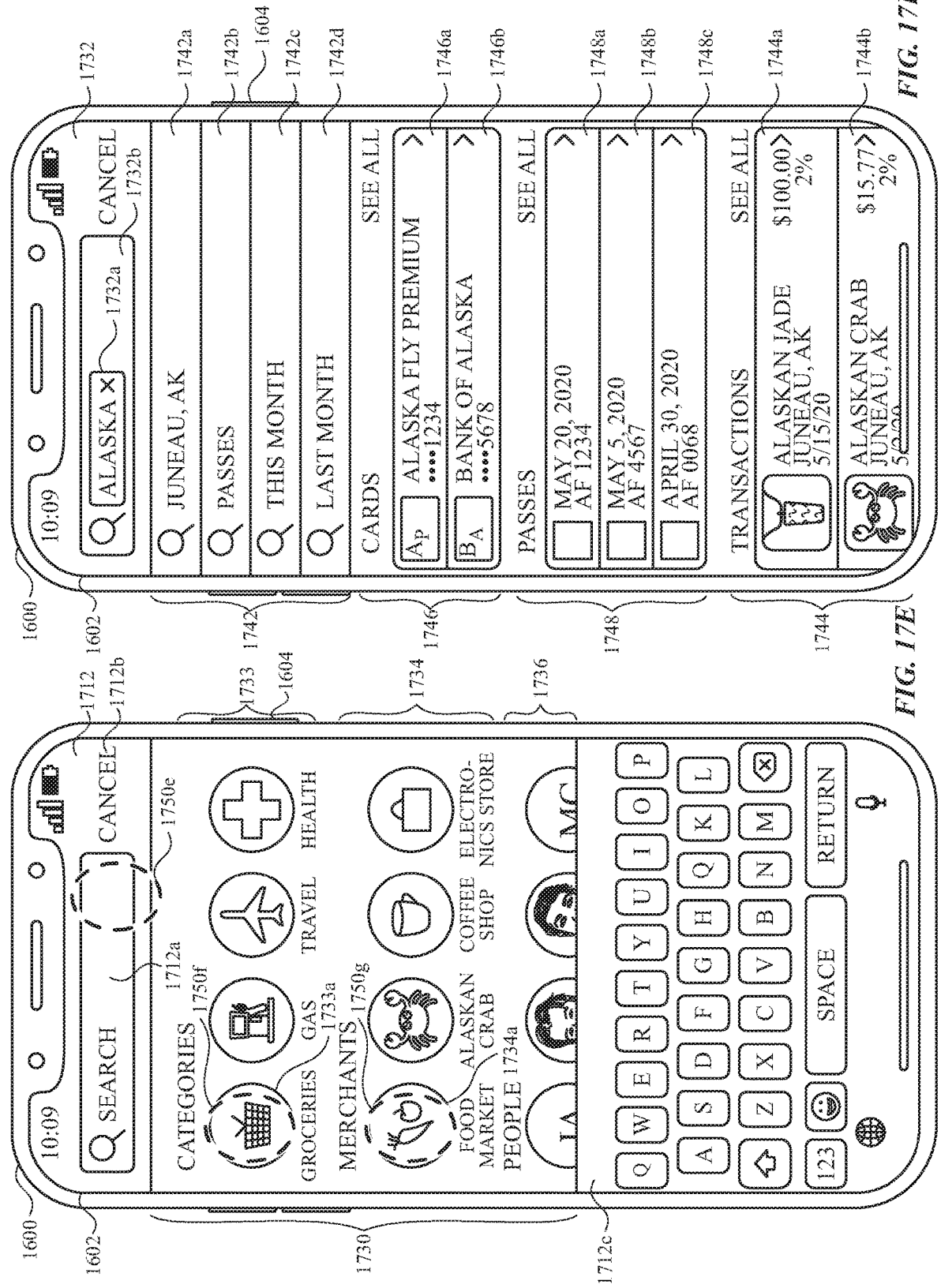

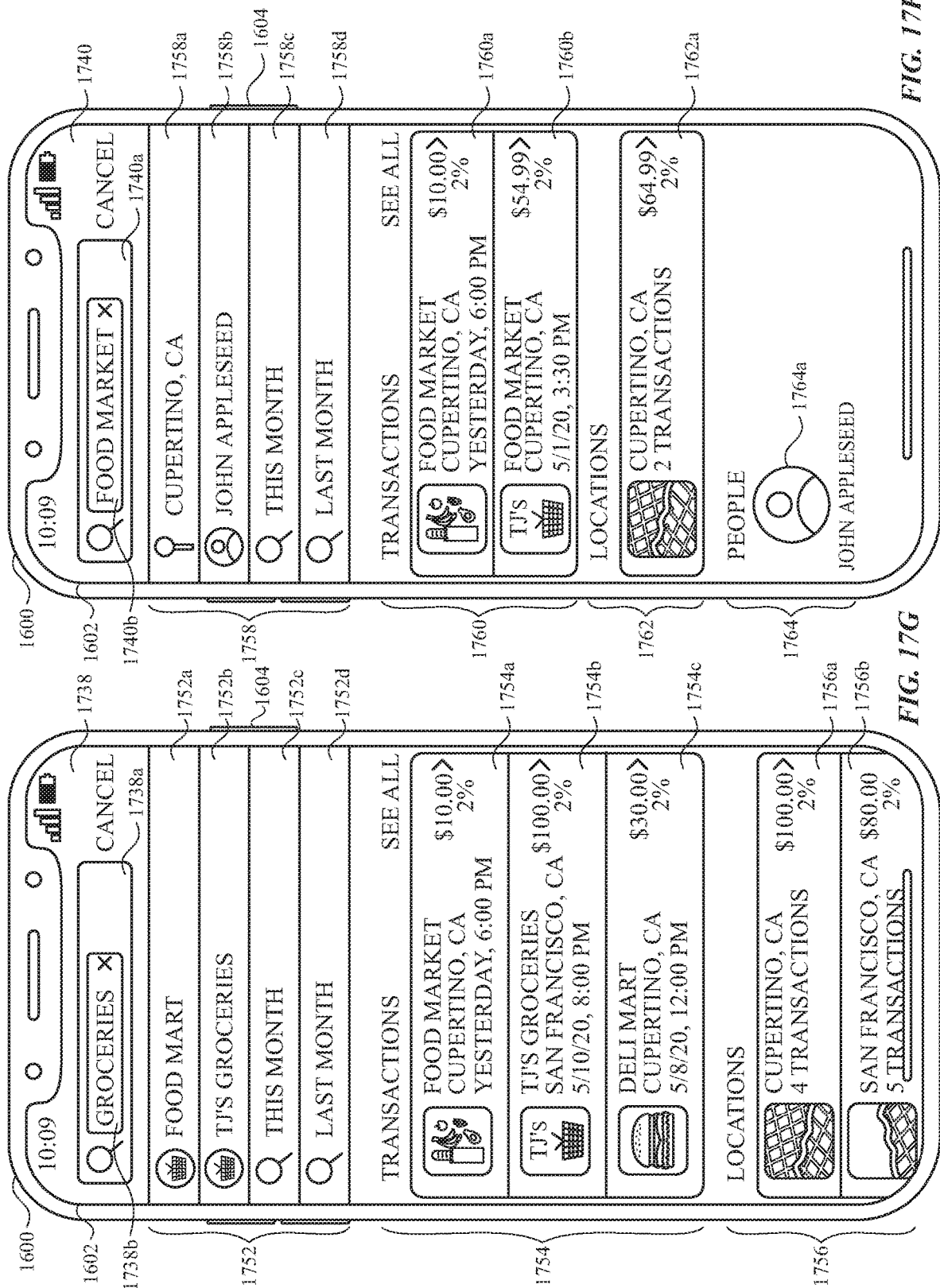

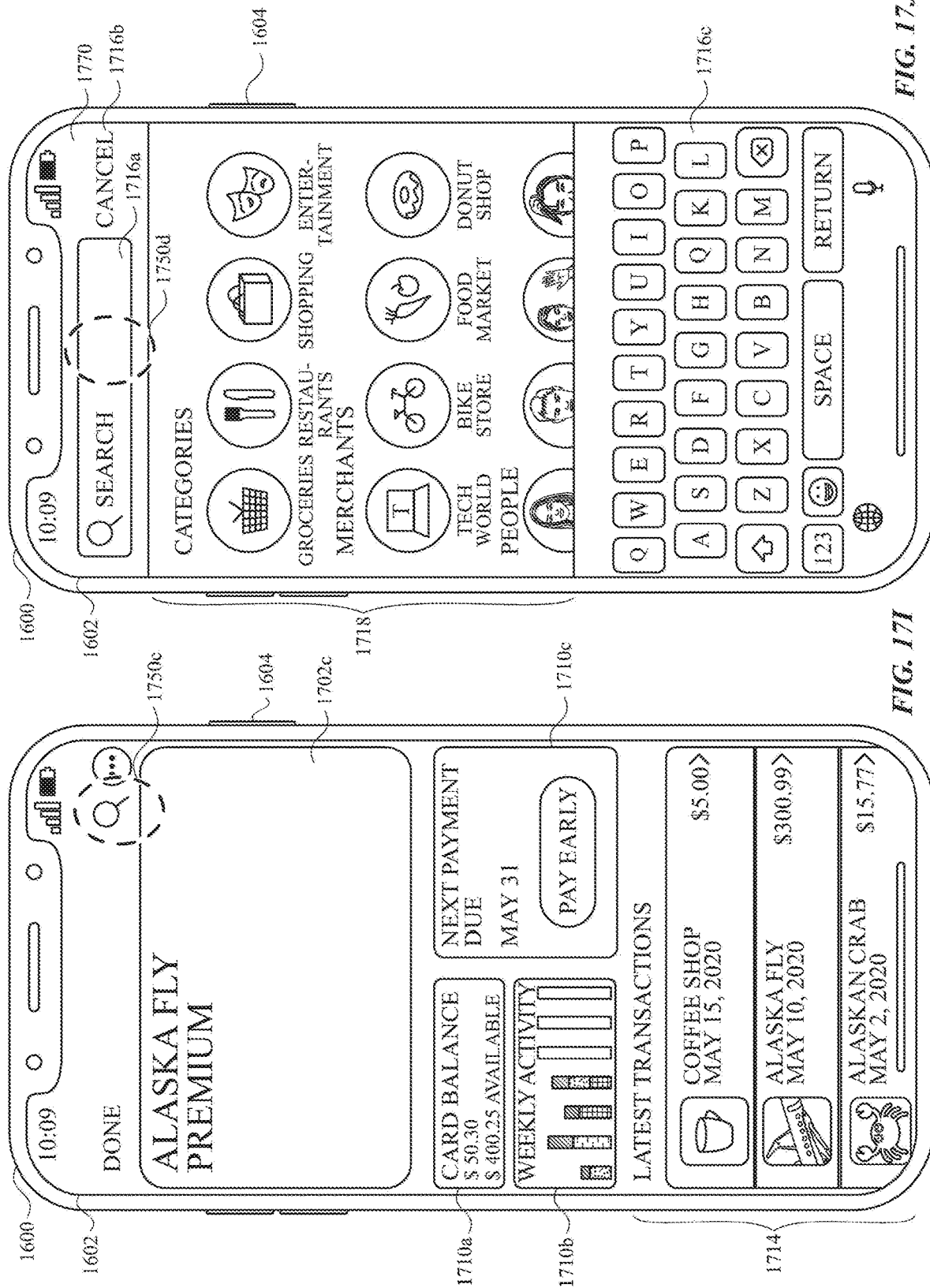

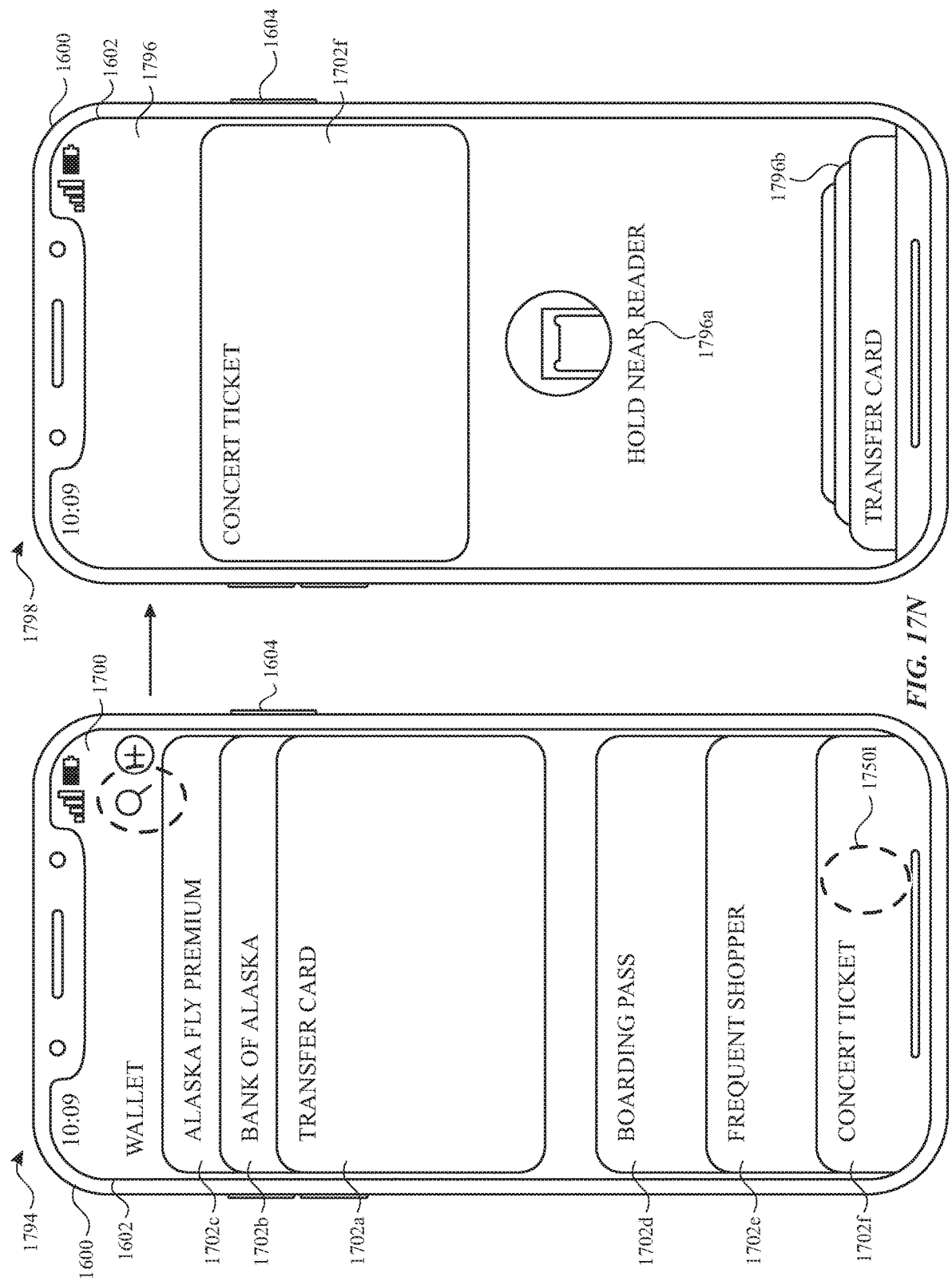

SHARING AND USING PASSES OR ACCOUNTS

CROSS-REFERENCE TO RELATED APPLICATIONS

This application claims the benefit of U.S. Provisional Application Ser. No. 63/032,504, filed May 29, 2020, entitled "SHARING AND USING PASSES OR ACCOUNTS" and U.S. Provisional Application Ser. No. 63/041,996, filed Jun. 21, 2020, entitled "SHARING AND USING PASSES OR ACCOUNTS", the entire contents of which are hereby incorporated by reference.

FIELD

The present disclosure relates generally to computer user interfaces, and more specifically to interfaces and techniques for sharing and using passes or accounts.

BACKGROUND

A computer system can be used to access information related to a pass or an account. The information can then be used to provide goods or services to a user, such as gaining entry to a venue or transferring funds. Typically, the information related to the pass or to the account is associated with a user of the computer system.

BRIEF SUMMARY

Some techniques for using passes or accounts using computer systems, however, are generally cumbersome and inefficient. For example, some existing techniques provide limited options for sharing a pass with another user. In addition, some existing techniques use a complex and time-consuming user interface to use a pass or account, which may include multiple key presses or keystrokes. Existing techniques require more time than necessary, wasting user time and device energy. This latter consideration is particularly important in battery-operated devices.

Accordingly, the present technique provides computer systems with faster, more efficient methods and interfaces for sharing and using passes or accounts. Such methods and interfaces optionally complement or replace other methods for using passes or accounts. Such methods and interfaces reduce the cognitive burden on a user and produce a more efficient human-machine interface. For battery-operated computing devices, such methods and interfaces conserve power and increase the time between battery charges.

Example methods are disclosed herein. An example method includes, at a computer system that is in communication with a display generation component and one or more input devices: displaying, via the display generation component, a first user interface that includes information about one or more passes associated with a service provider; while displaying the first user interface, receiving, via the one or more input devices, a request to add one or more passes to an account associated with a first user identity, wherein the one or more passes provide access to a service provided by the service provider; after receiving the request, displaying, via the display generation component, a share affordance for providing at least one of the one or more passes to an account associated with a second user identity; receiving, via the one or more input devices, a user input corresponding to selection of the share affordance; and in response to receiving the user input corresponding to selection of the share affordance, initiating a process for providing at least one of the one or more passes to the account associated with the second user identity.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, a first user interface that includes information about one or more passes associated with a service provider; while displaying the first user interface, receiving, via the one or more input devices, a request to add one or more passes to an account associated with a first user identity, wherein the one or more passes provide access to a service provided by the service provider; after receiving the request, displaying, via the display generation component, a share affordance for providing at least one of the one or more passes to an account associated with a second user identity; receiving, via the one or more input devices, a user input corresponding to selection of the share affordance; and in response to receiving the user input corresponding to selection of the share affordance, initiating a process for providing at least one of the one or more passes to the account associated with the second user identity.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, a first user interface that includes information about one or more passes associated with a service provider; while displaying the first user interface, receiving, via the one or more input devices, a request to add one or more passes to an account associated with a first user identity, wherein the one or more passes provide access to a service provided by the service provider; after receiving the request, displaying, via the display generation component, a share affordance for providing at least one of the one or more passes to an account associated with a second user identity; receiving, via the one or more input devices, a user input corresponding to selection of the share affordance; and in response to receiving the user input corresponding to selection of the share affordance, initiating a process for providing at least one of the one or more passes to the account associated with the second user identity.

Example computer systems are described herein. An example computer system includes a display generation component; one or more input devices; one or more processors; and memory storing one or more programs configured to be executed by the one or more processors, the one or more programs including instructions for: displaying, via the display generation component, a first user interface that includes information about one or more passes associated with a service provider; while displaying the first user interface, receiving, via the one or more input devices, a request to add one or more passes to an account associated with a first user identity, wherein the one or more passes provide access to a service provided by the service provider; after receiving the request, displaying, via the display generation component, a share affordance for providing at least one of the one or more passes to an account associated with a second user identity; receiving, via the one or more input devices, a user input corresponding to selection of the share affordance; and in response to receiving the user input corresponding to selection of the share affordance, initiating a process for providing at least one of the one or more passes to the account associated with the second user identity.

An example computer system includes: a display generation component; one or more input devices; means for displaying, via the display generation component, a first user interface that includes information about one or more passes associated with a service provider; means for, while displaying the first user interface, receiving, via the one or more input devices, a request to add one or more passes to an account associated with a first user identity, wherein the one or more passes provide access to a service provided by the service provider; means for, after receiving the request, displaying, via the display generation component, a share affordance for providing at least one of the one or more passes to an account associated with a second user identity; means for receiving, via the one or more input devices, a user input corresponding to selection of the share affordance; and means for, in response to receiving the user input corresponding to selection of the share affordance, initiating a process for providing at least one of the one or more passes to the account associated with the second user identity.

Example methods are disclosed herein. An example method includes, at a computer system that is in communication with a display generation component and one or more input devices: detecting that data corresponding to a first pass was provided by the computer system to a pass reader terminal that is separate from the computer system; after detecting that data corresponding to the first pass was provided by the computer system to the pass reader terminal: displaying, via the display generation component, an indication that data corresponding to the first pass was provided by the computer system to the pass reader terminal; in accordance with a determination that data corresponding to a second pass is available to be provided to the pass reader terminal by the computer system, providing a prompt to the user to provide authorization for data corresponding to the second pass to be provided to the pass reader terminal by the computer system; and in accordance with a determination that data corresponding to a second pass is not available to be provided to the pass reader terminal by the computer system, forgoing providing the prompt to the user to provide authorization for data corresponding to a second pass to be provided to the pass reader terminal by the computer system.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: detecting that data corresponding to a first pass was provided by the computer system to a pass reader terminal that is separate from the computer system; after detecting that data corresponding to the first pass was provided by the computer system to the pass reader terminal: displaying, via the display generation component, an indication that data corresponding to the first pass was provided by the computer system to the pass reader terminal; in accordance with a determination that data corresponding to a second pass is available to be provided to the pass reader terminal by the computer system, providing a prompt to the user to provide authorization for data corresponding to the second pass to be provided to the pass reader terminal by the computer system; and in accordance with a determination that data corresponding to a second pass is not available to be provided to the pass reader terminal by the computer system, forgoing providing the prompt to the user to provide authorization for data corresponding to a second pass to be provided to the pass reader terminal by the computer system.

Example transitory computer-readable storage media are described herein. An example transitory computer-readable storage medium stores one or more programs configured to be executed by one or more processors of a computer system that is in communication with a display generation component and one or more input devices, the one or more programs including instructions for: detecting that data corresponding to a first pass was provided by the computer system to a pass reader terminal that is separate from the computer system; after detecting that data corresponding to the first pass was provided by the computer system to the pass reader terminal: displaying, via the display generation component, an indication that data corresponding to the first pass was provided by the computer system to the pass reader terminal; in accordance with a determination that data corresponding to a second pass is available to be provided to the pass reader terminal by the computer system, providing a prompt to the user to provide authorization for data corresponding to the second pass to be provided to the pass reader terminal by the computer system; and in accordance with a determination that data corresponding to a second pass is not available to be provided to the pass reader terminal by the computer system, forgoing providing the prompt to the user to provide authorization for data corresponding to a second pass to be provided to the pass reader terminal by the computer system.

Example computer systems are described herein. An example computer system includes a display generation component; one or more input devices; one or more processors; and memory storing one or more programs configured to be executed by the one or more processors, the one or more programs including instructions for: detecting that data corresponding to a first pass was provided by the computer system to a pass reader terminal that is separate from the computer system; after detecting that data corresponding to the first pass was provided by the computer system to the pass reader terminal: displaying, via the display generation component, an indication that data corresponding to the first pass was provided by the computer system to the pass reader terminal; in accordance with a determination that data corresponding to a second pass is available to be provided to the pass reader terminal by the computer system, providing a prompt to the user to provide authorization for data corresponding to the second pass to be provided to the pass reader terminal by the computer system; and in accordance with a determination that data corresponding to a second pass is not available to be provided to the pass reader terminal by the computer system, forgoing providing the prompt to the user to provide authorization for data corresponding to a second pass to be provided to the pass reader terminal by the computer system.

An example computer system includes: a display generation component; one or more input devices; means for detecting that data corresponding to a first pass was provided by the computer system to a pass reader terminal that is separate from the computer system; means for, after detecting that data corresponding to the first pass was provided by the computer system to the pass reader terminal: displaying, via the display generation component, an indication that data corresponding to the first pass was provided by the computer system to the pass reader terminal; means for, in accordance with a determination that data corresponding to a second pass is available to be provided to the pass reader terminal by the computer system, providing a prompt to the user to provide authorization for data corresponding to the second pass to be provided to the pass reader terminal by the computer system; and means for, in accordance with a determination that data corresponding to a second pass is not available to be provided to the pass reader terminal by the computer system, forgoing providing the prompt to the user to provide authorization for data corresponding to a second pass to be provided to the pass reader terminal by the computer system.

Example methods are disclosed herein. An example method includes, at a computer system that is in communication with a display generation component and one or more input devices: displaying, via the display generation component, a first user interface including an indication of an account; receiving, via the one or more input devices, authentication data; and in response to receiving the authentication data: in accordance with a determination that the authentication data satisfies authentication criteria associated with the account, displaying, via the display generation component, a first machine-readable code associated with the account; and in accordance with a determination that the authentication data does not satisfy the authentication criteria associated with the account, forgoing display of the first machine-readable code associated with the account.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, a first user interface including an indication of an account; receiving, via the one or more input devices, authentication data; and in response to receiving the authentication data: in accordance with a determination that the authentication data satisfies authentication criteria associated with the account, displaying, via the display generation component, a first machine-readable code associated with the account; and in accordance with a determination that the authentication data does not satisfy the authentication criteria associated with the account, forgoing display of the first machine-readable code associated with the account.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, a first user interface including an indication of an account; receiving, via the one or more input devices, authentication data; and in response to receiving the authentication data: in accordance with a determination that the authentication data satisfies authentication criteria associated with the account, displaying, via the display generation component, a first machine-readable code associated with the account; and in accordance with a determination that the authentication data does not satisfy the authentication criteria associated with the account, forgoing display of the first machine-readable code associated with the account.

Example computer systems are described herein. An example computer system includes a display generation component; one or more input devices; one or more processors; and memory storing one or more programs configured to be executed by the one or more processors, the one or more programs including instructions for: displaying, via the display generation component, a first user interface including an indication of an account; receiving, via the one or more input devices, authentication data; and in response to receiving the authentication data: in accordance with a determination that the authentication data satisfies authentication criteria associated with the account, displaying, via the display generation component, a first machine-readable code associated with the account; and in accordance with a determination that the authentication data does not satisfy the authentication criteria associated with the account, forgoing display of the first machine-readable code associated with the account.

An example computer system includes: a display generation component; one or more input devices; means for displaying, via the display generation component, a first user interface including an indication of an account; means for receiving, via the one or more input devices, authentication data; and means for, in response to receiving the authentication data: in accordance with a determination that the authentication data satisfies authentication criteria associated with the account, displaying, via the display generation component, a first machine-readable code associated with the account; and in accordance with a determination that the authentication data does not satisfy the authentication criteria associated with the account, forgoing display of the first machine-readable code associated with the account.

Example methods are disclosed herein. An example method includes, at a computer system that is in communication with a display generation component and one or more input devices: displaying, via the display generation component, an account user interface that includes a plurality of visual representations of a plurality of different accounts; while displaying the account user interface, receiving, via the one or more input devices, a scroll input corresponding to a request to scroll the account user interface; in response to receiving the scroll input, scrolling, via the display generation component, the account user interface to cause a first visual representation of a first account and a second visual representation of a second account to scroll; and subsequent to receiving the scroll input and while displaying the account user interface: in accordance with a determination that the first visual representation of the first account satisfies a set of selection criteria, the set of selection criteria includes a criterion that is met when the first visual representation of the first account is displayed in a selection region for at least a threshold amount of time, reducing a visual emphasis of the second visual representation of the second account relative to a visual emphasis of the first visual representation of the first account; and in accordance with a determination that the second visual representation of the second account satisfies the set of selection criteria, reducing a visual emphasis of the first visual representation of the first account relative to a visual emphasis of the second visual representation of the second account.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, an account user interface that includes a plurality of visual representations of a plurality of different accounts; while displaying the account user interface, receiving, via the one or more input devices, a scroll input corresponding to a request to scroll the account user interface; in response to receiving the scroll input, scrolling, via the display generation component, the account user interface to cause a first visual representation of a first account and a second visual representation of a second account to scroll; and subsequent to receiving the scroll input and while displaying the account user interface: in accordance with a determination that the first visual representation of the first account satisfies a set of selection criteria, the set of selection criteria includes a criterion that is met when the first visual representation of the first account is displayed in a selection region for at least a threshold amount of time, reducing a visual emphasis of the second visual representation of the second account relative to a visual emphasis of the first visual representation of the first account; and in accordance with a determination that the second visual representation of the second account satisfies the set of selection criteria, reducing a visual emphasis of the first visual representation of the first account relative to a visual emphasis of the second visual representation of the second account.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, an account user interface that includes a plurality of visual representations of a plurality of different accounts; while displaying the account user interface, receiving, via the one or more input devices, a scroll input corresponding to a request to scroll the account user interface; in response to receiving the scroll input, scrolling, via the display generation component, the account user interface to cause a first visual representation of a first account and a second visual representation of a second account to scroll; and subsequent to receiving the scroll input and while displaying the account user interface: in accordance with a determination that the first visual representation of the first account satisfies a set of selection criteria, the set of selection criteria includes a criterion that is met when the first visual representation of the first account is displayed in a selection region for at least a threshold amount of time, reducing a visual emphasis of the second visual representation of the second account relative to a visual emphasis of the first visual representation of the first account; and in accordance with a determination that the second visual representation of the second account satisfies the set of selection criteria, reducing a visual emphasis of the first visual representation of the first account relative to a visual emphasis of the second visual representation of the second account.

Example computer systems are described herein. An example computer system includes a display generation component; one or more input devices; one or more processors; and memory storing one or more programs configured to be executed by the one or more processors, the one or more programs including instructions for: displaying, via the display generation component, an account user interface that includes a plurality of visual representations of a plurality of different accounts; while displaying the account user interface, receiving, via the one or more input devices, a scroll input corresponding to a request to scroll the account user interface; in response to receiving the scroll input, scrolling, via the display generation component, the account user interface to cause a first visual representation of a first account and a second visual representation of a second account to scroll; and subsequent to receiving the scroll input and while displaying the account user interface: in accordance with a determination that the first visual representation of the first account satisfies a set of selection criteria, the set of selection criteria includes a criterion that is met when the first visual representation of the first account is displayed in a selection region for at least a threshold amount of time, reducing a visual emphasis of the second visual representation of the second account relative to a visual emphasis of the first visual representation of the first account; and in accordance with a determination that the second visual representation of the second account satisfies the set of selection criteria, reducing a visual emphasis of the first visual representation of the first account relative to a visual emphasis of the second visual representation of the second account.

An example computer system includes: a display generation component; one or more input devices; means for displaying, via the display generation component, an account user interface that includes a plurality of visual representations of a plurality of different accounts; means for, while displaying the account user interface, receiving, via the one or more input devices, a scroll input corresponding to a request to scroll the account user interface; means for, in response to receiving the scroll input, scrolling, via the display generation component, the account user interface to cause a first visual representation of a first account and a second visual representation of a second account to scroll; and means for, subsequent to receiving the scroll input and while displaying the account user interface: in accordance with a determination that the first visual representation of the first account satisfies a set of selection criteria, the set of selection criteria includes a criterion that is met when the first visual representation of the first account is displayed in a selection region for at least a threshold amount of time, reducing a visual emphasis of the second visual representation of the second account relative to a visual emphasis of the first visual representation of the first account; and in accordance with a determination that the second visual representation of the second account satisfies the set of selection criteria, reducing a visual emphasis of the first visual representation of the first account relative to a visual emphasis of the second visual representation of the second account.

Example methods are disclosed herein. An example method includes, at a computer system that is in communication with a display generation component and one or more input devices: receiving, via the one or more input devices, a first input; in response to receiving the first input: displaying, via the display generation component, an account user interface that includes a first visual representation of a first account; while displaying the first visual representation of the first account, receiving, via the one or more input devices, a second input corresponding to selection of the first visual representation of the first account; and in response to receiving the second input corresponding to selection of the first visual representation of the first account: in accordance with a determination that the first visual representation of the first account was displayed in response to a request to prepare one or more accounts from the account user interface for use, displaying, via the display generation component, a readable portion of a machine-readable code corresponding to the first account; and in accordance with a determination that the first visual representation of the first account was displayed in response to a request to view information about one or more accounts without preparing the one or more accounts from the account user interface for use, displaying, via the display generation component, information corresponding to the first account without displaying the readable portion of the machine-readable code corresponding to the first account.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: receiving, via the one or more input devices, a first input; in response to receiving the first input: displaying, via the display generation component, an account user interface that includes a first visual representation of a first account; while displaying the first visual representation of the first account, receiving, via the one or more input devices, a second input corresponding to selection of the first visual representation of the first account; and in response to receiving the second input corresponding to selection of the first visual representation of the first account: in accordance with a determination that the first visual representation of the first account was displayed in response to a request to prepare one or more accounts from the account user interface for use, displaying, via the display generation component, a readable portion of a machine-readable code corresponding to the first account; and in accordance with a determination that the first visual representation of the first account was displayed in response to a request to view information about one or more accounts without preparing the one or more accounts from the account user interface for use, displaying, via the display generation component, information corresponding to the first account without displaying the readable portion of the machine-readable code corresponding to the first account.

Example transitory computer-readable storage media are described herein. An example transitory computer-readable storage medium stores one or more programs configured to be executed by one or more processors of a computer system that is in communication with a display generation component and one or more input devices, the one or more programs including instructions for: receiving, via the one or more input devices, a first input; in response to receiving the first input: displaying, via the display generation component, an account user interface that includes a first visual representation of a first account; while displaying the first visual representation of the first account, receiving, via the one or more input devices, a second input corresponding to selection of the first visual representation of the first account; and in response to receiving the second input corresponding to selection of the first visual representation of the first account: in accordance with a determination that the first visual representation of the first account was displayed in response to a request to prepare one or more accounts from the account user interface for use, displaying, via the display generation component, a readable portion of a machine-readable code corresponding to the first account; and in accordance with a determination that the first visual representation of the first account was displayed in response to a request to view information about one or more accounts without preparing the one or more accounts from the account user interface for use, displaying, via the display generation component, information corresponding to the first account without displaying the readable portion of the machine-readable code corresponding to the first account.

Example computer systems are described herein. An example computer system includes a display generation component; one or more input devices; one or more processors; and memory storing one or more programs configured to be executed by the one or more processors, the one or more programs including instructions for: receiving, via the one or more input devices, a first input; in response to receiving the first input: displaying, via the display generation component, an account user interface that includes a first visual representation of a first account; while displaying the first visual representation of the first account, receiving, via the one or more input devices, a second input corresponding to selection of the first visual representation of the first account; and in response to receiving the second input corresponding to selection of the first visual representation of the first account: in accordance with a determination that the first visual representation of the first account was displayed in response to a request to prepare one or more accounts from the account user interface for use, displaying, via the display generation component, a readable portion of a machine-readable code corresponding to the first account; and in accordance with a determination that the first visual representation of the first account was displayed in response to a request to view information about one or more accounts without preparing the one or more accounts from the account user interface for use, displaying, via the display generation component, information corresponding to the first account without displaying the readable portion of the machine-readable code corresponding to the first account.

An example computer system includes: a display generation component; one or more input devices; means for receiving, via the one or more input devices, a first input; means for, in response to receiving the first input: displaying, via the display generation component, an account user interface that includes a first visual representation of a first account; means for, while displaying the first visual representation of the first account, receiving, via the one or more input devices, a second input corresponding to selection of the first visual representation of the first account; and means for, in response to receiving the second input corresponding to selection of the first visual representation of the first account: in accordance with a determination that the first visual representation of the first account was displayed in response to a request to prepare one or more accounts from the account user interface for use, displaying, via the display generation component, a readable portion of a machine-readable code corresponding to the first account; and in accordance with a determination that the first visual representation of the first account was displayed in response to a request to view information about one or more accounts without preparing the one or more accounts from the account user interface for use, displaying, via the display generation component, information corresponding to the first account without displaying the readable portion of the machine-readable code corresponding to the first account.

Example methods are disclosed herein. An example method includes, at a computer system that is in communication with a display generation component and one or more input devices: displaying, via the display generation component, a search user interface; while displaying the search user interface, receiving, via the one or more input devices, input that includes a search term; and in response to receiving the input that includes the search term: in accordance with a determination that the search user interface corresponds to a plurality of transfer accounts provisioned on the computer system and configured to transfer a resource of the respective transfer account upon user authorization: concurrently displaying, via the display generation component, a plurality of search results selected using the search term, the plurality of search results including: a first search result corresponding to a resource transfer activity of a first account of the plurality of transfer accounts, and a second search result corresponding to a resource transfer activity of a second account, different from the first account, of the plurality of transfer accounts.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, a search user interface; while displaying the search user interface, receiving, via the one or more input devices, input that includes a search term; and in response to receiving the input that includes the search term: in accordance with a determination that the search user interface corresponds to a plurality of transfer accounts provisioned on the computer system and configured to transfer a resource of the respective transfer account upon user authorization: concurrently displaying, via the display generation component, a plurality of search results selected using the search term, the plurality of search results including: a first search result corresponding to a resource transfer activity of a first account of the plurality of transfer accounts, and a second search result corresponding to a resource transfer activity of a second account, different from the first account, of the plurality of transfer accounts.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, a search user interface; while displaying the search user interface, receiving, via the one or more input devices, input that includes a search term; and in response to receiving the input that includes the search term: in accordance with a determination that the search user interface corresponds to a plurality of transfer accounts provisioned on the computer system and configured to transfer a resource of the respective transfer account upon user authorization: concurrently displaying, via the display generation component, a plurality of search results selected using the search term, the plurality of search results including: a first search result corresponding to a resource transfer activity of a first account of the plurality of transfer accounts, and a second search result corresponding to a resource transfer activity of a second account, different from the first account, of the plurality of transfer accounts.

Example computer systems are described herein. An example computer system includes a display generation component; one or more input devices; one or more processors; and memory storing one or more programs configured to be executed by the one or more processors, the one or more programs including instructions for: displaying, via the display generation component, a search user interface; while displaying the search user interface, receiving, via the one or more input devices, input that includes a search term; and in response to receiving the input that includes the search term: in accordance with a determination that the search user interface corresponds to a plurality of transfer accounts provisioned on the computer system and configured to transfer a resource of the respective transfer account upon user authorization: concurrently displaying, via the display generation component, a plurality of search results selected using the search term, the plurality of search results including: a first search result corresponding to a resource transfer activity of a first account of the plurality of transfer accounts, and a second search result corresponding to a resource transfer activity of a second account, different from the first account, of the plurality of transfer accounts.

An example computer system includes: a display generation component; one or more input devices; means for displaying, via the display generation component, a search user interface; means for, while displaying the search user interface, receiving, via the one or more input devices, input that includes a search term; and means for, in response to receiving the input that includes the search term: in accordance with a determination that the search user interface corresponds to a plurality of transfer accounts provisioned on the computer system and configured to transfer a resource of the respective transfer account upon user authorization: concurrently displaying, via the display generation component, a plurality of search results selected using the search term, the plurality of search results including: a first search result corresponding to a resource transfer activity of a first account of the plurality of transfer accounts, and a second search result corresponding to a resource transfer activity of a second account, different from the first account, of the plurality of transfer accounts.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for sharing and using passes or accounts, thereby increasing the effectiveness, efficiency, and user satisfaction with such devices. Such methods and interfaces may complement or replace other methods for sharing and using passes and accounts.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 6A-6F illustrate exemplary user interfaces for sharing one or more passes in accordance with some embodiments.

FIG. 7 is a flow diagram illustrating a method for sharing one or more passes in accordance with some embodiments.

FIGS. 8A-8F illustrate exemplary user interfaces for providing a prompt to a user to provide authorization in accordance with some embodiments.

FIG. 9 is a flow diagram illustrating a method for providing a prompt to a user to provide authorization in accordance with some embodiments.

FIGS. 10A-10L illustrate exemplary user interfaces for displaying a machine-readable code in accordance with some embodiments.

FIG. 11 is a flow diagram illustrating a method for displaying a machine-readable code in accordance with some embodiments.

FIG. 14 is a flow diagram illustrating a method for displaying transfer accounts in accordance with some embodiments.

FIGS. 16A-16C illustrate exemplary user interfaces for searching one or more computer storage accounts in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for sharing and using passes or accounts. For example, when one or more passes are received, there is a need for a user to easily and efficiently provide one or more of the passes to a second user. As another example, when one or more passes are being used, there is a need for a user to easily and efficiently provide data corresponding to the passes to a pass reader terminal. As another example, when using an account for a transaction, there is a need for a user to easily and efficiently provide a machine-readable code associated with the account to conduct the transaction. Such techniques can reduce the cognitive burden on a user who shares or uses passes or accounts, thereby enhancing productivity. Further, such techniques can reduce processor and battery power otherwise wasted on redundant user inputs.

Figure 12A:
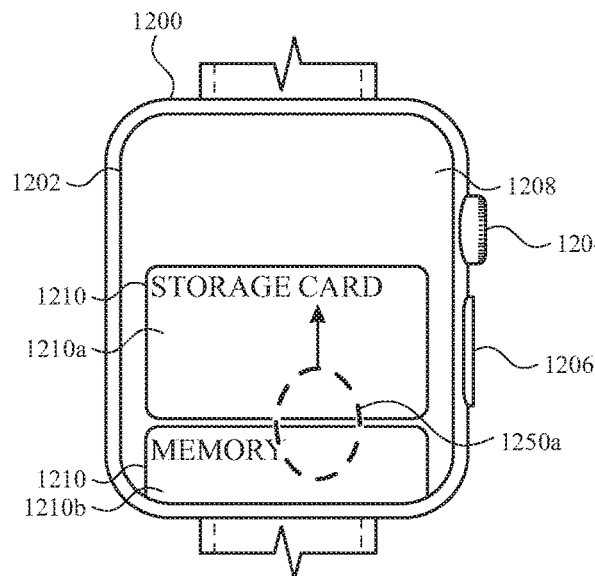
FIGS. 12A-12C illustrate exemplary user interfaces for displaying computer storage accounts in accordance with some embodiments.
Figure 12B:
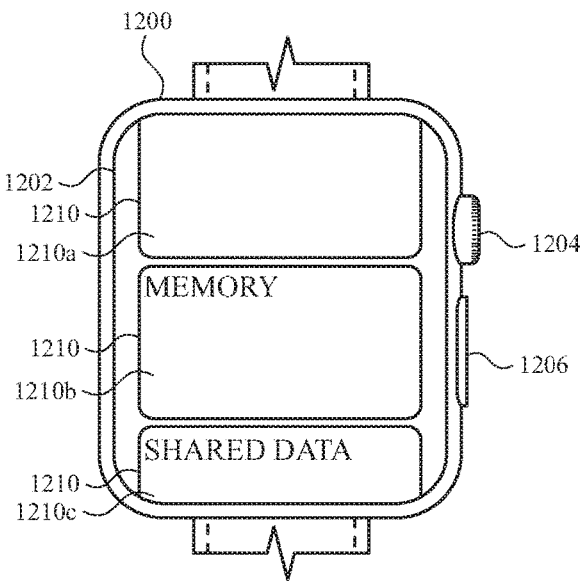
Figure 12C:
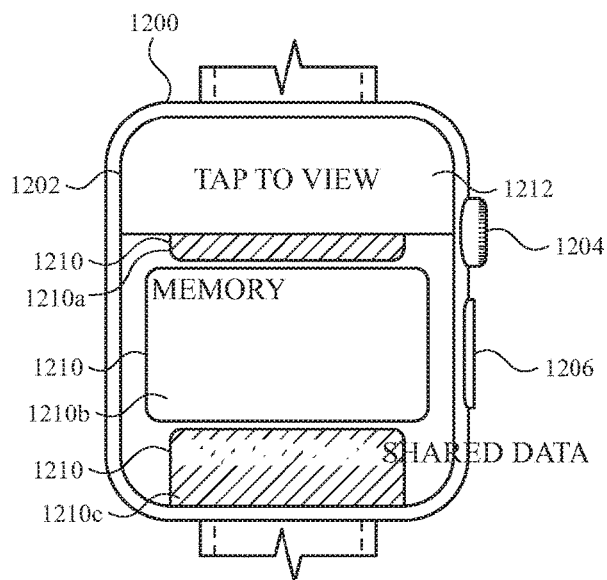
Figure 13A:
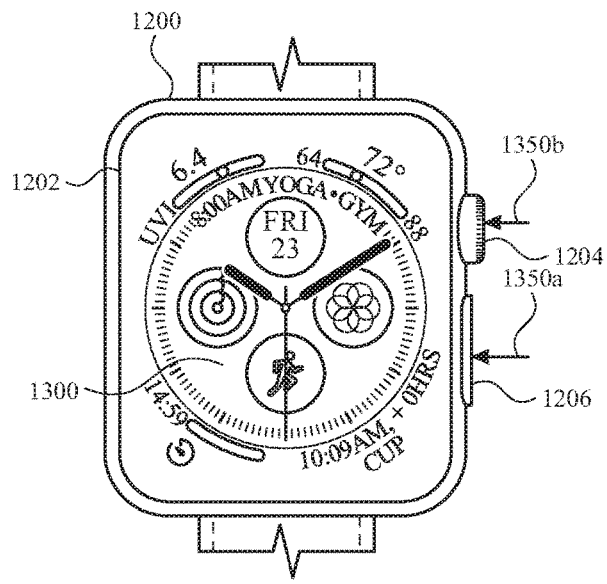
FIGS. 13A-13AA illustrate exemplary user interfaces for displaying and authorizing transfer storage accounts in accordance with some embodiments.
Figure 15:
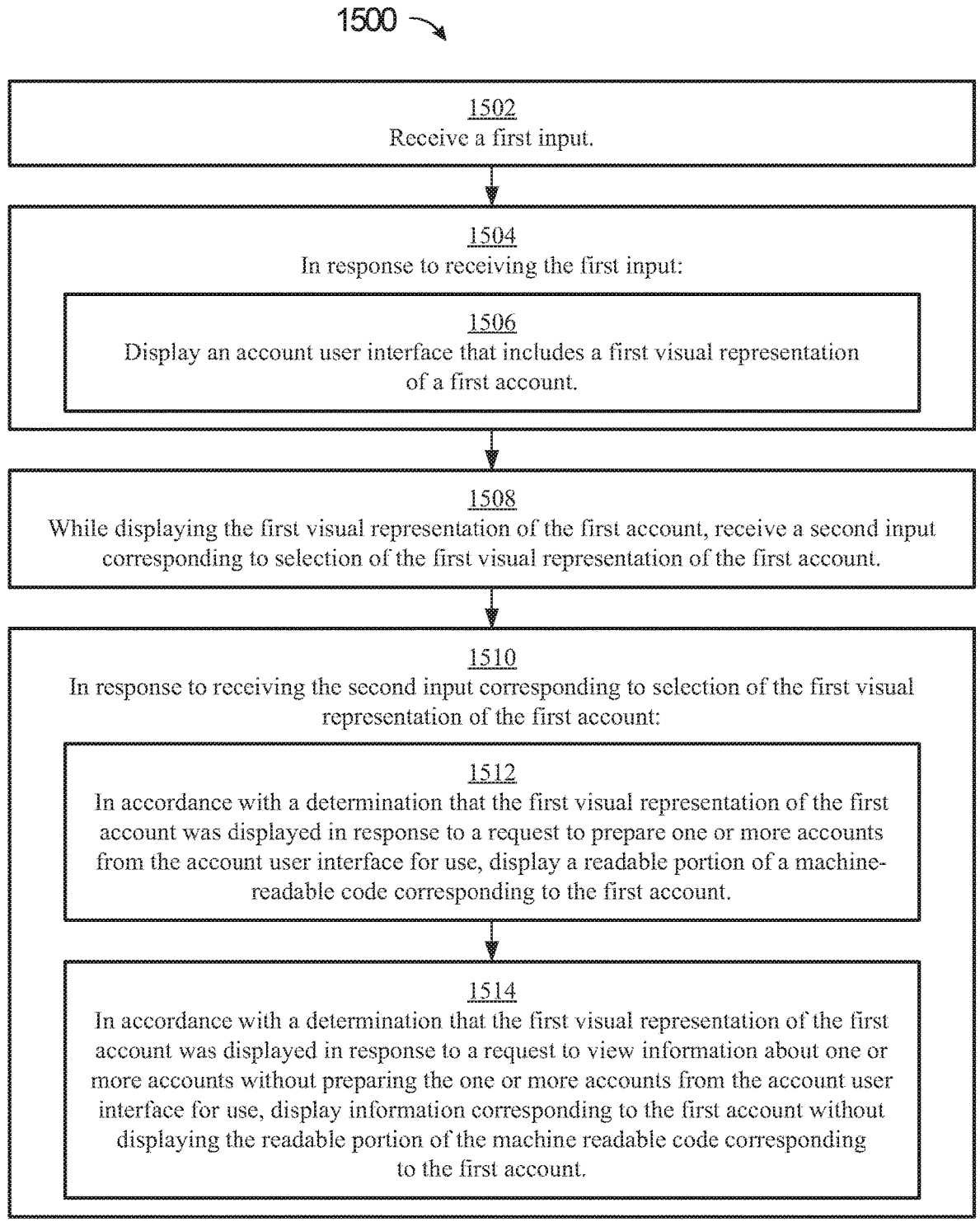
FIG. 15 is a flow diagram illustrating a method for authorizing transfer accounts in accordance with some embodiments.
Figure 16C:
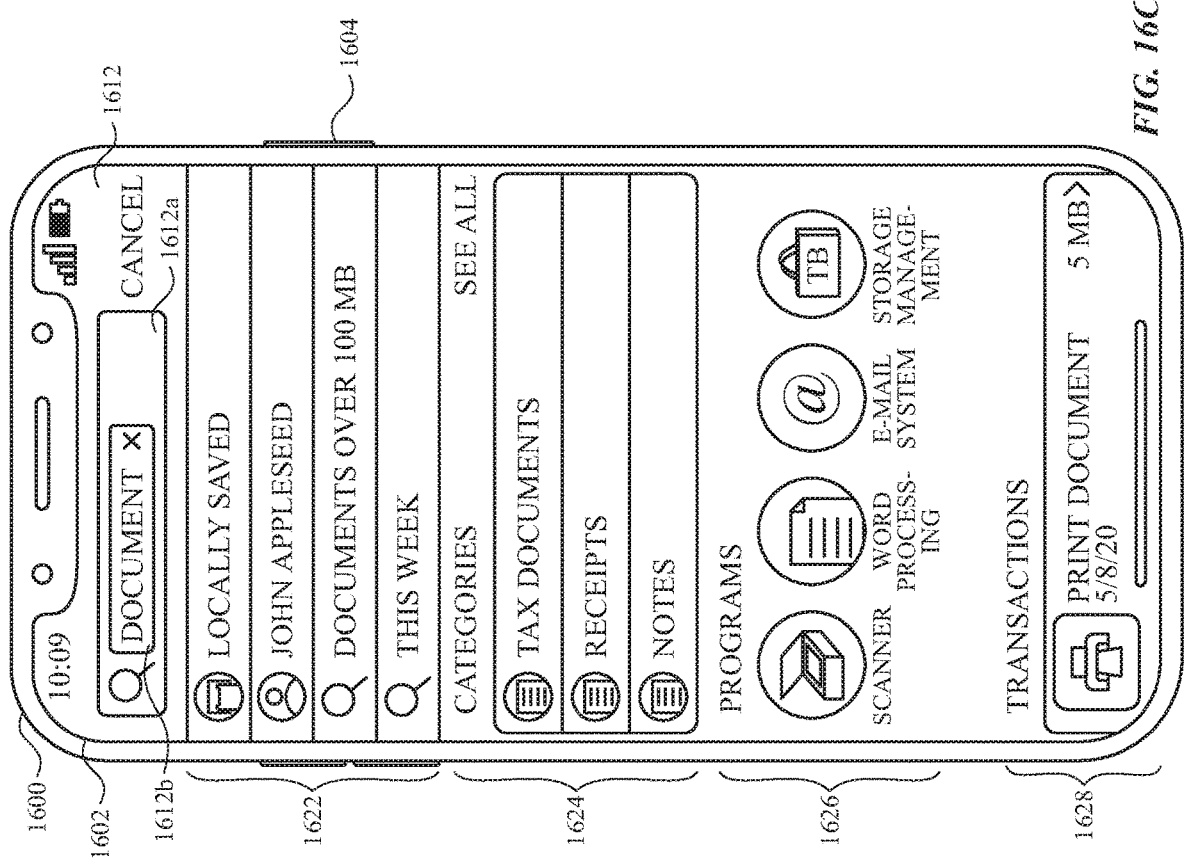
Figure 17K:
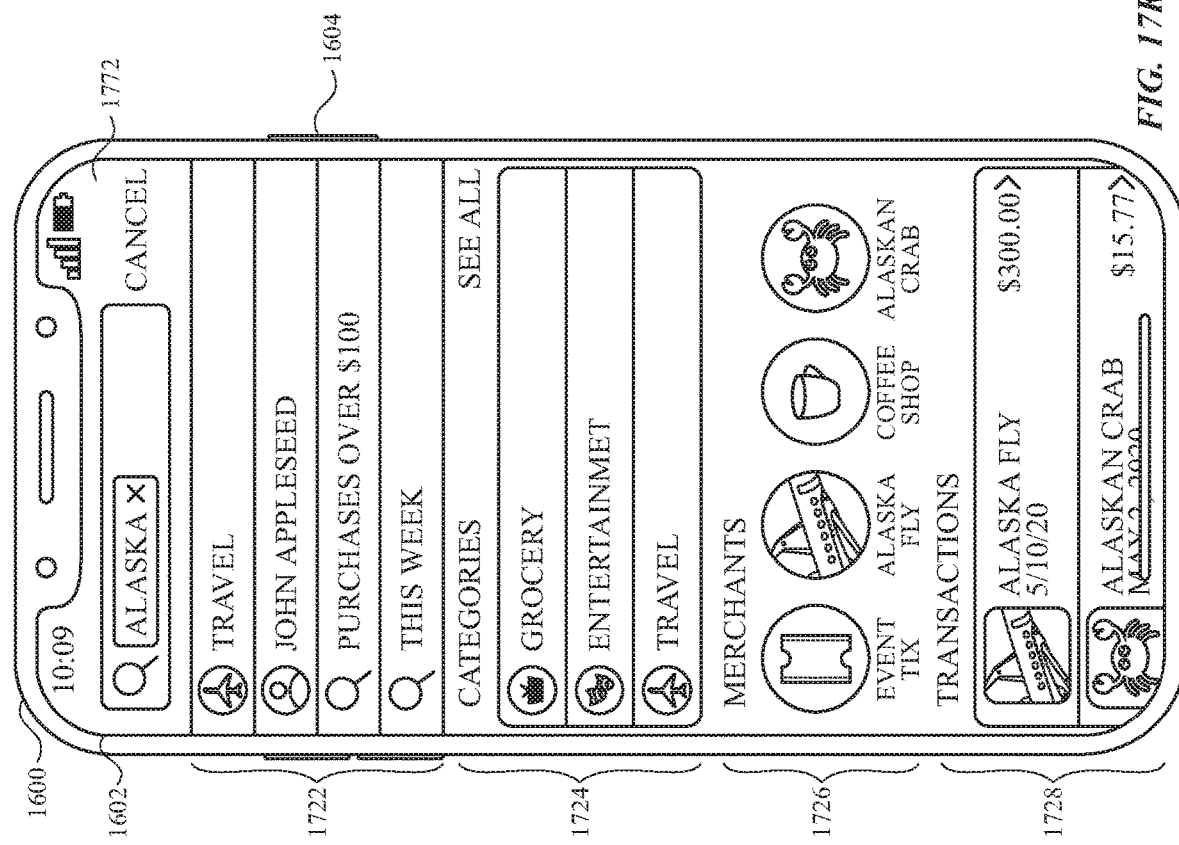
FIGS. 17A-17N illustrate exemplary user interfaces for searching one or more transfer storage accounts in accordance with some embodiments.
Figure 18:
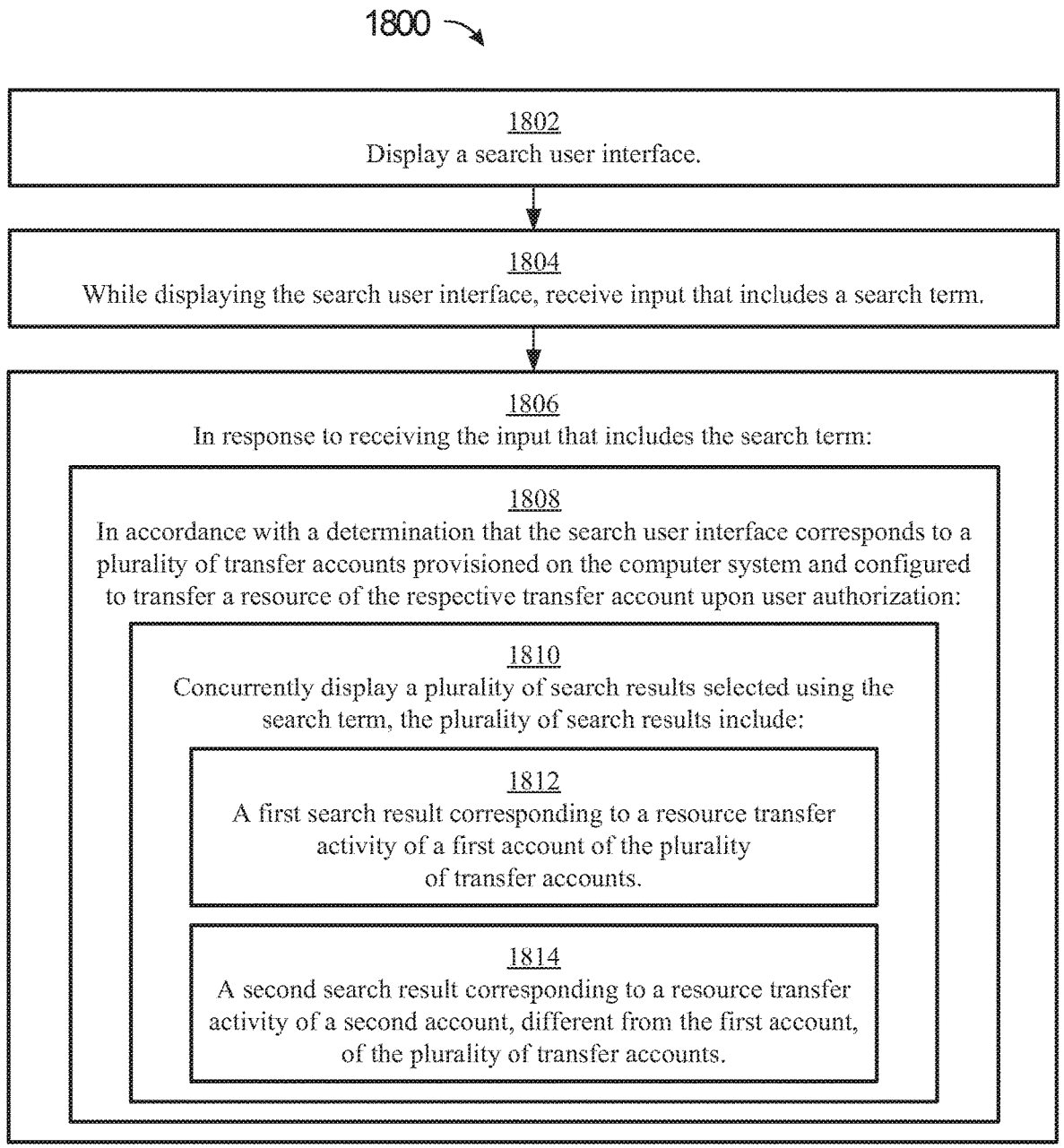
FIG. 18 is a flow diagram illustrating a method for searching one or more transfer storage accounts in accordance with some embodiments.

Below, FIGS. 1A-1B, 2, 3, 4A-4B, and 5A-5B provide a description of exemplary devices for performing the techniques for sharing and using passes or accounts. FIGS. 6A-6F illustrate exemplary user interfaces for sharing one or more passes in accordance with some embodiments. FIG. 7 is a flow diagram illustrating methods for sharing one or more passes in accordance with some embodiments. The user interfaces in FIGS. 6A-6F are used to illustrate the processes described below, including the processes in FIG. 7. FIGS. 8A-8F illustrate exemplary user interfaces for providing a prompt to a user to provide authorization in accordance with some embodiments. FIG. 9 is a flow diagram illustrating methods for providing a prompt to a user to provide authorization in accordance with some embodiments. The user interfaces in FIGS. 8A-8F are used to illustrate the processes described below, including the processes in FIG. 9. FIGS. 10A-10L illustrate exemplary user interfaces for displaying a machine-readable code, in accordance with some embodiments. FIG. 11 is a flow diagram illustrating methods for displaying a machine-readable code in accordance with some embodiments. The user interfaces in FIGS. 10A-10L are used to illustrate the processes described below, including the processes in FIG. 11. FIGS. 12A-12C illustrate exemplary user interfaces for displaying computer storage accounts in accordance with some embodiments. FIGS. 13A-13AA illustrate exemplary user interfaces for displaying and authorizing transfer accounts in accordance with some embodiments. FIG. 14 is a flow diagram illustrating methods for displaying transfer accounts in accordance with some embodiments. FIG. 15 is a flow diagram illustrating methods for authorizing transfer accounts in accordance with some embodiments. The user interfaces in FIGS. 12A-12C and FIGS. 13A-13AA are used to illustrate the processes described below, including the processes in FIGS. 14 and 15. FIGS. 16A-16C illustrate exemplary user interfaces for searching one or more computer storage accounts in accordance with some embodiments. FIGS. 17A-17N illustrate exemplary user interfaces for searching one or more transfer accounts in accordance with some embodiments. FIG. 18 is a flow diagram illustrating methods for searching one or more transfer accounts. The user interfaces in FIGS. 16A-16C and FIGS. 17A-17N are used to illustrate the processes described below, including the processes in FIG. 18.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including,"

"comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
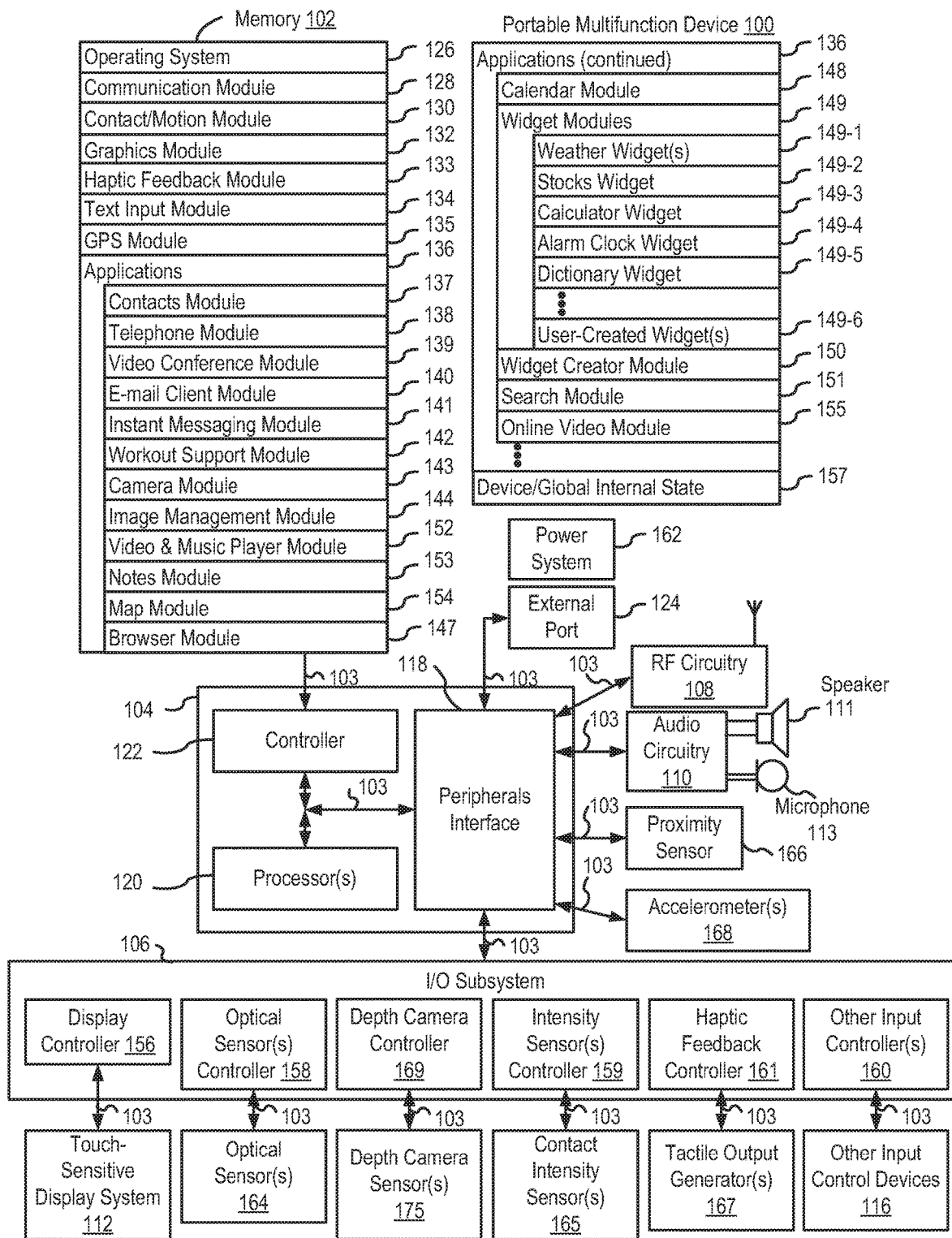
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
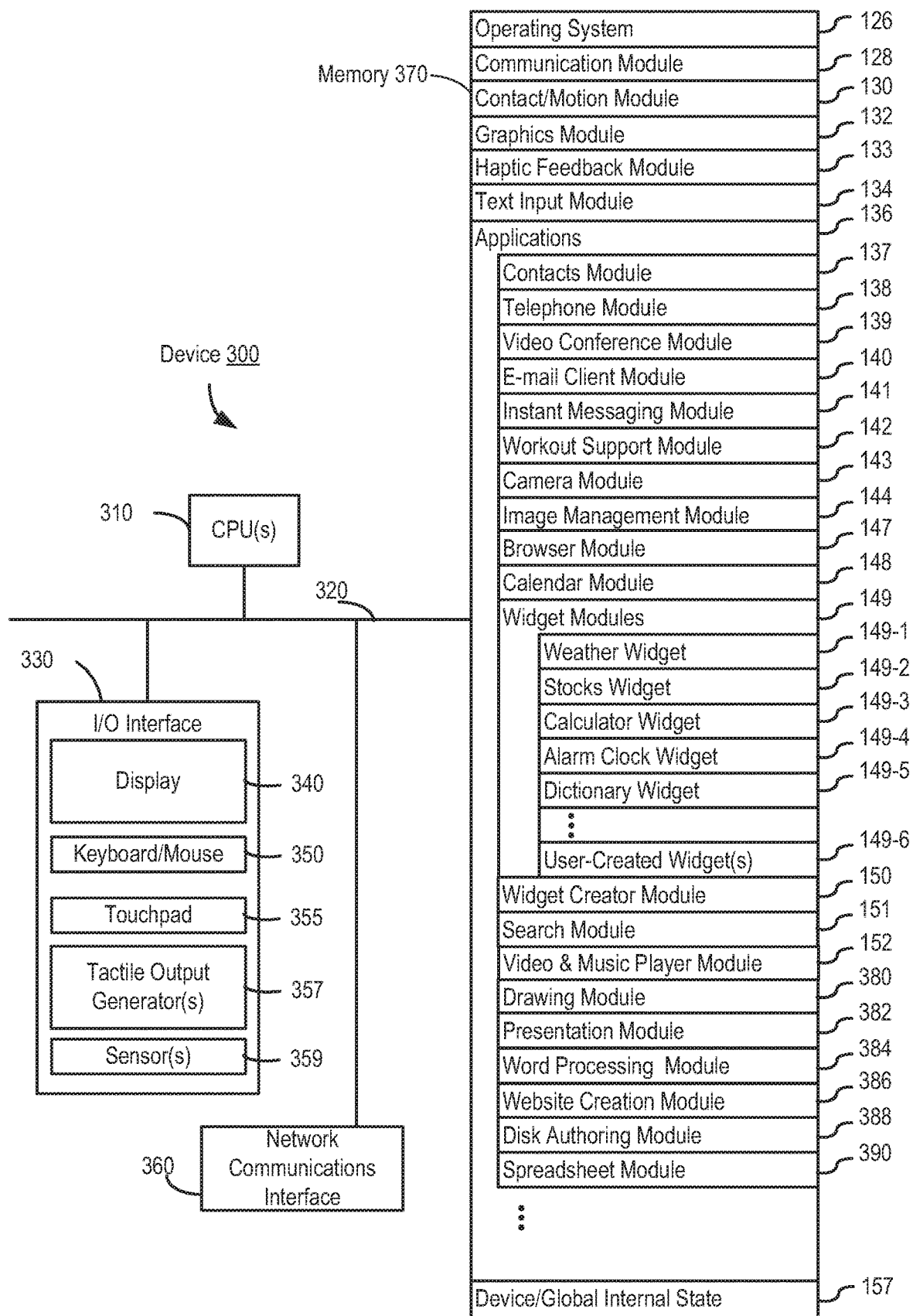
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;

Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
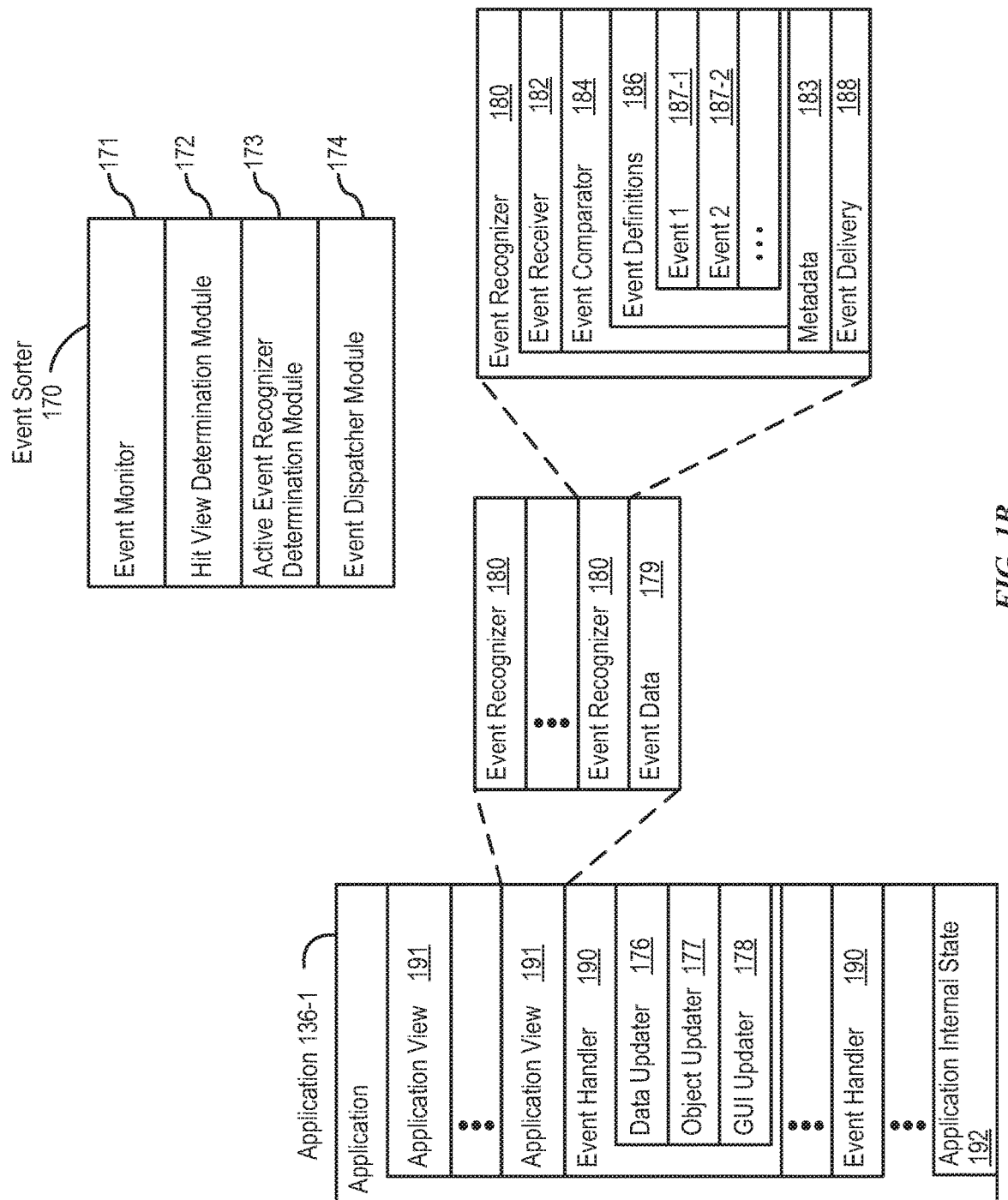
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113

(through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
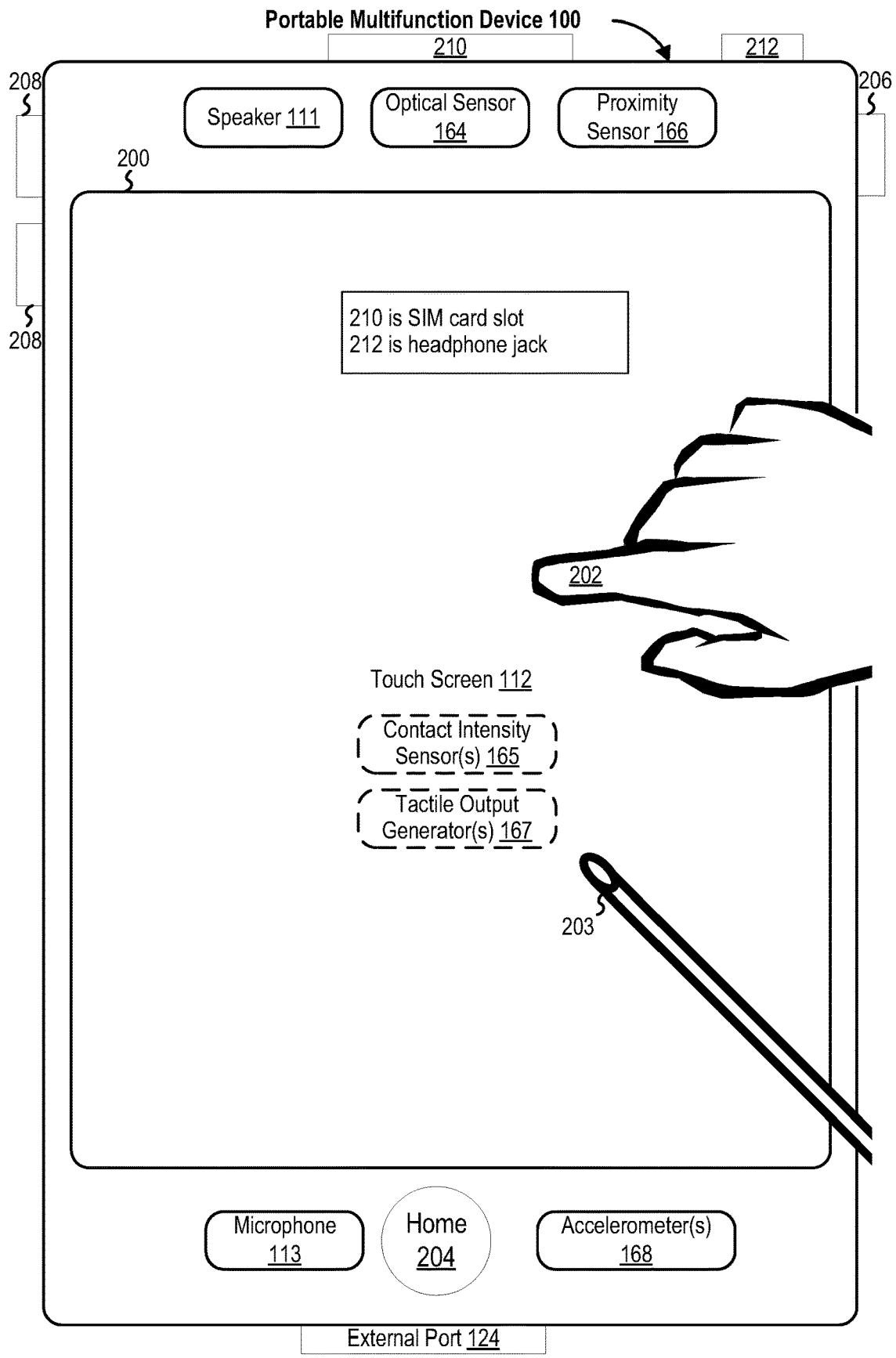
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
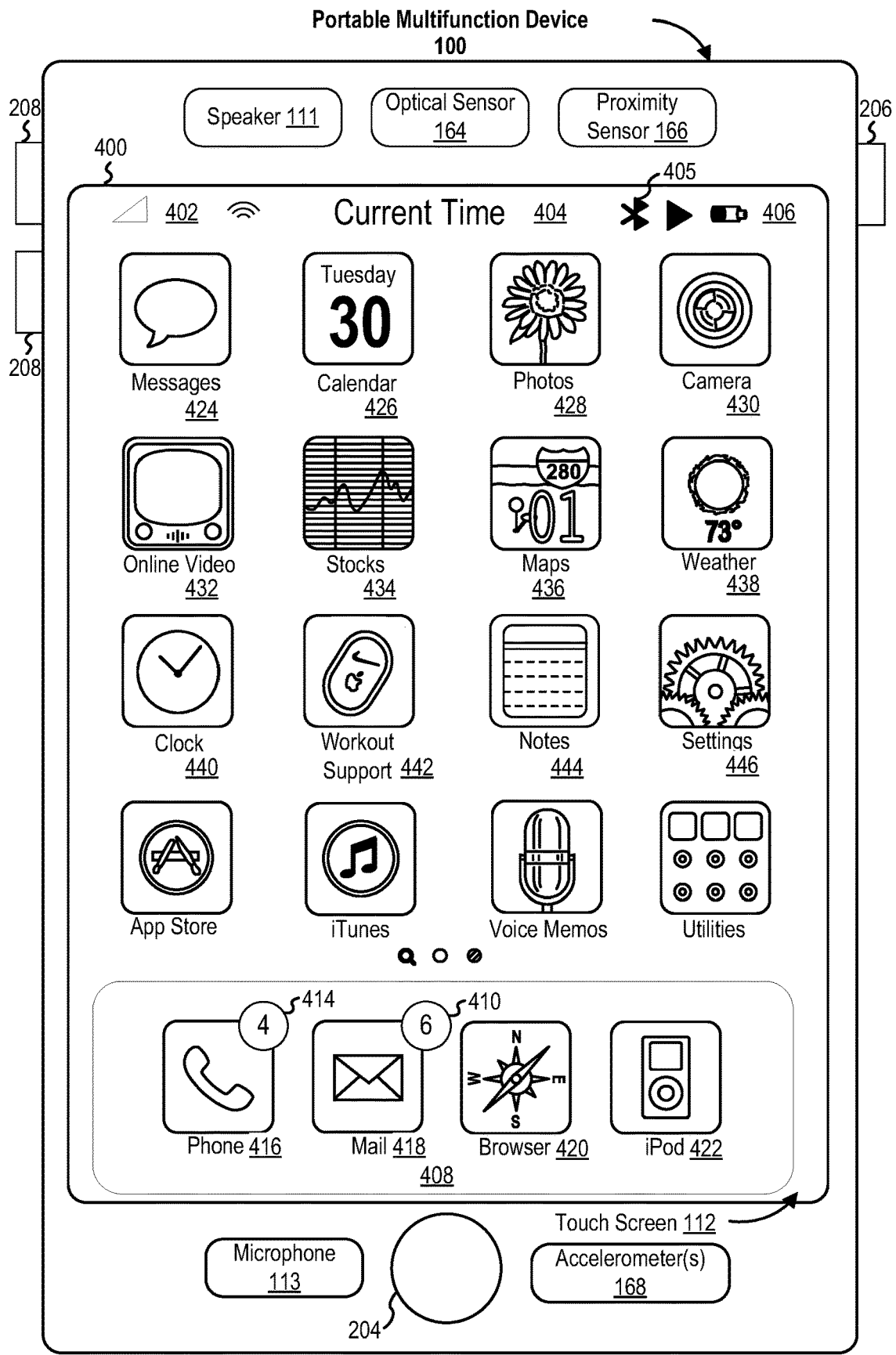
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
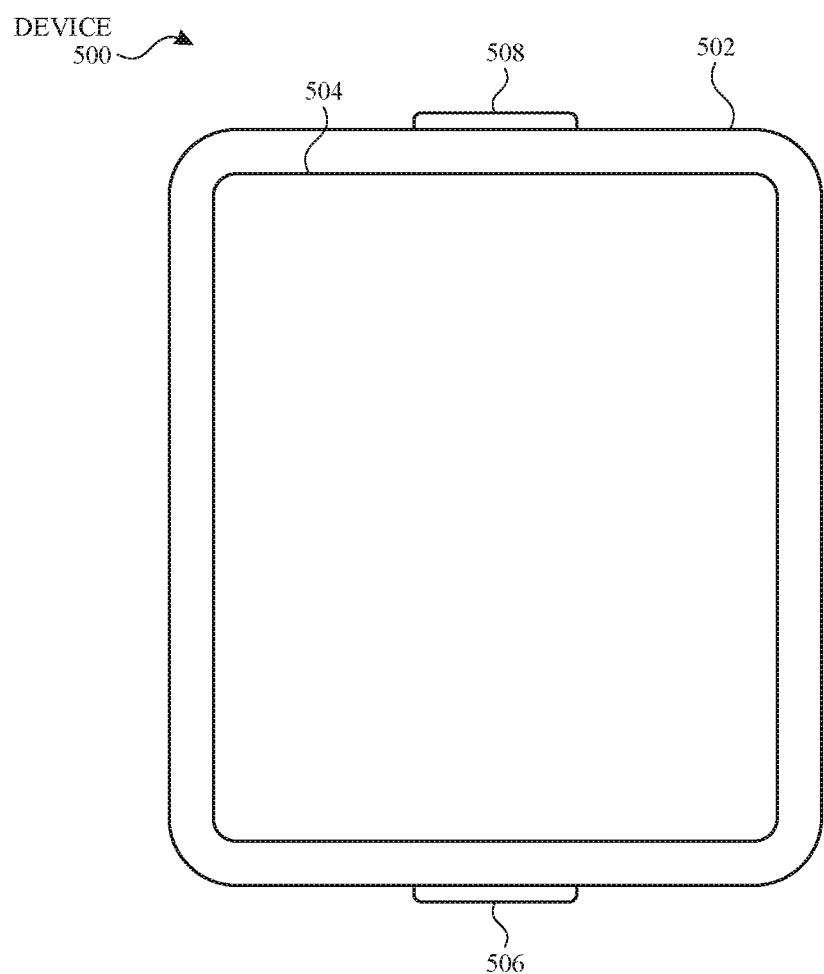
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
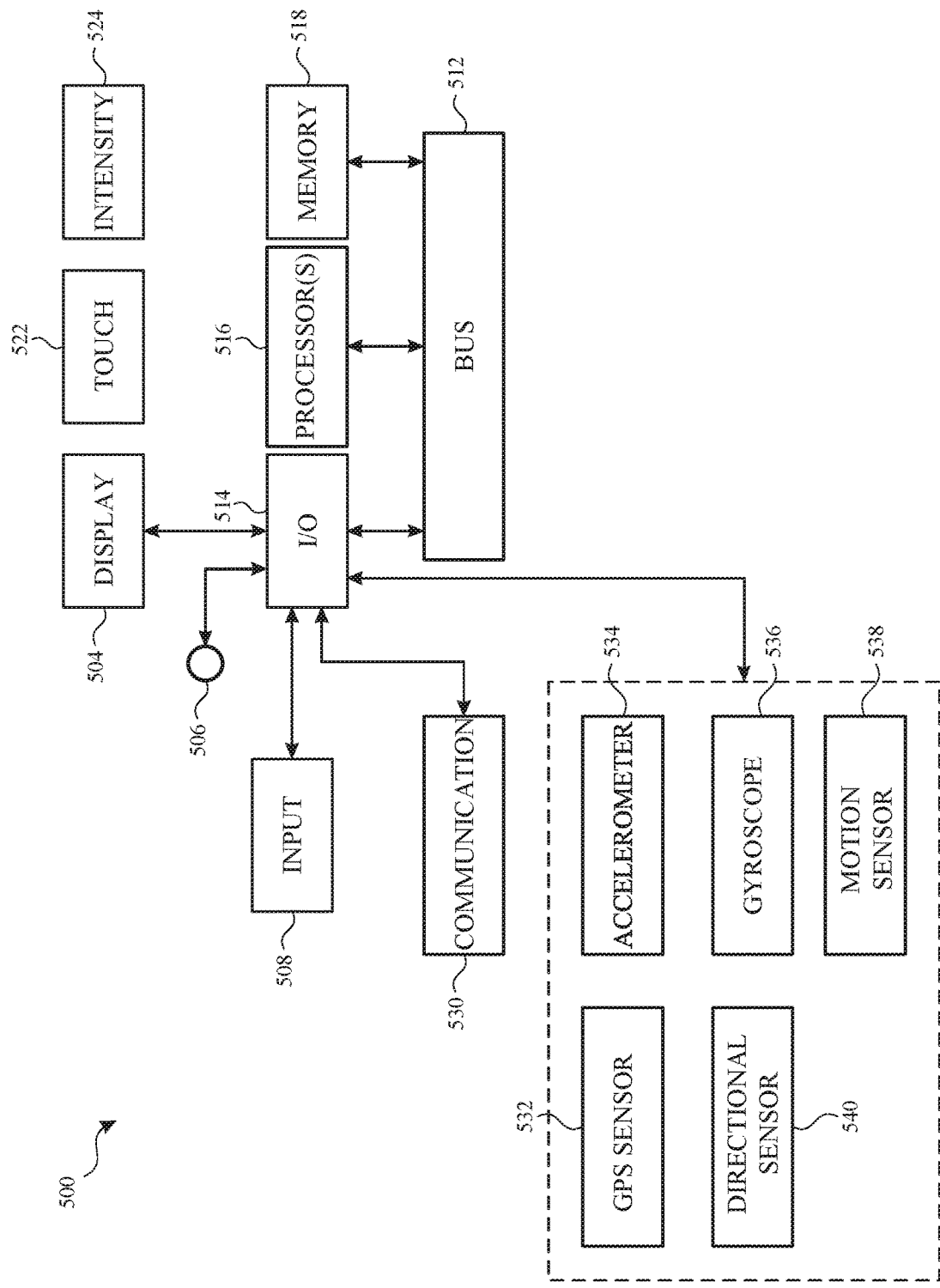
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, 1400, 1500, and 1800 (FIGS. 7, 9, 11, 14, 15, and 18). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6F illustrate exemplary user interfaces for sharing one or more passes in accordance with some embodiments. The user interfaces in these figures are used to illustrate the processes described below, including the processes in FIG. 7.

FIG. 6A illustrates device 600a, which includes display 602a (e.g., a touch screen display). In FIG. 6A, device 600a displays user interface 604, which includes information about three passes associated with a service provider, named Amusement World (e.g., an amusement park). In some embodiments, a pass is a digital pass that includes data that can be transmitted (e.g., to a pass reader terminal) to use or redeem the pass. In some embodiments, the service provider is a business that provides access to a service (e.g., an amusement park, a concert venue, and/or a merchant with memberships). In some embodiments, the service provider is an entity (e.g., a company and/or a third party) that is different from the entity (e.g., the first party) that developed and/or provides device 600a and/or the operating system being run on device 600a. In some embodiments, user interface 604 is a user interface for a vendor application (e.g., a third-party application), a vendor website (e.g., a third-party website), or a wallet application (e.g., a first-party wallet application included with the operating system of device 600a). In some embodiments, user interface 604 includes information about one pass, two passes, or more than three passes. In some embodiments, the passes include electronic tickets, electronic membership cards, or electronic access badges. In some embodiments, the passes provide access to a service provided by the service provider (e.g., entry into an amusement park, entry into a venue, entry into a retail establishment, access to an account or account feature, and/or redemption of an offer or promotion). In the embodiment illustrated in FIG. 6A, the passes provide access to a venue called Amusement World.

User interface 604 includes affordance 606, which when selected, initiates a process for adding the passes to an account associated with a first user identity (e.g., an account associated with a user or owner of device 600a and to which device 600a is signed into). In some embodiments, the account is for a first-party wallet application associated with the user identity. In some embodiments, a first-party application is an application that is developed, managed, and/or provided by the developer of device 600a and/or the operating system being run on device 600a. In FIG. 6A, while displaying user interface 604, device 600a receives (e.g., detects) a request 603 to add the passes indicated on user interface 604a to an account associated with a first user identity. In the embodiment illustrated in FIG. 6A, request 603 includes a selection of (e.g., a tap on) affordance 606.

After (e.g., in response to) receiving request 603 device 600a displays a share affordance 612a (e.g., as shown on user interface 608a in FIG. 6B) for providing (e.g., sharing) at least one of the one or more passes to an account associated with a second user identity.

Use interface 608a includes (e.g., concurrently displays) share affordance 612a, add affordance 610a, a representation 630a of the pass(es) (or an account associated with the pass(es) and/or the service provider), and a prompt to add the passes to the account associated with the first user identity. In some embodiments, user interface 608a is displayed in response to receiving a request to launch or open the wallet account application (e.g., a double press of hardware button 635a on device 600a) after receiving request 603 to add the one or more passes to the account associated with the first user identity.

While displaying user interface 608a, device 600a can receive (e.g., detect) request 605 (e.g., a tap on add affordance 610a) to add the passes to the account associated with the first user identity and/or to device 600a (e.g., the passes can be stored on device 600a). In some embodiments, adding a pass to an account associated with a user identity includes adding data corresponding to the pass to the account without adding (e.g., storing) data corresponding to the pass to a device associated with the user identity, adding data corresponding to the pass to the account and adding data corresponding to the pass to a device associated with the user identity, or adding data corresponding to the pass to a device associated with the user identity without adding data corresponding to the pass to the account.

In the embodiment illustrated in FIG. 6C, in response to receiving request 605, device 600a removes (e.g., ceases display of) the prompt for the user to add the passes to the account associated with the first user identity and displays an indication (e.g., a textual indication "3 PASSES ADDED TO WALLET") that the passes have been added to the account associated with the first user identity. In the embodiment illustrated in FIG. 6C, in response to receiving request 605, device 600a removes (e.g., ceases display of) add affordance 610a and displays Done affordance 632.

In some embodiments, device 600a (e.g., automatically, without additional user input) adds all of the received passes to the account and/or device associated with the first user identity in response to receiving selection of add affordance 610a. In some embodiments, in response to receiving selection of add affordance 610a, device 600a provides (e.g., displays) one or more options (e.g., affordances) to select which of the received passes to add to the account and/or device associated with the first user identity. For example, device 600a can provide the ability to add the passes one at a time or to add any one or two of the three passes without adding all of the passes.

In some embodiments, share affordance 612a is displayed after adding the pass(es) (e.g., information corresponding to the pass(es)) to the account associated with the first user identity. For example, share affordance 612a is not displayed in user interface 608a in FIG. 6B in response to receiving request 603 in FIG. 6A, and is displayed in user interface 608a in FIG. 6C after adding the pass(es) to the account associated with the first user identity (e.g., in response to receiving selection 605 in FIG. 6B of add affordance 610a).

In some embodiments, device 600a provides capability to select a visual design for the pass(es) (e.g., different artwork options that can be used as an image on the passes). In some embodiments, prior to sharing the pass(es) and/or adding the pass(es) to device 600a (or an account associated with device 600a), device 600a receives a request to view visual design options for the pass(es) (e.g., device 600a detects selection of an affordance that, when selected, causes device 600a to display selectable visual design options). For example, device 600a receives an input corresponding to a selection of a visual design for the one or more passes, and in response, displays the pass(es) according to the selected visual design. In some embodiments, data representing the visual design is provided to the account associated with the second user identity.

In some embodiments, the representation of the pass(es) (e.g., in user interface 608a, 608b, and/or 618) is displayed with a geometry alteration effect (e.g., a skewing effect, a 3D effect, a depth effect, and/or a parallax effect). In some embodiments, the representation of the pass(es) includes a graphical animation (e.g., shifting colors and/or shifting shapes) that creates an illusion that the representation of the pass(es) (or a portion thereof) is a three dimensional object that is being viewed from different angles as the angle (or orientation) of the device (e.g., 600a or 600b) changes. In some embodiments, the geometry alternation effect includes shifting the position of a first layer (e.g., a first pass and/or a first layer of artwork) relative to a second layer (e.g., a second pass and/or a second layer of artwork (e.g., a background)) based on a change in orientation of the device relative to a reference point. In some embodiments, displaying the geometry alternation includes detecting a change in orientation of the device relative to a fixed reference point on the earth (e.g., based on orientation sensors of the device such as an accelerometer, a gyroscope, and/or a magnetometer). In some embodiments, displaying the geometry alternation effect includes detecting a change in orientation of a user relative to the device (e.g., based on a face tracking sensor such as a camera or other face tracking sensor that can detect changes of the point of view of a viewing angle of the device by a face that is being tracked by the device).

In some embodiments, the display of the representation of the pass(es) (e.g., in user interface 608a, 608b, and/or 618) includes an animation (e.g., twinkling stars; an ongoing animation; and/or a repeating animation). In some embodiments, displaying the representation of the pass(es) includes displaying an animation of at least one visual feature of the representation of the pass(es) (e.g., stars on the pass are animated to twinkle). In some embodiments, the animation includes displaying a plurality of intermediate states while transitioning from an initial state of the visual feature to an end state of the visual feature.

In FIG. 6C, device 600a receives (e.g., detects) input 609 (e.g., a tap) corresponding to selection of share affordance 612a. In response to receiving input 609, device 600a initiates a process for providing at least one of the passes to the account associated with the second user identity. In some embodiments, the account associated with the second user identity is a second account for the first-party wallet application associated with a second user (e.g., an account of a family member). In the embodiment illustrated in FIG. 6D, the process for providing at least one of the passes to the account associated with the second user identity includes displaying user interface 614. In some embodiments, user interface 614 includes a graphical element having an appearance of a card or a sheet that overlaps (e.g., is displayed in front of) at least a portion of user interface 608a. User interface 614 includes a graphical representation (e.g., a list) of one or more user identities and a graphical representation of one or more methods for providing the pass(es) (e.g., text message, email, NFC, and/or a shared cloud storage account shared by the first user identity and the second user identity).

In FIG. 6D, device 600a receives (e.g., detects) input 611 (e.g., a tap) selecting a user identity (e.g., a tap on representation 616 of a user identity associated with user Amy Appleseed). In response to receiving input 611, device 600a provides at least one of the passes to an account associated with the selected user identity (e.g., information is added to the account associated with the selected user identity such that at least one pass is redeemable from a wallet application of the second user identity). In some embodiments, device 600a provides the one or more passes by sending information representing the pass or providing access to the pass information from a central server. In the embodiment illustrated in FIG. 6D, device 600a provides one of the passes (e.g., only one of the passes; a single pass) to the account associated with the selected user identity.

In some embodiments, in response to receiving input 611, device 600a displays (e.g., returns to) user interface 608a shown in FIG. 6C. In some embodiments (e.g., after returning to user interface 608a shown in FIG. 6C), device 600a provides at least one of the passes to an account associated with a second user identity (e.g., a selected user identity) in response to receiving input 609 (e.g., selection of share affordance 612a).

In some embodiments, some or all of the techniques described with reference to FIGS. 6A-6D can be repeated to provide the pass(es) to another user identity. For example, after (e.g., in response to) selection of the second user identity in user interface 614 (or after providing the pass(es) to the account associated with the second user identity), device 600a displays user interface 608a as shown in FIG. 6B, if the pass(es) have not been added to device 600a, or user interface 608a as shown in FIG. 6C, optionally without Done affordance 632, if the pass(es) have been added to device 600a. In some embodiments, two or more user identities (e.g., Amy Appleseed and John Appleseed) can be selected in user interface 614, and in response to receiving selection of two or more user identities, device 600a provides the pass(es) to accounts associated with all of the selected user identities. In some embodiments, a representation in user interface 614 corresponds to a group of user identities (e.g., two or more user identities), and in response to receiving selection of such a representation, device 600a provides the pass(es) to accounts associated with all of the user identities associated with the group.

In some embodiments, device 600a (e.g., automatically, without additional user input) provides all of the received passes to the account associated with the selected user identity in response to receiving input 611. In some embodiments, in response to receiving input 611, device 600a provides (e.g., displays) one or more options (e.g., affordances) to select which of the passes to provide to the account associated with the selected user identity. For example, device 600a can provide the ability to provide the passes one at a time or to provide any one or two of the three passes without providing all of the passes.

In the embodiment illustrated in FIGS. 6A-6C, share affordance 612a is displayed as part of a process of adding the passes to device 600a and/or the account associated with a user identity associated with device 600a. For example, the passes are added to device 600a in response to receiving selection 605 of add affordance 610a in FIG. 6B prior to providing the pass to an account associated with a second user identity. In some embodiments, one or more passes can be provided to an account associated with a second user identity prior to or without adding the pass(es) to device 600a. For example, device 600a can receive (e.g., detect) input 607 (e.g., a tap) corresponding to selection of share affordance 612a, as shown in FIG. 6B. In response to receiving input 607, device 600a initiates the process for providing at least one of the passes to the account associated with the second user identity described above with reference to FIG. 6D (e.g., device 600a displays user interface 614) without or prior to adding the pass(es) to device 600a.

In some embodiments, after the pass(es) are shared, device 600a returns to an application or website that generated the pass(es) (e.g., a source of the pass(es)) or from which the process for adding the pass(es) to the account associated with the first user identity was initiated. For example, in response to selection of a second user identity, such as input 611 on representation 616, device 600a displays (e.g., automatically; without further user input) a user interface of the application corresponding to user interface 604 in FIG. 6A (e.g., device 600a launches, re-opens, brings to the foreground, and/or switches to a third-party application or website of the service provider that was the source of the pass(es) or from which the process for adding the pass(es) to an account associated with the first user identity was initiated.

In some embodiments, the second user identity is associated with the first user identity (e.g., the two user identities are included in a family sharing account in which users can share data such as photos, videos, passes, and/or access to other accounts). In some such embodiments, providing the pass(es) to the account associated with the second user identity adds the pass(es) to the account associated with the second user identity without input at a computer system associated with the second user identity and/or without providing a notification or message at a device associated with the second user identity (e.g., the pass(es) appear in the account of the second user identity (e.g., are displayed in a wallet application that is logged into the account of the second user identity) without sending a text message, email, and/or other notification.

In some embodiments, providing the pass(es) to the account associated with the second user identity adds the pass(es) to a first device associated with the second user identity (e.g., a phone) and a second device associated with the second user identity (e.g., a watch).

In some embodiments, adding the pass(es) to the account and/or device(s) associated with the first user identity or the second user identity authorizes the respective devices to redeem the pass(es).

In some embodiments, an animation (e.g., a spaceship launching and/or a gate opening) is displayed when the pass(es) are redeemed or used (e.g., as described with reference to FIGS. 8C and 8E). For example, in some embodiments, device 600a detects a request (e.g., a request as described with reference to FIGS. 8C and 8E) to provide data corresponding to a first pass of the pass(es) to a pass reader terminal, and in response, displays an animation associated with the first pass indicating that the data corresponding to the first pass was successfully provided to the pass reader terminal. In some embodiments, the animation includes displaying a transition from an initial state (e.g., spaceship on launch pad and/or gate closed) to an end state (e.g., spaceship in space and/or gate open), and a plurality of intermediate states are displayed while transitioning from the initial state to the end state. In some embodiments, the animation is displayed in response to detecting that the data corresponding to the first pass was transmitted from the computer system. In some embodiments, the animation is displayed in response to receiving a confirmation that the data corresponding to the first pass was accepted by the pass reader terminal.

In some embodiments, when the pass(es) are used, device 600a and/or the pass reader terminal make (e.g., output) a unique noise or a noise different from noises made when other events occur. In some embodiments, the noise includes a sound that corresponds to custom art or animation (e.g., a sound of the spaceship launching and/or a sound associated with a visual design selected by a user). For example, in some embodiments, device 600a detects a request to provide data corresponding to a pass to a pass reader terminal, and in response, causes (e.g., by the device 600a and/or the pass reader terminal) an audio notification corresponding to the pass (e.g., when the pass is used, the user's device and/or the pass reader terminal plays a sound corresponding to artwork on the pass). In some embodiments, the audio notification is custom to the pass (e.g., the notification is a specific audio output (e.g., a sound effect) associated with the pass that is different from a notification for alerts, such as incoming calls, text messages, and/or emails).

Returning to FIG. 6D, representation 616 corresponds to an option to provide one or more of the passes to an account associated with a user identity associated with user Amy Appleseed via text message, as indicated by the thought bubble indication on the bottom right of representation 616. In some embodiments, the account associated with the selected user identity is accessed via a second electronic device associated with the second user identity. FIG. 6E illustrates an example of a user interface 618 of a messaging application displayed on display 602b of device 600b associated with the selected user identity (e.g., Amy Appleseed's phone). User interface 618 includes (e.g., displays) a message conversation between the user identity associated with device 600a and the user identity associated with device 600b. As a result of the user identity associated with device 600b being selected in FIG. 6D, user interface 618 includes (e.g., in the message conversation) a graphical indication 620 of the pass(es) and affordance 622 for viewing the shared pass(es).

In FIG. 6E, device 600b receives (e.g., detects) request 613 to view the shared pass(es) (e.g., a tap on affordance 622). In response to receiving request 613, device 600b displays user interface 608b, as shown in FIG. 6F. In some embodiments, user interface 608b is a user interface for a wallet application (e.g., a first-party wallet application) associated with the user identity associated with device 600b. In some embodiments, user interface 608b is similar to user interface 608a shown in FIG. 6B. User interface 608b includes (e.g., concurrently displays) share affordance 612b, add affordance 610b, a representation 630b of the shared pass(es) (or an account associated with the shared pass(es) and/or the service provider), and a prompt to add the pass(es) to the account associated with the first user identity. In some embodiments, user interface 608b is displayed in response to receiving a request to launch or open the wallet account application (e.g., a double press of hardware button 635b on device 600b) after receiving the pass(es). For example, the option to add and/or share the received pass(es) can be displayed in the wallet application associated with the selected user identity without (or prior to) viewing representation 620 of the pass(es) in user interface 618 of the messaging application or selecting affordance 622.

In response to receiving selection of add affordance 610b, device 600b adds the pass(es) to an account (e.g., a digital wallet account) associated with the user identity associated with device 600b. In some embodiments, the shared passes are added to the account associated with the second user identity without further input (e.g., without selection of add affordance 610b in user interface 608b, without input at device 600b, and/or without other confirmation input). In some embodiments, the shared pass(es) are automatically added to the account associated with the selected user identity, but further input is required (e.g., selection of add affordance 610b) to add/store the shared pass(es) on device 600b. In some embodiments, selection of add affordance 610b (or other input at a device associated with the selected user identity (e.g., a confirmation input)) is required to add the shared pass(es) to the account associated with the selected user identity.

In response to receiving selection of share affordance 612b, device 600b initiates a process to share the pass with another user identity (e.g., a same or similar process as described for device 600a with reference to FIGS. 6C-6D).

FIG. 7 is a flow diagram illustrating a method for sharing one or more passes in accordance with some embodiments. Method 700 is performed at a computer system (e.g., 100, 300, 500, 600a) in communication with a display generation component (e.g., 602a) and one or more input devices (e.g., a touch-sensitive surface). Some operations in method 700 are, optionally, combined, the orders of some operations are, optionally, changed, and some operations are, optionally, omitted.

As described below, method 700 provides an intuitive way for sharing passes with an account associated with a second user identity. The method reduces the cognitive burden on a user when sharing passes, thereby creating a more efficient human-machine interface. For battery-operated computer systems, enabling a user to share passes faster and more efficiently conserves power and increases the time between battery charges.

In method 700, the computer system (e.g., 600a) displays (702), via the display generation component (e.g., 602a), a first user interface (e.g., 604, 608a) (e.g., a vendor application, a vendor website, and/or a wallet application) that includes information about one or more passes associated with a service provider (e.g., a business that provides access to a service (e.g., an amusement park, a concert venue, and/or a merchant with memberships)).

While displaying the first user interface, the computer system receives (704), via the one or more input devices, a request (e.g., 603, 605) (e.g., selection of an "add to wallet" affordance via a touch-sensitive surface) to add one or more passes (e.g., electronic tickets, electronic membership cards, and/or electronic access badges) to an account associated with a first user identity (e.g., an account for a first-party wallet application associated with the user). The one or more passes provide access to a service provided by the service provider (e.g., entry into an amusement park, entry into a venue, entry into a retail establishment, access to an account or account feature, and/or redemption of an offer or promotion).

After receiving the request (and optionally after adding information corresponding to the one or more passes to the account associated with the first user identity (e.g., adding information such that the passes are redeemable from the wallet application)), the computer system displays (706), via the display generation component, a share affordance (e.g., 612a) (e.g., a selectable user interface object) for providing (e.g., sending information representing the pass and/or providing access to the pass information from a central server) at least one of the one or more passes to an account associated with a second user identity (e.g., a second account for the first-party wallet application associated with a second user (e.g., an account of a family member). In some embodiments, the account associated with the second user identity is accessed via a second electronic device (e.g., 600b) associated with the second user identity).

The computer system receives (708), via the one or more input devices, a user input (e.g., 607, 609) corresponding to selection of the share affordance (e.g., 612a) (e.g., a tap gesture, via a touch-sensitive surface, on the share affordance).

In response to receiving the user input corresponding to selection of the share affordance, the computer system initiates (710) a process for providing at least one of the one or more passes to the account associated with the second user identity (e.g., adding information to the second account such that at least one pass is redeemable from the wallet application of the second user). Providing passes to a second account associated with a second user identity in response selection of a share affordance reduces the number of inputs needed to add passes to the second account. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, before initiating the process for providing at least one of the one or more passes to the account associated with the second user identity, the second user identity is selected from a list of user identities available to receive a shared pass (e.g., selected from user interface 614) (e.g., family members and/or contacts in a contact list). In some embodiments, the process for providing at least one of the one or more passes to the second account associated with the second user identity includes receiving and responding to a sequence of one or more inputs and can include displaying one or more user interfaces. In some embodiments, the process for providing at least one of the one or more passes to the second account associated with the second user identity includes providing an indication (e.g., 620) (e.g., a text message) to a device associated with the second user identity that the pass has been added to (e.g., authorized to be redeemed by) the account associated with the second user identity).

In some embodiments, displaying the first user interface (e.g., 604, 608a) includes displaying a representation (e.g., 630a) of the one or more passes with a geometry alteration effect (e.g., a skewing effect, a 3D effect, a depth effect, a parallax effect, and/or a graphical animation (e.g., shifting colors and/or shifting shapes) that creates an illusion that the representation of the one or more passes (or portion thereof) is a three dimensional object that is being viewed from different angles as the angle (or orientation) of the display generation component changes). In some embodiments, the geometry alternation effect includes shifting the position of a first layer (e.g., a first pass and/or a first layer of artwork) relative to a second layer (e.g., a second pass and/or a second layer of artwork (e.g., a background)) based on a change in orientation of the display generation component relative to a reference point. In some embodiments, displaying the geometry alternation includes detecting a change in orientation of the display generation component relative to a fixed reference point on the earth (e.g., based on orientation sensors of the computer system such as an accelerometer, a gyroscope, and/or a magnetometer). In some embodiments, displaying the geometry alternation effect includes detecting a change in orientation of a user relative to the display generation component (e.g., based on a face tracking sensor such as a camera or other face tracking sensor that can detect changes of the point of view of a viewing angle of the device by a face that is being tracked by the device). Displaying a representation of the one or more passes with a geometry alteration effect provides the user with visual feedback about a state of the display generation component and/or information about the one or more passes, such as how many passes are available (e.g., by allowing the height of a simulated stack of passes to be viewed by changing the orientation of the display generation component). Further, displaying the geometry alteration effect as the orientation of the display generation component changes indicates to the user that the displayed passes are authentic and not a video that is displayed independently of the orientation of the display generation component. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the device by enabling the user to use the device more quickly and efficiently.

In some embodiments, in response to receiving the request (e.g., 603, 605) to add one or more passes to the account associated with the first user identity, the computer system initiates a process for adding the one or more passes to a device (e.g., 600a) associated with (e.g., logged into) the account associated with the first user identity. In some embodiments, the process for adding the one or more passes to the device associated with the account associated with the first user identity includes displaying the share affordance (e.g., 612a) for providing at least one of the one or more passes to the account associated with the second user identity. Displaying the share affordance for providing at least one of the one or more passes to the account associated with the second user identity as part of the process for adding the one or more passes to the device associated with the account associated with the first user identity allows the user to efficiently share passes without having to provide extra inputs to navigate to additional user interfaces. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, in response to receiving the request (e.g., 603, 605) to add one or more passes to the account associated with the first user identity, the computer system adds a first pass of the one or more passes and a second pass of the one or more passes, different from the first pass of the one or more passes, to the account associated with the first user identity (e.g., a single input on an "add passes" affordance (e.g., 606, 610a) causes multiple passes to be added to the account). Adding a first pass and a second pass to the account associated with the first user identity in response to receiving the request to add one or more passes to the account associated with the first user identity allows the user to efficiently add multiple passes to the account associated with the first user identity with a single input. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the request (e.g., 603) to add one or more passes to the account associated with the first user identity does not add the one or more passes to the account associated with the first user identity. Forgoing adding the passes to the account associated with the first user identity allows the user to share one or more passes with an account associated with a second user identity without adding passes to the account associated with the first user identity, which provides additional control to the user over which accounts have passes. Providing additional control of the computer system to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the process for providing at least one of the one or more passes to the account associated with the second user identity includes providing a first pass of the one or more passes and a second pass of the one or more passes, different from the first pass of the one or more passes, to the account associated with the second user identity. In some embodiments, the passes are sent to the account associated with the second user identity via text message (e.g., 620), and then the second user is given an option to add passes (e.g., 610*b*). In some embodiments, all of the passes in the one or more passes are pushed to the account associated with the second user identity without further input from the second user (e.g., in response to a single input). Providing a first pass and a second pass to the account associated with the second user identity allows the user to efficiently share multiple passes to the account associated with the second user identity with a single input. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the share affordance (e.g., 612*a*) is displayed in a second user interface (e.g., 608*a*) (e.g., a UI for a wallet application) different from the first user interface (e.g., 604) (e.g., a user interface of an application associated with the service provider). In some embodiments, in response to receiving the user input (e.g., 607, 609) corresponding to selection of the share affordance, the computer system displays (e.g., automatically; without further user input) the first user interface. Displaying the first user interface in response to receiving the user input corresponding to selection of the share affordance allows the user to return to the first user interface without additional input. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the second user identity is associated with the first user identity (e.g., the two users are included in a family sharing account), and the process for providing at least one of the one or more passes to the account associated with the second user identity adds the at least one of the one or more passes to the account associated with the second user identity without input at a computer system (e.g., 600*b*) associated with the second user identity (e.g., pass appears in the second user's wallet without receiving text message and/or pass data is sent via a shared cloud storage account). Adding the at least one of the one or more passes to the account associated with the second user identity provides additional control to the user over which accounts have passes. Providing additional control of the computer system to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the process for providing at least one of the one or more passes to the account associated with the second user identity adds (e.g., authorizes the devices to redeem) the at least one of the one or more passes to a first device (e.g., 600*b*) associated with the second user identity (e.g., a phone) and a second device associated with the second user identity (e.g., a watch). Adding the at least one of the one or more passes to a first device associated with the second user identity and a second device associated with the second user identity allows the user to add passes to multiple devices with a single input. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Figures 8A, 8B:
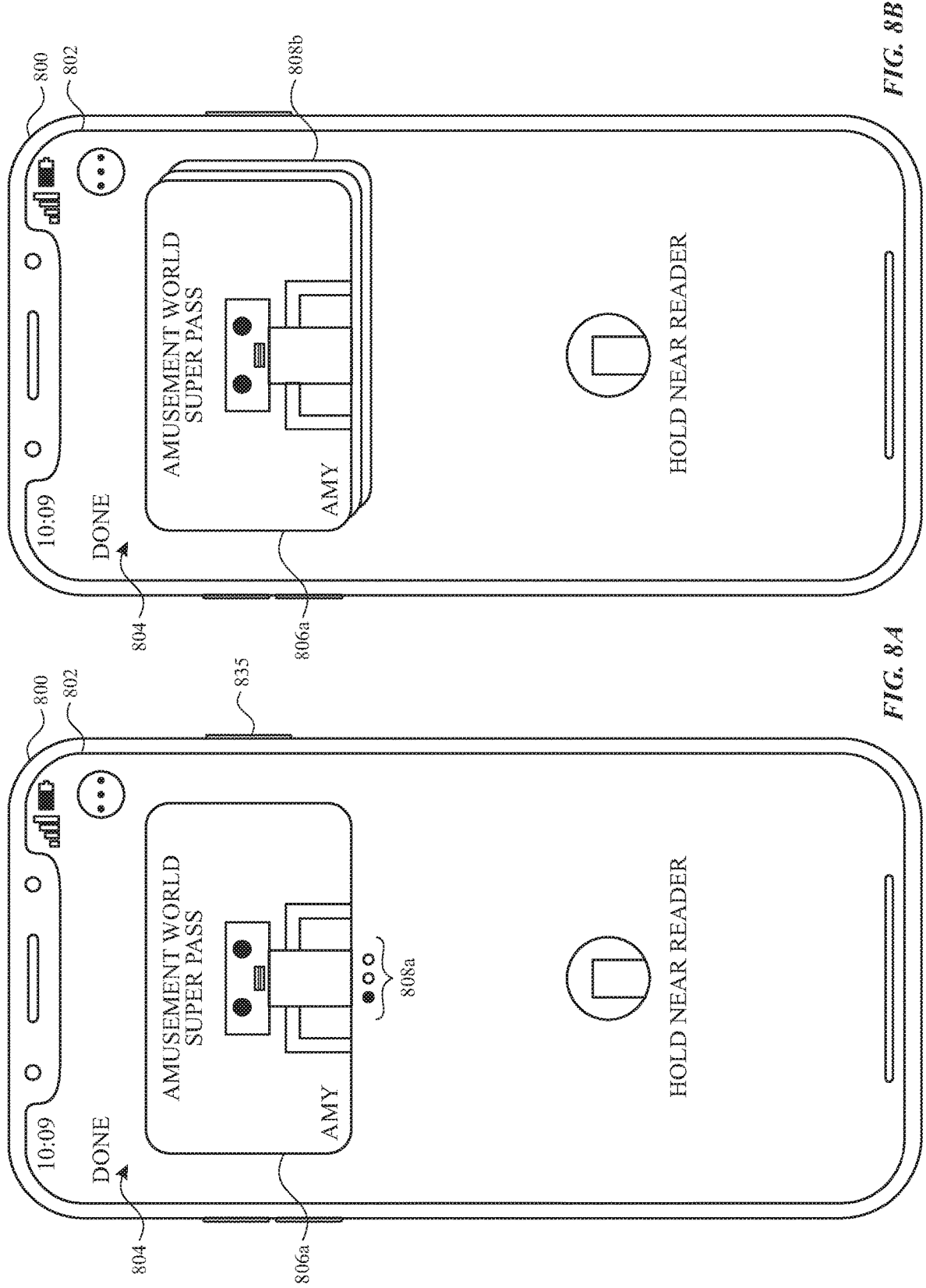

In some embodiments, the computer system receives an input corresponding to a selection of a visual design for the one or more passes. In some embodiments, prior to receiving the input corresponding to a selection of a visual design, the computer system detects a request to view visual design options for the one or more passes and, in response to receiving the input corresponding to the selection of the visual design for the one or more passes, the computer system displays the one or more passes according to the selected visual design (e.g., different artwork options that can be used as an image on the passes, such as shown in FIGS. 8A and 8D). In some embodiments, data representing the visual design is provided to the account associated with the second user identity. Displaying the one or more passes according to the selected visual design allows the user to customize the appearance of a pass, which provides visual feedback to the user that the pass is associated with the user's account. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system detects a request to provide data corresponding to a first pass of the one or more passes to a pass reader terminal (e.g., 850, as described in reference to FIGS. 8C and 8E) and, in response to detecting the request to provide data corresponding to the first pass to the pass reader terminal, the computer system displays, via the display generation component, an animation associated with the first pass (e.g., as described in reference to FIGS. 8C and 8E) indicating the data corresponding to the first pass was successfully provided to the pass reader terminal (e.g., an animation is displayed when the pass is used (e.g., an expression on a character changing, a spaceship launching, and/or a gate opening). In some embodiments, the animation includes displaying a transition from an initial state (e.g., spaceship on launch pad and/or gate closed) to an end state (e.g., spaceship in space and/or gate open), and a plurality of intermediate states are displayed while transitioning from the initial state to the end state. In some embodiments, the animation is displayed in response to detecting the data corresponding to the first pass was transmitted from the computer system. In some embodiments, the animation is displayed in response to receiving a confirmation that the data corresponding to the first pass was accepted by the pass reader terminal. Displaying the animation associated with the first pass provides visual feedback to the user confirming that the data corresponding to the first pass was successfully provided to the pass reader terminal. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system displays, via the display generation component, a representation (e.g., 630*a*, 630*b*, 806*a* as shown in FIGS. 8A-8C, 806*b* as shown in FIGS. 8D and 8E) of a first pass of the one or more passes. In some embodiments, displaying the representation of the first pass includes displaying an animation of at least one visual feature of the representation of the first pass (e.g., stars on the pass are animated to twinkle). In some embodiments, the animation includes displaying a plurality of intermediate states while transitioning from an initial state of the visual feature to an end state of the visual feature. Displaying an animation of at least one visual feature of the representation of the first pass provides visual feedback to the user that the displayed representation of the first pass corresponds to an authentic pass (e.g., the displayed pass is not a still image copied from another device). Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the device by enabling the user to use the device more quickly and efficiently.

In some embodiments, the computer system detects a request to provide data corresponding to a first pass of the one or more passes to a pass reader terminal (e.g., 850, as described in reference to FIGS. 8C and 8E) and, in response to detecting the request to provide data corresponding to the first pass to the pass reader terminal, the computer system causes (e.g., by the computer system and/or the pass reader terminal) an audio notification corresponding to the first pass (e.g., when the pass is used, the user's device and/or the pass reader terminal plays a sound corresponding to artwork on the pass). In some embodiments, the audio notification is customized to the first pass (e.g., the notification is a specific audio output (e.g., a sound effect) associated with the first pass that is different from a notification for alerts, such as incoming calls, text messages, and/or emails). Causing an audio notification corresponding to the first pass in response to detecting the request to provide data corresponding to the first pass to the pass reader terminal provides feedback to the user confirming that the first pass has been used. Providing improved feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the device by enabling the user to use the device more quickly and efficiently.

In some embodiments, the computer system provides (e.g., automatically; without further user input) the at least one of the one or more passes to the account associated with the second user identity. In some embodiments, the at least one of the one or more passes is provided to the second account associated with the second user identity in response to initiating the process for providing at least one of the one or more passes to the second account associated with the second user identity. In some embodiments, the at least one of the one or more passes is provided to the second account associated with the second user identity in response to receiving the user input (e.g., 607, 609) corresponding to selection of the share affordance (e.g., 612*a*). In some embodiments, the at least one of the one or more passes is provided to the second account associated with the second user identity in response to receiving another input during the process for providing at least one of the one or more passes to the second account associated with the second user identity. In some embodiments, in response to receiving the user input corresponding to selection of the share affordance, a process is initiated for providing at least one of the one or more passes to a third account associated with a third user identity (e.g., selecting the share affordance shares passes to two different users). In some embodiments, before initiating the process for providing at least one of the one or more passes to the account associated with the second user identity or the third user identity, the second user identity and third user identity are selected from a list of user identities available to receive a shared pass (e.g., selected from user interface 614) (e.g., family members and/or contacts in a contact list). Providing the at least one of the one or more passes to the account associated with the second user identity allows the at least one of the one or more passes to be added to the account associated with the second user identity without additional user input. Reducing the number of user inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below. For example, methods 900 and 1100 optionally include one or more of the characteristics of the various methods described above with reference to method 700. For brevity, these details are not repeated below.

FIGS. 8A-8F illustrate exemplary user interfaces for providing a prompt to a user to provide authorization in accordance with some embodiments. The user interfaces in these figures are used to illustrate the processes described below, including the processes in FIG. 9.

FIG. 8A illustrates device 800 displaying user interface 804 on display 802 (e.g., a touch screen display). User interface 804 includes (e.g., displays) representation 806a (e.g., an image) of a pass (also referred to as pass 806a) associated with a service provider (e.g., a pass to an amusement park called Amusement World, as shown in FIG. 8A). Pass 806a includes text indicating that pass 806a is associated with a person (e.g., a guest named Amy) and a logo for the service provider (e.g., a character and/or a robot).

In some embodiments, user interface 804 is displayed in response to a user input selecting pass 806a. In some embodiments, user interface 804 is displayed in response to receiving (e.g., detecting) an input (e.g., a double press of hardware button 835). In some embodiments, pass 806a is displayed in response to a user input causing data for the first pass to be provided to a pass reader (e.g., 850 shown in FIG. 8C).

User interface 804 includes indication 808a (e.g., paging dots) showing that pass 806a is one (e.g., the first) of a set of multiple (e.g., three) passes (e.g., the left paging dot is highlighted and/or filled compared to the center dot and the right dot). In FIG. 8A, user interface 804 includes a prompt (e.g., a graphical element) for a user to hold device 800 near a pass reader terminal (e.g., to redeem pass 806a). In some embodiments, in response to device 800 being held near a pass reader terminal, device 800 provides data corresponding to pass 806a to a pass reader terminal.

FIG. 8B illustrates an embodiment of user interface 804 that is similar to the embodiment shown in FIG. 8A, except that indication 808b is displayed (e.g., instead of indication 808a). Indication 808b includes a representation of the set of three passes in a staggered stack such that at least a portion of each card is displayed (e.g., so that a user can see how many passes are in the set).

FIG. 8C illustrates device 800 being held near pass reader terminal 850. In FIG. 8C, device 800 detects that data corresponding to pass 806a was provided by device 800 to pass reader terminal 850. In some embodiments, the data corresponding to pass 806a is provided via a signal from a NFC transceiver, an optical scan, or a communication (e.g., a confirmation message from a remote server) indicating that a visual representation of pass 806a, such as a barcode or QR code, has been optically scanned. In some embodiments, device 800 provides the data corresponding to pass 806a to pass reader terminal 850 in response to receiving (e.g., detecting) an input (e.g., authorization; contact on display 802, motion of device 800, rotation of a rotatable input device, biometric information or authentication (e.g., fingerprint data, facial data, and/or iris data), and/or a press of a hardware button on device 800).

After (e.g., in response to) detecting that data corresponding to pass 806a was provided by device 800 to pass reader terminal 850, device 800 displays representation 806a of the pass and an indication that data corresponding to pass 806a was provided by device 800 to pass reader terminal 850 (e.g., a checkmark icon and/or an animation of a representation of pass 806a). In some embodiments, display 802 is deactivated (e.g., off and/or in a sleep mode) before the data is provided to pass reader terminal 850 (e.g., display 802 is activated (e.g., turned on) in response to detecting that data corresponding to pass 806a was provided by device 800 to pass reader terminal 850).

In the embodiment illustrated in FIG. 8C, the indication that data corresponding to pass 806a was provided by device 800 to pass reader terminal 850 includes displaying a check mark icon (e.g., in place of the icon above text "HOLD NEAR READER" in FIGS. 8A and 8B) and displaying, on pass 806a, stars (e.g., an animation of stars twinkling) and an updated version of the logo of the service provider (e.g., an animation of the robot raising its right arm/hand). In some embodiments, after (e.g., in response to) detecting that data corresponding to pass 806a was provided by device 800 to pass reader terminal 850, device 800 provides a tactile and/or audible output, as indicated by the wavy lines around the corners of device 800 in FIG. 8C. In some embodiments, after (e.g., in response to) detecting that data corresponding to pass 806a was provided by device 800 to pass reader terminal 850, pass reader terminal 850 provides an indication (e.g., audible output and/or a noise).

In some embodiments, in accordance with a determination that data corresponding to a second pass is available to be provided to pass reader terminal 850 by device 800, device 800 provides a prompt (e.g., a visual, audible, and/or tactile prompt) to provide authorization for data corresponding to the second pass to be provided to pass reader terminal 850 by device 800. In some embodiments, in accordance with the determination that data corresponding to a second pass is available to be provided to pass reader terminal 850 by device 800, device 800 maintains display 802 in an active state (e.g., display 802 is turned on).

In some embodiments, pass 806a and the second pass are associated with each other (e.g., both passes provide access to the same event and/or day/time at the service provider). In some embodiments, other passes for a different event or time/day at the service provider are not used (e.g., do not cause a prompt that data corresponding to a second pass is available). In some embodiments, a prompt is provided only for additional passes that are associated with pass 806a.

In some embodiments, providing the prompt includes displaying an indication that data corresponding to at least the second pass is available to be provided to pass reader terminal 850 by device 800 (e.g., displaying paging dots, displaying a representation of a stack of passes, displaying an instruction to tap the screen, displaying an instruction to swipe, displaying an instruction to tilt the phone, and/or display a portion of a second pass along an edge of the display). In the embodiment illustrated in FIG. 8C, the prompt includes displaying the text "ADVANCE TO NEXT PASS" and displaying (e.g., maintaining display of) indication 808a. In some embodiments, the prompt indicates a number of passes available to be provided to the pass reader terminal by device 800 (e.g., paging dots 808a and/or a representation of a stack of passes 808b). In some embodiments, providing the prompt includes outputting an audio notification that data corresponding to the second pass is available to be provided to pass reader terminal 850 by device 800. In some embodiments, providing the prompt includes outputting, via one or more tactile output generators, a tactile output (e.g., vibration) when data corresponding to the second pass is available to be provided to pass reader terminal 850 by device 800.

In some embodiments, in accordance with a determination that data corresponding to a second pass is not available to be provided to pass reader terminal 850 by device 800, device 800 forgoes providing the prompt to provide authorization for data corresponding to a second pass to be provided to pass reader terminal 850 by device 800. In some embodiments, in accordance with the determination that data corresponding to a second pass is not available to be provided to pass reader terminal 850 by device 800, device 800 deactivates display 802 (e.g., display 802 is turned off and/or transitioned to a lower power state (e.g., a state with low brightness and/or refresh rate)).

FIG. 8D illustrates device 800 displaying representation 806b of a second pass (also referred to as pass 806b). In FIG. 8D, the center paging dot of paging dots 808a is highlighted and/or filled compared to the left dot and the right dot to indicate that pass 806*b* is the second of three passes. Pass 806*b* includes text indicating that pass 806*b* is associated with a person (e.g., a guest named Pete and/or a different person than for pass 806*a*) and a logo for the service provider (e.g., a different logo than for pass 806*a*; a character; and/or a mouse). Similar to user interface 804 in FIG. 8A, user interface 804 in FIG. 8D prompts a user to hold device 800 near a pass reader terminal (e.g., since pass 806*b* has not been redeemed).

In some embodiments, device 800 displays pass 806*b* (e.g., as part of user interface 804 in FIG. 8D) in response to receiving (e.g., detecting) an input (e.g., after providing the prompt to provide authorization for data corresponding to the second pass to be provided to pass reader terminal 850 by device 800). In some embodiments, the input includes a contact on display 802, motion of device 800, and/or biometric information (e.g. facial information, iris information, fingerprint information). In some embodiments, device 800 displays pass 806*b* (e.g., as part of user interface 804 in FIG. 8D) in response to detecting input 803 (e.g., a right-to-left swipe gesture on display 802) shown in FIG. 8C. In some embodiments, device 800 displays pass 806*b* (e.g., as part of user interface 804 in FIG. 8D) after (e.g., automatically after; without receiving further input; and/or in response to) detecting that data corresponding to pass 806*a* was provided by device 800 to pass reader terminal 850 (e.g., without having to receive input 803). In some embodiments, device 800 displays pass 806*b* (e.g., as part of user interface 804 in FIG. 8D) in response to detecting motion of device 800 (e.g., raising and/or lowering of device 800; and/or raising and/or lowering of device 800 after detecting that data corresponding to pass 806*a* was provided by device 800 to pass reader terminal 850). In some embodiments, device 800 can display pass 806*b* in response to receiving input (e.g., a right-to-left swipe gesture while displaying pass 806*a*) prior to (e.g., without) providing data corresponding to pass 806*a* to pass reader terminal 850 or detecting that data corresponding to pass 806*a* was provided by device 800 to pass reader terminal 850. In some embodiments, in response to receiving (e.g., detecting) an input (e.g., a left-to-right swipe gesture on display 802) while displaying pass 806*b* (e.g., while displaying user interface 804 as shown in FIG. 8D), device 800 displays pass 806*a* (e.g., device 800 displays user interface 804 as shown in FIG. 8C).

In some embodiments, after (or while) displaying pass 806*b*, device 800 detects a request (e.g., placing device 800 next to pass reader terminal 850) to provide authorization for data corresponding to pass 806*b* to pass reader terminal 850. FIG. 8E illustrates device 800 being held near pass reader terminal 850 (e.g., while displaying pass 806*b*). In FIG. 8E, device 800 detects that data corresponding to pass 806*b* was provided by device 800 to pass reader terminal 850. In some embodiments, the data corresponding to pass 806*b* is provided via a signal from a NFC transceiver, an optical scan, or a communication (e.g., a confirmation message from a remote server) indicating that a visual representation of pass 806*b*, such as a barcode or QR code, has been optically scanned.

After (e.g., in response to) detecting that data corresponding to pass 806*b* was provided by device 800 to pass reader terminal 850, device 800 displays representation 806*b* of the pass and an indication that data corresponding to pass 806*b* was provided by device 800 to pass reader terminal 850 (e.g., a checkmark icon and/or an animation of a representation of pass 806*b*). In some embodiments, display 802 is deactivated (e.g., off and/or in a sleep mode) before the data is provided to pass reader terminal 850 (e.g., display 802 is activated (e.g., turned on) in response to detecting that data corresponding to pass 806*b* was provided by device 800 to pass reader terminal 850).

In the embodiment illustrated in FIG. 8E, the indication that data corresponding to pass 806*b* was provided by device 800 to pass reader terminal 850 includes displaying a check mark icon and displaying, on pass 806*b*, stars (e.g., an animation of stars twinkling) and a revised version of the logo of the service provider on pass 806*a* (e.g., an animation of the whiskers and tail of the mouse moving). In some embodiments, after (e.g., in response to) detecting that data corresponding to pass 806*b* was provided by device 800 to pass reader terminal 850, device 800 provides a tactile and/or audible output, as indicated by the wavy lines around the corners of device 800 in FIG. 8E. In some embodiments, after (e.g., in response to) detecting that data corresponding to pass 806*b* was provided by device 800 to pass reader terminal 850, pass reader terminal 850 provides an indication (e.g., audible output and/or a noise).

In some embodiments, in accordance with a determination that data corresponding to a third pass is available to be provided to pass reader terminal 850 by device 800, device 800 provides a prompt (e.g., a visual, audible, and/or tactile prompt) to provide authorization for data corresponding to the third pass to be provided to pass reader terminal 850 by device 800. In some embodiments, in accordance with the determination that data corresponding to a third pass is available to be provided to pass reader terminal 850 by device 800, device 800 maintains display 802 in an active state (e.g., display 802 is turned on).

In some embodiments, pass 806*a*, pass 806*b*, and the third pass are associated with each other (e.g., all three passes provide access to the same event and/or day/time at the service provider). In some embodiments, other passes for a different event or time/day at the service provider are not used (e.g., do not cause a prompt that data corresponding to a third pass is available). In some embodiments, a prompt is provided only for additional passes that are associated with pass 806*b*.

In some embodiments, providing the prompt includes displaying an indication that data corresponding to at least the third pass is available to be provided to pass reader terminal 850 by device 800 (e.g., displaying paging dots, displaying a representation of a stack of passes, displaying an instruction to tap the screen, displaying an instruction to swipe, displaying an instruction to tilt the phone, and/or displaying a portion of a second pass along an edge of the display). In the embodiment illustrated in FIG. 8E, the prompt includes displaying the text "ADVANCE TO NEXT PASS" and displaying (e.g., maintaining display of) indication 808*a*. In some embodiments, the prompt indicates a number of passes available to be provided to the pass reader terminal by device 800 (e.g., paging dots indication 808*a* and/or a representation of a stack of passes indication 808*b*). In some embodiments, providing the prompt includes outputting an audio notification that data corresponding to the third pass is available to be provided to pass reader terminal 850 by device 800. In some embodiments, providing the prompt includes outputting, via one or more tactile output generators, a tactile output (e.g., vibration) when data corresponding to the third pass is available to be provided to pass reader terminal 850 by device 800.

In some embodiments, in accordance with a determination that data corresponding to a third pass is not available to be provided to pass reader terminal 850 by device 800, device 800 forgoes providing the prompt to provide authorization for data corresponding to a third pass to be provided to pass reader terminal 850 by device 800. In some embodiments, in accordance with the determination that data corresponding to a third pass is not available to be provided to pass reader terminal 850 by device 800, device 800 deactivates display 802 (e.g., display 802 is turned off and/or transitioned to a lower power state (e.g., a state with low brightness and/or refresh rate)).

In some embodiments, device 800 can display a representation of the third pass and provide data corresponding to the third pass to pass reader terminal 850 according to the same techniques described for pass 806*a* and pass 806*b* with reference to FIGS. 8A-8F.

FIG. 8F illustrates an embodiment of user interface 804 including (e.g., displaying) pass 806*a* and indication 808*a* (e.g., paging dots and/or a stack of passes) showing that pass 806*a* is one (e.g., the first) of a set of multiple (e.g., three) passes (e.g., the left paging dot is highlighted and/or filled compared to the center dot and the right dot). In FIG. 8F, user interface 804 includes an indication 812 (e.g., a prompt) that all of the passes that are available to be provided to pass reader terminal 850 by device 800 can be redeemed with an input (e.g., a particular type of input and/or a press and hold gesture). In FIG. 8F, device 800 receives (e.g., detects) request 805 to redeem all passes (e.g., a press and hold gesture on display 802). In response to receiving request 805, device 800 provides (e.g., automatically; without receiving further input), to pass reader terminal 850, data corresponding to all passes that are available to be provided to pass reader terminal 850 by device 800 (e.g., data corresponding to pass 806*a*, pass 806*b*, and/or a pass corresponding to the paging dot on the right side of indication 808*a*).

In some embodiments, the techniques described with reference to FIGS. 8A-8F can be applied to a set of passes that includes only one pass, only two passes, or more than three passes.

FIG. 9 is a flow diagram illustrating a method for providing a prompt to a user to provide authorization in accordance with some embodiments. Method 900 is performed at a computer system (e.g., 100, 300, 500, 600*a*, 600*b*, 800) that is in communication with a display generation component (e.g., 602*a*, 602*b*, 802) and one or more input devices (e.g., a touch-sensitive surface). Some operations in method 900 are, optionally, combined, the orders of some operations are, optionally, changed, and some operations are, optionally, omitted.

As described below, method 900 provides an intuitive way for providing a prompt to a user to provide authorization for data corresponding to a second pass to be provided to a pass reader terminal. The method reduces the cognitive burden on a user when providing data corresponding to two or more passes to a pass reader terminal, thereby creating a more efficient human-machine interface. For battery-operated computing devices, enabling a user to authenticate passes (e.g., grouped passes) faster and more efficiently conserves power and increases the time between battery charges.

In method 900, the computer system (e.g., 800) detects (902) (e.g., via a signal from a NFC transceiver, an optical scan, and/or a communication (e.g., a confirmation message from a remote server) indicating that a visual representation of the pass such as a barcode or QR code has been optically scanned) that data corresponding to a first pass (e.g., 806*a*) was provided by the computer system to a pass reader terminal (e.g., 850) that is separate from the computer system.

After detecting that data corresponding to the first pass was provided by the computer system to the pass reader terminal, the computer system displays (904), via the display generation component (e.g., 802), an indication (e.g., 810, animation of pass 806*a*) that data corresponding to the first pass was provided by the computer system to the pass reader terminal.

In accordance (906) with a determination that data corresponding to a second pass (e.g., 806*b*) is available to be provided to the pass reader terminal by the computer system, the computer system provides a prompt (e.g., 808*a*, 810, a tactile notification, and/or an audio notification) to the user to provide authorization for data corresponding to the second pass to be provided to the pass reader terminal by the computer system. In some embodiments, the first pass and second pass are associated with each other (e.g., both passes provide access to the same event and/or day/time at the service provider (e.g., other passes for a different event or time/day at the service provider are not used and/or a prompt is provided only for additional passes that are associated with the first pass). Providing a prompt to the user to provide authorization for data corresponding to a second pass to be provided to a pass reader terminal provides feedback to the user that an additional pass is available to be provided to the pass reader terminal. Providing improved feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In accordance (908) with a determination that data corresponding to a second pass (e.g., 806*b*) is not available to be provided to the pass reader terminal by the computer system, the computer system forgoes providing the prompt to the user to provide authorization for data corresponding to a second pass to be provided to the pass reader terminal by the computer system.

In some embodiments, in response to detecting (e.g., via a NFC signal from the pass reader terminal, via a confirmation message from a remote server, and/or via an optical scan) that data corresponding to the first pass was provided by the computer system to the pass reader terminal, the computer system displays, via the display generation component, a user interface (e.g., 804) including a representation of the first pass (e.g., 806*a*) (e.g., an image with the name of a first guest and/or a logo for the service provider). In some embodiments, the display is deactivated before the data is provided to the pass reader terminal. Displaying a user interface including a representation of the first pass provides visual feedback to the user confirming that a pass was provided to the pass reader terminal. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after displaying, via the display generation component (e.g., 802), the indication (e.g., 810) that data corresponding to the first pass (e.g., 806*a*) was provided by the computer system to the pass reader terminal (e.g., 850), and in accordance with the determination that data corresponding to a second pass (e.g., 806*b*) is available to be provided to the pass reader terminal by the computer system, the computer system maintains the display generation component in an active state (e.g., the display is turned on). In some embodiments, in accordance with the determination that data corresponding to a second pass is not available to be provided to the pass reader terminal by the computer system, the computer system deactivates the display generation component (e.g., the display is turned off and/or transitioned to a lower power state (e.g., a state with low brightness and/or refresh rate)). Maintaining the display generation component in an active state in accordance with the determination that data corresponding to a second pass is available to be provided to the pass reader terminal provides visual feedback to the user that data corresponding to the second pass is available to be provided to the pass reader terminal. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, providing the prompt includes displaying, via the display generation component, an indication (e.g., 808a, 808b, 810) that data corresponding to at least the second pass is available to be provided to the pass reader terminal by the computer system (e.g., displaying paging dots, displaying a representation of a stack of passes, displaying an instruction to tap the screen, displaying an instruction to swipe, displaying an instruction to tilt the phone, and/or displaying a portion of a second pass along an edge of the display). Displaying an indication that data corresponding to at least the second pass is available to be provided to the pass reader terminal by the computer system provides visual feedback to the user that an additional pass is available to be provided to the pass reader terminal. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the prompt indicates a number of passes available to be provided to the pass reader terminal by the computer system (e.g., 808a, 808b) (e.g., paging dots and/or a representation of a stack of passes). Indicating a number of passes available to be provided to the pass reader terminal provides visual feedback to the user whether or not an additional pass is available to be provided to the pass reader terminal. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, providing the prompt includes outputting an audio notification that data corresponding to the second pass is available to be provided to the pass reader terminal by the computer system. Outputting an audio notification that data corresponding to the second pass is available to be provided to the pass reader terminal by the computer system provides feedback to the user that an additional pass is available to be provided to the pass reader terminal. Providing improved feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, providing the prompt includes outputting, via one or more tactile output generators, a tactile output (e.g., vibration) when data corresponding to the second pass is available to be provided to the pass reader terminal by the computer system. Outputting a tactile output when data corresponding to the second pass is available to be provided to the pass reader terminal by the computer system provides feedback to the user that an additional pass is available to be provided to the pass reader terminal. Providing improved feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after providing the prompt to the user to provide authorization for data corresponding to the second pass to be provided to the pass reader terminal by the computer system, the computer system detects, via the one or more input devices, a user input (e.g., an input on a touch-sensitive surface, motion of the computer system, and/or biometric information (e.g. facial information, iris information, and/or fingerprint information)). In response to detecting the user input, the computer system displays, via the display generation component, a representation of the second pass (e.g., 806b) (e.g., an image with the name of a second guest and/or a logo for the service provider). In some embodiments, after displaying the representation of the second pass, the computer system detects a request (e.g., placing the device next to a pass reader) to provide authorization for data corresponding to the second pass to be provided to the pass reader). Displaying a representation of the second pass in response to detecting the user input provides visual feedback to the user that data corresponding to the second pass is available to be provided to the pass reader terminal. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after providing the prompt to the user to provide authorization for data corresponding to the second pass to be provided to the pass reader terminal by the computer system, the computer system detects authorization for data corresponding to the second pass to be provided to the pass reader terminal by the computer system. In some embodiments, the authorization includes detecting motion (e.g., via an accelerometer) of a component of the computer system from a lowered position to a raised position (e.g., a device is lifted off the pass reader to authorize the second pass). In some embodiments, the authorization further includes detecting, via a biometric sensor (e.g., camera and/or fingerprint sensor), biometric information (e.g., facial information, iris information, and/or fingerprint information). In some embodiments, after lifting the device off the pass reader, the device is lowered again to provide the data corresponding to the second pass to the pass reader. Authorizing data corresponding to the second pass to be provided to the pass reader terminal by the computer system in response to detecting motion of a component of the computer system from a lowered position to a raised position allows a user to efficiently authorize the data corresponding to the second pass to be provided to the pass reader terminal without having to provide extra inputs to navigate additional user interfaces. Reducing the number of user inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the authorization for data corresponding to the second pass to be provided to the pass reader terminal includes detecting a swipe gesture (e.g., 803) on the display generation component. In some embodiments, after detecting the swipe gesture to authorize the second pass, the data corresponding to the second pass is provided to the pass reader. In some embodiments, the authorization includes detecting rotation of a rotatable input device (e.g., the crown of a watch). In some embodiments, the authorization further includes detecting biometric information (e.g., facial information, iris information, and/or fingerprint information). Authorizing data corresponding to the second pass to be provided to the pass reader terminal by the computer system in response to detecting a swipe gesture on the display generation component allows a user to efficiently authorize the data corresponding to the second pass to be provided to the pass reader terminal without having to provide extra inputs to navigate additional user interfaces. Reducing the number of user inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the authorization for data corresponding to the second pass to be provided to the pass reader terminal includes detecting, via the one or more input devices, an input (e.g., 805) (e.g., while the display generation component is in proximity to (e.g., within range of a wireless signal from) the pass reader terminal) for a predetermined amount of time (e.g., a tap and hold gesture). In some embodiments, the input is on an icon indicating a group of passes can be provided. In some embodiments, the input is at any location on the display generation component. In some embodiments, detecting an input on the display generation component for the predetermined amount of time authorizes data corresponding to all passes, including the first pass and second pass, to be provided to the pass reader terminal. Authorizing data corresponding to the second pass and one or more additional passes to be provided to the pass reader terminal by the computer system in response to detecting an input for a predetermined amount of time allows a user to efficiently authorize the data corresponding to the second pass and one or more additional passes to be provided to the pass reader terminal without having to provide extra inputs to navigate additional user interfaces. Reducing the number of user inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, prior to detecting that data corresponding to the first pass was provided by the computer system to the pass reader terminal, the computer system displays, via the display generation component, a user interface (e.g., 804) including a representation of the first pass (e.g., 806*a*) (e.g., an image with the name of a first guest and/or a logo for the service provider). In some embodiments, the representation of the first pass is displayed in response to a user input selecting the first pass. In some embodiments, the representation of the first pass is displayed in response to a user input causing data for the first pass to be provided to the pass reader terminal. Displaying a user interface including a representation of the first pass provides visual feedback to the user that a pass is available to be provided to the pass reader terminal. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, data corresponding to the second pass (e.g., 806*b*) is determined to be available to be provided to the pass reader terminal by the computer system when (e.g., only when) the first pass (e.g., 806*a*) and the second pass are associated with each other (e.g., both passes provide access to the same event and/or day/time at the service provider (e.g., other passes for a different event and/or time/day at the service provider are not used and/or a prompt is provided only for additional passes that are associated with the first pass)). Determining that data corresponding to the second pass is available to be provided to the pass reader terminal by the computer system when the first pass and the second pass are associated with each other provides additional control to the user when redeeming passes (e.g., by prompting the user to redeem related passes and not passes for other venues or events). Providing additional control of the computer system to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Note that details of the processes described above with respect to method 900 (e.g., FIG. 9) are also applicable in an analogous manner to the methods described below/above. For example, methods 700 and 1100 optionally include one or more of the characteristics of the various methods described above with reference to method 900. For brevity, these details are not repeated below.

FIGS. 10A-10L illustrate exemplary user interfaces for displaying a machine-readable code, in accordance with some embodiments. The user interfaces in these figures are used to illustrate the processes described below, including the processes in FIG. 11.

FIG. 10A illustrates device 1000, which includes display 1002 (e.g., a touchscreen display). In FIG. 10A, device 1000 displays user interface 1004, which includes information about performing transactions with an account (e.g., a payment account, a bank account, a credit card account, a debit card account, and/or a data storage account). In some embodiments, user interface 1004 is a user interface for a vendor application (e.g., a third-party application associated with a bank, credit card, and/or data transfer service) or a vendor website (e.g., a third-party website associated with a bank, credit card, and/or data transfer service).

User interface 1004 includes affordance 1006, which when selected, initiates a process for adding the account to a wallet application. In some embodiments, the wallet application is a first-party application that is developed, managed, and/or provided by the developer of device 1000 and/or the operating system being run on device 1000. In FIG. 10A, while displaying user interface 1004, device 1000 receives (e.g., detects) a request 1003 to add the account presented on user interface 1004 to the first-party wallet application. In the embodiment illustrated in FIG. 10A, request 1003 includes a selection of (e.g., a tap on) affordance 1006.

FIG. 10B illustrates device 1000 displaying user interface 1008 (e.g., a user interface for a wallet application). After (e.g., in response to) receiving request 1003 (as shown in FIG. 10A), user interface 1008 includes a representation 1010 of the account (e.g., an image of a card), as shown in FIG. 10B. In some embodiments, while displaying user interface 1008, device 1000 receives (e.g., detects) a request 1005 to use the account for a transaction. In the embodiment illustrated in FIG. 10B, request 1005 includes a selection of (e.g., a tap on) representation 1010 of the account.

FIG. 10C illustrates device 1000 displaying user interface 1012, which includes representation 1010 of the account to be used for a transaction. In some embodiments, user interface 1012 is displayed in response to receiving (e.g., detecting) request 1005 to use the account for a transaction, as shown in FIG. 10B. In some embodiments, as shown in FIG. 10D, user interface 1012 further includes offer 1014 (e.g., a selectable offer). In some embodiments, offer 1014 is a discount that can be used for transactions performed with the account (e.g., offer 1014 can be selected to obtain additional information about the offer, to access the offer, and/or to apply the offer).

In order to use the account for a transaction, the identity of a user of device 1000 is authenticated. In some embodiments, the identity of the user of device 1000 is authenticated using facial recognition. In some embodiments, facial recognition is initiated in response to receiving (e.g., detecting) a request 1001 to initiate facial recognition of the user. In the embodiment illustrated in FIG. 10C, request 1001 includes a detecting a double click input (e.g., two presses within a predetermined time period) with button 1040. In some embodiments, the identity of the user of device 1000 is authenticated using fingerprint recognition, a passcode, or other biometric information.

Figure 10F:
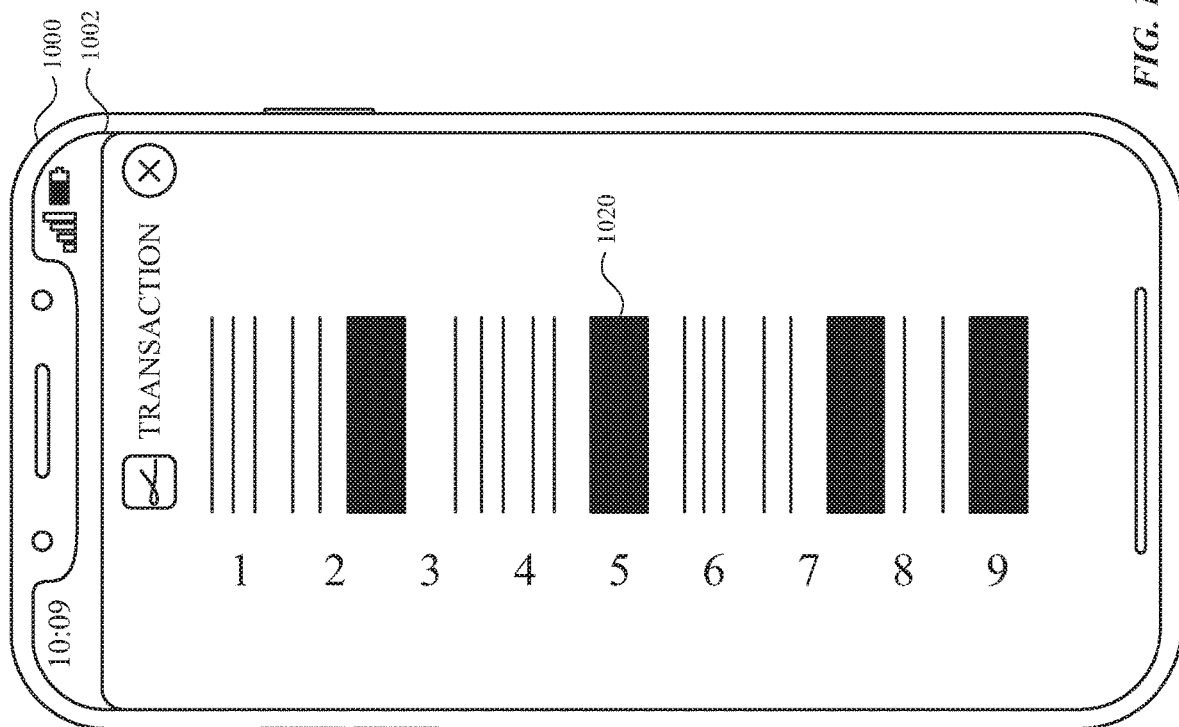
Figure 10E:
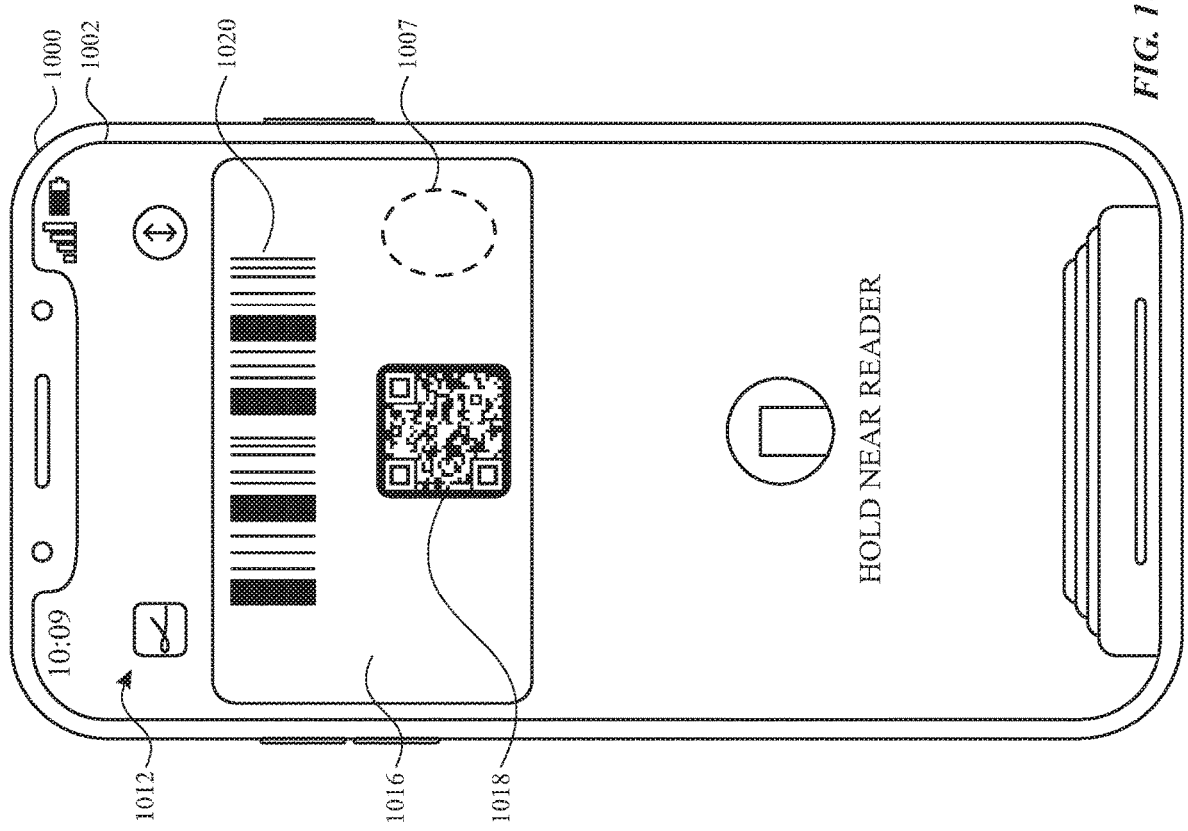

In accordance with a determination that the identity of the user of device 1000 corresponds to an authorized user of the account, a first machine-readable code 1018 (e.g., a QR code and/or two-dimensional code) is displayed, as shown in FIG. 10E. In some embodiments, a second machine-readable code 1020 (e.g., a barcode and/or one-dimensional code) is displayed concurrently with first machine-readable code 1018. In some embodiments, displaying the first machine-readable code 1018 includes displaying an animation of the representation 1010 of the account (as shown in FIGS. 10C and 10D) transitioning to the first machine-readable code 1018 (e.g., transitioning gradually between a plurality of intermediate states while transitioning from the representation 1010 of the account to the machine-readable code 1018). In some embodiments, representation 1010 of the account is animated to appear to turn over so that a back side 1016 of the representation is displayed (e.g., a card image is turned over), and the machine-readable code 1018 is included on the back side 1016 of the representation (e.g., the back of the card image includes the machine-readable code).

In some embodiments, the first machine-readable code 1018 or second machine-readable code 1020 can be scanned (e.g., with a camera, laser, and/or other optical sensing device) to initiate a transaction using the account. For example, in some embodiments, the first machine-readable code 1018 and second machine-readable code 1020 correspond to account information (e.g., an account number). Using the account information, money can be transferred to or from the account. In some embodiments, the transaction is a transfer of money to a merchant to purchase goods. In some embodiments, the transaction is a person-to-person transfer of money.

In some embodiments, the first machine-readable code 1018 and/or second machine-readable code 1020 is different each time the code is displayed (e.g., each time a request to use the account for a transaction is received and the identity of the user is determined to correspond to an authorized user, a different code is displayed). This allows a unique code to be displayed for each transaction.

In FIG. 10E, while displaying the first machine-readable code 1018, device 1000 receives (e.g., detects) a request 1007 to display a machine-readable code at a larger size. In the embodiment illustrated in FIG. 10E, request 1007 includes a selection of (e.g., a tap on) the back side 1016 of the representation of the account. In response to detecting request 1007 to display a machine-readable code at a larger size, second machine-readable code 1020 is displayed at a larger size, as shown in FIG. 10F. In some embodiments, in response to detecting request 1007 to display a machine-readable code at a larger size, first machine-readable code 1018 is displayed at a larger size. In some embodiments, displaying a machine-readable code at a larger size allows the machine-readable code to be scanned more easily by a camera, laser, or other optical sensing device.

In some embodiments, first machine-readable code 1018 and/or second machine-readable code 1020 ceases to be displayed after a predetermined amount of time (e.g., 5 seconds, 15 seconds, 1 minute; and/or in response to a time threshold being met). In some embodiments, first machine-readable code 1018 and/or second machine-readable code 1020 ceases to be displayed if no transaction confirmation is received within a predetermined amount of time (e.g., 5 seconds, 15 seconds, 1 minute; and/or in response to a time threshold being met). In some embodiments, the predetermined amount of time is an amount of time since authenticating the user or since initially displaying the machine-readable code.

As shown in FIG. 10G, after ceasing to display first machine-readable code 1018 and/or second machine-readable code 1020, a prompt is displayed to authenticate the identity of the user a second time. In some embodiments, notification 1026 is displayed to indicate that no transaction confirmation is received. In some embodiments, ceasing to display first machine-readable code 1018 and/or second machine-readable code 1020 includes replacing the display of first machine-readable code 1018 and/or second machine-readable code 1020 with the display of representation 1010 of the account. In some embodiments, replacing the display of first machine-readable code 1018 and/or second machine-readable code 1020 with the display of representation 1010 of the account includes displaying an animation of first machine-readable code 1018 and/or second machine-readable code 1020 transitioning to representation 1010 of the account (e.g., transitioning gradually between a plurality of intermediate states while transitioning from the machine-readable code to the representation of the account). In some embodiments, back side 1016 of the representation (as shown in FIG. 10E) is animated to appear to turn over so that representation 1010 of the account is displayed (e.g., a card image is turned over from the back side to the front side).

In some embodiments, first machine-readable code 1018 and/or second machine-readable code 1020 is replaced with a different machine-readable code after a predetermined amount of time (e.g., 5 seconds, 15 seconds, 1 minute; and/or in response to a time threshold being met). In some embodiments, first machine-readable code 1018 and/or second machine-readable code 1020 is replaced with a different machine-readable code if no transaction confirmation is received within a predetermined amount of time (e.g., 5 seconds, 15 seconds, 1 minute; and/or in response to a time threshold being met). In some embodiments, the predetermined amount of time is an amount of time since authenticating the user or since initially displaying the machine-readable code. In some embodiments, the previously displayed machine-readable code becomes invalid after a new machine-readable code is displayed.

As shown in FIG. 10H, after receiving a transaction confirmation (e.g., from a third-party vendor application) that first machine-readable code 1018 and/or second machine-readable code 1020 was successfully used to access information associated with the account (e.g., a transaction using the account was approved), first machine-readable code 1018 and/or second machine-readable code 1020 ceases to be displayed and indication 1030 (e.g., a checkmark) that information associated with the account was successfully accessed is displayed.

Figure 10I:
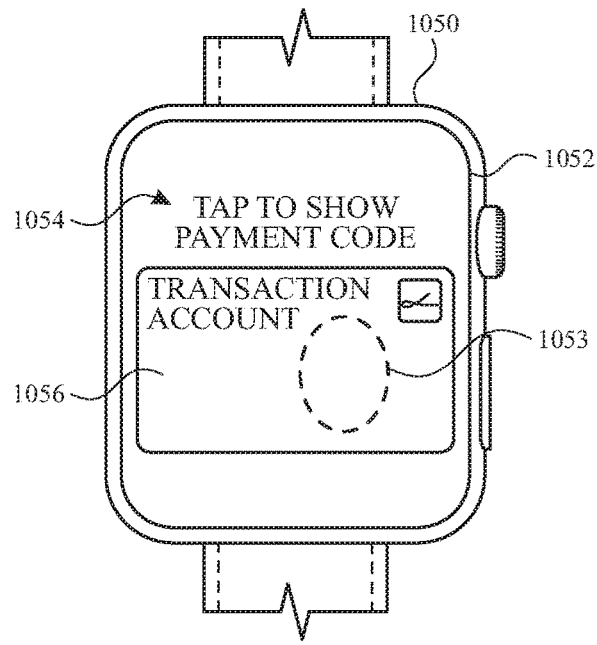

FIG. 10I illustrates device 1050, which includes display 1052 (e.g., a touchscreen display). In FIG. 10I, device 1000 displays user interface 1054, which includes representation 1056 of an account to be used for a transaction (e.g., a payment account, a bank account, a credit card account, a debit card account, and/or a data storage account). In FIG. 10I, while displaying user interface 1054, device 1050 receives (e.g., detects) request 1053 to use the account for a transaction. In the embodiment illustrated in FIG. 10I, request 1053 includes a selection of (e.g., a tap on) representation 1056 of the account.

Figure 10J:
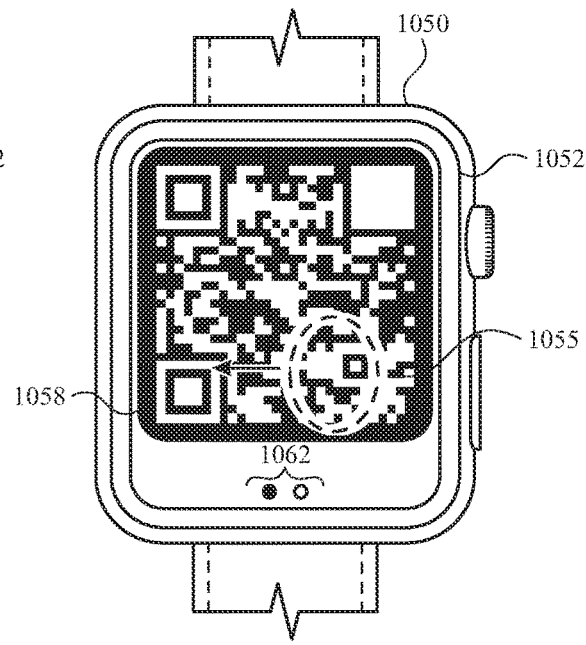

In response to receiving (e.g., detecting) request 1053 to use the account for a transaction, first machine-readable code 1058 (e.g., a QR code and/or two-dimensional code) is displayed, as shown in FIG. 10J. In some embodiments, indication 1062 (e.g., paging dots) showing first machine-readable code 1058 is one (e.g., the first) of a set of multiple (e.g., two) types of machine-readable codes (e.g., the left paging dot is highlighted and/or filled compared to the right dot). In FIG. 10J, while displaying first machine-readable code 1058, device 1050 receives (e.g., detects) request 1055 to display a different type of machine-readable code. In the embodiment illustrated in FIG. 10J, request 1055 includes a swipe gesture on display 1052.

Figure 10K:
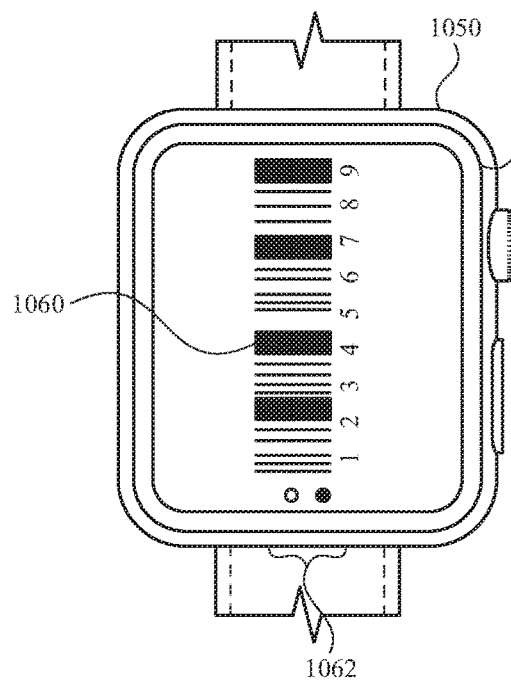

In response to receiving (e.g., detecting) request 1055 to display a different type of machine-readable code, second machine-readable code 1060 (e.g., a barcode and/or one-dimensional code) is displayed, as shown in FIG. 10K. In some embodiments, indication 1062 is updated to indicate that a different type of machine-readable codes is being displayed.

In some embodiments, the type of machine-readable code displayed in response to receiving (e.g., detecting) request 1053 to use the account for a transaction is based on the type of machine-readable code that was last used for a transaction (e.g., if a barcode was last used for a transaction, then a barcode is displayed in response to request 1053 instead of a QR code).

Figure 10L:
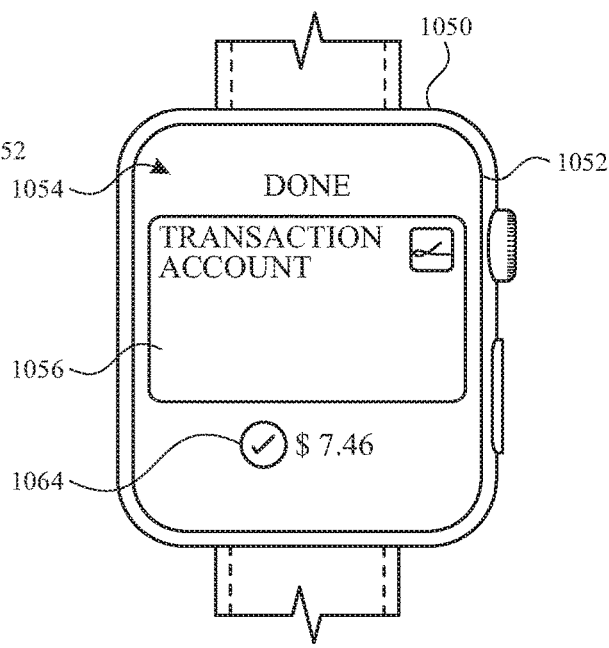

As shown in FIG. 10L, after receiving a transaction confirmation (e.g., from a third-party vendor application) that first machine-readable code 1058 and/or second machine-readable code 1060 was successfully used to access information associated with the account (e.g., a transaction using the account was approved), first machine-readable code 1018 and/or second machine-readable code 1020 ceases to be displayed and indication 1064 (e.g., a checkmark) that information associated with the account was successfully accessed is displayed.

FIG. 11 is a flow diagram illustrating a method for displaying a machine-readable code in response to receiving authentication data in accordance with some embodiments. Method 1100 is performed at a computer system (e.g., 100, 300, 500, 600a, 600b, 800, 1000, 1050) that is in communication with a display generation component (e.g., 602a, 602b, 802, 1002, 1052) and one or more input devices (e.g., a touch-sensitive surface, a camera, a fingerprint sensor, and/or a biometric sensor). Some operations in method 1100 are, optionally, combined, the orders of some operations are, optionally, changed, and some operations are, optionally, omitted.

As described below, method 1100 provides an intuitive way for displaying a machine-readable code. The method reduces the cognitive burden on a user when displaying a machine-readable code with the computer system. For battery-operated computing systems, enabling a user to display a machine-readable code faster and more efficiently conserves power and increases the time between battery charges.

In method 1100, the computer system (e.g., 1000, 1050) displays (1102), via the display generation component (e.g., 1002, 1052), a first user interface (e.g., 1008, 1012, 1054) including an indication (e.g., 1010, 1056) of an account (e.g., a payment card and/or a data storage account). In some embodiments, the first user interface is displayed in response to a double tap (e.g., 1001) of a hardware button (e.g., 1040).

The computer system receives (1104), via the one or more input devices (e.g., via one or more biometric sensors), authentication data (e.g., facial information, fingerprint information, and/or a passcode).

In response (1106) to receiving the authentication data and in accordance (1108) with a determination that the authentication data satisfies authentication criteria associated with the account (e.g., the facial information matches facial information of an account owner, the fingerprint information matches fingerprint information of an account owner, and/or the passcode matches a passcode of an account owner), the computer system displays, via the display generation component, a first machine-readable code (e.g., 1018, 1020, 1058, 1060) (e.g., a two-dimensional code (e.g., QR code) and/or a one-dimensional code (e.g., a barcode)) associated with the account (e.g., the machine-readable code can be used to authorize a transaction for the account). Displaying a machine-readable code in accordance with a determination that the authentication data satisfies authentication criteria associated with the account provides visual feedback to the user confirming that the authentication criteria are satisfied and improves security of transactions using the machine-readable code. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In response (1106) to receiving the authentication data and in accordance (1110) with a determination that the authentication data does not satisfy the authentication criteria associated with the account, the computer system forgoes display of the first machine-readable code (e.g., 1018, 1020, 1058, 1060) associated with the account.

In some embodiments, displaying the machine-readable code (e.g., 1018, 1020, 1058, 1060) includes replacing the display of the indication (e.g., 1010, 1056) of the account with the display of the machine-readable code (e.g., ceasing display of the indication of the account and displaying the machine-readable code). In some embodiments, replacing the display of the indication of the account with the display of the machine-readable code includes an animated transition from the indication of the account to the machine-readable code (e.g., transitioning gradually between a plurality of intermediate states while transitioning from the indication of the account to the machine-readable code). Replacing the display of the indication of the account with the display of the machine-readable code provides visual feedback to the user confirming that the authentication criteria are satisfied and improves security of transactions using the machine-readable code. Providing improved visual feedback to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system displays, via the display generation component, a second user interface (e.g., 1004) for an application associated with a service provider (e.g., a third-party application associated with a vendor (e.g., a bank and/or a merchant)). In some embodiments, the account is associated with the service provider. In some embodiments, while displaying the second user interface, the computer system detects a request (e.g., 1003) (e.g., via a touch-sensitive surface) to configure the account for use in the first user interface (e.g., a request to add a card associated with the vendor to the first user interface) and, in response to detecting the request to configure the account for use in the first user interface, the computer system includes the indication of the account in the first user interface (e.g., 1008). Detecting a request to configure the account for use in the first user interface while displaying the second user interface allows a user to efficiently configure the account (e.g., for use in a wallet application) without having to manually navigate between multiple user interfaces. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the computer system receives, via the one or more input devices, second authentication data (e.g., facial information, fingerprint information, and/or a passcode), and, in response to receiving the second authentication data and in accordance with a determination that the second authentication data satisfies the authentication criteria associated with the account (e.g., the facial information matches facial information of an account owner, the fingerprint information matches fingerprint information of an account owner, and/or the passcode matches a passcode of an account owner), the computer system displays, via the display generation component, a second machine-readable code (e.g., 1018, 1020, 1058, 1060) (e.g., a two-dimensional code (e.g., QR code) and/or a one-dimensional code (e.g., a barcode)) associated with the account, where the second machine-readable code is different from the first machine readable code (e.g., a different machine-readable code is displayed each time a transaction is authorized). In some embodiments, the machine-readable code is different from all previous codes (e.g., the machine-readable code is unique). In some embodiments, in response to receiving the second authentication data and in accordance with a determination that the second authentication data does not satisfy the authentication criteria associated with the account, the computer system forgoes display of the second machine-readable code associated with the account. Displaying a second machine-readable code different from the first machine readable code provides visual feedback to the user confirming that the authentication criteria are satisfied and improves security of transactions by using a different machine-readable code for each transaction. Providing improved visual feedback to the user enhances the operability of the computer system and makes the user-system interface more efficient (e.g., by helping the user to provide proper inputs and reducing user mistakes when operating/ interacting with the computer system) which, additionally, reduces power usage and improves battery life of the computer system by enabling the user to use the computer system more quickly and efficiently.

In some embodiments, after displaying the machine-readable code (e.g., 1018, 1020, 1058, 1060) associated with the account, the computer system ceases to display the machine-readable code after a predetermined amount of time (e.g., 5 seconds, 15 seconds, 1 minute). In some embodiments, the computer system ceases to display the machine-readable code in response to a determination that a time threshold has been met (e.g., the machine-readable code has been displayed for a predetermined amount of time and/or a predetermined amount of time has passed since receiving the authentication information or since initially displaying the machine-readable code). Ceasing to display the machine-readable code after a predetermined amount of time improves security of transactions by limiting the amount of time the machine-readable code is displayed.

In some embodiments, the machine-readable code is a first machine-readable code, and, after displaying the first machine-readable code (e.g., 1018, 1020, 1058, 1060) associated with the account, the computer system ceases to display the first machine-readable code after a predetermined amount of time (e.g., 5 seconds, 15 seconds, 1 minute; and/or in response to a time threshold being met)

and the computer system displays a second machine-readable code (e.g., 1018, 1020, 1058, 1060) associated with the account that is different from the first machine-readable code associated with the account. In some embodiments, the second machine-readable code is displayed in response to a time threshold being met (e.g., if the first machine-readable code has been displayed for a predetermined amount of time). Displaying a second machine-readable code different from the first machine readable code improves security of transactions by limiting the amount of time the machine-readable code is displayed.

In some embodiments, after displaying the machine-readable code (e.g., 1018, 1020, 1058, 1060) associated with the account, and in accordance with (e.g., in response to) a determination that second authentication data is received within a predetermined amount of time (e.g., 5 seconds, 30 seconds, 2 minutes; and/or in response to a time threshold being met) and the second authentication data satisfies authentication criteria associated with the account (e.g., the facial information matches facial information of an account owner, the fingerprint information matches fingerprint information of an account owner, and/or the passcode matches a passcode of an account owner), the computer system maintains display of the machine-readable code associated with the account. In some embodiments, after displaying the machine-readable code associated with the account and in accordance with (e.g., in response to) a determination that second authentication data is not received within the predetermined amount of time (e.g., 5 seconds, 30 seconds, 2 minutes; and/or in response to a time threshold being met) or the second authentication data does not satisfy the authentication criteria associated with the account, the computer system ceases to display the machine-readable code associated with the account. In some embodiments, the machine-readable code is replaced with a payment card image (e.g., 1010, 1056) (e.g., the card associated with the previously-displayed machine-readable code). Ceasing to display the machine-readable code in accordance with a determination that second authentication data is not received within the predetermined amount of time provides visual feedback to the user that the authentication criteria were not satisfied and also improves security of transactions by limiting the amount of time the machine-readable code is displayed. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after displaying the machine-readable code (e.g., 1018, 1020, 1058, 1060) associated with the account and in accordance with (e.g., in response to) a determination that second authentication data is not received within the predetermined amount of time (e.g., 5 seconds, 30 seconds, 2 minutes; and/or in response to a time threshold being met) or the second authentication data does not satisfy the authentication criteria associated with the account, the computer system displays a request for the second authentication data (e.g., user interface 1012 as shown in FIG. 10G) (e.g., a request to re-authorize the transaction using biometric information (e.g., facial information and/or fingerprint information) and/or a passcode). Displaying the request for the second authentication data provides visual feedback to the user that the second authentication data was not received within the predetermined amount of time or that authentication criteria were not satisfied. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, after displaying the machine-readable code (e.g., 1018, 1020, 1058, 1060) associated with the account, the computer system receives a confirmation (e.g., from a third-party vendor app) that the machine-readable code was successfully used to access information associated with the account (e.g., a transaction using the account was approved), and, in response to receiving the confirmation that the machine-readable code was successfully used to access information associated with the account, the computer system ceases to display the machine-readable code and the computer system displays, via the display generation component, an indication (e.g., 1030) that information associated with the account was successfully accessed (e.g., a checkmark icon). Displaying an indication that information associated with the account was successfully accessed provides visual feedback to the user that the machine-readable code was successfully used to access information associated with the account. Providing improved visual feedback enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the machine-readable code includes displaying the machine-readable code (e.g., 1020) at a first size. In some embodiments, while displaying the machine-readable code at the first size, the computer system detects a request (e.g., 1007) (e.g., a tap gesture on the machine-readable code) to display the machine-readable code at a larger size and, in response to detecting the request to display the machine-readable code at a larger size, the computer system displays the machine-readable code at a second size larger than the first size (e.g., 1020 as shown in FIG. 10F). Displaying the machine-readable code at a second size larger than the first size provides additional control to the user over the size of the machine-readable code. A larger machine-readable code may improve the ability of the code scanner to read the machine-readable code. Providing additional control of the computer system to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, the machine-readable code is a machine readable code of a first type (e.g., 1058) (e.g., a QR code). In some embodiments, while displaying the machine-readable code of the first type, the computer system detects a request (e.g., 1055) (e.g., a swipe gesture) to display a machine-readable code of a second type (e.g., 1060) (e.g., a barcode) and in response to detecting the request to display the machine-readable code of the second type, the computer system displays the machine-readable code of the second type (e.g., a QR code is replaced with a barcode and/or a barcode is replaced with a QR code). In some embodiments, e.g., on a watch (e.g., 1050), the request to display the second type of machine-readable code is detected after tapping on a representation (1056) of the account to display the machine-readable code. In some embodiments, the order of display of QR code or barcode is based on the type of code that was displayed most recently. Displaying a machine-readable code of the second type provides additional control to the user over the type of machine-readable code. A different type of machine-readable code may allow the machine-readable code to be scanned by additional types of code scanners. Providing additional control of the computer system to the user enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

In some embodiments, displaying the first user interface includes displaying one or more offers (e.g., 1014; a selectable offer) associated with the account (e.g., a discount that can be used for transactions with the account provider). Displaying one or more offers associated with the account allows the user to access contextually relevant offers from the first user interface without having to navigate to additional user interfaces. Reducing the number of inputs needed to perform an operation enhances the operability of the computer system and makes the user-system interface more efficient (e.g., by helping the user to provide proper inputs and reducing user mistakes when operating/interacting with the computer system) which, additionally, reduces power usage and improves battery life of the computer system by enabling the user to use the computer system more quickly and efficiently.

Note that details of the processes described above with respect to method 1100 (e.g., FIG. 11) are also applicable in an analogous manner to the methods described above. For example, methods 700 and 900 optionally include one or more of the characteristics of the various methods described above with reference to method 1100. For brevity, these details are not repeated below.

FIG. 12A illustrates an electronic device 1200 with display 1202 (e.g., touch screen) and one or more input devices (e.g., rotatable input mechanism 1204, side button 1206). At FIG. 12A, electronic device 1200 displays, on display 1202, account user interface 1208 (e.g., similar to account user interface 1302 described below with reference to FIG. 13B). Electronic device 1200 displays a plurality of platters 1210 associated with respective computer storage accounts of a user on account user interface 1208. The respective computer storage accounts of the user include varying amounts of (e.g., cloud-based) computer storage resources. In some embodiments, different types of data (e.g., data corresponding to photo files, data corresponding to document files, data corresponding to music files, data corresponding to video files, and/or data corresponding to application files) can be stored and/or archived in the computer storage resources associated with the computer storage accounts. Accordingly, in response to detecting user input corresponding to a selection of a platter of the plurality of platters 1210, electronic device 1200 displays information related to the computer storage resources (e.g., amount of data available and/or amount of data consumed) associated with the respective computer storage account corresponding to the selected platter.

At FIG. 12A, electronic device 1200 displays storage card platter 1210*a* and memory platter 1210*b* (e.g., a partial view of memory computer storage account platter 1210*b*) on account user interface 1208. Further, at FIG. 12A, electronic device 1200 detects swipe gesture 1250*a* (e.g., upward swipe gesture). In response to detecting swipe gesture 1250*a*, electronic device 1200 scrolls account user interface 1208 (e.g., scrolls and/or translates the plurality of platters 1210 of the account user interface 1208 in a downward direction) to display additional platters of the plurality of platters 1210. In some embodiments, electronic device 1200 is also configured to scroll account user interface 1208 based on rotation of rotatable input mechanism 1204 in addition to swipe gestures.

For instance, at FIG. 12B, electronic device 1200 displays storage card platter 1210*a* (e.g., a partial view of storage card platter 1210*a*), memory platter 1210*b*, and shared data platter 1210*c* (e.g., a partial view of shared data platter 1210*c*) on account user interface 1208. As such, swipe gesture 1250*a* causes additional platters of the plurality of platters 1210 (e.g., shared data platter 1210*c*) to be at least partially displayed on account user interface 1208.

At FIG. 12C, electronic device 1200 has detected the end of swipe gesture 1250*a* and electronic device 1200 is displaying account user interface 1208 while memory platter 1210*b* is in a center of display 1202 (e.g., memory platter 1210*b* has stopped scrolling and/or electronic device 1200 does not detect any further user inputs to scroll the platters after swipe gesture 1250*a* causes scrolling of account user interface 1208). As a result of pausing on memory platter 1210*b* (e.g., displaying memory player 1210*b* at a predefined location (or within a predefined area) of the display or user interface for at least a predetermined period of time (e.g., without scrolling memory platter 1210*b* during the duration of the predetermined period of time)), account user interface 1208 is modified, as shown at FIG. 12C.

At FIG. 12C, appearances of storage card platter 1210*a* and shared data platter 1210*c* are deemphasized when compared to memory platter 1210*b*. Storage card platter 1210*a* and shared data platter 1210*c* are deemphasized by being reduced in size when compared to memory platter 1210*b*. To further deemphasize the platters, an appearance of storage card platter 1210*a* and an appearance of shared data platter 1210*c* are altered (e.g., reduced in opacity, blurred, and/or modified in color) when compared to memory platter 1210*b* (e.g., as represented at FIG. 12C by hatching). In some embodiments, electronic device 1200 is configured to deemphasize the platters by ceasing to display platters that are not positioned in the center of display 1202.

Additionally, in some embodiments, as a result of pausing on memory platter 1210*b*, account user interface 1208 updates to include indicator 1212 ("Tap to View") indicating a prompt to a user of electronic device 1200 to view additional details related to the computer storage account associated with and/or represented by memory platter 1210*b*. In response to detecting a tap gesture on memory platter 1210*b*, electronic device 1200 displays a details user interface that provides the user with visual representations related to the computer storage resources of the computer storage account associated with memory platter 1210*b*. In some embodiments, electronic device 1200 forgoes display of the indicator 1212 on account user interface 1208 based on the user inputs that caused display of account user interface 1208, as discussed in detail below with reference to FIGS. 13A-13N. In some embodiments, a tap gesture on memory platter 1210*b* causes display of the details user interface regardless of whether or not indicator 1212 is displayed on account user interface 1208.

Figure 13B:
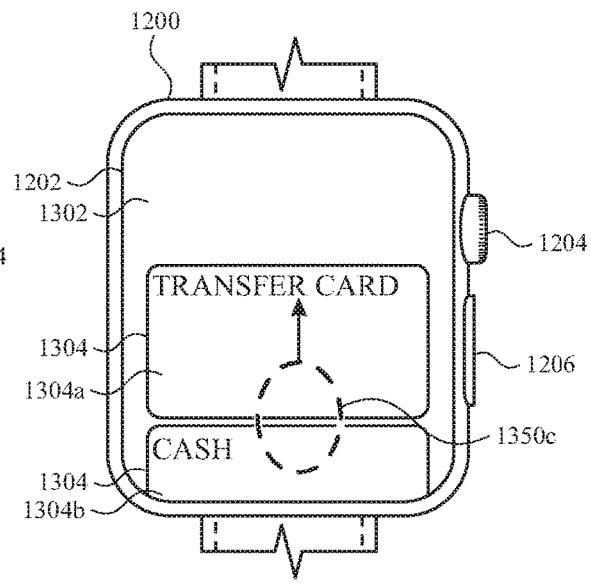

FIG. 13A illustrates electronic device 1200 displaying user interface 1300. At FIG. 13A, user interface 1300 is a watch face. In other embodiments, user interface 1300 is user interface associated with an application of electronic device 1200. At FIG. 13A, electronic device 1200 detects user input 1350*a* (e.g., a double press gesture and/or double tap gesture) on side button 1206. In response to detecting user input 1350*a*, electronic device 1200 displays account user interface 1302 of a transfer application (e.g., an electronic wallet application), as shown at FIG. 13B. Further, at FIG. 13A, electronic device 1200 detects user input 1350*b* (e.g., a single press and/or single tap input) on crown 1204. In response to detecting user input 1350*b*, electronic device 1200 displays application user interface 1320, as shown at FIG. 13I. In some embodiments, electronic device 1200 displays account user interface 1302 in response to detecting user input 1350*a* (e.g., a double press gesture and/or double tap gesture) regardless of what is being displayed on display 1202 (e.g., watch face user interface 1300, user interface of another application, and/or application user interface 1320).

As discussed in detail below with reference to FIGS. 13B-13N, user input 1350*a* authorizes and/or activates transfer accounts linked to electronic device 1200. As such, electronic device 1200 releases (e.g., transmits) credentials associated with a respective transfer account when a set of transfer criteria is met (e.g., when electronic device 1200 is positioned within a threshold proximity of a receiver and the linked transfer account is authorized/activated). In contrast, receiving a different set of user inputs (e.g., user input 1350*b* followed by tap gesture 1350*h* at FIG. 13I) causes electronic device 1200 to display account user interface 1302 without authorizing and/or activating transfer accounts linked to electronic device 1200 (without further user input). As such, in response to detecting user input 1350*b* (and detecting tap gesture 1350*h*) electronic device 1200 does not release credentials associated with the respective transfer account when the set of transfer criteria is met.

At FIG. 13B, account user interface 1302 includes a plurality of platters 1304 associated with respective transfer accounts (e.g., payment accounts, such as a third-party credit card account, a debit card account, and/or a stored-value account; pass accounts; ticket accounts; point accounts; rewards accounts; and/or transit accounts) linked to (e.g., provisioned onto) electronic device 1200. In some embodiments, a user can provision electronic device 1200 with one or more transfer accounts and use the transfer accounts to conduct transfers. For example, upon receiving access to the transfer account of a user, electronic device 1200 receives and stores credentials associated with the transfer account (e.g., account numbers, pin codes, authorization codes, pass codes, card number, balance information, and/or address) in a secure element of electronic device 1200. Electronic device 1200 releases (e.g., transmits) the credentials associated with the transfer account to a terminal (e.g., a wireless communication terminal and/or an NFC terminal) when the transfer account is activated and/or authorized by the user (e.g., via user input 1350*a*).

At FIG. 13B, electronic device 1200 displays transfer card platter 1304*a* representing a first transfer account (e.g., a credit card account, a debit card account, and/or a dual credit/debit card account) and cash platter 1304*b* (e.g., a partial view of cash platter 1304*b*) representing a second transfer account (e.g., a cash card and/or a gift card) on account user interface 1302. At FIG. 13B, transfer card platter 1304*a* and cash platter 1304*b* have the same emphasis (e.g., same opacity, same size, and/or same height). Although transfer card platter 1304*a* is displayed in the center of display 1202 (e.g., at a predefined location (or within a predefined area) of the display or user interface), electronic device 1200 does not change the emphasis of (e.g., deemphasize) cash platter 1304*b* with respect to transfer card platter 1304*a* because electronic device 1200 has not paused on transfer card platter 1304*a* (e.g., electronic device 1200 has not displayed transfer card platter 1304*a* at the predefined location (or within the predefined area) of the display or user interface for at least a predetermined period of time (e.g., without scrolling transfer card platter 1304*a* during the predetermined period of time)).

Figure 13C:
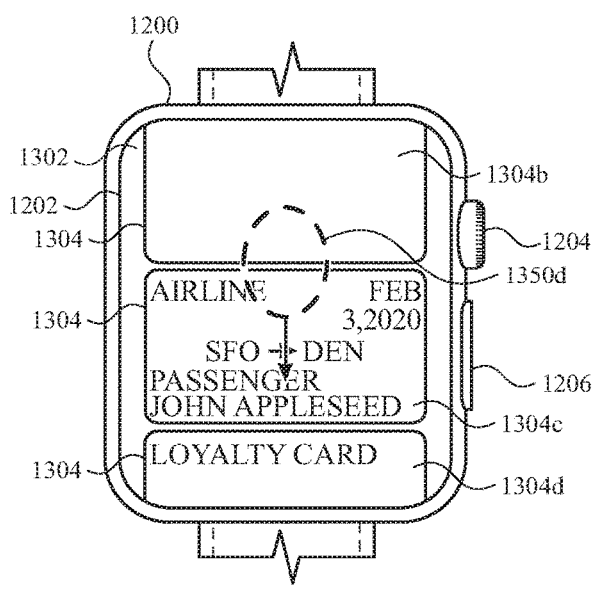

At FIG. 13B, electronic device 1200 detects swipe gesture 1350*c* (e.g., an upward swipe gesture) before the duration of the predetermined period of time passes. In response to detecting swipe gesture 1350*c*, electronic device 1200 scrolls account user interface 1302 (e.g., scrolls and/or translates the plurality of platters 1304 of account user interface 1302 in an upward direction) to display additional platters (e.g., 1304*c*, 1304*d*) of the plurality of platters 1304, as shown in FIG. 13C. In some embodiments, electronic device 1200 is also configured to scroll account user interface 1208 based on rotation of rotatable input mechanism 1204 in addition to swipe gestures.

At FIG. 13C, electronic device 1200 displays cash platter 1304*b* (e.g., a partial view of cash platter 1304*b*) representing the second transfer account, boarding pass platter 1304*c* representing a third transfer account (e.g., an airlines account), and loyalty card platter 1304*d* (e.g., a partial view of loyalty card platter 1304*d*) representing a fourth transfer account (e.g., a loyalty account and/or a rewards account) on account user interface 1302. As such, swipe gesture 1350*c* causes additional platters of the plurality of platters 1304 (e.g., boarding pass platter 1304*c* and/or loyalty card platter 1304*d*) to be at least partially displayed on account user interface 1302.

At FIG. 13C, while the platters have stopped scrolling and are stationary. Although boarding pass platter 1304*c* is displayed in the center of display 1202 (e.g., at the predefined location (or within the predefined area) of the display or user interface), electronic device 1200 does not change the emphasis of (e.g., deemphasize) platters 1304*b* and 1304*d* with respect to boarding pass platter 1304*c* because electronic device 1200 has not paused on boarding pass platter 1304*c* (e.g., electronic device 1200 has not displayed boarding pass platter 1304*c* at the predefined location (or within the predefined area) of the display or user interface for at least the predetermined period of time (e.g., without scrolling boarding pass platter 1304*c* during the predetermined period of time)).

Figure 13D:
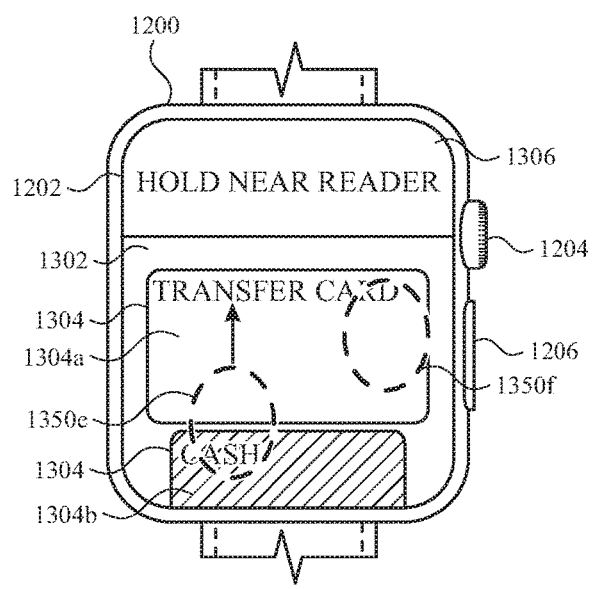

At FIG. 13C (and before the predetermined period of time passes), electronic device 1200 detects swipe gesture 1350*d* (e.g., a downward swipe gesture) on account user interface 1302. In response to detecting swipe gesture 1350*d*, electronic device 1200 scrolls account user interface 1302 (e.g., scrolls and/or translates the plurality of platters 1304 of account user interface 1302 in an upward direction) to display account user interface 1302 as shown at FIG. 13D. At FIG. 13D, after swipe gesture 1350*d* ceases, electronic device 1200 stops scrolling account user interface 1302 (e.g., 3 seconds after detecting an end of swipe gesture 1350*d*) and electronic device 1200 pauses on transfer card platter 1304*a* (e.g., transfer card platter 1304*a* is displayed in the center of display 1202 (e.g., at the predefined location (or within the predefined area) of the display or user interface) for at least the predetermined period of time (e.g., without scrolling transfer card platter 1304*a* during the predetermined period of time)). As a result of pausing on transfer card platter 1304*a* (for the predetermined period of time (e.g., half a second, one second, two seconds)), account user interface 1302 is modified, as shown at FIG. 13D. In some embodiments, prior to pausing on a particular platter, each platter of the plurality of platters includes a uniform size (e.g., each platter includes the same size and/or shape). In some embodiments, prior to pausing on a particular platter, the platters of the plurality of platters have different heights, sizes, and/or shapes.

At FIG. 13D, as a result of pausing on transfer card platter 1304*a*, (regardless of whether the platters had a uniform or non-uniform appearance in FIG. 13C) an appearance of cash platter 1304*b* is deemphasized as compared to transfer card platter 1304*a*. Deemphasizing cash platter 1304*b* as compared to transfer card platter 1304*a* includes, for example, reducing the size of cash platter 1304*b* as compared to transfer card platter 1304*a* (e.g., reducing size of cash platter 1304*b* without reducing (or with increasing) the size of transfer card platter 1304*a* and/or increasing the size of transfer card platter 1304*a* without increasing (or with reducing) the size of cash platter 1304*b*). Further, an additional appearance of cash platter 1304*b* is optionally altered (e.g., reduced in opacity, blurred, and/or modified in color) as compared to transfer card platter 1304*a* (e.g., as represented at FIG. 13D by hatching of cash platter 1304*b*) to deemphasize cash platter 1304*b*. In some embodiments, electronic device 1200 is configured to deemphasize platters that are not positioned in the center of display 1202 (e.g., cash platter 1304*b*) by ceasing to display the platters.

Additionally, at FIG. 13D, as a result of pausing on transfer card platter 1304*a* and because the user input that caused display of account user interface 1302 was user input 1350*a* (and not tap gesture 1350*h*), electronic device 1200 displays indicator 1306 ("Hold Near Reader") indicating that a transfer account (e.g., the first transfer account) associated with transfer card platter 1304*a* is activated (e.g., authorized for use to conduct a transfer and/or transaction). Indicator 1306 prompts a user of electronic device 1200 to position electronic device proximate to a receiver (e.g., within a threshold proximity of a device capable of receiving transmissions from electronic device 1200). Accordingly, once electronic device 1200 is positioned within proximity of the receiver (e.g., within proximity of a wireless communication terminal) the transfer account associated with transfer card platter 1304*a* can be utilized to conduct a transfer (e.g., a transaction using monetary funds, a transfer of points, a transfer of credit, and/or authorization of entry) without further user input. User input 1350*a* (as compared to tap gesture 1350*h*) that causes electronic device 1200 to display account user interface 1302 also enables electronic device 1200 to authorize the transfer accounts associated with the plurality of platters 1304 of account user interface 1302. As discussed below with reference to FIGS. 13I-13K, accessing account user interface 1302 via a technique that does not include user input 1350*a* (e.g., instead includes tap gesture 1350*h* and/or a voice instruction), does not activate the transfer account associated with transfer card platter 1304*a* when pausing on transfer card platter 1304*a* in account user interface 1302.

Figure 13E:
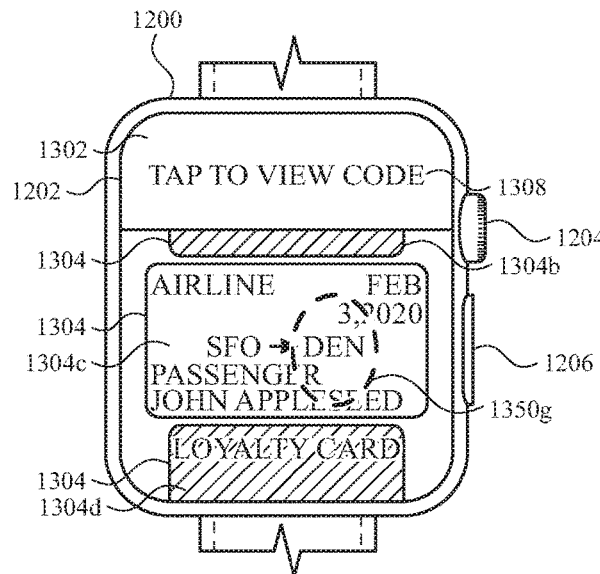
Figure 13F:
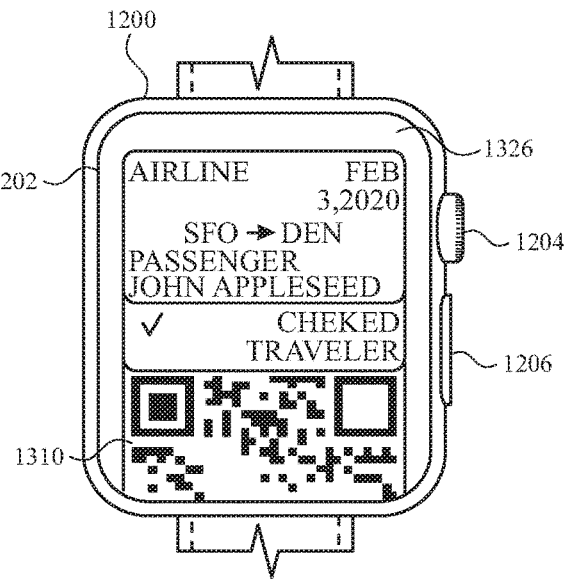
Figure 13G:
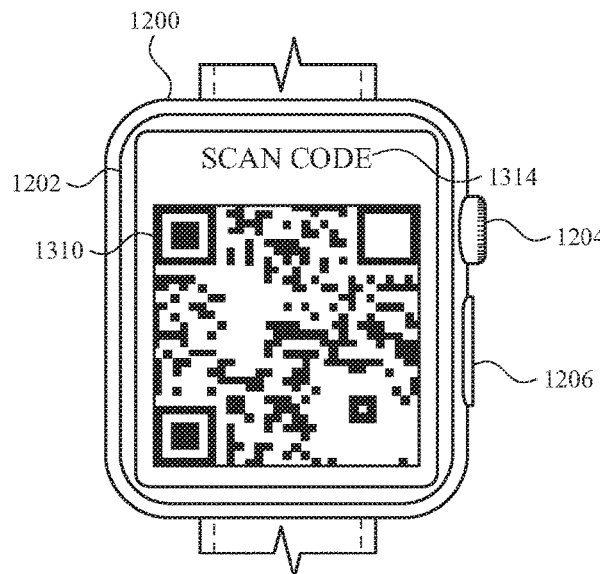

At FIG. 13D, electronic device 1200 detects swipe gesture 1350*e* (e.g., upward swipe gesture). In response to detecting swipe gesture 1350*e*, electronic device 1200 optionally undoes the deemphasizing (e.g., returns the platters to the visual appearance before the deemphasizing) and scrolls account user interface 1302 (e.g., scrolls and/or translates the plurality of platters 1304 of account user interface 1302 in a downward direction) to display cash platter 1304*b*, boarding pass platter 1304*c*, and loyalty card platter 1304*d*, as shown at FIG. 13E. Alternatively to detecting swipe gesture 1350*e*, electronic device 1200 detects tap gesture 1350*f* on transfer card platter 1304*a*. In response to detecting tap gesture 1350*f*, electronic device 1200 displays details user interface 1330, as shown at FIG. 13O.

At FIG. 13E, in response to detecting swipe gesture 1350*e*, electronic device 1200 displays account user interface 1302 and pauses account user interface 1302 on boarding pass platter 1304*c*. As a result of pausing on boarding pass platter 1304*c* (for the predetermined period of time (e.g., half a second, one second, two seconds)), account user interface 1302 is modified, as shown at FIG. 13E.

At FIG. 13E, in response to pausing on boarding pass platter 1304*c*, an appearance of cash platter 1304*b* and an appearance of loyalty card platter 1304*d* are deemphasized as compared to boarding pass platter 1304*c*. Deemphasizing optionally includes cash platter 1304*b* and loyalty card platter 1304*d* being reduced in size when compared to boarding pass platter 1304*c*. Further, the deemphasizing optionally includes an appearance of cash platter 1304*b* and an appearance of loyalty card platter 1304*d* being altered (e.g., reduced in opacity, blurred, and/or modified in color) as compared to boarding pass platter 1304*c* (e.g., as represented at FIG. 13E by hatching of cash platter 1304*b* and loyalty card platter 1304*d*).

Additionally, at FIG. 13E, in response to pausing on boarding pass platter 1304*c*, electronic device 1200 displays indicator 1308 ("Tap to View Code") indicating that a transfer account (e.g., the third transfer account) associated with boarding pass platter 1304*c* is authorized and/or activated (e.g., boarding pass is authorized for scanning). At FIG. 13E, boarding pass platter 1304*c* includes display of visual indicators of information related to a particular pass represented by boarding pass platter 1304*c*. For example, boarding pass platter 1304*c* includes display of visual indications that distinguish boarding pass platter 1304*c* from other boarding pass platters of the plurality of platters 1304. Boarding pass platter 1304*c* displays visual indications of a name of a passenger associated with boarding pass platter 1304*c* ("John Appleseed"), a date of travel (e.g., a flight) associated with boarding pass platter 1304*c* ("Feb. 3, 2020"), airline information of the flight associated with boarding pass platter 1304*c* ("AIRLINE"), and/or flight information of the flight associated with boarding pass platter ("SFO DEN", start location and destination). Accordingly, electronic device 1200 enables a user to easily avoid confusing different passes (e.g., boarding passes) that have a similar appearance on account user interface 1302 based on the displayed details represented by visual indications on boarding pass platter 1304*c*.

At FIG. 13E, while boarding pass platter 1304*c* is authorized and/or activated (as visually indicated by the other platters being relatively deemphasized), electronic device 1200 detects tap gesture 1350*g* on boarding pass platter 1304*c*. In response to detecting tap gesture 1304*c*, electronic device 1200 displays machine-readable code 1310 (e.g., a QR code and/or a bar code), as shown at FIG. 13G. In order to display code 1310 at FIG. 13G, electronic device 1200 displays a transition (e.g., an animation) between account user interface 1302 at FIG. 13E and code 1310 at FIG. 13G. For instance, at FIG. 13F, electronic device 1200 displays boarding pass details user interface 1326 in response to tap gesture 1350*g*. In some embodiments, boarding pass details user interface 1326 includes additional information related to the transfer account associated with boarding pass platter 1304c (e.g., flight details). In some embodiments, electronic device 1200 displays boarding pass details user interface 1326 as an animation before displaying code 1310 as shown at FIG. 13G (e.g., electronic device 1200 displays boarding pass details user interface 1326 and then scrolls the boarding pass details user interface 1326 to display code 1310 as a continuous sequence in response to tap gesture 1350g).

At FIG. 13G, electronic device 1200 displays code 1310 in a full screen mode (e.g., code 1310 occupies greater than 80% of display 1202, greater than 85% of display 1202, greater than 90% of display 1202, and/or greater than 95% of display 1202) in response to tap gesture 1350g. In some embodiments, electronic device 1200 increases a brightness of display 1202 (e.g., brightness output of display 1202) in the full screen mode. In some embodiments, electronic device 1200 displays indicator 1314 ("Scan Code") prompting the user to position electronic device 1200 proximate to a reader (e.g., a device that receives transmissions of credentials from electronic device 1200), such that code 1310 may be scanned (e.g., to authorize a user to board a plane). In some embodiments, electronic device 1200 forgoes display of indicator 1314, thereby enabling a size of code 1310 to further increase on display 1202. Accordingly, the transfer account associated with boarding pass platter 1304c can be utilized in response to user input 1350a and tap gesture 1350g. As discussed below, a tap gesture on boarding pass platter 1304c after accessing account user interface 1302 via user input 1350b does not automatically display code 1310 in the full screen mode. Rather, as discussed below, electronic device 1200 detects further user input to display code 1310 in a center position of display 1202 (e.g., further user input is required for electronic device 1200 to display code 1310 for scanning). In some embodiments, detecting user input (e.g., a swipe gesture and/or rotation of rotatable input mechanism 1204) when electronic device 1200 displays code 1310 in the full screen mode causes electronic device 1200 to scroll the user interface to display additional details related to the transfer account associated with boarding pass platter 1304c (e.g., as shown at FIG. 13N) (and to optionally cease displaying code 1310 in the full scree mode).

Figure 13H:
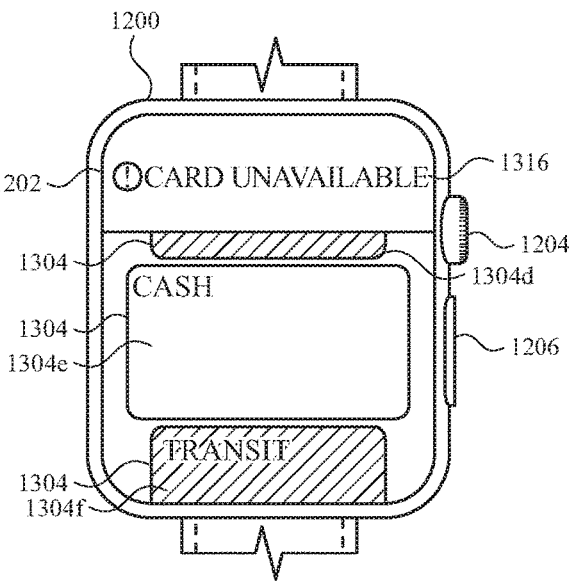

At FIG. 13H, electronic device 1200 has paused user interface account 1302 on second cash platter 1304e. As a result of pausing on second cash platter 1304e, account user interface 1302 is modified, as shown at FIG. 13H. In particular, an appearance of loyalty card platter 1304d and an appearance of transit platter 1304f are deemphasized as compared to second cash platter 1304d (e.g., sizes of loyalty card platter 1304d and transit platter 1304f are reduced, appearances of loyalty card platter 1304d and transit platter 1304f are reduced in opacity, are blurred, and/or are changed in color).

At FIG. 13H, electronic device 1200 displays indicator 1316 (overlaid on another platter) having an error message indicating that a transfer account (e.g., the fifth transfer account) associated with second cash platter 1304d is unavailable. In some embodiments, electronic device 1200 displays the error message when account user interface 1302 is accessed via user input 1350a and electronic device 1200 detects that the transfer account associated with second cash platter 1304d cannot complete a transfer and/or that electronic device 1200 cannot otherwise access the transfer account. For instance, electronic device 1200 displays the error message when a transfer account associated with a platter of the plurality of platters 1304 cannot be accessed by electronic device 1200 and/or includes insufficient transfer credits (e.g., monetary funds, credits, and/or points) to complete a transfer.

As set forth above, account user interface 1302 can be accessed via other user inputs detected by electronic device 1200. For example, at FIG. 13I, electronic device 1200 displays application user interface 1320 in response to detecting user input 1350b at FIG. 13A. At FIG. 13I, application user interface 1320 includes a plurality of application user interface objects 1322 corresponding to applications of electronic device 1200. Further, at FIG. 13I, electronic device 1200 detects tap gesture 1350h on transfer application user interface object 1322a. In response to detecting tap gesture 1350h, electronic device 1200 displays account user interface 1302, as shown at FIG. 13J. As noted above, accessing account user interface 1302 via tap gesture 1350h does not authorize and/or authenticate transfer accounts of the transfer application. As such, additional user input is detected by electronic device 1200 for a respective transfer account of the transfer application to be utilized to conduct a transfer.

At FIG. 13J, electronic device 1200 displays account user interface 1302 having the plurality of platters 1304. Electronic device 1200 displays transfer card platter 1304a and cash platter 1304b on account user interface 1302. In some embodiments, electronic device 1200 does not detect user input after detecting tap gesture 1350h, such that electronic device 1200 pauses account user interface 1302 on transfer card platter 1304a. Accordingly, in response to detecting that account user interface 1302 is paused on transfer card platter 1304a (for the predetermined period of time (e.g., half of a second, one second, two seconds)), electronic device 1200 modifies account user interface 1302, as shown at FIG. 13K.

At FIG. 13K, cash platter 1304b is deemphasized in appearance (e.g., reduced in size, reduced in opacity, blurred, and/or changed in color) as compared to transfer card platter 1304a. Because user input 1304b and tap gesture 1350h do not authorize transfer accounts of the transfer application, at FIG. 13K, account user interface 1302 includes indicator 1324 ("Double Click to Pay") prompting a user to authorize and/or activate the transfer account associated with transfer card platter 1304a. In some embodiments, electronic device 1200 detects user input (e.g., a double press gesture and/or a double tap gesture) on side button 1206. In response to the user input, electronic device 1200 authorizes and/or activates the transfer account associated with platter 1304a, such that a user can position electronic device 1200 within a threshold proximity of a receiver (e.g., within proximity of a wireless communication terminal) to release (e.g., transmit) credentials of the transfer account to conduct a transfer.

At FIG. 13K, electronic device detects swipe gesture 1350i (e.g., upward swipe gesture) on account user interface 1302. In response to detecting swipe gesture 1350i, electronic device 1200 scrolls account user interface 1302 to show additional platters of the plurality of platters 1304 (e.g., scrolls and/or translates the plurality of platters 1304 of account user interface 1302 in the upward direction to display additional platters), as shown at FIG. 13L. Alternatively, electronic device detects tap gesture 1350j on transfer card platter 1304a. In response to detecting tap gesture 1350j, electronic device 1200 displays details user interface 1330, as shown at FIG. 13O.

At FIG. 13L, user interface 1302 has stopped scrolling and electronic device 1200 pauses display of account user interface 1302 on boarding pass platter 1304c (e.g., in a center of display 1202 for at least the predetermined period of time (e.g., half a second, one second, two seconds)). In response to pausing on boarding pass platter 1304c, electronic device 1200 modifies account user interface 1302 to deemphasize appearances of cash platter 1304b and loyalty card platter 1304d (e.g., reduces sizes, reduces opacities, blurs, and/or changes colors of cash platter 1304b and loyalty card platter 1304d) as compared to boarding pass platter 1304c, as shown in FIG. 13L.

As set forth above, accessing account user interface 1302 via tap gesture 1350h does not activate and/or authorize transfer accounts of transfer application. At FIG. 13L, while boarding pass platter 1304c is emphasized, electronic device 1200 detects tap gesture 1350k on boarding pass platter 1304c. Instead of displaying boarding pass details user interface 1326 and automatically displaying code 1310 in the full screen mode as described with respect to FIGS. 13E-13G, electronic device 1200 displays (in response to detecting tap gesture 1350k) boarding pass details user interface 1326 without automatically displaying code 1310 in the full screen mode, as shown at FIG. 13M, because account user interface 1302 was displayed in response to tap gesture 1350h.

Figure 13M:
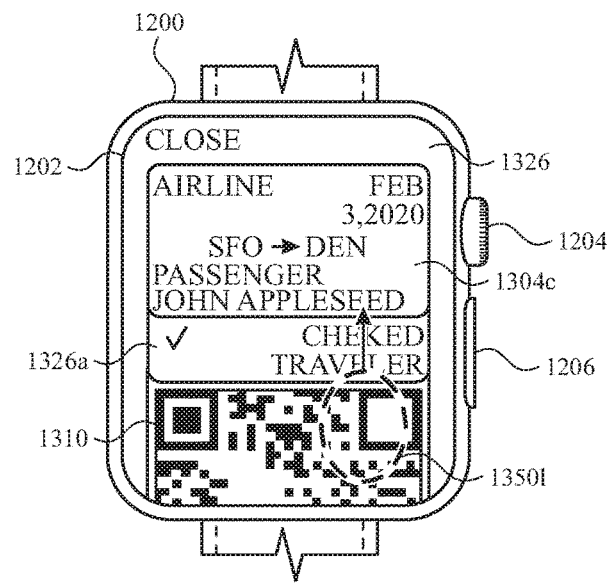
Figure 13N:
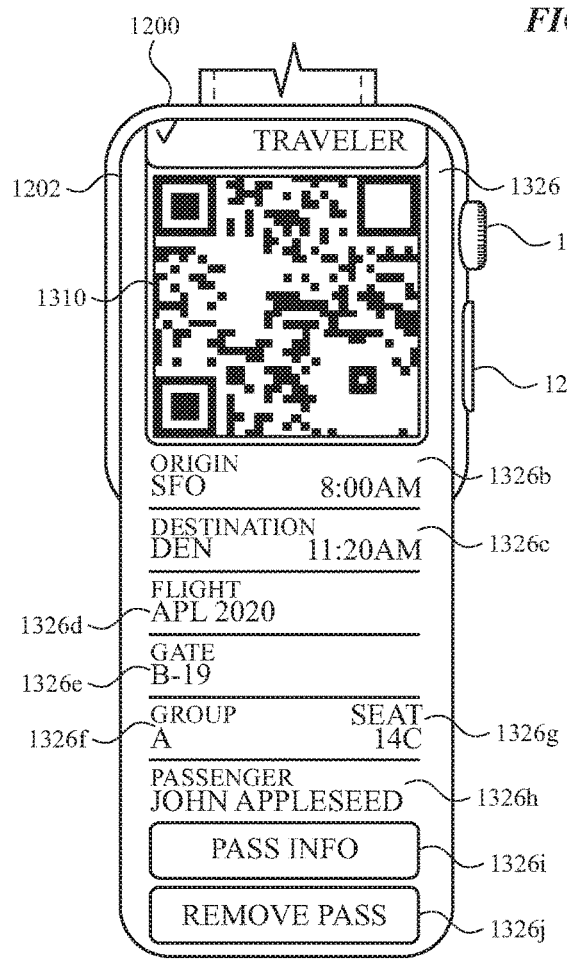
Figure 13O:
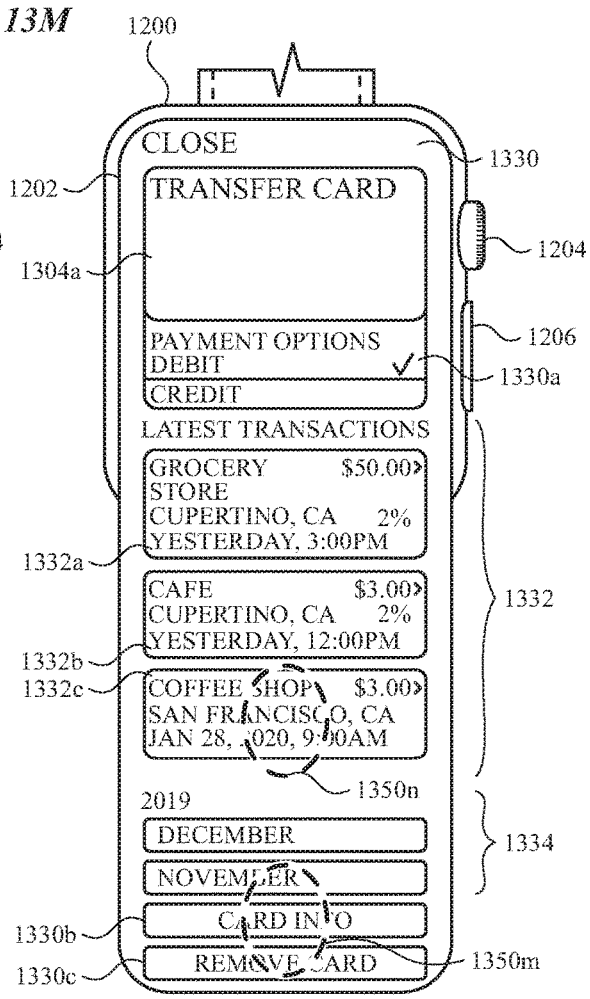

In response to detecting tap gesture 1350k, at FIG. 13M, electronic device 1200 displays boarding pass details user interface 1326, which includes boarding pass platter 1304c, details indicator 1326a (e.g., an indication that the traveler associated with boarding pass of boarding pass platter 1304c is a checked traveler, has a particular status, and/or has a particular security clearance), and a partial (incomplete) view of machine-readable code 1310 (e.g., QR code and/or bar code) (e.g., including a first part of code 1310, not including a second part of code 1310). The partial view of machine-readable code 1310 is incomplete and does not permit the full machine-readable code 1310 to be read be a reader. Electronic device 1200 forgoes automatic display of code 1310 in the full screen mode in response to detecting tap gesture 1350k. Thus, to activate and/or authenticate code 1310, electronic device 1200 detects swipe gesture 1350l (e.g., upward swipe gesture), as shown at FIG. 13M.

In response to detecting swipe gesture 1350l, electronic device 1200 scrolls (e.g., translates in an upward direction) boarding pass details user interface 1326, as shown at FIG. 13N. At FIG. 13N, electronic device 1200 displays code 1310 at a center position of display 1202. In some embodiments, swipe gesture 1350l causes electronic device 1200 to display boarding pass details user interface 1326 with code 1310 positioned at the center position of display 1202. In some embodiments, electronic device 1200 displays code 1310 in the full screen mode after code 1310 has been displayed at the center position of display 1202 for a predetermined period of time (e.g., half a second, one second, two seconds). In some embodiments, electronic device 1200 displays code 1310 in the full screen mode at an increased brightness (e.g., 100% brightness) on display 1202 after code 1310 has been paused at the center position of display 1202 for the predetermined period of time. In some embodiments, in response to detecting a swipe gesture while displaying code 1310 in the full screen mode, electronic device 1200 continues scrolling through details user interface 1326.

In some embodiments, swipe gesture 1350l is an input that causes electronic device 1200 to scroll boarding pass details user interface 1326 beyond code 1310 (e.g., without pausing on code 1310). As shown at FIG. 13N, boarding pass details user interface 1326 includes further details related to the transfer account and/or specific pass associated with boarding pass platter 1304c. For example, boarding pass details user interface 1326 includes boarding time indicator 1326b ("SFO 8:00 AM") of a flight associated with boarding pass platter 1304c, landing time indicator 1326c ("DEN 11:20 AM") of the flight associated with boarding pass platter 1304c, flight number indicator 1326d ("APL2020") of the flight associated with boarding pass platter 1304c, gate number indicator 1326e ("B-19") of the flight associated with boarding pass platter 1304c, boarding group indicator 1326f ("A") of the flight associated with boarding pass platter 1304c, seat number indicator 1326g ("19C") of the flight associated with boarding pass platter 1304c, passenger information indicator 1326h (e.g., a name "John Appleseed) of the flight associated with boarding pass platter 1304c, additional information user interface object 1326i, and remove pass user interface object 1326j.

Turning now to FIG. 13O, electronic device 1200 displays details user interface 1330 associated with transfer card platter 1304a in response to detecting tap gesture 1350f and/or tap gesture 1350j. At FIG. 13O, details user interface 1330 includes transfer card platter 1304a, payment options user interface object 1330a (e.g., for selecting between two account options of the respective transfer account, such as "Debit" or "Credit"), latest transactions area 1332, history area 1334, additional information user interface object 1330b, and remove card user interface object 1330c.

Figures 13P, 13Q:
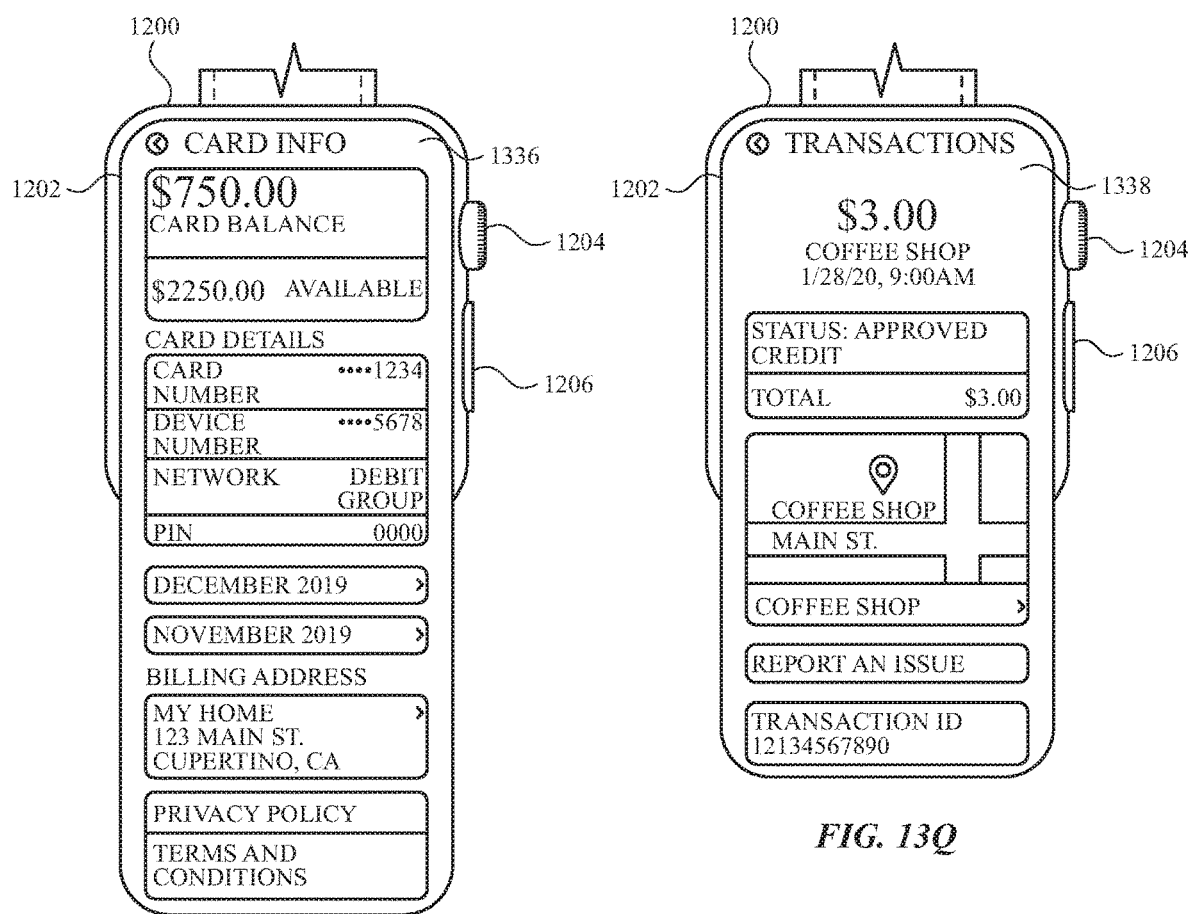

At FIG. 13O, electronic device 1200 detects tap gesture 1350m on additional information user interface object 1330b of details user interface 1330. In response to detecting tap gesture 1350m, electronic device 1200 displays additional details user interface 1336, as shown at FIG. 13P. At FIG. 13P, additional details user interface 1336 includes information related to the transfer account associated with transfer card platter 1304a. For instance, additional details user interface 1336 includes visual indicators of credentials (e.g., balance information, card number, device number, network, pin number, history, user address, privacy policy information, and/or terms and conditions information) corresponding to the transfer account associated with transfer card platter 1304a. In some embodiments, additional details user interface 1336 includes multiple visual indicators, where all of the multiple visual indicators do not fit on display 1202 at one time (e.g., the multiple visual indicators do not fit on display 1202 concurrently with one another). Accordingly, electronic device 1200 scrolls additional details user interface 1336 in response to swipe gestures on additional details user interface 1336 to display visual indicators that are not initially displayed on display 1202.

At FIG. 13O, latest transactions area 1332 includes first transaction user interface object 1332a, second transaction user interface object 1332b, and third transaction user interface object 1332c. In some embodiments, latest transactions area 1332 of details user interface 1330 can include more than three transaction user interface objects or fewer than three transaction user interface objects. At FIG. 13O, electronic device 1200 detects tap gesture 1350n on third transaction user interface object 1332c. In response to detecting tap gesture 1350n on third transaction user interface object 1332c, electronic device 1200 displays transaction details user interface 1338, as shown at FIG. 13Q. At FIG. 13Q, transaction details user interface 1338 includes visual indicators corresponding to further details related to a particular transaction associated with third transaction user interface object 1332c performed with the transfer account associated with transfer card platter 1304a. In some embodiments, transaction details user interface 1338 includes multiple visual indicators, where all of the multiple visual indicators do not fit on display 1202 at one time (e.g., the multiple visual indicators do not fit on display 1202 concurrently with one another). Accordingly, electronic device 1200 scrolls transaction details user interface 1338 in response to swipe gestures on transaction details user interface 1338 to display visual indicators that are not initially displayed on display 1202.

Turning now to FIG. 13R, electronic device 1200 displays transit details user interface 1340 in response to a tap gesture on transit platter 1304*f*. At FIG. 13R, transit details user interface 1340 includes balance indicator 1340*a* (e.g., "Balance 1—$20.00" and "Balance 2—$100.00"), latest transactions area 1342, history area 1344, additional information user interface object 1340*b*, service mode user interface object 1340*c*, and remove card user interface object 1340*d*. In some embodiments, the transfer account associated with transit platter 1304*f* includes sub-accounts for different services. For example, the transfer account includes a first sub-account for conducting transfers for a bus service and a second sub-account for conducting transfers for a subway service. Accordingly, transit platter 1304*f* can be utilized to conduct transfers for different services and/or service operators, such that the transfer account associated with transit platter 1304*f* corresponds to credentials for the different sub-accounts. In some embodiments, electronic device 1200 detects a particular sub-account that is to be used upon communication with a receiver, and electronic device 1200 releases the credentials associated with that particular sub-account. Thus, balance indicator 1340*a* includes balance information related to each sub-account of the transfer account associated with transit platter 1304*f*.

Turning now to FIG. 13S, electronic device 1200 displays cash details user interface 1346 in response to a tap gesture on cash platter 1304*b* and/or second cash platter 1304*e*. At FIG. 13S, cash details user interface 1346 includes cash platter 1304*b*, balance indicator 1346*a*, pending transfers area 1348, completed transfers area 1352, history area 1354, additional details user interface object 1346*b*, and remove card user interface object 1346*c*. A transfer account associated with cash platter 1304*b* and/or second cash platter 1304*e* enables a user to request and accept transfers using a predefined balance (e.g., transfer credits preloaded into the transfer account associated with cash platter 1304*b* and/or second cash platter 1304*e*). In some embodiments, electronic device 1200 detects user input to request that a transfer be made to a transfer account of another user and transmits the request to an external device associated with the other user. In some embodiments, the other user must accept the request in order for a transfer to be completed. In some embodiments, electronic device 1200 receives a request from an external device of the other user, such that the user of electronic device 1200 can accept or deny the request.

Figure 13T:
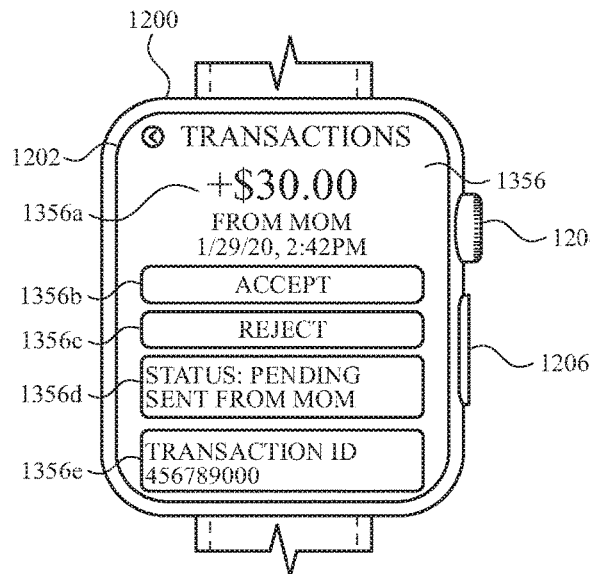

At FIG. 13S, electronic device 1200 detects tap gesture 1350*o* on pending transfer user interface object 1348*a*. In response to detecting tap gesture 1350*o*, electronic device 1200 displays pending transfer user interface 1356, as shown at FIG. 13T. At FIG. 13T, pending transfer user interface 1356 includes details indicator 1356*a* ("+$30.00 From Mom 1/29/20, 2:42 PM"), accept user interface object 1356*b*, reject user interface object 1356*c*, status indicator 1356*d*, and transaction indicator 1356*e*. Accordingly, electronic device 1200 transmits one or more signals to an external device indicating whether the user has accepted or rejected a pending transfer based on user input received on the pending transfer user interface 1356.

Figure 13U:
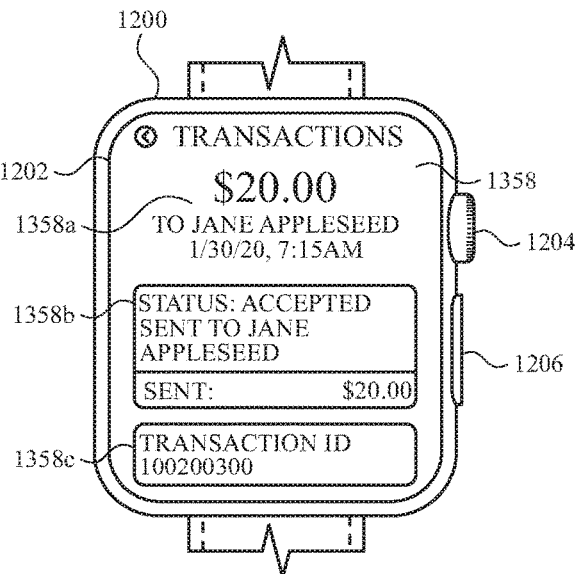

Turning back to FIG. 13S, electronic device detects tap gesture 1350*p* on completed transfer user interface object 1352*a* of completed transfers area 1352. In response to detecting tap gesture 1350*p*, electronic device 1200 displays completed transfer user interface 1358, as shown at FIG. 13U. At FIG. 13U, completed transfer user interface 1358 includes details related to a completed transfer, such as details indicator 1358*a* ("$20.00 to Jane Appleseed 1/30/20, 7:15 AM"), status indicator 1358*b*, and transaction indicator 1358*c*.

Figure 13V:
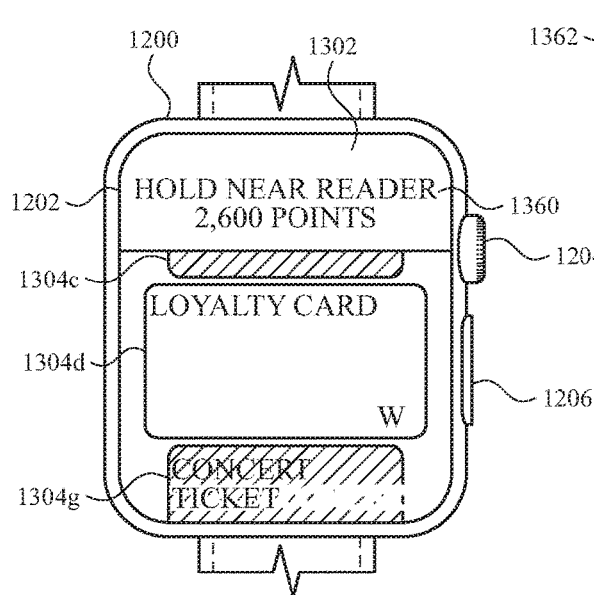

FIGS. 13V-13AA illustrate a process for completing a transfer using both a loyalty transfer account and a transfer card transfer account. At FIG. 13V, electronic device 1200 displays account user interface 1302 upon detecting user input 1350*a*. Therefore, transfer accounts of transfer application are authorized and activated. In some embodiments, electronic device 1200 also detects a swipe gesture on account user interface 1302 to scroll the plurality of platters 1304, such that loyalty card platter 1304*d* is positioned at a center of display 1202. Further still, the swipe gesture causes electronic device 1200 to pause scrolling and display loyalty card transfer account platter 1304*d* positioned at the center of display 1202 for the predetermined period of time (e.g., a half second, one second, two seconds). Accordingly, boarding pass platter 1304*c* and concert ticket platter 1304*g* are deemphasized in appearance (e.g., reduced in size, reduced in opacity, blurred, and/or changed in color) as compared to loyalty card platter 1304*d*. Additionally, account user interface 1302 includes indicator 1360 ("Hold Near Reader 2,600 Points") that prompts a user of electronic device 1200 to position electronic device 1200 proximate to a receiver in order to utilize a transfer account associated with loyalty card platter 1304*d*. In some embodiments, indicator 1306, indicator 1308, and/or indicator 1360 include balance information and/or further details that aid the user of electronic device 1200 in conducting a transfer. In some embodiments, indicator 1306, indicator 1308, and/or indicator 1360 alternate text that is displayed when a transfer account associated with a platter of the plurality of platters is configured to conduct transfers using two different techniques (e.g., Near Field Communication and/or machine-readable code-based transfers).

Figure 13W:
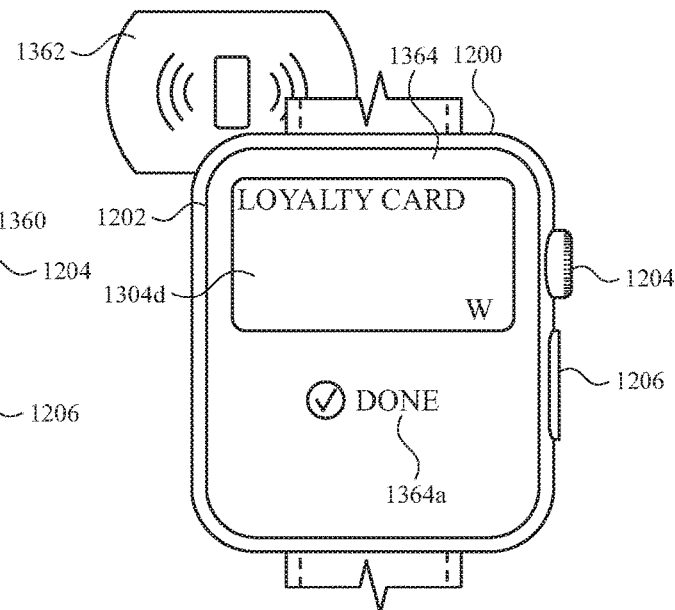

At FIG. 13W, the user positions electronic device 1200 proximate to reader 1362. As such, electronic device 1200 displays transfer user interface 1364 in response to detecting that electronic device 1200 is positioned within a threshold proximity to reader 1362 (e.g., within range of an RF field of reader 1362) and in response to detecting that credentials of the transfer account associated with loyalty card platter 1304*d* have been successfully released (e.g., transmitted by electronic device 1200 and accepted by reader 1362 to complete a transfer). Transfer user interface 1364 includes loyalty card platter 1304*d* and indicator 1364*a* ("Done") indicating that the transfer of credentials (e.g., an account number) of the transfer account associated with loyalty card platter 1304*d* has been completed.

Figure 13X:
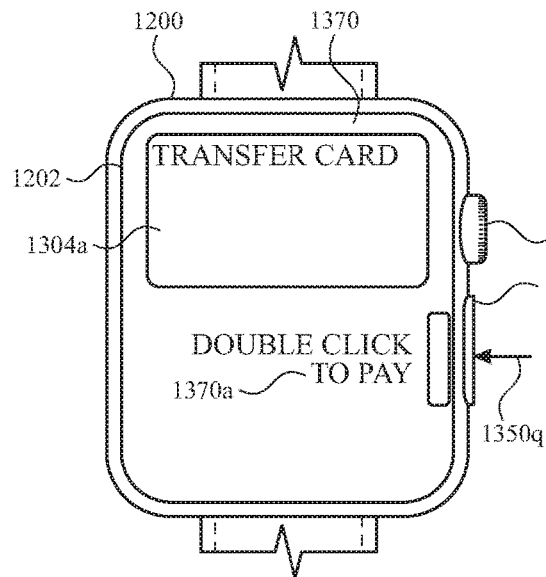

In some embodiments, in response to detecting that the transfer has been completed with the transfer account associated with loyalty card platter 1304*d*, electronic device 1200 displays authorization user interface 1370 at FIG. 13X (e.g., without receiving additional user input). At FIG. 13X, authorization user interface 1370 includes transfer card platter 1304*a* and indicator 1370*a* ("Double Click to Pay"). In some embodiments, authorization user interface 1370 includes another platter of the plurality of platters 1304 associated with a transfer account that is to be used in the transaction.

Authorization user interface 1370 includes indicator 1370*a* indicating that that the transfer account associated with transfer card platter 1304a is not authorized/activated. As such, electronic device 1200 detects user input 1350q (e.g., a double press gesture and/or a double tap gesture) on side button 1206 of electronic device 1200. In response to detecting user input 1350q, electronic device 1200 authorizes the transfer account associated with transfer card platter 1304a and displays transfer user interface 1372, as shown at FIG. 13Y.

Figure 13Y:
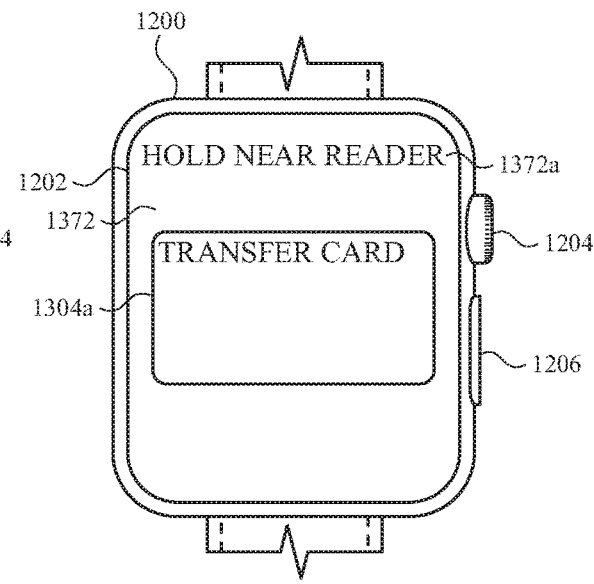
Figure 13Z:
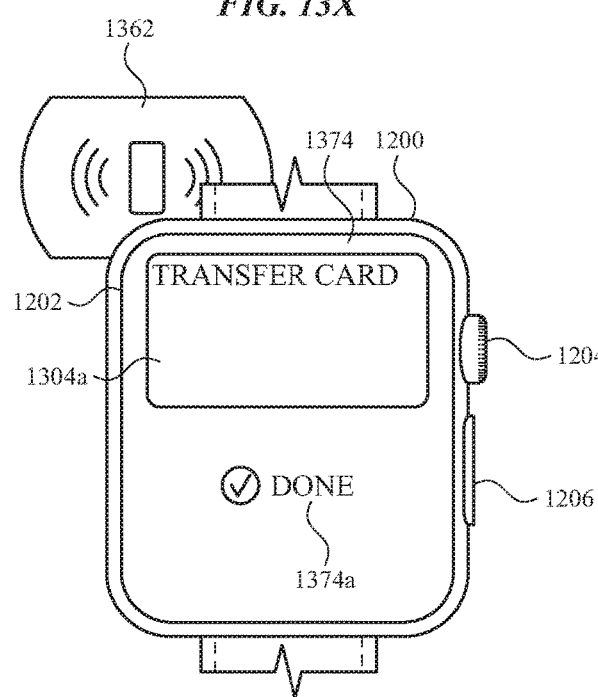
Figure 13A:
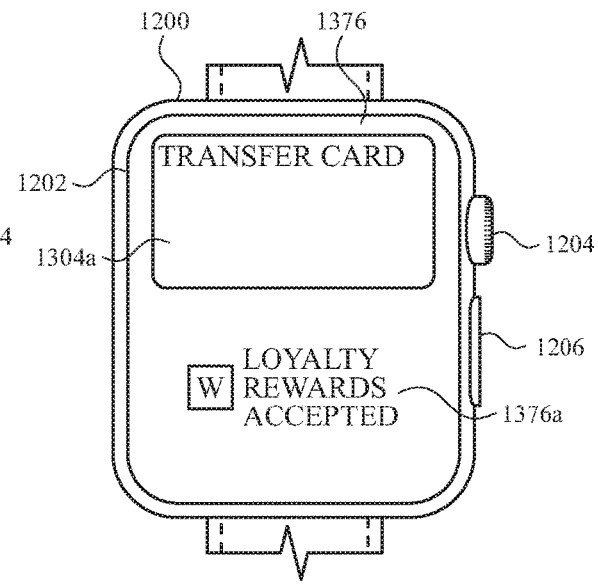

At FIG. 13Y, transfer user interface 1372 includes transfer card platter 1304a and indicator 1372a ("Hold Near Reader"). Indicator 1372a prompts a user to position electronic device 1200 proximate to reader 1362 to release credentials of the transfer account associated with transfer card platter 1304a. At FIG. 13Z, electronic device 1200 detects that electronic device 1200 is positioned within a threshold proximity of reader 1362 and transmits the credentials of the transfer account to the reader, then displays successful transfer user interface 1374. At FIG. 13Z, successful transfer user interface 1374 includes transfer card platter 1304a and indicator 1374a ("Done"). Successful user interface 1374 is automatically displayed in response to electronic device detecting that credentials of the transfer account associated with transfer card platter 1304a have been released and accepted and/or received by reader 1362.

Further, electronic device 1200 displays dual transfer user interface 1376 after displaying successful user interface 1374 for a predetermined period of time (e.g., one second, two seconds, three seconds, four seconds, five seconds), as shown at FIG. 13AA. Dual transfer user interface 1376 includes transfer card platter 1304a and indicator 1376a ("Loyalty Rewards Accepted") to indicate that the transaction was completed via both the transfer account associated with loyalty card platter 1304d and the transfer account associated with transfer card platter 1304a. Accordingly, a user of electronic device 1200 can recognize that the transaction is complete and that credentials from both transfer accounts were utilized in the transaction.

FIG. 14 is a flow diagram illustrating a method for displaying transfer accounts in accordance with some embodiments. Method 1400 is performed at a computer system (e.g., 100, 300, 500, 600a, 600b, 800, 1000, 1050, 1200, 1600) that is in communication with a display generation component (e.g., 602a, 602b, 802, 1002, 1052, 1202, 1602) and one or more input devices (e.g., a touch-sensitive surface, a camera, a fingerprint sensor, and/or a biometric sensor). Some operations in method 1400 are, optionally, combined, the orders of some operations are, optionally, changed, and some operations are, optionally, omitted.

As described below, method 1400 provides an intuitive way for displaying transfer accounts linked (e.g., provisioned) to the computer system. The method reduces the cognitive burden on a user when interacting with a particular transfer account linked to the computer system. For battery-operated computing systems, enabling a user to interact with a particular transfer account more easily conserves power and increases the time between battery charges.

In method 1400, the computer system (e.g., 1200, a smart device, such as a smartphone or a smartwatch; a mobile device) is in communication with a display generation component (e.g., 1202) and one or more input devices (e.g., touch-sensitive surface). The computer system displays (1402), via the display generation component, an account user interface (e.g., 1208, 1302) that includes a plurality of visual representations (e.g., 1210, 1304) of a plurality of different accounts (e.g., including a first visual representation of a first account and a second visual representation of a second account).

While displaying the account user interface, the computer system receives (1404), via the one or more input devices (e.g., via the touch-sensitive surface and/or via the rotatable input mechanism), a scroll input (e.g., 1250a, 1350c, 1350d, 1350e, 1350i, swipe on the touch-sensitive surface and/or rotation of the rotatable input mechanism) corresponding to a request to scroll the account user interface (e.g., 1208, 1302);

In response to receiving the scroll input, (e.g., concurrently) the computer system scrolls (1406), via the display generation component, the account user interface (e.g., 1208, 1302) to cause a first visual representation of a first account (e.g., 1210a, 1304a) and a second visual representation of a second account (e.g., 1210b, 1304b) to scroll (e.g., first visual representation to scroll to a first location, second visual representation to scroll to a second location, different from the first location).

Subsequent to receiving the scroll input, while the computer system displays the account user interface (e.g., once the scrolling of the account user interface has stopped) (1408), and in accordance with a determination that the first visual representation of the first account (e.g., 1304a in FIG. 13D) satisfies a set of selection criteria, where the set of selection criteria includes a criterion that is met when the first visual representation of the first account is displayed in a selection region (e.g., of the display generation component, of the user interface) for at least a threshold amount of time (e.g., a non-zero threshold amount of time), the computer system reduces (1410) (e.g., as in FIG. 13D) a visual emphasis (e.g., opacity and/or size) of the second visual representation of the second account (e.g., 1304b) relative to a visual emphasis of the first visual representation of the first account (e.g., reducing the opacity and/or size of the second visual representation (e.g., visually deemphasizing the visual representation to a predetermined opacity and/or size) without reducing the opacity and/or size of the first visual representation (e.g., without visually deemphasizing the indication to the predetermined opacity and/or size)). Subsequent to receiving the scroll input, while the computer system displays the account user interface (e.g., once the scrolling of the account user interface has stopped) (1408), and in accordance with a determination that the second visual representation of the second account (e.g., 1210b, 1304c) satisfies the set of selection criteria, the computer system reduces (1412) (e.g., as in FIGS. 12C, 13E) a visual emphasis of the first visual representation of the first account (e.g., 1210a, 1304b, 1304d) relative to a visual emphasis of the second visual representation of the second account (e.g., reducing the opacity and/or size of the first visual representation (e.g., visually deemphasizing the visual representation to the predetermined opacity and/or size) without reducing the opacity and/or size of the second visual representation (e.g., without visually deemphasizing the visual representation to the predetermined opacity and/or size)). In some embodiments, the second visual representation of the second account does not satisfy the set of selection criteria when the first visual representation of the first account satisfies the set of selection criteria. In some embodiments, the first visual representation of the first account does not satisfy the set of selection criteria when the second visual representation of the second account satisfies the set of selection criteria.

Reducing the visual emphasis of other visual representations relative to a particular visual representation of an account when the particular visual representation meets the set of selection criteria provides the user feedback about the state of the computer system, and in particular that the account corresponding to the particular visual representation is currently selected by the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first visual representation and the second visual representation have the same value (e.g., a second value, 100% opacity) (e.g., have the same size, have the same opacity, and/or the same visual emphasis) for a visual characteristic while scrolling and, optionally, after scrolling but before the set of selection criteria are met. In some embodiments, visual representations of multiple accounts (e.g., all displayed visual representations of accounts other than the visual representation of the account that satisfied the set of selection criteria) are visually de-emphasized (e.g., by changing the visual characteristic of the visual representations of the multiple accounts to a different value, by reducing the opacity and/or size of the displayed visual representations) as compared to the visual representations of the single account that satisfied the set of selection criteria.

In some embodiments, the set of selection criteria is not met for any account while scrolling the account user interface. In some embodiments, the set of selection criteria ceases to be met for any account in response to receiving scroll input to scroll the account user interface.

In some embodiments, the computer system reduces a visual emphasis (e.g., opacity and/or size) of the second visual representation (e.g., 1304*b* in FIG. 13D) of the second account relative to a visual emphasis of the first visual representation of the first account (e.g., 1304*a* in FIG. 13D) by reducing an opacity of the second visual representation relative to the first visual representation. In some embodiments, the computer system reduces a visual emphasis (e.g., opacity and/or size) of the first visual representation of the first account (e.g., 1210*a*, 1210*c* in FIG. 12C, 1304*b*, 1304*d* in FIG. 13E) relative to a visual emphasis of the second visual representation of the second account (e.g., 1210*b*, 1304*c* in FIG. 13E) by reducing an opacity of the first visual representation relative to the second visual representation. In some embodiments, reducing the visual emphasis of a representation relative to a second representation includes ceasing to display (e.g., reducing opacity to zero) the representation while maintaining display of the second representation. In some embodiments, reducing the visual emphasis of a representation relative to a second representation includes darkening display of the representation relative to the second representation (e.g., making the representation darker while maintaining the second representation and/or maintain the representation while making the second representation brighter). In some embodiments, reducing the visual emphasis of a representation relative to a second representation includes blurring display of the representation relative to the second representation (e.g., making the representation more blurry while maintaining the second representation and/or maintain the representation while making the second representation less blurry). In some embodiments, the visual emphasis is changed via one or more (or all) of: changing opacity, size, darkening, and blurring of one visual representation relative to a second representation.

Partially fading representations of other accounts when an account is selected provides the user with visual feedback about which account is currently selected. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more input devices includes a rotatable input mechanism (e.g., 1204, that is rotatable with respect to a body of the computer system, a crown of a smartwatch). In some embodiments, the computer system receives the scroll input by detecting a rotation of the rotatable input mechanism (e.g., 1204).

Using a rotatable input mechanism to scroll a user interface provides users with the ability to scroll displayed content without obstructing the displayed content with an input device (e.g., a finger, such as often needed for a touch-screen), thereby increasing the precision of scroll inputs and reducing the number of inputs required to scroll to an intended position. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more input devices includes a touch-sensitive surface (e.g., that is optionally integrated with the display generation component to form a touch-sensitive display, 1202). In some embodiments, the computer system receives the scroll input by detecting a scroll gesture (e.g., a swipe input that includes movement of a contact, 1350*c*, 1350*i*, 1350*k*) at the touch-sensitive surface.

Using a touch-sensitive surface to scroll a user interface (e.g., as compared to keyboard input) provides users with the ability to scroll displayed content at various speeds and get concurrent visual feedback on the scroll progress, such as on a touch-screen, thereby increasing the precision of scroll inputs and thereby reducing the number of inputs required to scroll to an intended position. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to the computer system receiving the scroll input and while the computer system displays the account user interface (e.g., 1302) (e.g., once the scrolling of the account user interface has stopped), in accordance with the determination that the first visual representation of the first account satisfies the set of selection criteria (and, optionally, and in accordance with a determination that the first account is available for use), the computer system displays (e.g., in the account user interface), via the display generation component, a balance of the first account (e.g., an amount of resources (such as available or used) of the first account) (e.g., without displaying a balance of the second account).

In some embodiments, in accordance with the determination that the second visual representation of the second account satisfies the set of selection criteria (and, optionally, and in accordance with a determination that the second account is available for use), displaying (e.g., in the account user interface), via the display generation component, a balance of the second account (e.g., an amount of resources (such as available or used) of the second account) (e.g., without displaying a balance of the first account).

Displaying a balance of an account once the account is selected provides the user with visual feedback about that account (before the user attempts to use the account (e.g., in a transaction)) without needing to provide the same feedback about all other accounts provisioned on the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to the computer system receiving the scroll input and while the computer system displays the account user interface (e.g., once the scrolling of the account user interface has stopped), in accordance with the determination that the first visual representation of the first account satisfies the set of selection criteria (and, optionally, in accordance with a determination that the first account is a first type of account (e.g., an NFC-capable account) and/or in accordance with a determination that the first account is available for use), the computer system displays (e.g., in the account user interface), via the display generation component, instructions (e.g., 1324, "double-click side button") to prepare (e.g., for participating in transactions) the first account for use (e.g., to authorize and/or enable an NFC transaction using the first account) (without enabling the second account for use).

In some embodiments, in accordance with the determination that the second visual representation of the second account satisfies the set of selection criteria (and, optionally, in accordance with a determination that the second account is a first type of account (e.g., an NFC-capable account) and/or in accordance with a determination that the second account is available for use), displaying (e.g., in the account user interface), via the display generation component, instructions (such as instructions to provide biometric authentication or interact with a hardware component of the device such as a button or a rotatable input device (e.g., "double-click side button")) to prepare the second account for use (e.g., to authorize and/or enable an NFC transaction using the second account) (without enabling the first account for use).

Displaying instructions for the user to perform to cause the computer system to prepare the selected account for use provides the user with visual feedback that the currently selected account is not prepared for use and about what action the user should take to cause the computer system to prepare the account for use. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to the computer system receiving the scroll input and while the computer system displays the account user interface (e.g., once the scrolling of the account user interface has stopped): in accordance with the determination that the first visual representation of the first account satisfies the set of selection criteria and in accordance with a determination that the first account is prepared (e.g., for participating in transactions) for use (e.g., via a double-press of a side button of the computer system), the computer system displays (e.g., in the account user interface), via the display generation component, instructions (e.g., 1306, "hold near reader", 1212, 1308, "tap to view") to initiate a process to use the first account (e.g., the process including transmitting credentials of the first account to a terminal, such as a wireless communication terminal for NFC transactions, when the computer system is placed in a wireless field of the terminal, displaying a machine-readable code (such as a QR code), perform a transaction).

In some embodiments, in accordance with the determination that the first visual representation of the first account satisfies the set of selection criteria and in accordance with a determination that the first account is not prepared (e.g., for participating in transactions, using NFC) for use, forgoing displaying (e.g., in the account user interface), via the display generation component, instructions to initiate the process to use the first account (and, optionally, instead displaying instructions (e.g., "double-click side button") to prepare the first account for use).

Displaying instructions for the user to perform to initiate the process for using the account provides the user with visual feedback that the currently selected account is prepared for use and about what action the user should take to cause the computer system to use the account (e.g., in a transaction). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays the instructions to initiate a process to use the first account in accordance with a determination that the first account is a first type of account (e.g., an account that is NFC-capable and not machine-readable code (e.g., QR-code) capable) and by displaying instructions (e.g., 1306, textual instructions) to place the computer system within proximity (e.g., within a range of an NFC field) of a terminal (e.g., a point-of-sale terminal and/or a wireless communication terminal for NFC transactions).

In some embodiments, the computer system displays the instructions to initiate a process to use the first account in accordance with a determination that the first account is a second type of account (e.g., an account that is machine-readable code-capable and is not NFC-capable) and by displaying instructions (e.g., 1308, textual instructions) to provide an input (e.g., a tap input (1350*g*) at a location corresponding to the first visual representation) at the computer system to cause display of a readable portion of (e.g., the entirety of) a machine-readable code (e.g., a two-dimensional code (e.g., QR code) and/or a one-dimensional code (e.g., a barcode)) corresponding to the first account (e.g., the machine-readable code can be used to authorize a transaction for the account).

In some embodiments, the computer system displays the instructions to initiate a process to use the first account in accordance with a determination that the first account is a third type of account (e.g., an account that is both QR code-capable and NFC-capable) and by displaying instructions (e.g., textual instructions) (e.g. displayed alternating (each in turn, in succession, repeatedly) at the same display location) to: place the computer system within proximity (e.g., within a range of an NFC field) of the terminal (e.g., a point-of-sale terminal and/or a wireless communication terminal for NFC transactions), and provide an input (e.g., a tap input at a location corresponding to the first visual representation) at the computer system to cause display of a readable portion of (e.g., the entirety of) a machine-readable code (e.g., a two-dimensional code (e.g., QR code) and/or a one-dimensional code (e.g., a barcode)) corresponding to the first account. In some embodiments, the instructions are displayed concurrently. In some embodiments the instructions are displayed at different times (e.g., automatically alternating between displaying the instruction to place the computer system within proximity of the terminal and displaying the instruction to provide an input at the computer system to cause display of a readable portion of a machine-readable code corresponding to the first account.

Displaying instructions for the user to perform to initiate the process for using the account provides the user with visual feedback that the currently selected account is prepared for use by the computer system and about what action the user should take to cause the computer system to use the account (e.g., in a transaction). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments (e.g., when an account is an NFC-capable account), the (displayed) instructions to initiate the process to use (e.g., via NFC) the account are instructions (e.g., textual instructions) to place the computer system within proximity (e.g., within a range of an NFC field) of a terminal (e.g., a point-of-sale terminal and/or a wireless communication terminal for NFC transactions).

In some embodiments (e.g., when an account is a QR code-capable account), the (displayed) instructions to initiate the process to use (e.g., via a machine-readable code (such as a QR code)) the account are instructions (e.g., textual instructions) to provide an input (e.g., a tap input at a location corresponding to the first visual representation) at the computer system to cause display of a readable portion of (e.g., the entirety of) a machine-readable code (e.g., a two-dimensional code (e.g., QR code) and/or a one-dimensional code (e.g., a barcode)) corresponding to the account (e.g., the machine-readable code can be used to authorize a transaction for the account).

In some embodiments (e.g., when an account is both QR code-capable and NFC-capable), the (displayed) instructions to initiate the process to use (e.g., via NFC and/or via a machine-readable code (such as a QR code)) the first account are alternating instructions (e.g., textual instructions) (e.g., displayed alternating (each in turn, in succession, repeatedly) at the same display location) to: (a) place the computer system within proximity (e.g., within a range of an NFC field) of a terminal (e.g., a point-of-sale terminal), and (b) provide an input (e.g., a tap input at a location corresponding to the first visual representation) at the computer system to cause display of a readable portion of (e.g., the entirety of) a machine-readable code (e.g., a two-dimensional code (e.g., QR code) and/or a one-dimensional code (e.g., a barcode)) corresponding to the first account.

In some embodiments, subsequent to the computer system receiving the scroll input and while the computer system displays the account user interface (e.g., once the scrolling of the account user interface has stopped), in accordance with the determination that the first visual representation of the first account (e.g., 1304e in FIG. 13H) satisfies the set of selection criteria and in accordance with a determination that the first account is not available for use (e.g., the account is deactivated and/or inaccessible, the account is unable to be prepared for use in (or participation in) a transaction), the computer system displays a warning (e.g., 1316, error condition) corresponding to the first account being not available for use without displaying a balance of the first account (e.g., an amount of resources (such as available or used) of the first account) without displaying (e.g., even when the first account is not prepared for use) instructions (e.g., "double-click side button") to prepare the first account for use (e.g., to authorize and/or enable use of the first account in an NFC transaction).

Displaying a warning that the selected account is not available for use by the computer system provides the user with visual feedback about the state of the account (before the user attempts to use the account (e.g., in a transaction)). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, subsequent to using the first account (e.g., using NFC to transmit credentials of the first account to a terminal for use in a transaction and/or using a machine-readable code to participate in a transaction), the computer system displays status information (e.g., 1364a, 1374a, success, and/or failure) for the use of the first account. In some embodiments, using the first account includes transmitting (e.g., when placed into an NFC field of a terminal) account credentials (e.g., an account number) of the first account for use in a transaction. Subsequent to transmitting the account credentials, the computer system receives (e.g., from a server and/or from the terminal) information regarding the transaction. The electronic device displays status information, based on (and, optionally, in response to) the received information, indicating whether the transaction was successful or failed.

Displaying status information corresponding to the use of an account provides the user with visual feedback about whether the computer system was able to successfully use the account (e.g., in a transaction). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays the status information (e.g., 1364a, 1374a) by displaying information (e.g., transaction information) corresponding to the first account. In some embodiments, the information includes one or more of: a balance, an entry transit station, an exit transit station, a commute plan, and a number of transit trips remaining.

In some embodiments, the transaction information includes a balance (e.g., number of trips remaining on the first account when the first account is a transit account), resulting from use of the first account in the transaction. In some embodiments, the transaction information includes an indication of entry/exit transit stations used for the transaction (e.g., when the first account is a transit account). In some embodiments, the transaction information includes commute plan (e.g., month commuter plan, weekly commuter plan) details (e.g., when the first account is a transit account).

Displaying information corresponding to the use of an account provides the user with visual feedback about the account provisioned onto the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays the status information (e.g., 1364a, 1374a) in accordance with a determination that a loyalty account was used (e.g., transmitting credentials of a loyalty account to the terminal) in conjunction with use (e.g., in the same transaction as) of the first account and by displaying a visual representation of the loyalty account (e.g., 1376a). In some embodiments, the computer system displays the status information (e.g., 1364a, 1374a) in accordance with a determination that the loyalty account was not used in conjunction with use of the first account and by forgoing display of the visual representation of the loyalty account (e.g., 1376a).

Displaying a visual representation of a loyalty account when the loyalty account was used in conjunction with a payment account provides the user with visual feedback about whether the loyalty account was used by the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a loyalty account is an account of a loyalty program that provides a structured marketing effort that rewards customers/members. A loyalty account is optionally specific to one particular company, store, or chain of stores. A company (such as a retail store or chain of stores) may use a loyalty account to track purchases or other information about a user (e.g., a purchaser). The loyalty account typically entitles the user to a discount on a current or future purchase and/or an allotment of points that may be used toward future purchases or gifts. In some embodiments, loyalty accounts cannot be used for making payments.

In some embodiments, subsequent to the computer system receiving the scroll input and while the computer system displays the account user interface (e.g., once the scrolling of the account user interface has stopped), in accordance with the determination that the first visual representation of the first account satisfies the set of selection criteria and that the account user interface (or, optionally, the first visual representation of the first account) was displayed in response to a request to view information about one or more accounts without preparing the one or more accounts from the account user interface for use (e.g., 1350h, the first input was of a second input type (e.g., a tap input on a touch-sensitive surface at a location corresponding to a UI object to cause the computer system to display an application (with the account user interface) corresponding to the UI object), different from the first input type), the computer system displays, via the display generation component and overlaid on the second visual representation that has reduced visual emphasis, instructions (e.g., 1324, "double-click side button") to prepare (e.g., for participating in transactions) the first account for use (e.g., to authorize and/or enable an NFC transaction using the first account) (without enabling the second account for use).

Displaying instructions (to be performed by the user to have the computer system prepare the selected account) overlaid on a visual representation of a different account further de-emphasizes the other account (that is not selected) provides the user with additional visual feedback about which account is currently selected by the computer system and that the currently selected account is not prepared for use. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the instructions to prepare the first account for use, the computer system receives input conforming to the instructions to prepare the first account for use. In response to receiving the input conforming to the instructions to prepare the first account for use, the computer system prepares the first account for use and enlarges the (visually emphasized) first visual representation, ceases to display the instructions to prepare the first account for use, and displays (e.g., replaces the previous instructions) with instructions (e.g., overlaid on the second visual representation) to initiate the process to use the first account (e.g., instructions to place the computer system within range of a field of a terminal and/or instructions to tap on the visual representation to cause display of the machine-readable code).

In some embodiments, subsequent to the computer system receiving the scroll input and while the computer system displays the account user interface (e.g., once the scrolling of the account user interface has stopped), in accordance with the determination that the second visual representation of the second account satisfies the set of selection criteria and that the account user interface (or, optionally, the first visual representation of the first account) was displayed in response to a request to view information about one or more accounts without preparing the one or more accounts from the account user interface for use (e.g., 1350h, the first input was of a second input type (e.g., a tap input on a touch-sensitive surface at a location corresponding to a UI object to cause the computer system to display an application (with the account user interface) corresponding to the UI object), different from the first input type), and in accordance with a determination that the second account is a first type of account (e.g., an account that is NFC-capable and not machine-readable code (e.g., QR-code) capable and/or a payment account), the computer system displays, via the display generation component (e.g., overlaid on the first visual representation that has reduced visual emphasis), instructions (e.g., 1324, "double-click side button") to prepare (e.g., for participating in transactions) the second account for use (e.g., to authorize and/or enable an NFC transaction using the first account). In some embodiments, subsequent to the computer system receiving the scroll input and while the computer system displays the account user interface (e.g., once the scrolling of the account user interface has stopped), in accordance with the determination that the second visual representation of the second account satisfies the set of selection criteria and that the account user interface (or, optionally, the first visual representation of the first account) was displayed in response to a request to view information about one or more accounts without preparing the one or more accounts from the account user interface for use (e.g., 1350*h*, the first input was of a second input type (e.g., a tap input on a touch-sensitive surface at a location corresponding to a UI object to cause the computer system to display an application (with the account user interface) corresponding to the UI object), different from the first input type), and in accordance with a determination that the second account is a second type of account (e.g., an account that is machine-readable code-capable and is not NFC-capable and/or a pass account) different from the first type of account, the computer system forgoes display of, via the display generation component, instructions (e.g., 1324, "double-click side button") to prepare (e.g., for participating in transactions) the second account for use (e.g., as in FIG. 13L).

In some embodiments, a pass account is a non-payment account. For example, a pass account is a park pass that provides access to park attractions or a transit pass that provides access to transit (e.g., bus and/or train) services.

Displaying instructions (to be performed by the user to have the computer system prepare the selected account) for particular types of accounts and not displaying the instructions for other particular types of accounts provides the user with visual feedback about the type of account currently selected by the computer system and whether the account does (or does not) need to be prepared for use (e.g., is not NFC-capable and therefore doesn't need to be prepared use and/or is NFC-capable and does need to be prepared for use). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while scrolling the account user interface (e.g., once the scrolling of the account user interface has started), the computer system forgoes displaying, via the display generation component, instructions (e.g., "double-click side button") to prepare (e.g., for participating in transactions) the first account (or any account) for use (e.g., to authorize and/or enable an NFC transaction using the first account) (without enabling the second account for use) regardless of the type of request that caused the display of the account user interface (or, optionally, the first visual representation of the first account).

Forgoing displaying instructions to be performed by the user to have the computer system prepare an account while scrolling through visual representations of accounts provides the user with visual feedback that no account is currently selected by the computer system and that an account should be selected to prepare the account for use. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, instructions to prepare an account for use are not displayed when the set of selection criteria is not met for any account. In some embodiments, the set of selection criteria is not met for any account while scrolling the account user interface. In some embodiments, the set of selection criteria ceases to be met for any account in response to receiving scroll input to scroll the account user interface.

In some embodiments, prior to the computer system displaying the account user interface (e.g., 1302), the computer system receives a first input. In response to receiving the first input, the computer system displays the account user interface, the first input is a request to prepare one or more accounts from the account user interface for use (e.g., 1350*a*, a double-press of a hardware button of the computer system, an input that enables one or more accounts provisioned on the computer system for near field (e.g., NFC) communication) or a request to view information about one or more accounts without preparing the one or more accounts from the account user interface for use (e.g., 1350*h*, a tap input on a touch-sensitive surface at a location corresponding to a UI object to cause the computer system to display an application (with the account user interface) corresponding to the UI object).

Displaying the account user interface when either of two different requests are received enables the computer system to alternatively display the account user interface in different modes of operation. Displaying the account user interface in response to the requests also provides the user with visual feedback about the state of the computer system (e.g., account prepared or not prepared for use). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system receives a second user input (e.g., a tap gesture). In response to receiving the second user input and in accordance with a determination that the second user input corresponds to selection of the first visual representation of the first account (e.g., 1350*g*, 1350*j*, 1350*k*, a tap gesture at a location corresponding to the first visual representation), the computer system displays, via the display generation component, details of the first account (e.g., 1326, an expiration date of the first account, and/or one or more prior transactions of the first account).

In some embodiments, the second user input is received while displaying first visual representation of the first account and the second visual representation of the second account, wherein the visual emphasis (e.g., opacity and/or size) of the second visual representation of the second account is reduced relative to the visual emphasis of the first visual representation of the first account.

Displaying details of a selected account when the visual representation of the selected account is activated (e.g., via a tap gesture) provides the user with additional details about the selected account that are available to the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, (e.g., in accordance with a determination that the first account is a second type of account (e.g., an account that is machine-readable code-capable)), displaying details of the first account includes: in accordance with a determination that the first visual representation of the first account was displayed in response to a request to prepare one or more accounts from the account user interface for use (e.g., the first input was of a first input type (e.g., a double-press of a hardware button of the computer system and/or an input that enables one or more accounts provisioned on the computer system for near field (e.g., NFC) communication)), displaying, via the display generation component, a readable portion of (e.g., the entirety of) a machine-readable code (e.g., a two-dimensional code (e.g., QR code) and/or a one-dimensional code (e.g., a barcode)) corresponding to the first account (e.g., the machine-readable code can be used to authorize a transaction for the account); and in accordance with a determination that the first visual representation of the first account was displayed in response to a request to view information about one or more accounts without preparing the one or more accounts from the account user interface for use, displaying, via the display generation component, information (e.g., displaying the first visual representation, displaying an account name, and/or displaying an image) corresponding to the first account without displaying the readable portion of (e.g., the entirety of) the machine-readable code corresponding to the first account.

In some embodiments, the details (e.g., 1326) of the first account includes additional information pertaining to a previously displayed error indication (e.g., a previously displayed warning corresponding to the first account being not available for use). In some embodiments, the additional information provides one or more reasons for why the account is not available for use (e.g., the account is expired and/or the account balance is at (or below a threshold) value (e.g., 0)). In some embodiments, the additional information is displayed below visual representation of the respective account.

Displaying information about a previously displayed warning when the visual representation of the selected account is activated (e.g., via a tap gesture) provides the user with additional details about the state of the computer system and, in particular, about the warning. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1400 (e.g., FIG. 14) are also applicable in an analogous manner to the methods described above. For example, methods 700, 900, and 1100 optionally include one or more of the characteristics of the various methods described above with reference to method 1400. For brevity, these details are not repeated below.

FIG. 15 is a flow diagram illustrating a method for authorizing transfer accounts in accordance with some embodiments. Method 1500 is performed at a computer system (e.g., 100, 300, 500, 600*a*, 600*b*, 800, 1000, 1050, 1200, 1600) that is in communication with a display generation component (e.g., 602*a*, 602*b*, 802, 1002, 1052, 1202, 1602) and one or more input devices (e.g., a touch-sensitive surface, a camera, a fingerprint sensor, and/or a biometric sensor). Some operations in method 1500 are, optionally, combined, the orders of some operations are, optionally, changed, and some operations are, optionally, omitted.

As described below, method 1500 provides an intuitive way for authorizing transfer accounts linked (e.g., provisioned) to the computer system. The method reduces the cognitive burden on a user when using a particular transfer account linked to the computer system. For battery-operated computing systems, enabling a user to utilize a particular transfer account more easily conserves power and increases the time between battery charges.

In method 1500, computer system (e.g., 1200, a smart device, such as a smartphone or a smartwatch; a mobile device) is in communication with a display generation component (e.g., 1202) and one or more input devices (e.g., touch-sensitive surface and/or hardware button). The computer system receives (1502), via the one or more input devices (e.g., via the touch-sensitive surface and/or via the hardware button), a first input (e.g., 1350*a*, 1350*h*).

In response to receiving the first input (e.g., 1350*a*, 1350*h*) (1504), the computer system displays (1506), via the display generation component, an account user interface (e.g., 1208, 1302) that includes a first visual representation of a first account (e.g., 1210*b*, 1304*c*, the account user interface including the first visual representation of the first account and, optionally, a second visual indication of a second account). In some embodiments, in response to receiving the first input and in accordance with a determination that the first input is of the first input type, the computer system enables one or more accounts (e.g., the second account) of a plurality of accounts for NFC communication. In some embodiments, in response to receiving the first input and in accordance with a determination that the first input is of the second input type, the computer system forgoes enabling the one or more accounts (e.g., the second account) of the plurality of accounts for NFC communication.

While the computer system displays the first visual representation of the first account (e.g., in the selection region, with indications of other accounts de-emphasized), the computer system receives (1508), via the one or more input devices (e.g., via the touch-sensitive surface), a second input (e.g., 1350*g*, 1350*k*, touch gesture at a location corresponding to, tap on) corresponding to selection of the first visual representation of the first account.

In response to receiving the second input corresponding to selection of the first visual representation of the first account (1510) and in accordance with a determination that the first visual representation of the first account was displayed in response to a request to prepare one or more accounts from the account user interface for use (e.g., the first input was of a first input type (e.g., 1350*a*, a double-press of a hardware button of the computer system and/or an input that enables one or more accounts provisioned on the computer system for near field (e.g., NFC) communication)), the computer system displays (1512), via the display generation component, a readable portion of (e.g., the entirety of) a machine-readable code (e.g., a two-dimensional code (e.g., QR code) and/or a one-dimensional code (e.g., a barcode)) corresponding to the first account (e.g., 1310 at FIG. 13G, the machine-readable code can be used to authorize a transaction for the account, the readable portion of the machine-readable code is a complete machine-readable code that can be scanned (e.g., optically scanned) by an external device to identify the first account). In response to receiving the second input corresponding to selection of the first visual representation of the first account (1510) and in accordance with a determination that the first visual representation of the first account was displayed in response to a request to view information about one or more accounts without preparing the one or more accounts from the account user interface for use (e.g., the first input was of a second input type (e.g., 1350*h*, a tap input on a touch-sensitive surface at a location corresponding to a UI object to cause the computer system to display an application (with the account user interface) corresponding to the UI object), different from the first input type), the computer system displays (1514), via the display generation component, information (e.g., displaying the first visual indication, displaying an account name, and/or displaying an image) corresponding to the first account without displaying the readable portion of (e.g., the entirety of) the machine-readable code corresponding to the first account (e.g., 1326 at FIG. 13M). In some embodiments, receiving scroll input while displaying the information causes the information to scroll off of the display and a (e.g., not full screen) machine-readable code (e.g., a two-dimensional code (e.g., QR code) and/or a one-dimensional code (e.g., a barcode)) corresponding to the first account to scroll onto the display. In some embodiments, pausing on the machine-readable code causes the machine readable code to be displayed in a full screen mode.

Alternatively displaying a readable portion of a machine-readable code of an account or information corresponding to the account based on the type of request that caused display of the account user interface provides the user with the information the user is likely to be trying to access, thereby reducing the number of inputs the user should provide to access that information. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, via the display generation component, the readable portion of (e.g., the entirety of) a machine-readable code (e.g., a two-dimensional code (e.g., QR code) and/or a one-dimensional code (e.g., a barcode)) corresponding to the first account (e.g., 1310 at FIG. 13G, displayed in accordance with the determination that the first visual representation of the first account was displayed in response to the request to prepare one or more accounts from the account user interface for use) at a first brightness level. In some embodiments, the information (e.g., displaying the first visual indication, displaying an account name, and/or displaying an image) corresponding to the first account (e.g., 1326 at FIG. 13M, displayed in accordance with a determination that the first visual representation of the first account was displayed in response to a request to view information about one or more accounts without preparing the one or more accounts from the account user interface for use) is displayed via the display generation component at a second brightness level that is less than the first brightness level.

In some embodiments, in response to receiving the second input corresponding to selection of the first visual representation of the first account and in accordance with a determination that the first visual representation of the first account was displayed in response to a request to prepare one or more accounts from the account user interface for use, the computer system increases (e.g., to a maximum brightness and/or to a predefined brightness) the display brightness of the display generation component. In some embodiments, in response to receiving the second input corresponding to selection of the first visual representation of the first account and in accordance with a determination that the first visual representation of the first account was displayed in response to a request to view information about one or more accounts without preparing the one or more accounts from the account user interface for use, the computer system forgoes increasing (e.g., to the maximum brightness and/or to the predefined brightness) the display brightness and, optionally, maintains the display brightness.

Increasing the brightness of displayed content when the displayed content is intended to be optically ready by an external device (e.g., a terminal) enables the computer system to better (e.g., from a further distance and/or in more types of lighting conditions) communicate the displayed content to the external device. Increasing the brightness without requiring further user input enhances the operability of the device and makes the user-device interface more efficient (e.g., by helping the computer system to provide displayed content and reducing user mistakes) which, additionally, reduces power usage and improves battery life of the device by enabling the user to use the device more quickly and efficiently.

In some embodiments, while the computer system displays the readable portion of (e.g., the entirety of) the machine-readable code (e.g., a two-dimensional code (e.g., QR code) and/or a one-dimensional code (e.g., a barcode)) corresponding to the first account (e.g., 1310 at FIG. 13G), the computer system receives, via the one or more input devices, a scroll input (e.g., 1350*l*, swipe on the touch-sensitive surface, and/or rotation of the rotatable input mechanism). In response to receiving the scroll input (e.g., 1350*l*), the computer system displays details (e.g., 1326*b*-326*j*, information corresponding to the first account; an expiration date of the first account, one or more prior transactions of the first account, travel information corresponding to the first account, and/or address information corresponding to the first account) of the first account (e.g., by scrolling at least a portion of the machine-readable code off of the display generation component and concurrently scrolling the details onto the display generation component).

Displaying details of an account via a scroll input (received while displayed the readable portion of the machine-readable code) provides the user with additional details about the account that are available to the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, details are displayed via the display generation component at the first brightness level that is more than the second brightness level at which the machine-readable code was displayed.

In some embodiments, the displayed information corresponding to the first account includes a visual representation of the first account (e.g., 1326 at FIG. 13M), at least some of (e.g., not all of) the portion of the machine-readable code (e.g., 1310 at FIG. 13M), and one or more details (e.g., 1326*a*, an indication that the account has a particular status, such as TSA pre-check) of the first account, the one or more details of the first account displayed between the visual representation of the first account and the at least some of the portion of the machine-readable code.

Displaying one or more details of an account positioned between the visual representation of the account and the machine-readable code corresponding to the account provides the user with additional details about the account that are available to the computer system, and which are displayed while scrolling to display the machine-readable code. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, visual representations of accounts of a first type (e.g., 1304a in FIG. 13B, a payment accounts, corresponding to payment cards) are displayed in the account user interface with a respective height (e.g., a height that is less than a height of the display) and visual representations of accounts of a second type (e.g., 1304b in FIG. 13B, non-payment accounts, corresponding to non-payment passes) are displayed in the account user interface with the respective height.

In some embodiments, visual representations are displayed in the account user interface with a same height (and, optionally, same shape and size) independent of the type of account the visual representation represents (e.g., a visual representation of a payment account is the same height (and, optionally, size) as a visual representation of a pass account).

Displaying visual representations of various types of accounts using the same height enables the computer system to provide the user with feedback about what displayed objects are visual representations of accounts (e.g., if an object has a specific height, the user can have confidence that it corresponds to an account). Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first visual representation of the first account (e.g., 1304c) includes display of one or more data corresponding to the first account, the one or more data selected from a plurality of data corresponding to the first account (e.g., selected based on one or more rules, such as prioritization rules based on the type of data available for the first account). In some embodiments, the first visual representation of the first account does not include other data of the plurality of data corresponding to the first account.

Displaying one or more data corresponding to the first account as part of the visual representations enables the computer system to provide the user with feedback about the accounts, thereby better allowing the user to select the intended account without needing to select multiple accounts to find the intended account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more data includes data (e.g., passenger name, travel date, travel company, and/or travel destination) to disambiguate the first visual representation of the first account from other visual representations of other accounts of the account user interface. In some embodiments, the data to disambiguate the first visual representation is selected based on disambiguating the first visual representation from the other visual representations of other accounts of the account user interface.

In some embodiments, the one or more data of the first visual representation of the first account includes different information as compared to one or more data of a second visual representation of a second account, thereby enabling the two visual representations and their corresponding accounts to be separately identified by the user.

Displaying one or more data to disambiguate the first account from other accounts enables the computer system to provide the user with feedback about the account, thereby better allowing the user to select the intended account without needing to select multiple accounts to find the intended account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more data includes an indication (e.g., a logo of a merchant, a store name, and/or a name of an application) of a source of the first account.

Displaying an indication of a source of the first account enables the computer system to provide the user with feedback about the account, thereby better allowing the user to select the intended account without needing to select multiple accounts to find the intended account. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the account user interface that includes the first visual representation of a first account, the computer system receives a second scroll input (e.g., 1350c, swipe on the touch-sensitive surface, and/or rotation of the rotatable input mechanism). In response to receiving the second scroll input, the computer system displays in the account user interface, via the display generation component, a second visual representation of a second account (e.g., 1304d, by scrolling the first visual representation on the display generation component and scrolling the second visual representation of the second account onto the display generation component). Subsequent to the computer system receiving the second input corresponding to selection of the first visual representation of the first account (e.g., while displaying the information (e.g., displaying an account name, displaying an image, and/or displaying a non-readable/incompletion part of the machine-readable code) corresponding to the first account without displaying the readable portion of (e.g., the entirety of) the machine-readable code corresponding to the first account), the computer system receives a third scroll input (e.g., 1350l, swipe on the touch-sensitive surface, and/or rotation of the rotatable input mechanism). In response to receiving the third scroll input, the computer system displays additional information (e.g., 1326b-1326h, account details, such as an expiration date, a name of an account holder, a travel date, flight information, and/or billing address) corresponding to the first account (e.g., without displaying information corresponding to another account).

Displaying additional visual representations of other accounts when receiving a scroll input while displaying the account user interface and displaying details about the first account while displaying the machine-readable code of the first account enables the computer system to provide the user with feedback on the other content (accounts vs. details) of the respective user interface being accessed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first account is a loyalty account (or non-payment account). In some embodiments, in response to using the first account (e.g., as shown in FIG. 13V-13W, in a process, such as a merchant or purchase transaction; transmitting, such as by NFC, credentials of the first account to a terminal; and/or providing a computer-generated code to a terminal) (and, optionally, in accordance with a determination that the first account is a non-payment account (or a loyalty account)), the computer system displays a second visual indication of a second account (e.g., 1304a) for use (e.g., in the same process), the second account is a payment account.

In some embodiments, the first account is a loyalty account and the second account is a payment account. The computer system detects that the loyalty account was used in a transaction and prompts the user to use the payment account as part of the same transaction. In some embodiments, after using a loyalty account the computer system prompts (e.g., via display) for use of a payment account.

Displaying a visual indication of a second account after use of a first account enables the computer system to provide the user with a more direct access to an account that is likely to be used (e.g., user is likely to use the second account after using the first account). Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays, via the display generation component, a readable portion of (e.g., the entirety of) the machine-readable code corresponding to the first account by scrolling (e.g., as in FIGS. 13F-13G), via the display generation component, content (e.g., a visual representation of the first account, one or more details (e.g., an indication that the account has a particular status, such as TSA pre-check) of the first account, at least some of (e.g., not all of) the portion of the machine-readable code) to display the readable portion of (e.g., the entirety of) the machine-readable code corresponding to the first account.

Scrolling through content corresponding to the first account to display the machine-readable code corresponding to the first account provides the user with feedback on how to access the content (e.g., by scrolling) once the machine-readable code is displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays information (e.g., displaying the first visual indication, displaying an account name, and/or displaying an image) corresponding to the first account without displaying the readable portion of (e.g., the entirety of) the machine-readable code corresponding to the first account (e.g., as shown in FIG. 13M), the computer system receives a fourth scroll input (e.g., 1350*l*, swipe on the touch-sensitive surface, and/or rotation of the rotatable input mechanism). In response to receiving the fourth scroll input, the computer system scrolls the additional information. Subsequent to scrolling the additional information and in accordance with a determination that the readable portion of (e.g., the entirety of) the machine-readable code corresponding to the first account is displayed in a selection region (e.g., of the display generation component and/or of the user interface) for at least a threshold amount of time (e.g., a non-zero threshold amount of time), the computer system increases (e.g., to a maximum brightness and/or to a predefined brightness) the brightness with which the readable portion of (e.g., the entirety of) the machine-readable code is displayed. In some examples, the brightness of the readable portion of the machine-readable code is increased by increase the display brightness of the display generation component.

Increasing the brightness of displayed content when the displayed content is intended to be optically ready by an external device (e.g., a terminal) enables the computer system to better (e.g., from a further distance and/or in more types of lighting conditions) communicate the displayed content to the external device. Increasing the brightness without requiring further user input enhances the operability of the device and makes the user-device interface more efficient (e.g., by helping the computer system to provide displayed content and reducing user mistakes) which, additionally, reduces power usage and improves battery life of the device by enabling the user to use the device more quickly and efficiently.

In some embodiments, subsequent to scrolling the additional information, in accordance with a determination that the readable portion of the machine-readable code corresponding to the first account is not displayed in the selection region for at least the threshold amount of time, the computer system foregoes increase the brightness with which content (if a part of (not all of) the machine-readable code) is displayed.

In some embodiments, subsequent to scrolling the additional information, in accordance with a determination that the readable portion of (e.g., the entirety of) the machine-readable code corresponding to the first account is displayed in a selection region (e.g., of the display generation component and/or of the user interface) for at least a threshold amount of time (e.g., a non-zero threshold amount of time), the computer systems updates display of the machine-readable code to be in a full-screen display.

In some embodiments, subsequent to using the first account and in accordance with a determination that the first account is a pass of a group of passes (e.g., amusement park passes for family), automatically displaying a visual representation of a subsequent pass of the group of passes and prepare the subsequent pass for use without requiring additional user input. In some embodiments, subsequent to using the first account and in accordance with a determination that the first account is a pass of a group of passes (e.g., amusement park passes for family), automate the process for using a subsequent pass of the group of passes, such as illustrated and described with respect to FIGS. 8A-8F and 9.

Note that details of the processes described above with respect to method 1500 (e.g., FIG. 15) are also applicable in an analogous manner to the methods described above. For example, methods 700, 900, 1100, and 1400 optionally include one or more of the characteristics of the various methods described above with reference to method 1500. For brevity, these details are not repeated below.

FIG. 16A illustrates an electronic device 1600 with display 1602 (e.g., touch screen) and one or more input devices (e.g., side button 1604). At FIG. 16A, electronic device 1600 displays, on display 1602, account user interface 1606 (e.g., similar to account user interface 1700 described below with reference to FIG. 17A). Electronic device 1600 displays a plurality of user interface objects 1608 associated with respective computer storage accounts of a user on account user interface 1606. The respective computer storage accounts of the user include a various amounts of (e.g., cloud-based) computer storage resources. In some embodiments, different types of data (e.g., data corresponding to photo files, data corresponding to document files, data corresponding to music files, data corresponding to video files, and/or data corresponding to application files) can be stored and/or archived in the computer storage resources associated with the computer storage accounts. Accordingly, in response to detecting user input corresponding to a selection of a user interface object of the plurality of user interface objects 1608, electronic device 1600 displays information related to the computer storage resources (e.g., amount of data available and/or amount of data consumed) associated with the respective computer storage account corresponding to the selected user interface object.

At FIG. 16A, electronic device 1600 displays storage card user interface object 1608a, memory user interface object 1608b, shared data user interface object 1608c, distributed storage account user interface object 1608d, remote storage account user interface object 1608e, and back up storage account user interface object 1608f on account user interface 1606.

A user of electronic device 1600 may wish to search for various transfers of files and/or transfers of storage allocation related to computer storage resources of the computer storage accounts. As set forth below with reference to FIGS. 16B and 16C, account user interface 1606 enables the user to search a specific computer storage account represented by a particular user interface object of the plurality of user interface objects 1608 and to search multiple (e.g., all) computer storage accounts linked to electronic device 1600.

At FIG. 16A, electronic device 1600 detects tap gesture 1650a on search user interface object 1606a (e.g., universal search user interface object). In response to detecting tap gesture 1650a, electronic device 1600 displays universal search user interface 1610, as shown at FIG. 16B (e.g., universal search user interface 1610 displays search results after electronic device 1600 detects user inputs corresponding to a search term). Alternatively, at FIG. 16A, electronic device 1600 detects tap gesture 1650b on storage card user interface object 1608a. In response to detecting tap gesture 1650b, electronic device 1600 displays a details user interface (e.g., similar to details user interface 1710, described below with reference to FIG. 17B). At FIG. 16B, while displaying the details user interface, electronic device 1600 detects a tap gesture on search user interface object of the details user interface. In response to detecting the tap gesture, electronic device displays single account search user interface 1612, as shown at FIG. 16C (e.g., single account search user interface 1612 displays search results after electronic device 1600 detects user inputs corresponding to a search term).

At FIG. 16B, universal search user interface 1610 includes search bar user interface object 1610a, search narrowing area 1614, account area 1616, deletions area 1618, and transactions area 1620. Universal search user interface 1610 includes results that match search term 1610b ("Document") input into search bar user interface object 1610a via user input. As such, electronic device 1600 compares search term 1610b to data files, computer storage accounts, transactions (e.g., reallocation of storage), and/or other information related to computer storage accounts for multiple (e.g., all) computer storage accounts linked to electronic device. For example, account area 1616 of universal search user interface 1610 includes particular computer storage accounts (e.g., "Cards") that include information based on (e.g., that matches) search term 1610b. In some embodiments, user input on account user interface object 1616a and/or account user interface object 1616b causes electronic device 1600 to display details associated with a particular computer storage account that is relevant to search term 1610b.

At FIG. 16C, single account search user interface 1612 includes search bar user interface object 1612a, search narrowing area 1622, categories area 1624, programs area 1626, and transactions area 1628. As set forth above, results displayed in single account search user interface 1612 are associated with a single computer storage account (e.g., computer storage account represented by storage card user interface object 1608a). Accordingly, single account search user interface 1612 includes only data files, transactions, and/or other information related to a single computer storage account (e.g., computer storage account represented by storage card user interface object 1608a). Single account search user interface 1612 does not include accounts area 1616 because results only include information from a single computer storage account that is searched by electronic device 1600. Therefore, user interface objects included in search narrowing area 1622, categories area 1624, programs area 1626, and transactions area 1628 are specific to the single computer storage account (e.g., computer storage account represented by storage card user interface object 1608a).

Turning now to FIGS. 17A-17N, FIG. 17A illustrates electronic device 1600 displaying account user interface 1700 for a transfer account application of electronic device 1600. At FIG. 17A, account user interface 1700 includes a plurality of user interface objects 1702 associated with respective transfer accounts (e.g., payment accounts, such as a third-party credit card account, a debit card account, and/or a stored-value account; pass accounts; ticket accounts; point accounts; rewards accounts; and/or transit accounts) linked to (e.g., provisioned onto) electronic device 1600. In some embodiments, a user can provision electronic device 1600 with one or more transfer accounts and use the transfer accounts to conduct transfers. For example, upon receiving access to the transfer account of a user, electronic device 1600 receives and stores credentials associated with the transfer account (e.g., account numbers, pin codes, authorization codes, pass codes, card number, balance information, and/or address) in a secure element of electronic device 1600. Electronic device 1600 releases (e.g., transmits) the credentials associated with the transfer account to a terminal (e.g., a wireless communication terminal and/or an NFC terminal) when the transfer account is activated and/or authorized by the user (e.g., via user input 1750*i* at FIG. 17L, user input 1750*k* at FIG. 17M, and/or user input 1750*l* at FIG. 17N).

Similar to account user interface 1606, account user interface 1700 includes search user interface object 1700*a* (e.g., universal search user interface object) and plurality of user interface objects 1702 corresponding to respective transfer accounts linked to electronic device 1600. In some embodiments, account user interface 1700 separates the plurality of user interface objects 1702 into a transfer account area 1704 and a pass account area 1706. At FIG. 17A, transfer account area 1704 includes user interface objects representing transfer accounts used to conduct transactions and pass account area 1706 includes user interface objects representing transfer accounts used to provide entry to an event (e.g., a ticket), provide entry to a transportation service (e.g., a boarding pass and/or a transit card), and/or transfer and accumulate rewards and/or points for particular transactions (e.g., rewards cards and/or loyalty cards). At FIG. 17A, transfer account area 1704 includes transfer card user interface object 1702*a*, Bank of Alaska user interface object 1702*b*, and Alaska Fly Premium user interface object 1702*c*. Additionally, pass account area 1706 includes boarding pass user interface object 1702*d*, frequent shopper user interface object 1702*e*, and concert ticket user interface object 1702*f*.

As set forth above with reference to FIGS. 16A-16C, a user of electronic device 1600 may wish to conduct searches related to data or information of transfer accounts linked to electronic device 1600. In some cases, a user is interested in searching a particular transfer account, whereas in other cases, the user is interested in generally search multiple (e.g., all) transfer accounts linked to electronic device 1600. As such, account user interface 1700 provides options to search both particular transfer accounts (e.g., single account search of a transfer account represented by a respective user interface object of the plurality of user interface objects 1702) and multiple (e.g., all) transfer accounts linked to electronic device 1600 (e.g., a universal search).

At FIG. 17A, electronic device detects tap gesture 1750*a* on transfer card user interface object 1702*a* to initiate a process for conducting a single account search. In response to detecting tap gesture 1750*a*, electronic device 1600 displays transfer card details user interface 1710 at FIG. 17B. Alternatively, at FIG. 17A, electronic device 1600 detects tap gesture 1750*b* on search user interface object 1700*a* to initiate a process for conducting a universal search. In response to detecting tap gesture 1750*b*, electronic device 1600 displays universal search user interface 1712 at FIG. 17E.

At FIG. 17B, electronic device 1600 displays transfer card details user interface 1710. Transfer card details user interface 1710 is specific to the transfer account represented by transfer card user interface object 1702*a*. Accordingly, transfer card details user interface 1710 displays details and information related to (e.g., only) the transfer account represented by transfer card user interface object 1702*a*. For example, transfer card details user interface 1710 includes transfer card user interface object 1702*a*, balance user interface object 1710*a*, weekly activity user interface object 1710*b*, payment user interface object 1710*c*, and latest transactions area 1714.

At FIG. 17B, electronic device 1600 detects tap gesture 1750*c* on search user interface object 1710*d* (e.g., single account search user interface object). In response to detecting tap gesture 1750*c*, electronic device 1600 displays single account search user interface 1716, as shown at FIG. 17C.

At FIG. 17C, single account search user interface 1716 includes search bar user interface object 1716*a*, cancel user interface object 1716*b*, search options area 1718, and keyboard user interface object 1716*c*. At FIG. 17C, electronic device 1600 detects tap gesture 1750*d* on search bar user interface object 1716*a*. In some embodiments, electronic device 1600 displays keyboard user interface object 1716*c* in response to detecting tap gesture 1750*d*. In some embodiments, electronic device 1600 maintains display of keyboard user interface object 1716*c* in response to detecting tap gesture 1750*d*. Additionally, electronic device 1600 detects one or more user inputs (e.g., one or more tap gestures) on keyboard user interface object 1716*c*. The one or more user inputs on keyboard user interface object 1716*c* correspond to a search term (e.g., text) that a user wishes to search (e.g., search the single transfer account represented by transfer card user interface object 1702*a*). In some embodiments, electronic device 1600 further detects user input that causes electronic device 1600 to conduct the search of the search term (e.g., search the single transfer account represented by transfer card user interface object 1702*a* for the search term). In response to detecting the user input, electronic device 1600 displays single account search results user interface 1720 at FIG. 17D. In some embodiments, electronic device 1600 displays single account search results user interface 1720 at FIG. 17D when electronic device 1600 detects a first input of the one or more user inputs on keyboard user interface object 1716*c* (e.g., electronic device 1600 begins to display and update search results on single account search results user interface 1720 as letters and/or numbers are typed into search bar user interface object 1716*a*).

At FIG. 17D, electronic device 1600 displays single account search results user interface 1720 for search term 1720*a* ("Alaska"). Single account search results user interface 1720 includes narrowing search area 1722, categories area 1724, merchants area 1726, and transactions area 1728. Electronic device 1600 displays narrowing criteria user interface objects 1722*a-d* as suggestions for search terms to be added to search bar user interface object 1720*b* in addition to search term 1720*a* and based on search term 1720*a* (e.g., narrowing criteria user interface objects 1722*a-d* correspond to additional search terms that are relevant to search term 1720*a*). Accordingly, in response to detecting user input on one of the narrowing criteria user interface objects 1722*a-d*, electronic device 1600 adds a term represented by the selected narrowing criteria user interface object to search bar user interface object 1720*b*. As such, a search of the transfer account represented by transfer card user interface object 1702*a* is conducted for data and/or information based on (e.g., that matches) search term 1720*a* and/or the additional term represented by the selected one of narrowing criteria user interface objects 1722*a-d*.

Categories area 1724 includes category user interface objects 1724*a-c*. In some embodiments, electronic device 1600 displays particular category user interface objects 1724*a-c* that are based on search term 1720*a*. For example, electronic device 1600 determines that the transfer account represented by transfer card user interface object 1702*a* was used to purchase groceries in the state of Alaska and/or at a particular grocery store that includes a name with the term "Alaska." Accordingly, the category user interface objects 1724*a-c* are specific to (e.g., selected based on) both search term 1720*a* and the transfer account represented by transfer card user interface object 1702*a*.

Similarly, merchants area 1726 includes merchant user interface objects 1726*a-d*. In some embodiments, electronic device 1600 displays particular merchant user interface objects 1726*a-d* that are based on search term 1720*a*. For example, electronic device 1600 determines that the transfer account represented by transfer card user interface object 1702*a* was used to make purchases at merchants in the state of Alaska and/or at a particular merchant that includes a name with the term "Alaska." Accordingly, the merchant user interface objects 1726*a-d* are specific to both search term 1720*a* and the transfer account represented by transfer card user interface object 1702*a*.

At FIG. 17D, transactions area 1728 includes first transaction user interface object 1728*a* corresponding to a transaction for purchasing Alaskan Jade and second transaction user interface object 1728*b* corresponding to a transaction for purchasing donuts at Donut Shop in the state of Alaska. Both first transaction user interface object 1728*a* and second transaction user interface object 1728*b* correspond to purchases associated with the transfer account represented by transfer card user interface object 1702*a*. Electronic device 1600 matches data and/or information associated with the transfer account represented by transfer card user interface object 1702*a* to search term 1720*a* to determine the particular transactions included in transactions area 1728. Therefore, results included in single account search results user interface 1720 are specific to (e.g., only) the transfer account represented by transfer card user interface object 1702*a*. In other words, single account search results user interface 1720 includes information associated with the transfer account represented by transfer card user interface object 1702*a*, but does not include information (e.g., transactions) associated with the transfer accounts represented by the remaining user interface objects of the plurality of user interface objects 1702.

As set forth above, electronic device 1600 displays universal search user interface 1712 in response to detecting user input 1750*b*, as shown at FIG. 17E. As set forth above, universal search user interface 1712 is not specific to one transfer account linked to electronic device 1600. Therefore, universal search user interface 1712 enables a user to search for data and/or information associated with multiple (e.g., all) transfer accounts linked to electronic device 1600.

At FIG. 17E, universal search user interface 1712 includes search bar user interface object 1712*a*, cancel user interface object 1712*b*, search options area 1730, and keyboard user interface object 1712*c*. At FIG. 17E, electronic device 1600 detects tap gesture 1750*e* on search bar user interface object 1712*a*. In some embodiments, electronic device 1600 displays keyboard user interface object 1712*c* in response to detecting tap gesture 1750*e*. In some embodiments, electronic device 1600 maintains display of keyboard user interface object 1712*c* in response to detecting tap gesture 1750*e*. Additionally, electronic device 1600 detects one or more user inputs (e.g., one or more tap gestures) on keyboard user interface object 1712*c*. The one or more user inputs on keyboard user interface object 1716*c* correspond to a search term (e.g., text) that a user wishes to search (e.g., search the multiple (e.g., all) transfer accounts linked to electronic device 1600). In some embodiments, electronic device 1600 further detects user input that causes electronic device 1600 to conduct the search of the search term (e.g., search multiple (e.g., all) transfer accounts linked to electronic device 1600 for the search term). In response to detecting the user input, electronic device 1600 displays universal search results user interface 1732 at FIG. 17F. In some embodiments, electronic device 1600 displays universal search results user interface 1732 at FIG. 17F when electronic device 1600 detects a first input of the one or more user inputs on keyboard user interface object 1712*c* (e.g., electronic device 1600 begins to display and update search results on universal search results user interface 1732 as letters and/or numbers are typed into search bar user interface object 1712*a*).

At FIG. 17E, search options area 1730 includes categories area 1733, merchants area 1734, and people area 1736. In some embodiments, user interface objects included in search options area 1730 are based on a search history of the user. In some embodiments, user interface objects included in search options area 1730 are based on the one or more user inputs detected on keyboard user interface object 1712*c* (e.g., user interface objects of search options area 1730 are updated as the user types). Search options area 1730 enables a user to select user interface objects related to a particular category, merchant, or person in lieu of entering a search term in search bar user interface object 1712*a* (e.g., via keyboard user interface object 1712*c*). For instance, electronic device 1600 detects tap gesture 1750*f* on groceries category user interface object 1733*a*. In response to detecting tap gesture 1750*f*, electronic device 1600 displays groceries category user interface 1738, as shown at FIG. 17G. Alternatively, electronic device 1600 detects tap gesture 1750*g* on food market user interface object 1734*a*. In response to detecting tap gesture 1750*g*, electronic device 1600 displays food market user interface 1740, as shown at FIG. 17H. As discussed below with reference to FIGS. 17G and 17H, selecting different user interface objects related to different categories, merchants, and/or people enable electronic device 1600 to display (and a user to view) the same data and/or information (e.g., the same transaction) associated with a transfer account linked to electronic device 1600.

At FIG. 17F, electronic device 1600 displays universal search results user interface 1732 for search term 1732*a* ("Alaska", received via input by the user). Similar to single account search results user interface 1720, universal search results user interface 1732 includes narrowing search area 1742 and transactions area 1744. Universal search results user interface 1732 also include transfer accounts area 1746 and passes area 1748.

Electronic device 1600 displays narrowing criteria user interface objects 1742*a-d* as suggestions for search terms to be added to search bar user interface object 1732*b* in addition to search term 1732*a* and based on search term 1732*a* (e.g., narrowing criteria user interface objects 1742*a-d* correspond to additional search terms that are relevant to search term 1732*a*). Accordingly, in response to detecting user input on one of narrowing criteria user interface objects 1742*a-d*, electronic device 1600 adds a term represented by the selected narrowing criteria user interface object to search bar user interface object 1732*b*. As such, a search of multiple (e.g., all) transfer accounts linked to electronic device 1600 is conducted for data and/or information (e.g., transactions) based on (e.g., that matches) search term 1732*a* and/or the additional term represented by the selected one of narrowing criteria user interface objects 1742*a-d*.

Transfer accounts area 1746 includes particular transfer accounts linked to electronic device 1600 that are relevant to search term 1732*a* (e.g., include a name that includes search term 1732*a* and/or include data and/or information based on (e.g., that matches) search term 1732*a*). At FIG. 17F, electronic device 1600 displays transfer account user interface objects 1746*a-b*. In some embodiments, transfer account user interface objects 1746*a-b* correspond to transfer accounts having a name that includes search term 1732*a* (or is similar to search term 1732*a*). In some embodiments, transfer account user interface objects 1746*a-b* correspond to transfer accounts having data and/or information that includes search term 1732*a* (or is similar to or relevant to search term 1732*a*). Accordingly, universal search results user interface 1732 includes results corresponding to transfer accounts linked to electronic device 1600, such that results of universal search results user interface 1732 are not limited to one specific transfer account. In some embodiments, selecting 1746*a* (e.g., a tap gesture on 1746*a*) causes display of the user interface shown in FIG. 17I.

Similarly, passes area 1748 includes particular passes (e.g., boarding passes, transit passes, and/or tickets) associated with transfer accounts linked to electronic device 1600 that are relevant to search term 1732*a* (e.g., include data and/or information (e.g., transactions) selected based on (e.g., that matches) search term 1732*a*). At FIG. 17F, electronic device 1600 displays pass user interface objects 1748*a-c*. In some embodiments, pass user interface objects 1748*a-c* correspond to passes of transfer accounts having a name that includes search term 1732*a* (or is similar to search term 1732*a*). In some embodiments, pass user interface objects 1748*a-c* correspond to passes of transfer accounts having data and/or information that includes search term 1732*a* (or is similar to or relevant to search term 1732*a*). The transfer accounts represented by pass user interface objects 1748*a-c* can be different from one another, the same as one another, or include any combination of transfer accounts linked to electronic device 1600. As such, universal search results user interface 1732 includes results of relevant passes of any transfer account linked to electronic device 1600 and are not limited to a specific transfer account.

At FIG. 17F, transactions area 1744 includes first transaction user interface object 1744*a* corresponding to a transaction for purchasing Alaskan Jade (e.g., the same transaction corresponding to first transaction user interface object 1728*a* at FIG. 17D) and second transaction user interface object 1744*b* corresponding to a transaction for purchasing Alaskan Crab (e.g., a transaction from a different transfer account than the transfer account associated with transfer card user interface object 1702*a*). First transaction user interface object 1744*a* corresponds to the same transaction as first transaction user interface object 1728*a* of single account search results user interface 1720. Accordingly, when searching the same term in single account search user interface 1716 and universal search user interface 1712, results for the same transaction can be displayed by electronic device 1600. Further, second transaction user interface object 1744*b* corresponds to a purchase that is not displayed in single account search results user interface 1720. Thus, second transaction user interface object 1744*b* corresponds to a transfer account that is different from the transfer account represented by transfer card user interface object 1702*a* (e.g., the transfer account searched to display single account search results user interface 1720). To determine the transactions to display in transactions area 1744, electronic device 1600 optionally searches for (e.g., matches) search term 1720*a* for data and/or information associated with multiple (e.g., all) transfer accounts linked to electronic device 1600. Therefore, results included in universal search results user interface 1732 are associated with multiple (e.g., all) transfer accounts linked to electronic device 1600 and not to one particular transfer account.

As set forth above, electronic device 1600 optionally displays the same data and/or information associated with one or more transfer accounts linked to electronic device 1600 in response to selection of different user interface objects included in search options area 1730 of universal search user interface 1712. At FIG. 17G, electronic device 1600 displays groceries category user interface 1738 in response to detecting tap gesture 1750*f*. At FIG. 17G, groceries category user interface 1738 includes search bar user interface object 1738*a*, search term 1738*b* included in search bar user interface object 1738*a* (e.g., selection of groceries category user interface object 1732*a* causes a search for "groceries"), narrowing search area 1752, transactions area 1754, and locations area 1756.

Similar to narrowing search area 1722 and narrowing search area 1742, narrowing search area 1752 includes narrowing criteria user interface objects 1752*a-d* as suggestions for search terms to be added to search bar user interface object 1738*a* in addition to search term 1738*b* and based on search term 1738*b* (e.g., narrowing criteria user interface objects 1752*a-d* correspond to additional search terms that are relevant to search term 1738*b*).

Transactions area 1754 includes transaction user interface objects 1754*a-c* corresponding to transactions associated with multiple (e.g., all) transfer accounts linked to electronic device 1600 that include data and/or information relevant to search term 1738*b*. For example, each of transaction user interface objects 1754*a-c* correspond to transactions for purchases related to groceries and/or purchases at grocery stores. Particularly, transaction user interface object 1754*a* corresponds to a transaction that occurred yesterday at 6:00 PM, at Food Market for $10.00 in Cupertino, California As set forth below, food market user interface 1740 also includes a user interface object corresponding to this same transaction.

Locations area 1756 includes location user interface objects 1756*a-b* corresponding to different locations that are relevant to search term 1738*b*. For example, location user interface objects 1756*a-b* correspond to locations where a user of electronic device 1600 conducted the transactions corresponding to transaction user interface objects 1754*a-c*. In some embodiments, location user interface objects 1756*a-b* correspond to locations in addition to those associated with transaction user interface objects 1754*a-c*. Electronic device 1600 matches data and/or information associated with multiple (e.g., all) transfer accounts linked to electronic device 1600 to determine locations that are relevant to search term 1738*b* (e.g., locations of transactions for groceries, locations of transactions at grocery stores, and/or locations having a name that includes search term 1738*b*).

At FIG. 17H, electronic device 1600 displays food market user interface 1740 in response to detecting user input 1750*g* of FIG. 17E. At FIG. 17H, food market user interface 1740 includes search bar user interface object 1740*a*, search term 1740*b* included in search bar user interface object 1740*a* (e.g., selection of food market merchant user interface object 1734*a* causes a search for "food market"), narrowing search area 1758, transactions area 1760, locations area 1762, and people area 1764.

Similar to narrowing search area 1722, narrowing search area 1742, and narrowing search area 1752, narrowing search area 1758 includes narrowing criteria user interface objects 1758*a-d* as suggestions for search terms to be added to search bar user interface object 1740*a* in addition to search term 1740*b* and based on search term 1740*b* (e.g., narrowing criteria user interface objects 1758*a-d* correspond to additional search terms that are relevant to search term 1740*b*).

Transactions area 1760 includes transaction user interface objects 1760*a-b* corresponding to transactions associated with multiple (e.g., all) transfer accounts linked to electronic device 1600 that include data and/or information relevant to search term 1740*b*. For example, each of transaction user interface objects 1760*a-b* correspond to transactions for purchases related to the merchant Food Market. Particularly, transaction user interface object 1760*a* corresponds to the same transaction as the transaction corresponding to transaction user interface object 1754*a* of groceries category user interface 1738. Specifically, the transaction corresponding to transaction user interface object 1760*a* occurred yesterday at 6:00 PM, at Food Market, for $10.00, in Cupertino, California Therefore, electronic device 1600 displays the same transaction in response to detecting user input on different user interface objects included in search options area 1730 of universal search user interface 1712 when the different user interface objects in search options area 1730 include overlapping data and/or information.

Locations area 1762 includes location user interface object 1762*a* corresponding to a location of the merchant Food Market. In some embodiments, a merchant includes multiple locations. Accordingly, locations area 1762 of food market user interface 1740 optionally includes additional location user interface objects corresponding to other locations of the merchant Food Market where any transfer account linked to electronic device 1600 was used to conduct a transaction and/or transfer.

Further, people area 1764 includes person user interface object 1764*a*. In some embodiments, recipients of a transfer (e.g., sending money to someone) are displayed in people area 1764 of the search results (e.g., based on a note entered by a user matching the search term). In some embodiments, transfer accounts are accessed and/or utilized by multiple users (e.g., joint accounts). Accordingly, people area 1764 displays person user interface object 1764*a* corresponding to a user that conducted transactions at the merchant Food Market ("John Appleseed"). In some embodiments, people area 1764 includes additional person user interface objects when another authorized user of a transfer account linked to electronic device 1600 conducts a transaction and/or transfer at the merchant Food Market.

A user may wish to conduct multiple searches for two different single transfer accounts instead of conducting a universal search for multiple (e.g., all) transfer accounts linked to electronic device 1600. As such, electronic device 1600 displays search results for each transfer account linked to electronic device 1600 in a similar (or the same) format and/or layout to facilitate user interaction with the transfer application and to enable a user to find the desired information quickly and efficiently. For example, FIGS. 17I-17K illustrate another example of electronic device 1600 conducting a search for a single transfer account. FIGS. 17I-17K show that different search results are generated for search term "Alaska" for a transfer account represented by Alaska Fly Premium user interface object 1702*c* when compared to search results for the transfer account represented by transfer card user interface object 1702*a*. However, single account search user interface 1770 at FIG. 17J and single account search user interface 1716 at FIG. 17C, as well as single account search results user interface 1772 at FIG. 17K and single account search results user interface 1720 at FIG. 17D, include the same general layout.

Figure 17L:
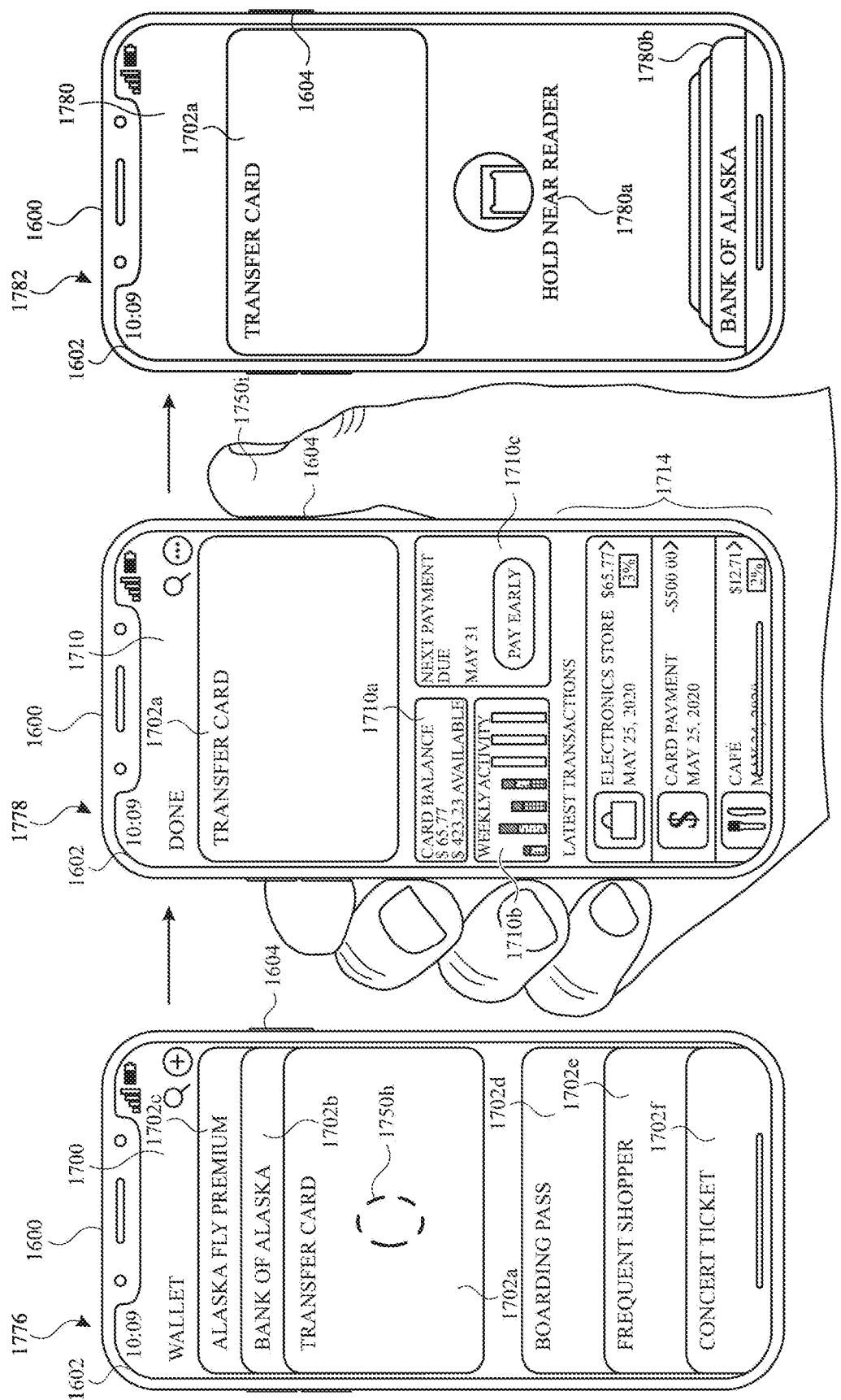
Figure 17M:
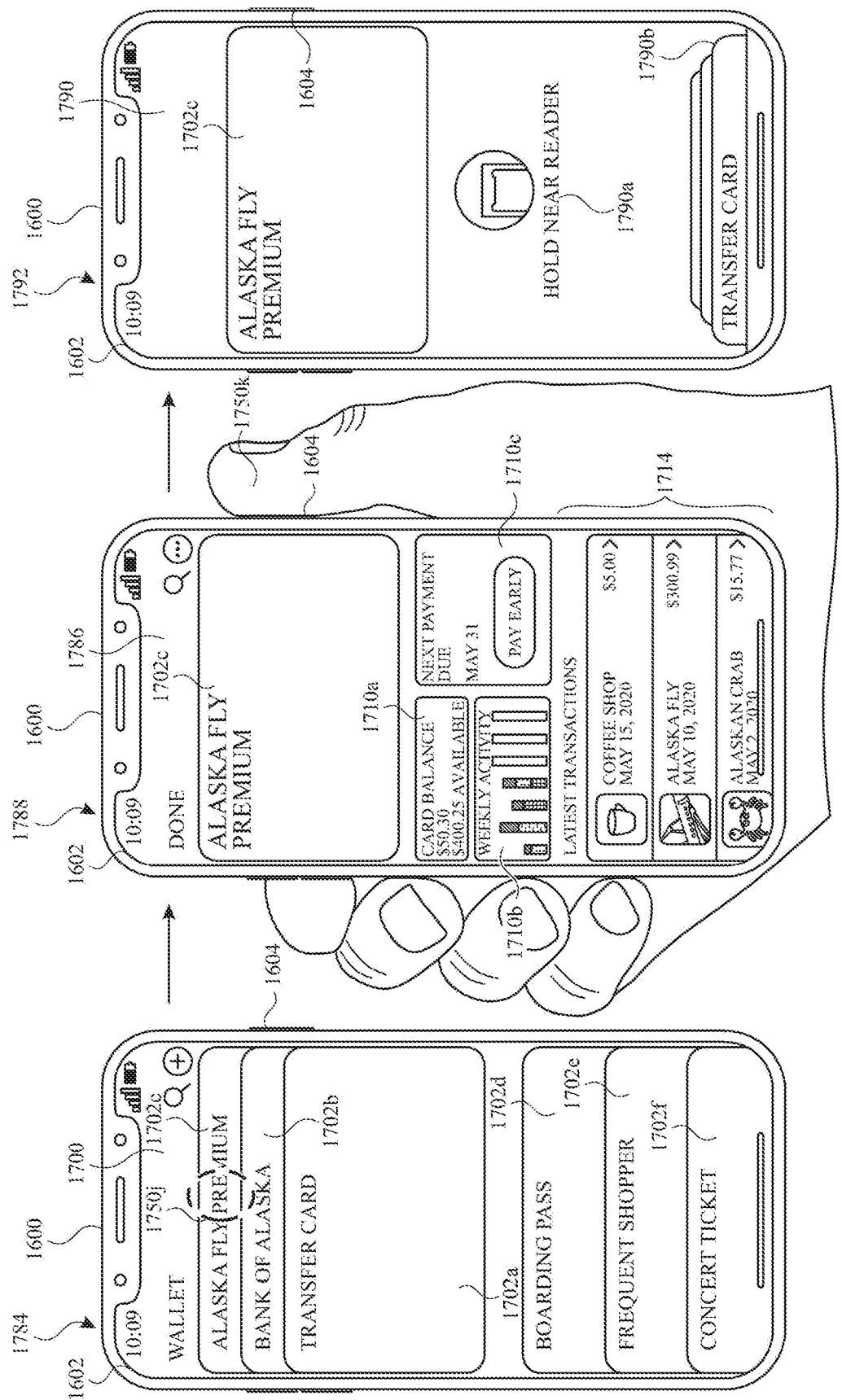

In some embodiments, a user may wish to conduct a transfer (e.g., a secure transfer, a secure transaction, and/or an encrypted transaction) using a transfer account of the transfer application using electronic device 1600. FIGS. 17L-17N illustrate examples of using electronic device 1600 to conduct transfers using transfer accounts associated with transfer card user interface object 1702*a*, Alaska Fly Premium user interface object 1702*c*, and concert ticket user interface object 1702*f*, respectively.

At 1776 of FIG. 17L, electronic device 1600 displays account user interface 1700 and detects tap gesture 1750*h* on transfer card user interface object 1702*a*. In response to detecting tap gesture 1750*h* on transfer card user interface object 1702*a*, electronic device 1600 displays details user interface 1710, as shown at 1778 of FIG. 17L. At 1778 of FIG. 17L, electronic device 1600 detects user input 1750*i* on side button 1604 (e.g., double tap gesture and/or double press gesture). In response to detecting user input 1750*i*, electronic device 1600 performs biometric authentication (e.g., facial recognition and/or fingerprint matching) of the user and, if successful, displays transfer user interface 1780 at 1782 of FIG. 17L. Transfer user interface 1780 includes transfer card user interface object 1702*a*, indicator 1780*a*, and stack 1780*b* of plurality of user interface objects 1702 (e.g., user interface objects of plurality of user interface objects 1702 without transfer card user interface object 1702*a*). Indicator 1780*a* prompts a user of electronic device 1600 to position electronic device 1600 within a threshold proximity of a receiver (e.g., a wireless communication terminal, an NFC terminal, and/or a device that is capable of receiving credentials from electronic device 1600). As such, the user input authenticates and/or activates the transfer account associated with transfer card user interface object 1702*a* and enables electronic device 1600 to release (e.g., transmit) credentials of the transfer account to conduct a transfer. In some embodiments, electronic device 1600 detects additional user input (e.g., face identification, fingerprint identification, and/or a passcode) after detecting user input 1750*i* and prior to displaying transfer user interface 1780. In some embodiments, this transaction is shown in search results when searching using a related search term.

At 1784 of FIG. 17M, electronic device 1600 displays account user interface 1700 and detects tap gesture 1750*j* on Alaska Fly Premium user interface object 1702*c*. In response to detecting tap gesture 1750*j* on Alaska Fly Premium user interface object 1702*c*, electronic device 1600 displays details user interface 1786 (e.g., similar to details user interface 1710), as shown at 1788 of FIG. 17M. At 1788 of FIG. 17M, electronic device 1600 detects user input 1750*k* on side button 1604 (e.g., double tap gesture and/or double press gesture). In response to detecting user input 1750*k*, electronic device 1600 performs biometric authentication (e.g., facial recognition and/or fingerprint matching) of the user and, if successful, displays transfer user interface 1790 at 1792 of FIG. 17M. Transfer user interface 1790 includes Alaska Fly Premium user interface object 1702*c*, indicator 1790*a*, and stack 1790*b* of plurality of user interface objects 1702 (e.g., user interface objects of plurality of user interface objects 1702 without Alaska Fly Premium user interface object 1702*c*). Indicator 1790*a* prompts a user of electronic device 1600 to position electronic device 1600 within a threshold proximity of a receiver (e.g., a wireless communication terminal, an NFC terminal, and/or a device that is capable of receiving credentials from electronic device 1600). As such, the user input authenticates and/or activates the transfer account associated with Alaska Fly Premium user interface object 1702*c* and enables electronic device 1600 to release (e.g., transmit) credentials of the transfer account to conduct a transfer. In some embodiments, electronic device 1600 detects additional user input (e.g., face identification, fingerprint identification, and/or a passcode) after detecting user input 1750*k* and prior to displaying transfer user interface 1790. In some embodiments, this transaction is shown in search results when searching using a related search term.

At 1794 of FIG. 17N, electronic device 1600 displays account user interface 1700 and detects tap gesture 1750l on concert ticket user interface object 1702f. In response to detecting tap gesture 1750l on concert ticket user interface object 1702f, electronic device 1600 displays transfer user interface 1796, as shown at 1798 of FIG. 17N. Transfer user interface 1796 includes concert ticket user interface object 1702f, indicator 1796a, and stack 1796b of plurality of user interface objects 1702 (e.g., user interface objects of plurality of user interface objects 1702 without concert ticket user interface object 1702f). Indicator 1796a prompts a user of electronic device 1600 to position electronic device 1600 within a threshold proximity of a receiver (e.g., a wireless communication terminal, an NFC terminal, and/or a device that is capable of receiving credentials from electronic device 1600). As such, tap gesture 1750l enables electronic device 1600 to release (e.g., transmit) credentials of the transfer account to conduct a transfer. The transfer account represented by concert ticket user interface object 1702f is associated with a pass (e.g., a ticket) and (optionally) does not involve a transfer of credits (e.g., concert ticket is already purchased and is being used only to gain entry to a venue of an event instead of transferring funds from transfer account). Accordingly, electronic device 1600 does not detect user input on side button 1604 in order to authenticate and/or activate the transfer account associated with concert ticket user interface object 1702f. In some embodiments, electronic device 1600 detects additional user input (e.g., face identification, fingerprint identification, and/or a passcode) after detecting tap gesture 1750l and prior to displaying transfer user interface 1796. In some embodiments, this transaction is shown in the search results when searching using a related search term.

FIG. 18 is a flow diagram illustrating a method for searching one or more transfer accounts in accordance with some embodiments. Method 1800 is performed at a computer system (e.g., 100, 300, 500, 600a, 600b, 800, 1000, 1050, 1200, 1600) that is in communication with a display generation component (e.g., 602a, 602b, 802, 1002, 1052, 1202, 1602) and one or more input devices (e.g., a touch-sensitive surface, a camera, a fingerprint sensor, and/or a biometric sensor). Some operations in method 1800 are, optionally, combined, the orders of some operations are, optionally, changed, and some operations are, optionally, omitted.

As described below, method 1800 provides an intuitive way for search one or more transfer accounts linked (e.g., provisioned) to the computer system. The method reduces the cognitive burden on a user when searching for particular information corresponding to a transfer account linked to the computer system. For battery-operated computing systems, enabling a user to find the desired information more easily conserves power and increases the time between battery charges.

In method 1800, the computer system (e.g., 1600, a smart device, such as a smartphone or a smartwatch; a mobile device) is in communication with a display generation component (e.g., 1602) and one or more input devices (e.g., touch-sensitive surface). The computer system displays (1802), via the display generation component, a search user interface (e.g., 1610, 1612, 1712, 1716, 1720, 1732, 1738).

While displaying the search user interface, the computer system receives (1804), via the one or more input devices (e.g., via the touch-sensitive surface and/or via the hardware button), input that includes a search term (e.g., 1610b, 1612b, 1738b, 1720a, 1732a, a plurality of alphanumeric characters).

In response to receiving the input that includes the search term (1806) and in accordance with a determination that the search user interface corresponds to a plurality of transfer accounts (e.g., a first account and a second account) provisioned on the computer system and configured to transfer a resource of the respective transfer account upon user authorization (e.g., as shown in FIGS. 16B, 17F), the computer system concurrently displays (1808), via the display generation component, a plurality of search results (e.g., 1746, 1748, 1744) selected using the search term. The plurality of search results include a first search result (1810) (e.g., 1744a) corresponding to a resource transfer activity of (e.g., a transaction using) a first account of the plurality of transfer accounts and a second search result (1812) (e.g., 1744b) corresponding to a resource transfer activity of (e.g., a transaction using) a second account, different from the first account, of the plurality of transfer accounts.

Providing search results corresponding to resource transfer activities of a plurality of accounts based on a search term provides the user with feedback about the resource transfer activities that relate to the search term for the plurality of accounts, thereby reducing the need to provide multiple inputs to conduct multiple searches. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, transfers (e.g., transactions) are secure transfers (e.g., secure transactions, and/or encrypted transactions). In some embodiments, to secure the transfer, a device account number (that optionally can only be decrypted with user authorization) is stored in a secure element of the computer system. The device account number is isolated from the operating system of the computer system and is not backed up during backup processes. After the computer system receives authorization (e.g., via authentication and/or via biometric authentication (face recognition, fingerprint recognition) to perform the transfer (e.g., use the account in the transaction), the secure element provides (e.g., transmits, wirelessly) device account number and a transaction-specific dynamic security code to the terminal (e.g., a wireless communication terminal) along with additional information needed to complete the transfer. In some embodiments, the computer system does not send the actual payment card number. Accordingly, the transfer is a secure transfer.

Configuring transfer accounts provisioned on the computer system to securely transfer a resource provides additional security by helping to prevent the resource from being used without the user's authorization.

In some embodiments (e.g., prior to receiving the input that includes the search term), the search user interface includes a plurality of visual representations (e.g., 1746a, 1746b) of a plurality of different transfer accounts (e.g., the first account and the second account).

Displaying the plurality of visual representations of the plurality of different transfer accounts provides the user with feedback about which transfer accounts are provisioned on the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to displaying the search user interface, the computer system displays, via the display generation component, an account user interface that includes a search option. In some embodiments, the account user interface includes a plurality of visual representations of different transfer accounts (e.g., a first visual representation of a first account and a second visual representation of a second account). In some embodiments, the account user interface includes a single visual representation of a transfer account. In response to detecting activation of the search option and in accordance with a determination that the account user interface includes (or corresponds to) a plurality of visual representations of a plurality of transfer accounts, the computer system displays the search user interface that corresponds to the plurality of transfer accounts. In response to detecting activation of the search option and in accordance with a determination that the account user interface includes (or corresponds to) a single visual representation of a transfer account, the computer system displays the search user interface that corresponds to the single transfer account.

In some embodiments, the transfer accounts correspond to transit accounts, loyalty accounts, payment accounts, and/or transit accounts.

In some embodiments, while the computer system displays the plurality of visual representations (e.g., 1702a-1702f, 1746a, 1746b) of the plurality of different transfer accounts (e.g., as part of the search user interface and/or as part of the account user interface), the computer system receives a selection input corresponding to (e.g., 1750a, 1750h, 1750j, 1750l, a tap gesture at a location corresponding to) a visual representation of a respective transfer account. In response to receiving the selection input corresponding to the visual representation of the respective transfer account, the computer system displays a user interface (e.g., 1710, 1786, 1796) for use of the respective transfer account in a transfer (e.g., a transaction).

In some embodiments, the user interface for use of the respective transfer account in a transfer includes a search option, which, when activated displays the search user interface.

Displaying a user interface for using the respective transfer account in a transfer provides the user with feedback about which transfer account will be used if a transfer is performed using the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the user interface (e.g., 1710, 1786, 1796) for use of the respective transfer account in a transfer (e.g., a transaction), the computer system receives authentication input (e.g., 1750i, 1750k, double-press of a hardware button and/or biometric input to authorize use of the respective transfer account). In response to receiving the authentication input and in accordance with the respective transfer account being the first account (and in accordance with a determination that the biometric input corresponds to an authorized input), the computer system prepares the first account for use (e.g., for use in a transfer, without preparing the second account for use in the transfer). In response to receiving the authentication input and in accordance with the respective transfer account being the second account (and in accordance with a determination that the biometric input corresponds to an authorized input), the computer system prepares the second account for use (e.g., for use in a transfer, without preparing the first account for use in the transfer).

Thus, a user authorizes an account to be prepared for use to transfer a resource of the respective account by providing a valid biometric input (e.g., via facial recognition and/or fingerprint recognition).

In some embodiments, using an account in a transaction includes transmitting a signal that includes credentials (e.g., payment information) for the account, such as a payment account. In some embodiments, preparing to use the account in a transaction includes reconfiguring the electronic device (e.g., 100, 300, 500, 600) to respond as a contactless payment card, such as an NFC-enabled contactless payment card, and then transmitting credentials of the account via NFC, such as to a wireless contactless payment terminal. In some embodiments, subsequent to transmitting credentials of the account via NFC, the computer system reconfigures to not respond as a contactless payment card (e.g., requiring authorization before again being reconfigured to respond as a contactless payment card via NFC).

In some embodiments, generation of and/or transmission of the signal is controlled by a secure element in the electronic device (e.g., 100, 300, 500, 600). The secure element optionally requires a particular user input prior to releasing payment information. For example, the secure element optionally requires detection that the electronic device is being worn, detection of a button press, detection of entry of a passcode, detection of a touch, detection of one or more option selections (e.g., received while interacting with an application), detection of a fingerprint signature, detection of a voice or voice command, detection of a gesture or movement (e.g., rotation and/or acceleration), biometric authentication, and/or facial recognition. In some examples, if a communication channel (e.g., an NFC communication channel) with another device (e.g., a contactless payment terminal) is established within a defined time period from detection of the input, the secure element releases payment information to be transmitted to the other device (e.g., the contactless payment terminal). In some examples, the secure element is a hardware component that controls release of secure information. In some examples, the secure element is a software component that controls release of secure information.

Preparing different accounts for use in a transfer based on a selection of the account prepares an appropriate transfer account to be used in a transfer. The authentication input helps to prevent unauthorized transfers using the prepared account.

In some embodiments, the search user interface (e.g., 1610, 1612, 1712, 1716, 1720, 1732, 1738) is generated by a first application and the first search result corresponding to the resource transfer activity is based on data received from a first source different from the first application (e.g., from a third-party application and/or from an external source (e.g., from a terminal, such as a wireless communication terminal for NFC transactions)).

In some embodiments, the second search result corresponding to the resource transfer activity is based on data received from a second source different from the first application and the first source.

Displaying search results corresponding to resource transfer activities based on data received from external sources provides the user feedback about the data transmitted from the external sources to the computer system. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to the computer system receiving the input that includes the search term and in accordance with a determination that the search user interface corresponds to the first account (e.g., and not the second account) provisioned on the computer system and configured to transfer a resource of the first account upon user authorization (e.g., as in FIGS. 17C, 17D), the computer system displays, via the display generation component, a second plurality of search results (e.g., 1728a (same as 1744a), 1728b). The second plurality of search results is selected using the search term without including the second search result (e.g., 1744b) corresponding to the resource transfer activity of the second account. In some embodiments, the second plurality of search results include the first search result (e.g., 1728a (same as 1744a)) corresponding to the resource transfer activity of (e.g., a transaction using) the first account of the plurality of transfer accounts and a third search result (e.g., 1728b) corresponding to another resource transfer activity of the first account of the plurality of transfer accounts. In some embodiments, the third search result is displayed concurrently with the first search result.

Providing search results corresponding to resource transfer activities of a single account based on a search term provides the user with feedback about the resource transfer activities that relate to the search term for that specific account, thereby reducing the need for the user to provide more inputs to find a particular transfer (e.g., when the account used for the transfer is already known to the user). Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, when the search user interface corresponds to a single transfer account, the search results include results corresponding to that respective single transfer account and do not include results corresponding to other transfer accounts.

In some embodiments, a first set of search results of the plurality of search results are displayed in a first grouping of a plurality of groupings of data (e.g., as shown in FIG. 17F) and a second set of search results of the plurality of search results are displayed in a second grouping of the plurality of groupings of data (e.g., as shown in FIG. 17D).

In some embodiments, the search results are selected by searching a plurality of groupings of data (e.g., same as the multiple groupings). In some embodiments, the plurality of groupings of data includes categories, merchants, people, locations, and accounts. In some embodiments, different search results of the first plurality of search results are grouped together and displayed within respective categories of the same multiple categories.

Searching a plurality of groupings of data and displaying the results grouped according to the groupings provides more complete search results, thereby reducing the need for the user to provide inputs to separately search each grouping of data. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of groupings of data includes one or more of categories (e.g., 1724), merchants (e.g., 1726), people (e.g., 1764), and locations (e.g., 1756). In some embodiments, the plurality of groupings of data includes all of: categories, merchants, people, and locations.

Searching a plurality of groupings of data and displaying the results grouped according to the groupings provides more complete search results, thereby reducing the need for the user to provide inputs to separately search each grouping of data. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays the search user interface prior to receiving the input that includes the search term and by displaying (e.g., as in FIGS. 17C and 17E) respective groupings of multiple groupings (e.g., categories, merchants, people, locations, and/or recently searched, same as the plurality of groupings of data).

In some embodiments, each category is visually separated from the other groupings. In some embodiments, each category includes one or more search objects, each search object corresponding to a suggested search term relating to the respective category.

Displaying indications of multiple groupings provides the user with feedback about how the search results will be grouped, thereby enabling the user to more quickly identify search results of particular interest when the search results are displayed. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system concurrently displays the plurality of search results selected using the search term by concurrently displaying: a first set of one or more search results of the plurality of search results in a first grouping; (e.g., 1742, 1746, a first section visually separated from a second section) and a second set of one or more search results of the plurality of search results in a second grouping (e.g., 1748, 1744, a second section).

Displaying search results grouped into groupings enables the user to more quickly identify search results of particular interest by first finding the grouping of interest. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, multiple search results (of the plurality of search results) of a first group are displayed in a first group section and multiple different search results (of the plurality of search results) of a second group are displayed (concurrently with the first group) in a second group section.

In some embodiments, in response to the computer system receiving the input that includes the search term and in accordance with a determination that the search user interface corresponds to the first account, the computer system displays search results (e.g., as in FIG. 17D) corresponding to the first account (and not to the second account) by grouping together different results and displaying the grouped results within respective groupings (e.g., of the multiple groupings). In some embodiments, in response to the computer system receiving the input that includes the search term and in accordance with a determination that the search user interface corresponds to the second account, the computer system displays search results (e.g., as in FIG. 17K) corresponding to the second account (and not to the first account) by grouping together different results and displaying the grouped results within the respective groupings (e.g., same groupings as for results of the first account, of the multiple groupings).

Display similar types of search results in similar groupings across the multiple transfer accounts enables the computer system to provide the user with consistently formatted results independent of the searched transfer account, thereby reducing the number of inputs the user needs to provide to navigate the respective search results. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while the computer system displays the search user interface, the computer system receives input (e.g., 1750f, 1760g, a tap input) selecting an option (e.g., 1733a, 1734a) of a grouping (e.g., selecting a search option within a section/grouping). In response to receiving the input selecting an option of a grouping and in accordance with a determination that the selected option is a first option (e.g., 1733a, of a first group), the computer system displays multiple search results corresponding to the first option. The multiple search results corresponding to the first option include a fourth search result corresponding to a resource transfer activity (e.g., a transaction using) and a fifth search result corresponding to a resource transfer activity and without displaying a sixth search result corresponding to a resource transfer activity (e.g., as in FIG. 17G). In some embodiments, in response to receiving the input selecting an option of a grouping and in accordance with a determination that the selected option is a second option (e.g., 1734a, of the first grouping, of a second grouping), the computer system displays multiple search results corresponding to the second option. The multiple search results corresponding to the second option include the fourth search result corresponding to a resource transfer activity (e.g., a transaction using) and the sixth search result corresponding to a resource transfer activity without displaying the fifth search result corresponding to a resource transfer activity (e.g., as in FIG. 17H).

Displaying the same search result as part of different grouping options enables the computer system to provide the user with the relevant search result when any group option relevant to the search result is selected, thereby reducing the need for the user to select multiple grouping options to find a search result. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, selecting options of a category causes display of transfer activities (e.g., transactions) grouped within a particular option or grouping. In some embodiments, the same transfer activity can be grouped under multiple options or groupings, and thus be displayed when various options are selected.

In some embodiments, the computer system concurrently displays, via the display generation component, with the plurality of search results selected using the search term, a filter option (or a plurality of filter options) (e.g., 1758a-1758d) which, when selected, narrows the displayed search results. In some embodiments, the plurality of filter options include options to narrow the search results by account, by date, by location (e.g., a particular location), by amount (e.g., less than a particular amount), by rewards purchases, by people (e.g., by particular people involved in the transfer), by transfers performed using a physical credit card, or by transfer performed using the computer system.

Providing filter options to narrow the search results displayed provides the user with the ability to narrow the search by selecting a single option, rather than the used needing to provide multiple inputs to type out a term by which to narrow the search. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the filter option (or the plurality of filter options) is selected based on the received search term (e.g., 1740b).

Providing filter options based on the received search term provides the user with the ability to narrow the search by selecting a single option, rather than the used needing to provide multiple inputs to type out a term by which to narrow the search. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the filter option (or the plurality of filter options) is selected based on prior searches (e.g., prior search terms and/or prior filtering options that were selected by the user).

Providing filter options based on prior searches provides the user with the ability to narrow the search by selecting a single option, rather than the used needing to provide multiple inputs to type out a term by which to narrow the search. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the plurality of search results selected using the search term includes one or more (e.g., representations of) payment accounts (e.g., 1746*a*, 1746*b*, the first account, the second account).

Displaying search results that include a payment account enables the computer system to provide the user with feedback about payment accounts provisioned onto the computer system that match the search term. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system receives a selection input corresponding to (e.g., a tap gesture at a location corresponding to) a payment account of the one or more payment accounts. In response to receiving the selection input corresponding to the payment account, the computer system displays a user interface for use of the respective transfer account in a transfer (e.g., a transaction). Thus, the user can search for a payment account and then easily use that payment account for a transfer (e.g., an NFC payment).

In some embodiments, the plurality of search results selected using the search term includes one or more (e.g., representations of) pass accounts (e.g., 1748*a*, 1748*b*, 1748*c*, the first account, the second account). In some embodiments, a pass account is a non-payment account. In some examples, a pass account is a park pass that provides access to park attractions or a transit pass that provides access to transit (e.g., bus and/or train) services. In some examples, a pass account is an airplane boarding pass that provides access to a secure area of an airport and/or entry to the airplane corresponding to the pass. In some examples, a pass account is loyalty account. In some embodiments, a loyalty account is an account of a loyalty program that provides a structured marketing effort that rewards customers/members. A loyalty account is optionally specific to one particular company, store, or chain of stores. A company (such as a retail store or chain of stores) may use a loyalty account to track purchases or other information about a user (e.g., a purchaser). The loyalty account typically entitles the user to a discount on a current or future purchase and/or an allotment of points that may be used toward future purchases or gifts. In some embodiments, loyalty accounts cannot be used for making payments. In some embodiments, the one or more pass accounts are concurrently displayed with one or more payment accounts and/or one or more loyalty accounts.

Displaying search results that include a pass account enables the computer system to provide the user with feedback about pass accounts provisioned onto the computer system that match the search term. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system receives a selection input corresponding to (e.g., a tap gesture at a location corresponding to) a pass account of the one or more pass accounts. In response to receiving the selection input corresponding to the pass account, the computer system displays a user interface for use of the respective pass account in a transfer (e.g., a transaction). Thus, the user can search for a pass account and then easily use that pass account for a transfer (e.g., a transaction, entering a transit station, and/or accessing a ride).

Note that details of the processes described above with respect to method 1800 (e.g., FIG. 18) are also applicable in an analogous manner to the methods described above. For example, methods 700, 900, 1100, 1400, and 1500 optionally include one or more of the characteristics of the various methods described above with reference to method 1800. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources share and use passes or accounts. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide access to passes or accounts. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, passes or accounts can be shared and used based on non-personal information data or a bare minimum amount of personal information, other non-personal information, or publicly available information.

What is claimed is:

1. A computer system, comprising:
    a display generation component;
    one or more input devices;
    one or more processors; and
    memory storing one or more programs configured to be executed by the one or more processors, the one or more programs including instructions for:
        displaying, via the display generation component, a first user interface including an indication of an account;
        receiving, via the one or more input devices, authentication data; and
        in response to receiving the authentication data:
            in accordance with a determination that the authentication data satisfies authentication criteria associated with the account, displaying, via the display generation component, a first machine-readable code associated with the account; and
            in accordance with a determination that the authentication data does not satisfy the authentication criteria associated with the account, forgoing display of the first machine-readable code associated with the account; and
        after displaying the first machine-readable code associated with the account:
            in accordance with a determination that second authentication data is received within a predetermined amount of time and that the second authentication data satisfies the authentication criteria associated with the account, maintaining display of the first machine-readable code associated with the account;
            receiving a confirmation that the first machine-readable code was successfully used to access information associated with the account;
            in response to receiving the confirmation that the first machine-readable code was successfully used to access information associated with the account:
                ceasing to display the first machine-readable code; and
                displaying, via the display generation component, an indication that information associated with the account was successfully accessed; and
            in accordance with a determination that second authentication data is not received within the predetermined amount of time or that the second authentication data does not satisfy the authentication criteria associated with the account, ceasing to display the first machine-readable code associated with the account.

2. The computer system of claim 1, wherein the one or more programs further include instructions for:
    displaying, via the display generation component, a second user interface for an application associated with a service provider, wherein the account is associated with the service provider;
    while displaying the second user interface, detecting a request to configure the account for use in the first user interface; and in response to detecting the request to configure the account for use in the first user interface, including the indication of the account in the first user interface.

3. The computer system of claim 1, wherein displaying the first machine-readable code includes replacing the display of the indication of the account with the display of the first machine-readable code.

4. The computer system of claim 1, wherein the one or more programs further include instructions for:
  receiving, via the one or more input devices, second authentication data; and
  in response to receiving the second authentication data:
    in accordance with a determination that the second authentication data satisfies the authentication criteria associated with the account, displaying, via the display generation component, a second machine-readable code associated with the account, wherein the second machine-readable code is different from the first machine-readable code; and
    in accordance with a determination that the second authentication data does not satisfy the authentication criteria associated with the account, forgoing display of the second machine-readable code associated with the account.

5. The computer system of claim 1, wherein the one or more programs further include instructions for:
  after displaying the first machine-readable code associated with the account, ceasing to display the first machine-readable code after a predetermined amount of time.

6. The computer system of claim 1, wherein the one or more programs further include instructions for:
  after displaying the first machine-readable code associated with the account:
    ceasing to display the first machine-readable code after a predetermined amount of time; and
    displaying a second machine-readable code associated with the account that is different from the first machine-readable code associated with the account.

7. The computer system of claim 1, wherein the one or more programs further include instructions for:
  after displaying the first machine-readable code associated with the account:
    in accordance with a determination that second authentication data is not received within the predetermined amount of time or the second authentication data does not satisfy the authentication criteria associated with the account, displaying a request for the second authentication data.

8. The computer system of claim 1, wherein displaying the first machine-readable code includes displaying the first machine-readable code at a first size, and wherein the one or more programs further include instructions for:
  while displaying the first machine-readable code at the first size, detecting a request to display the first machine-readable code at a larger size; and
  in response to detecting the request to display the first machine-readable code at a larger size, displaying the first machine-readable code at a second size larger than the first size.

9. The computer system of claim 1, wherein the first machine-readable code is a machine-readable code of a first type, and wherein the one or more programs further include instructions for:
  while displaying the first machine-readable code of the first type, detecting a request to display a first machine-readable code of a second type; and
  in response to detecting the request to display the first machine-readable code of the second type, displaying the first machine-readable code of the second type.

10. The computer system of claim 1, wherein displaying the first user interface includes displaying one or more offers associated with the account.

11. A non-transitory computer-readable storage medium storing one or more programs configured to be executed by one or more processors of a computer system that is in communication with a display generation component and one or more input devices, the one or more programs including instructions for:
  displaying, via the display generation component, a first user interface including an indication of an account;
  receiving, via the one or more input devices, authentication data; and
  in response to receiving the authentication data:
    in accordance with a determination that the authentication data satisfies authentication criteria associated with the account, displaying, via the display generation component, a first machine-readable code associated with the account; and
    in accordance with a determination that the authentication data does not satisfy the authentication criteria associated with the account, forgoing display of the first machine-readable code associated with the account; and
  after displaying the first machine-readable code associated with the account:
    in accordance with a determination that second authentication data is received within a predetermined amount of time and that the second authentication data satisfies the authentication criteria associated with the account, maintaining display of the first machine-readable code associated with the account;
    receiving a confirmation that the first machine-readable code was successfully used to access information associated with the account;
    in response to receiving the confirmation that the first machine-readable code was successfully used to access information associated with the account:
      ceasing to display the first machine-readable code; and
      displaying, via the display generation component, an indication that information associated with the account was successfully accessed; and
    in accordance with a determination that second authentication data is not received within the predetermined amount of time or that the second authentication data does not satisfy the authentication criteria associated with the account, ceasing to display the first machine-readable code associated with the account.

12. A method, comprising:
  at a computer system that is in communication with a display generation component and one or more input devices:
    displaying, via the display generation component, a first user interface including an indication of an account;
    receiving, via the one or more input devices, authentication data; and
    in response to receiving the authentication data:
      in accordance with a determination that the authentication data satisfies authentication criteria associated with the account, displaying, via the display generation component, a first machine-readable code associated with the account; and in accordance with a determination that the authentication data does not satisfy the authentication criteria associated with the account, forgoing display of the first machine-readable code associated with the account; and after displaying the first machine-readable code associated with the account:

in accordance with a determination that second authentication data is received within a predetermined amount of time and that the second authentication data satisfies the authentication criteria associated with the account, maintaining display of the first machine-readable code associated with the account;

receiving a confirmation that the first machine-readable code was successfully used to access information associated with the account;

in response to receiving the confirmation that the first machine-readable code was successfully used to access information associated with the account:

ceasing to display the first machine-readable code; and displaying, via the display generation component, an indication that information associated with the account was successfully accessed; and in accordance with a determination that second authentication data is not received within the predetermined amount of time or that the second authentication data does not satisfy the authentication criteria associated with the account, ceasing to display the first machine-readable code associated with the account.

13. The non-transitory computer-readable storage medium of claim 11, wherein the one or more programs further include instructions for:

displaying, via the display generation component, a second user interface for an application associated with a service provider, wherein the account is associated with the service provider;

while displaying the second user interface, detecting a request to configure the account for use in the first user interface; and in response to detecting the request to configure the account for use in the first user interface, including the indication of the account in the first user interface.

14. The non-transitory computer-readable storage medium of claim 11, wherein displaying the first machine-readable code includes replacing the display of the indication of the account with the display of the first machine-readable code.

15. The non-transitory computer-readable storage medium of claim 11, wherein the one or more programs further include instructions for:

receiving, via the one or more input devices, second authentication data; and in response to receiving the second authentication data:

in accordance with a determination that the second authentication data satisfies the authentication criteria associated with the account, displaying, via the display generation component, a second machine-readable code associated with the account, wherein the second machine-readable code is different from the first machine-readable code; and in accordance with a determination that the second authentication data does not satisfy the authentication criteria associated with the account, forgoing display of the second machine-readable code associated with the account.

16. The non-transitory computer-readable storage medium of claim 11, wherein the one or more programs further include instructions for:

after displaying the first machine-readable code associated with the account, ceasing to display the first machine-readable code after a predetermined amount of time.

17. The non-transitory computer-readable storage medium of claim 11, wherein the one or more programs further include instructions for:

after displaying the first machine-readable code associated with the account:

ceasing to display the first machine-readable code after a predetermined amount of time; and displaying a second machine-readable code associated with the account that is different from the first machine-readable code associated with the account.

18. The non-transitory computer-readable storage medium of claim 11, wherein the one or more programs further include instructions for:

after displaying the first machine-readable code associated with the account:

in accordance with a determination that second authentication data is not received within the predetermined amount of time or the second authentication data does not satisfy the authentication criteria associated with the account, displaying a request for the second authentication data.

19. The non-transitory computer-readable storage medium of claim 11, wherein displaying the first machine-readable code includes displaying the first machine-readable code at a first size, and wherein the one or more programs further include instructions for:

while displaying the first machine-readable code at the first size, detecting a request to display the first machine-readable code at a larger size; and in response to detecting the request to display the first machine-readable code at a larger size, displaying the first machine-readable code at a second size larger than the first size.

20. The non-transitory computer-readable storage medium of claim 11, wherein the first machine-readable code is a machine-readable code of a first type, and wherein the one or more programs further include instructions for:

while displaying the first machine-readable code of the first type, detecting a request to display a first machine-readable code of a second type; and in response to detecting the request to display the first machine-readable code of the second type, displaying the first machine-readable code of the second type.

21. The non-transitory computer-readable storage medium of claim 11, wherein displaying the first user interface includes displaying one or more offers associated with the account.

22. The method of claim 12, the method further comprising:

displaying, via the display generation component, a second user interface for an application associated with a service provider, wherein the account is associated with the service provider;

while displaying the second user interface, detecting a request to configure the account for use in the first user interface; and in response to detecting the request to configure the account for use in the first user interface, including the indication of the account in the first user interface.

23. The method of claim 12, wherein displaying the first machine-readable code includes replacing the display of the indication of the account with the display of the first machine-readable code.

24. The method of claim 12, the method further comprising:
receiving, via the one or more input devices, second authentication data; and
in response to receiving the second authentication data:
in accordance with a determination that the second authentication data satisfies the authentication criteria associated with the account, displaying, via the display generation component, a second machine-readable code associated with the account, wherein the second machine-readable code is different from the first machine-readable code; and
in accordance with a determination that the second authentication data does not satisfy the authentication criteria associated with the account, forgoing display of the second machine-readable code associated with the account.

25. The method of claim 12, the method further comprising:
after displaying the first machine-readable code associated with the account, ceasing to display the first machine-readable code after a predetermined amount of time.

26. The method of claim 12, the method further comprising:
after displaying the first machine-readable code associated with the account:
ceasing to display the first machine-readable code after a predetermined amount of time; and
displaying a second machine-readable code associated with the account that is different from the first machine-readable code associated with the account.

27. The method of claim 12, the method further comprising:
after displaying the first machine-readable code associated with the account:
in accordance with a determination that second authentication data is not received within the predetermined amount of time or the second authentication data does not satisfy the authentication criteria associated with the account, displaying a request for the second authentication data.

28. The method of claim 12, wherein displaying the first machine-readable code includes displaying the first machine-readable code at a first size, the method further comprising:
while displaying the first machine-readable code at the first size, detecting a request to display the first machine-readable code at a larger size; and
in response to detecting the request to display the first machine-readable code at a larger size, displaying the first machine-readable code at a second size larger than the first size.

29. The method of claim 12, wherein the first machine-readable code is a machine-readable code of a first type, the method further comprising:
while displaying the first machine-readable code of the first type, detecting a request to display a first machine-readable code of a second type; and
in response to detecting the request to display the first machine-readable code of the second type, displaying the first machine-readable code of the second type.

30. The method of claim 12, wherein displaying the first user interface includes displaying one or more offers associated with the account.

* * * * *